(12) United States Patent
Adkins

(10) Patent No.: US 7,672,918 B2
(45) Date of Patent: Mar. 2, 2010

(54) ARTIFICIAL NEURON

(76) Inventor: Steve Adkins, 25089 Larson Rd., Monroe, OR (US) 97456

( * ) Notice: Subject to any disclaimer, the term of this patent is extended or adjusted under 35 U.S.C. 154(b) by 206 days.

(21) Appl. No.: 12/026,543

(22) Filed: Feb. 5, 2008

(65) Prior Publication Data

US 2009/0132452 A1    May 21, 2009

Related U.S. Application Data

(60) Provisional application No. 60/899,475, filed on Feb. 5, 2007.

(51) Int. Cl.
*G06N 3/08* (2006.01)
(52) U.S. Cl. .................................................. 706/25
(58) Field of Classification Search ................. 706/25
See application file for complete search history.

(56) References Cited

U.S. PATENT DOCUMENTS

| | | | |
|---|---|---|---|
| 4,660,166 A | 4/1987 | Hopfield | |
| 4,719,591 A | 1/1988 | Hopfield et al. | |
| 4,752,906 A | 6/1988 | Kleinfeld | |
| 5,253,329 A | 10/1993 | Villarreal et al. | |
| 5,479,571 A | 12/1995 | Parlos et al. | |
| 5,553,195 A | 9/1996 | Meijer | |
| 5,588,090 A | 12/1996 | Furuta et al. | |
| 5,648,926 A * | 7/1997 | Douglas et al. | 708/801 |
| 6,212,508 B1 | 4/2001 | Sterzing et al. | |
| 6,363,369 B1 | 3/2002 | Liaw et al. | |
| 6,581,046 B1 | 6/2003 | Ahissar | |
| 6,581,049 B1 * | 6/2003 | Aparicio et al. | 706/39 |
| 6,625,588 B1 * | 9/2003 | Haikonen | 706/33 |
| 7,287,015 B2 * | 10/2007 | Cecchi et al. | 706/20 |
| 2001/0023419 A1 * | 9/2001 | Lapointe et al. | 706/15 |

OTHER PUBLICATIONS

Statsoft, Neural Networks. Verified by Wayback Machine to Feb. 2, 2006.*
Touussaint; "On model selection and the disability of neural networks to decompose tasks" Proceedings of the International Joint Conference on Neural Networks 2002.*

* cited by examiner

*Primary Examiner*—David R Vincent
*Assistant Examiner*—Ben M Rifkin
(74) *Attorney, Agent, or Firm*—Young Basile

(57) ABSTRACT

Artificial neurons and processing elements for artificial neurons are disclosed. One processing element generates a continuous value signal based on the first plurality of inputs and generates a responsiveness based on a second plurality of inputs. An output value determining portion generates an output signal that is equal to a predetermined value when the responsiveness signal corresponds to a non-responsive and equal to the continuous value signal when the responsiveness signal corresponds to a responsive state. Another processing element produces an output signal having a magnitude equal to zero except during a fixed time after an event when the output signal has a magnitude based on an event time.

7 Claims, 102 Drawing Sheets

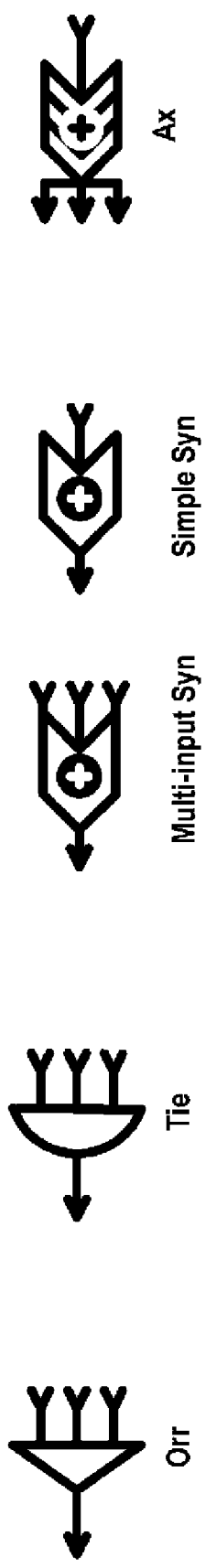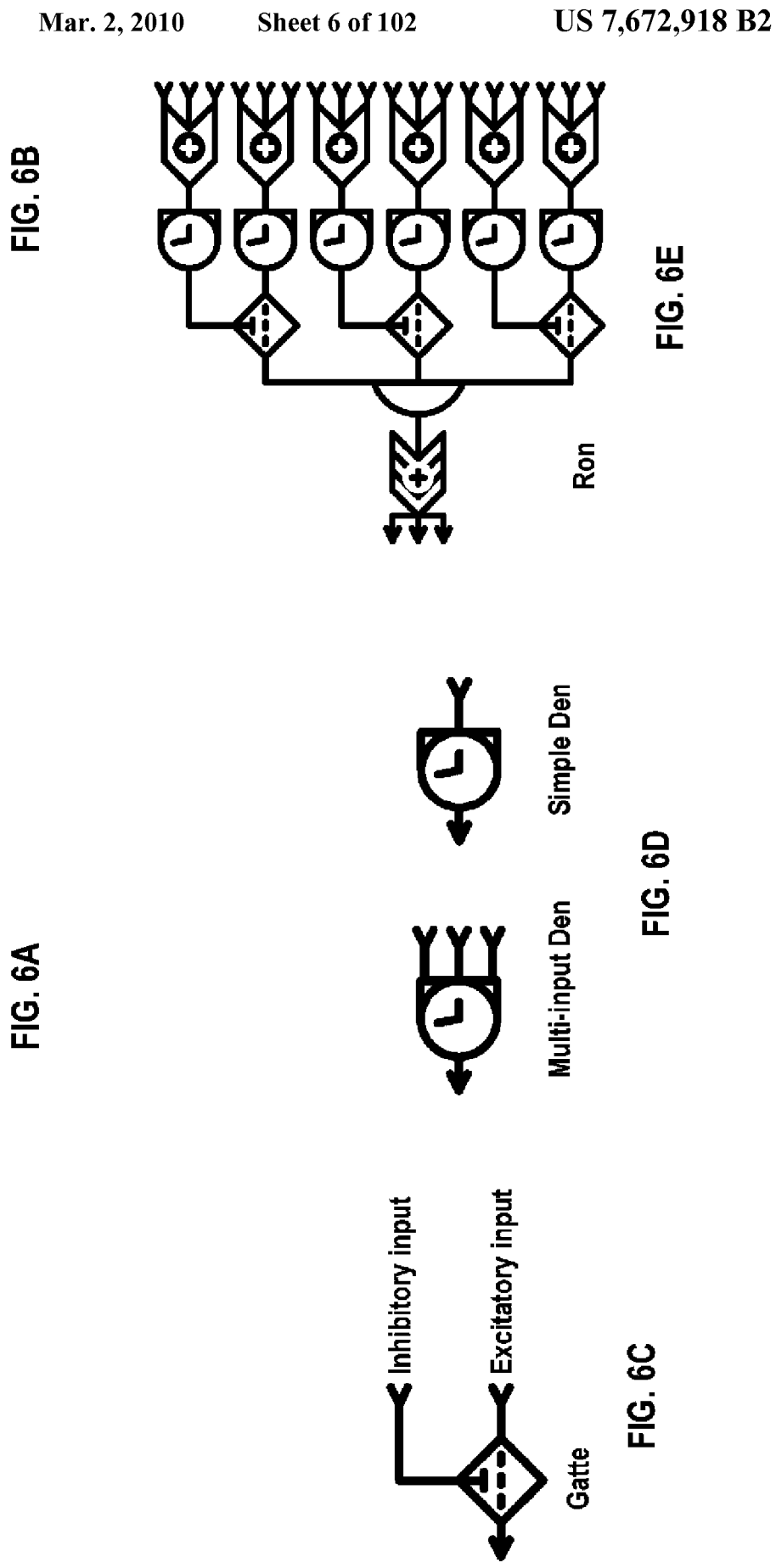

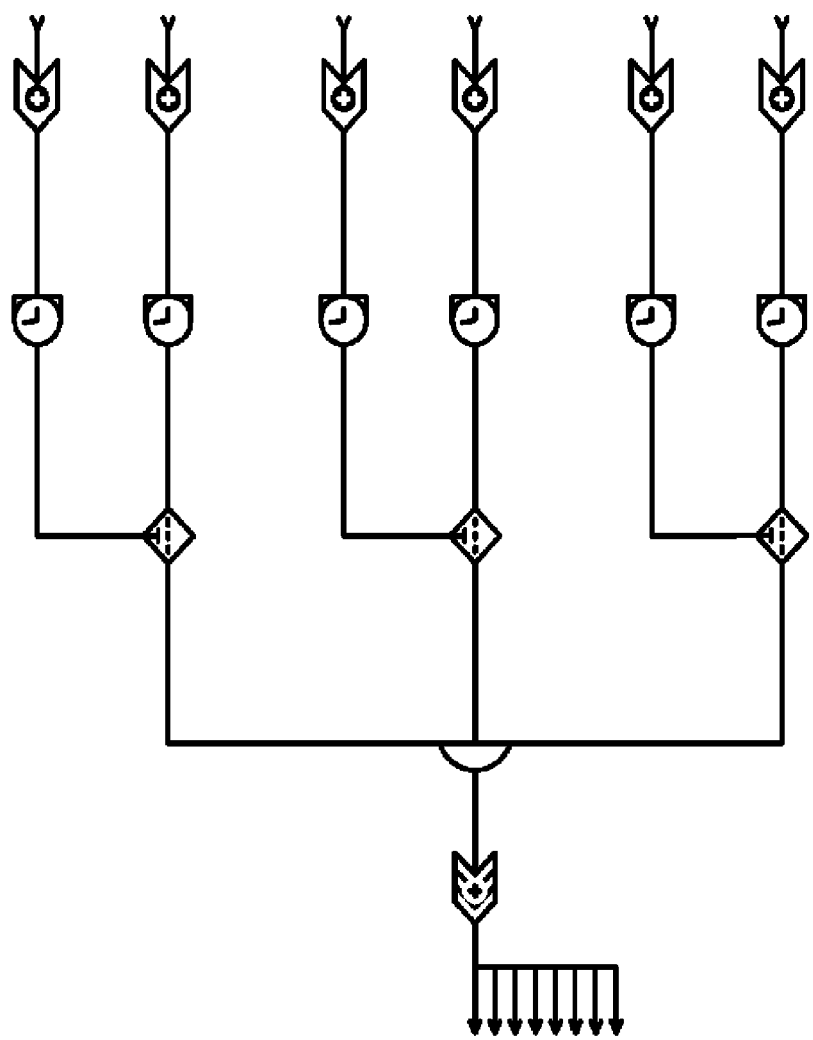
FIG. 12C
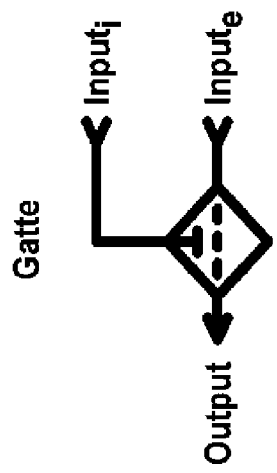
FIG. 12A
FIG. 12B

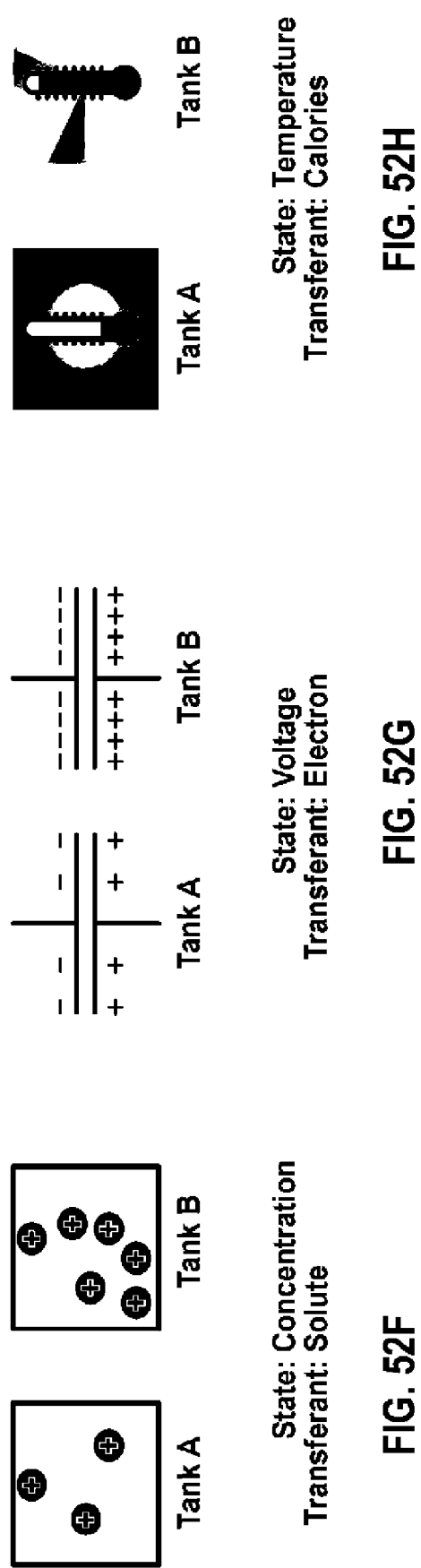

FIG. 53A: $A|B_u: \Uparrow A \overset{h}{\Rightarrow} B, \$B > A+4\varepsilon, \#B < A+2\varepsilon$ FIG. 54A: $A|B_U: \Downarrow A \overset{h}{\rightleftharpoons} B, \$B<A-4\varepsilon, \#B>A-2\varepsilon$
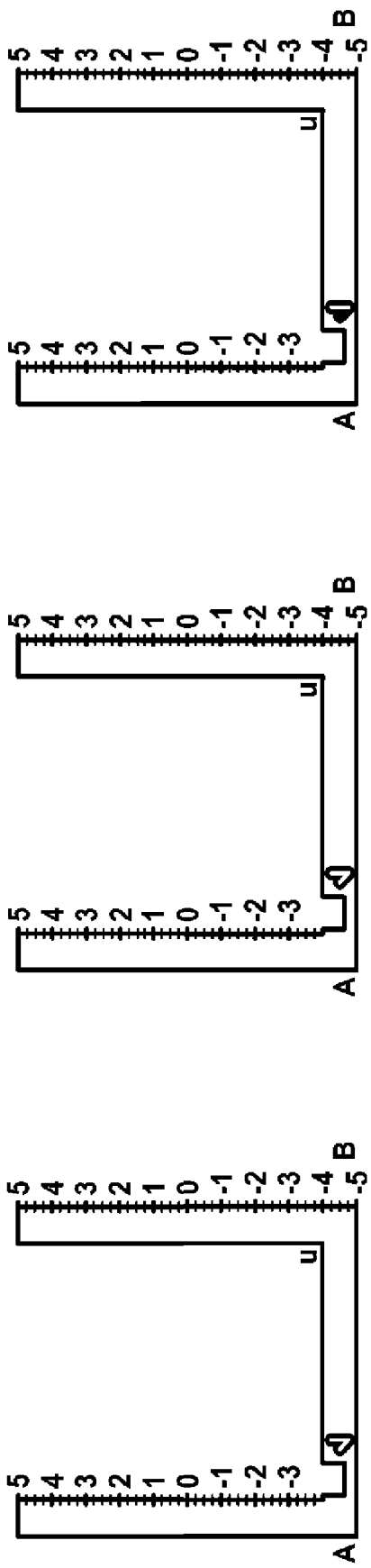
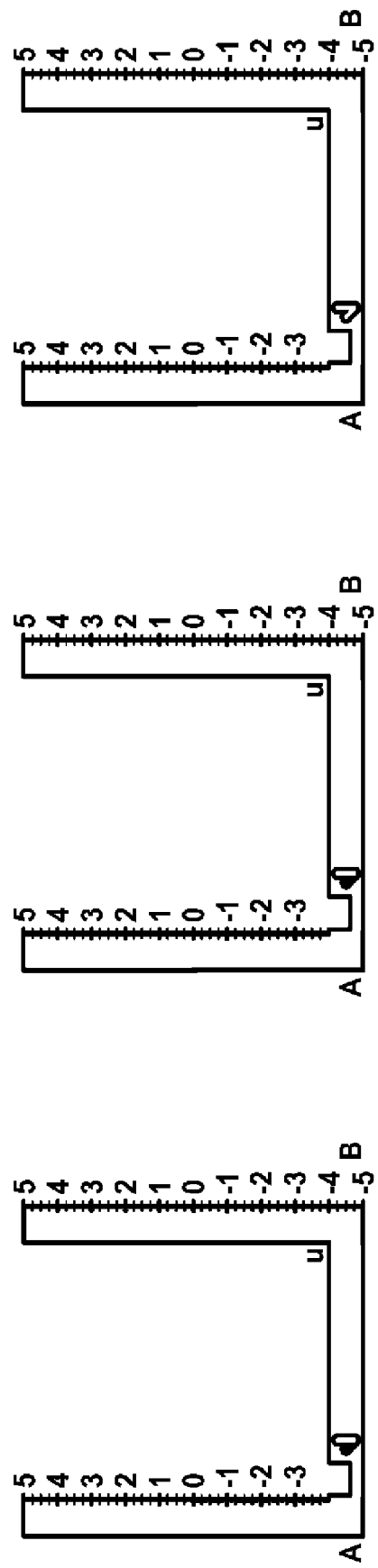

FIG. 55A: $A|B_u: \Uparrow \Downarrow A \Rightarrow B$

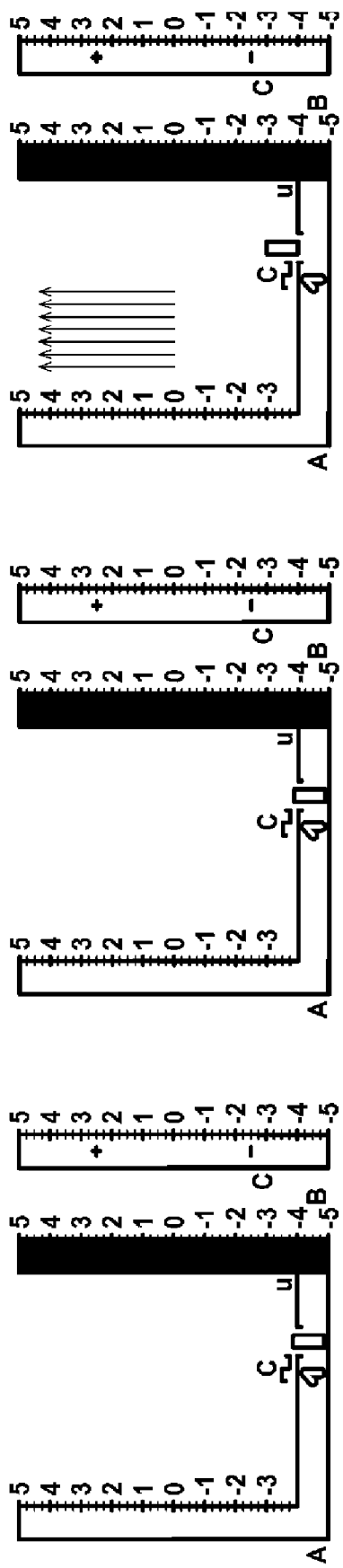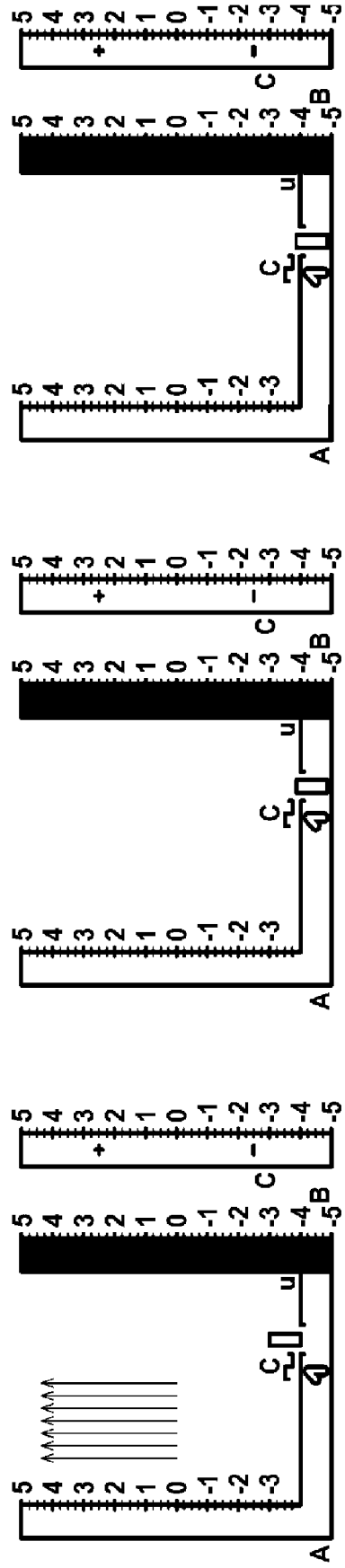
FIG. 56A: $\sqrt{C_U} \subset -2.5\varepsilon$, $\wedge C_U \supset 2.5\varepsilon$, $A|B_U$; $\Uparrow A \Rightarrow B$
FIG. 56B
FIG. 56C
FIG. 56D
FIG. 56E
FIG. 56F
FIG. 56G

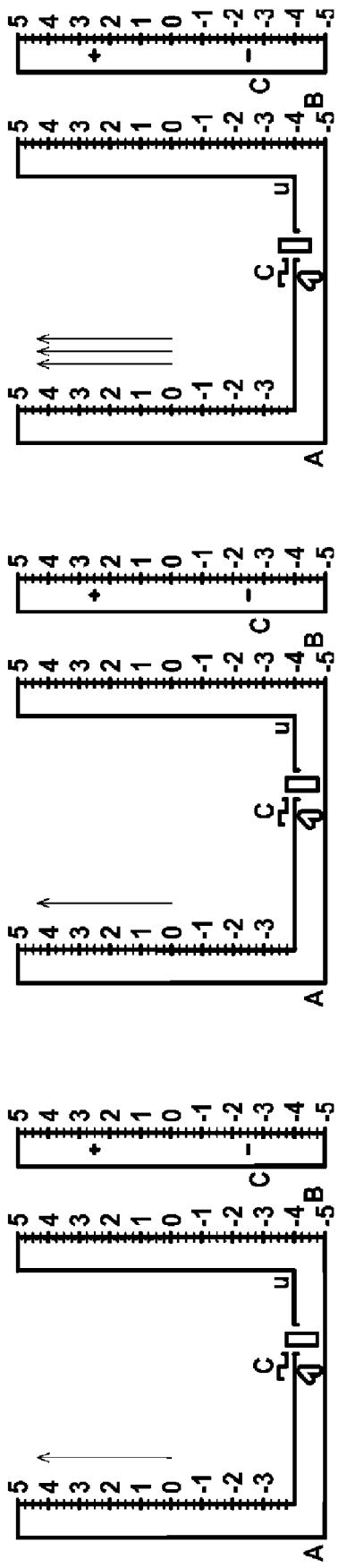
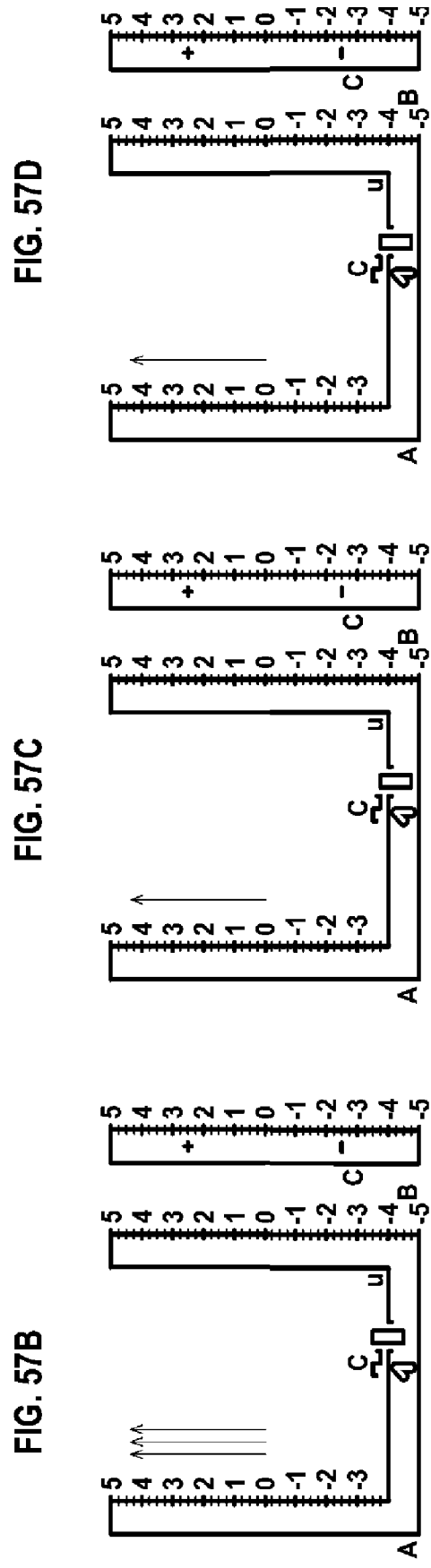
FIG. 57A: $\vee C_u \subset -2.5\varepsilon$, $\wedge C_u \supset 2.5\varepsilon$, $\Uparrow A \Rightarrow B_u$

FIG. 58A: $\bigcup^p C_u \subset -2.5\varepsilon, \bigcap^p C_u \supset 2.5\varepsilon$
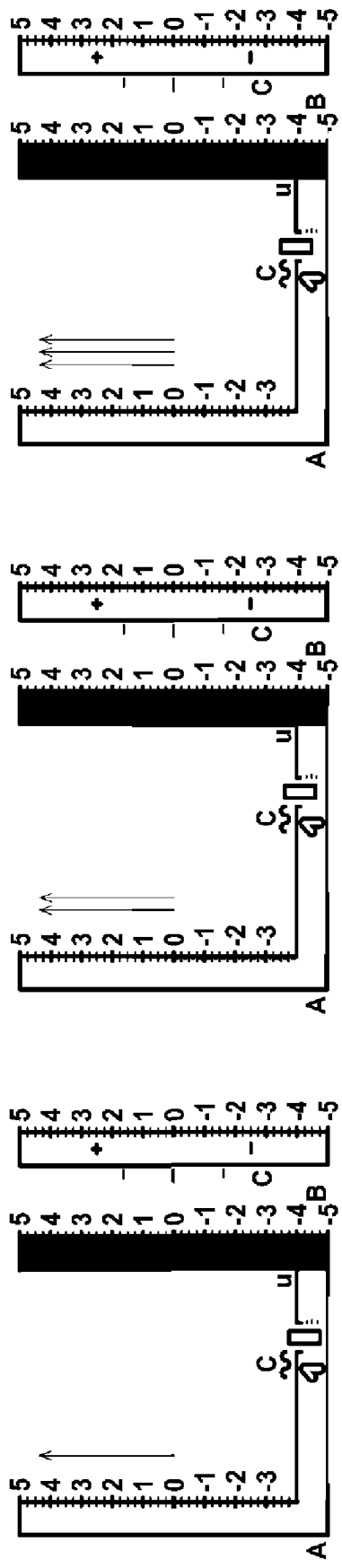
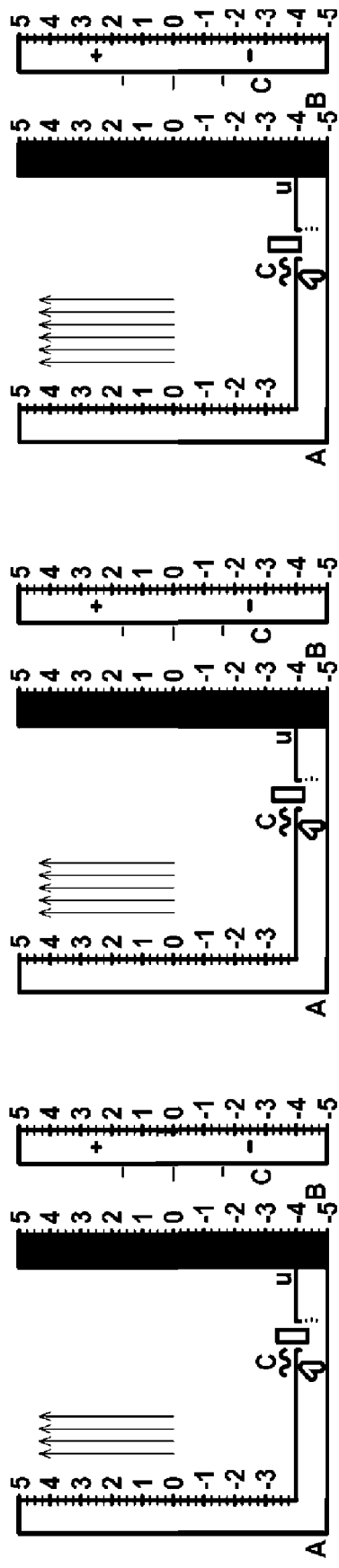

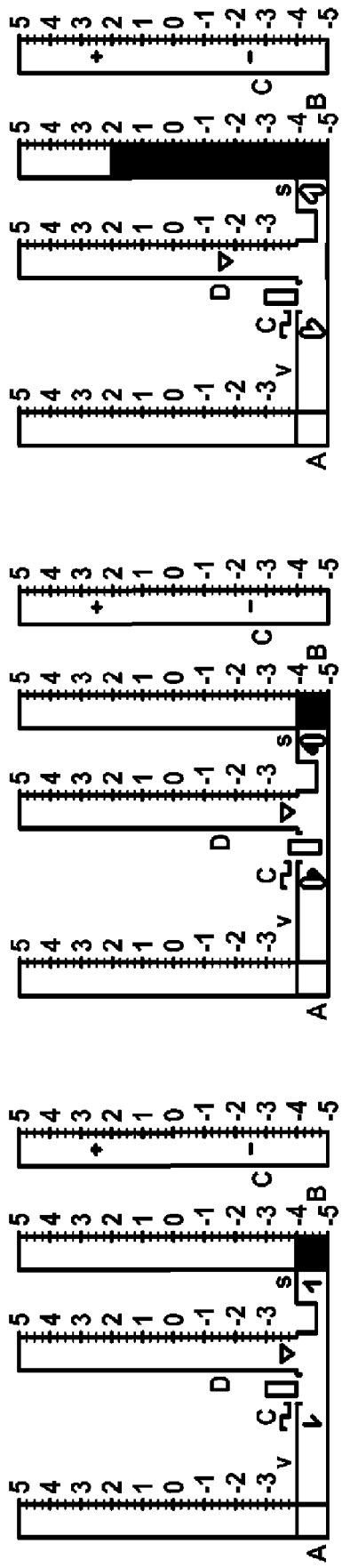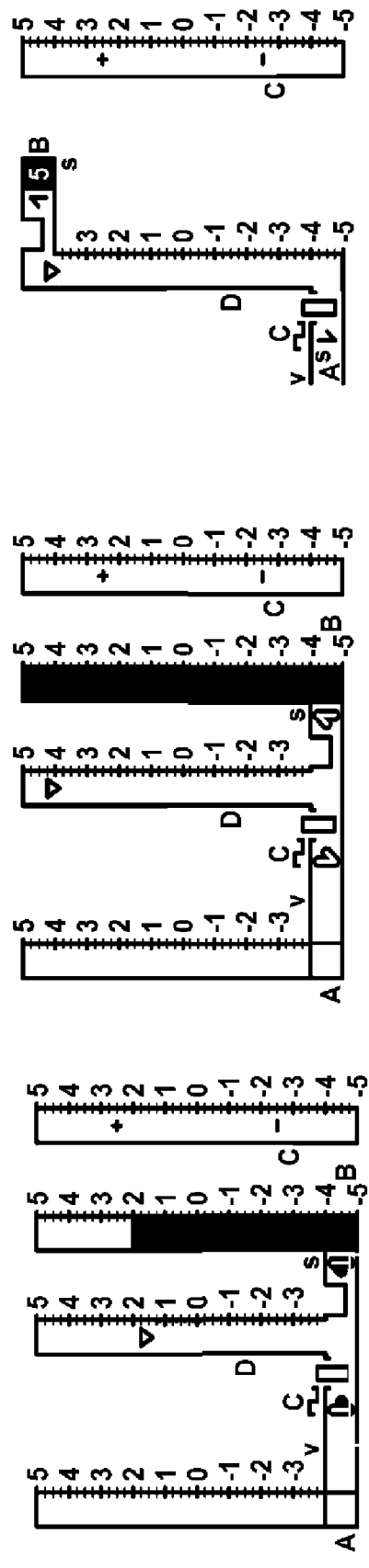

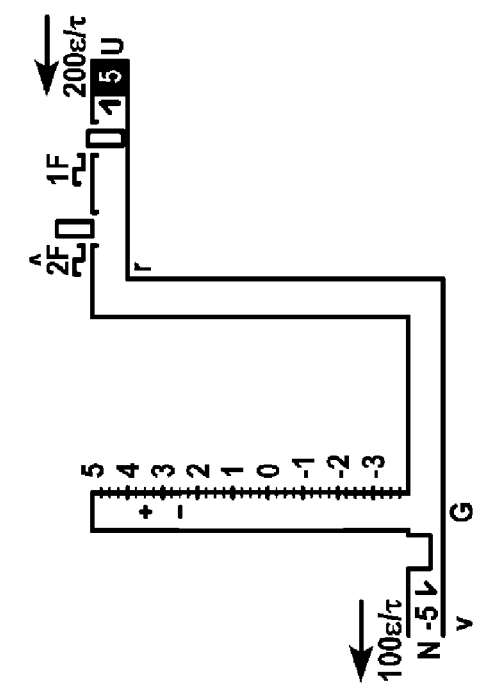

FIG. 68A
FIG. 68B
FIG. 68C

ARTIFICIAL NEURON

CROSS-REFERENCE TO RELATED APPLICATIONS

This application claims the benefit of U.S. Provisional Application Ser. No. 60/899,475, filed Feb. 5, 2007.

FIELD OF THE INVENTION

The invention relates to artificial intelligence.

BACKGROUND

It appears that our understanding of neurons is rounded, but it is not. The advancement of the treatment of psychiatric illness is hampered because neuron-neuron interactions that cause animal behavior are poorly understood. Present-day neuron models are unlikely to advance our understanding of how neurons control behavior. These models are also unlikely to lead to the creation of animal-like robots. There are many correlations between animal behavior and levels of specific drugs, for instance. Although many physiological details are known about drug-neuron interactions, there is no mechanistic understanding of how individual neurons interact to produce normal or abnormal behavior either with or without the influence of drugs. Biological research has not yet uncovered the relationship between neuron-neuron interactions and gross features of brain function/dysfunction regarding animal behavior. Therefore, there are not clear indications of how to treat many dysfunctional behaviors. However, because of a general sense that we have a rounded understanding of the neuron and because many drug mechanisms have been highly characterized, we gravitate to drug treatments to modify problematic human interactions with an environment of things, ideas and other people. Aggression, shyness and phobia are a few problematic behaviors that psychiatrists attempt to treat with drugs. These undesirable behaviors arise from a minority of "primed circuits", expedited pathways through chains of neurons. Using drugs, we are not able to modify problematic pathways without affecting beneficial pathways. As an example, drugs such as SSRIs, serotonin selective reuptake inhibitors, known by such brand names as PROZAC, ZOLOFT and PAXIL, are well characterized regarding physiological effects on neurons. It is believed that such drugs can lift depression. Such drugs are not selective for problematic neural circuits, but rather have a selective effect on neuron physiology throughout the brain. Because we do not know how individual neurons interact with one another to produce a normal or a depressed state, we cannot know how an SSRI modifies neuron-neuron interactions causing depression to be lifted. Similarly, neuron-neuron interactions responsible for brain pathologies, such as epilepsy and bipolar disease, remain unknown. The notion of a rounded understanding of the neuron may be inferred by some due to the abundance of "smart machines", machines with "artificial intelligence", pattern-recognition software and "neural networks". It may be assumed by some that these entities have intelligence, like that, which is accepted to be a trait of animals. Therefore, one would deduce that these entities employ a known mechanism of animal neuron-neuron interaction. This is not the case. Present-day machines do not behave like animals. Intelligence devices, chiefly neural networks, which attempt to model the biological neuron, are dependent on computer hardware and software and are one-dimensional, being largely task-specific, requiring the intentional priming of pathways. Supervisory computer programs are often required to direct the behavior of these devices. Computer feedback systems that alter the functioning of these devices to suit a specific task in a specific manner are often required. These devices are static in nature rather than addressing the timing of events. Timing is of critical importance for animals in real environments. Pattern-recognition softwares, though some programs are responsive to temporal patterns, do not use a temporal mechanism to control an environment and do not attempt to model the neuron. Present-day Intelligence devices do not appear to have the ability to evolve a means of creating directed animal-like behavior in machines whether these devices are based on mechanisms used by biological neurons or not.

SUMMARY

The invention provides artificial neurons and processing elements for artificial neurons.

One processing element for an artificial neuron taught herein includes a first plurality of inputs, a continuous value determining portion configured to generate a continuous value signal based on the first plurality of inputs, a second plurality of inputs, and a responsiveness determining portion configured to generate a responsiveness signal corresponding to either a responsive state or a non-responsive state based on the second plurality of inputs. The processing element further includes an output value determining portion configured to receive the continuous value signal and the responsiveness signal and generate an output signal. The output signal is equal to a predetermined value when the responsiveness signal corresponds to the non-responsive state. The output signal is equal to the continuous value signal when the responsiveness signal corresponds to the responsive state.

The continuous value signal may be equal to the multiplicative product of a first pair of inputs of the first plurality of inputs subtracted from the multiplicative product of a second pair of inputs of the first plurality of inputs.

The responsiveness determining portion may generate a threshold value based on a pair of inputs of the second plurality of inputs. The responsiveness signal corresponds to the non-responsive state when a first input of the second plurality of inputs is less than the threshold value. The responsiveness signal corresponds to the responsive state when a second input of the second plurality of inputs is less than the threshold value. However, the state of the responsiveness signal does not change if the first input of the second plurality of inputs is greater than the threshold value and the second input of the second plurality of inputs is greater than the threshold value. Furthermore, the threshold value may be based on a third input of the second plurality of inputs and a fourth input of the second plurality of inputs. More particularly, the threshold value may be equal to the third input subtracted from the fourth input.

The first plurality of inputs and the second plurality of inputs may have values corresponding to the concentrations of respective solutions of a plurality of solutions, and an actuator may be configured to receive the output signal and change the concentration of a solution based on the output signal.

Another processing element taught herein includes a first portion that receives a first input signal, and a second portion that receives a second input signal. The first portion has an activating state and a non-activating state. The second portion has an activating state and a non-activating state. A first event is defined as the second input entering the activating state from the non-activating state while the first input is in the activating state, and a second event is defined as the first input entering the non-activating state from the activating state while the second input is in the activating state. A third portion produces an output signal. The third portion has a first state where the magnitude of the output signal is equal to zero and a second state where the magnitude of the output is based on an event time equal to the time elapsed between the first event and the second event. The third portion may enter the second state at the time of the second event and returns to the first state after a predetermined time period has elapsed.

The magnitude of the output may be based on the difference of the event time and a predetermined value. The magnitude of the output signal may be equal to zero if the event time is greater than a predetermined value. Alternatively, the magnitude of the output signal may be equal to zero if the event time is less than a predetermined value. Furthermore, the magnitude of the output signal may be proportional or monotonically related to the absolute value of the difference of the event time and a predetermined value.

A processing method taught herein includes the steps of receiving a first signal, receiving a second signal, and measuring as an event time the time elapsed between a first event and a second event. The first event occurs when the second signal exceeds a second threshold value while the first signal exceeds a first threshold value. The second event occurs when the first signal subsequently drops below the first threshold value. The method further includes the step of generating an output signal, wherein the magnitude of the output signal is based on an event time equal to the time elapsed between the first event and the second event during a fixed time after the second event. The magnitude of the output signal may be zero other than during the fixed time after the second event. The magnitude of the output signal during the fixed time after the second event may be based on the difference of the event time and a predetermined value.

BRIEF DESCRIPTION OF THE DRAWINGS

The description herein makes reference to the accompanying drawings wherein like referenced numerals refer to like parts throughout several views and wherein:

FIGS. 6A is an illustration showing Representations for Ron subunits according to the artificial neuron of the present invention;

FIG. 6B is an illustration showing Representations for Ron subunits according to the artificial neuron of the present invention;

FIG. 6C is an illustration showing Representations for Ron subunits according to the artificial neuron of the present invention;

FIG. 6D is an illustration showing Representations for Ron subunits according to the artificial neuron of the present invention;

FIG. 6E is an illustration showing Representations for Ron subunits according to the artificial neuron of the present invention;

FIG. 12A is an illustration showing a Gatte;

FIG. 12B is an illustration showing a Gatte;

FIG. 12C is an illustration showing a Gaffe;

FIG. 52F is an illustration showing Transferants and Tanks;
FIG. 52G is an illustration showing Transferants and Tanks;
FIG. 52H is an illustration showing Transferants and Tanks;
FIG. 53A is an illustration showing Tank A increasing toward B with hysteresis.

FIG. 54A is an illustration showing Tank A decreasing toward B with hysteresis;

FIG. 54B is an illustration showing Tank A decreasing toward B with hysteresis;

FIG. 54C is an illustration showing Tank A decreasing toward B with hysteresis;

FIG. 54D is an illustration showing Tank A decreasing toward B with hysteresis;

FIG. 54E is an illustration showing Tank A decreasing toward B with hysteresis;

FIG. 54F is an illustration showing Tank A decreasing toward B with hysteresis;

FIG. 54G is an illustration showing Tank A decreasing toward B with hysteresis;

FIG. 55A is an illustration showing Tank A following B without hysteresis;

FIG. 56A is an illustration showing a full discrete kinetic valve time course sequence;

FIG. 56B is an illustration showing a full discrete kinetic valve time course sequence;

FIG. 56C is an illustration showing a full discrete kinetic valve time course sequence;

FIG. 56D is an illustration showing a full discrete kinetic valve time course sequence;

FIG. 56E is an illustration showing a full discrete kinetic valve time course sequence;

FIG. 56F is an illustration showing a full discrete kinetic valve time course sequence;

FIG. 56G is an illustration showing a full discrete kinetic valve time course sequence;

FIG. 57A is an illustration showing a discrete partial kinetic valve time course sequence;

FIG. 57B is an illustration showing a discrete partial kinetic valve time course sequence;

FIG. 57C is an illustration showing a discrete partial kinetic valve time course sequence;

FIG. 57D is an illustration showing a discrete partial kinetic valve time course sequence;

FIG. 57E is an illustration showing a discrete partial kinetic valve time course sequence;

FIG. 57F is an illustration showing a discrete partial kinetic valve time course sequence;

FIG. 57G is an illustration showing a discrete partial kinetic valve time course sequence;

FIG. 58A is an illustration showing a continuous partial kinetic valve time course sequence;

FIG. 58B is an illustration showing a continuous partial kinetic valve time course sequence;

FIG. 58C is an illustration showing a continuous partial kinetic valve time course sequence;

FIG. 58D is an illustration showing a continuous partial kinetic valve time course sequence;

FIG. 58E is an illustration showing a continuous partial kinetic valve time course sequence;

FIG. 58F is an illustration showing a continuous partial kinetic valve time course sequence;

FIG. 58G is an illustration showing a continuous partial kinetic valve time course sequence;

FIG. 59A is an illustration showing steady states and non-reciprocal valves;

FIG. 59B is an illustration showing steady states and non-reciprocal valves;

FIG. 59C is an illustration showing steady states and non-reciprocal valves;

FIG. 59D is an illustration showing steady states and non-reciprocal valves;

FIG. 59E is an illustration showing steady states and non-reciprocal valves;

FIG. 59F is an illustration showing steady states and non-reciprocal valves;

FIG. 59G is an illustration showing steady states and non-reciprocal valves;

FIG. 60A is an illustration showing a gatte system having a sourcing tank U and a sinking tank N;

FIG. 60B is an illustration showing a gatte system having a sourcing tank U and a sinking tank N;

FIG. 60C is an illustration showing a gatte system having a sourcing tank U and a sinking tank N;

FIG. 68A is an illustration showing a tank system for an Ax subunit;

FIG. 68B is an illustration showing a tank system for an Ax subunit;

FIG. 68C is an illustration showing a tank system for an Ax subunit;

FIG. 84 is an illustration showing a den tank system at Quiescence period 2 in depotentiation;

FIG. 85 is an illustration showing a den tank system when input is aborted before output;

FIG. 86 is an illustration showing e sizing and Coalescence of tank values;

FIG. 87 is an illustration showing a multi-input Den tank system;

FIG. 88 is an illustration showing brain inputs and outputs of artificial animal;

FIG. 89A is an illustration showing incidental wave propagation;

FIG. 89B is an illustration showing incidental wave propagation;

FIG. 89C is an illustration showing incidental wave propagation;

FIG. 89D is an illustration showing incidental wave propagation;

FIG. 90 is an illustration showing Happenstance Causation;

FIG. 91A is an illustration showing disinhibition;

FIG. 91B is an illustration showing disinhibition;

Figure 92:
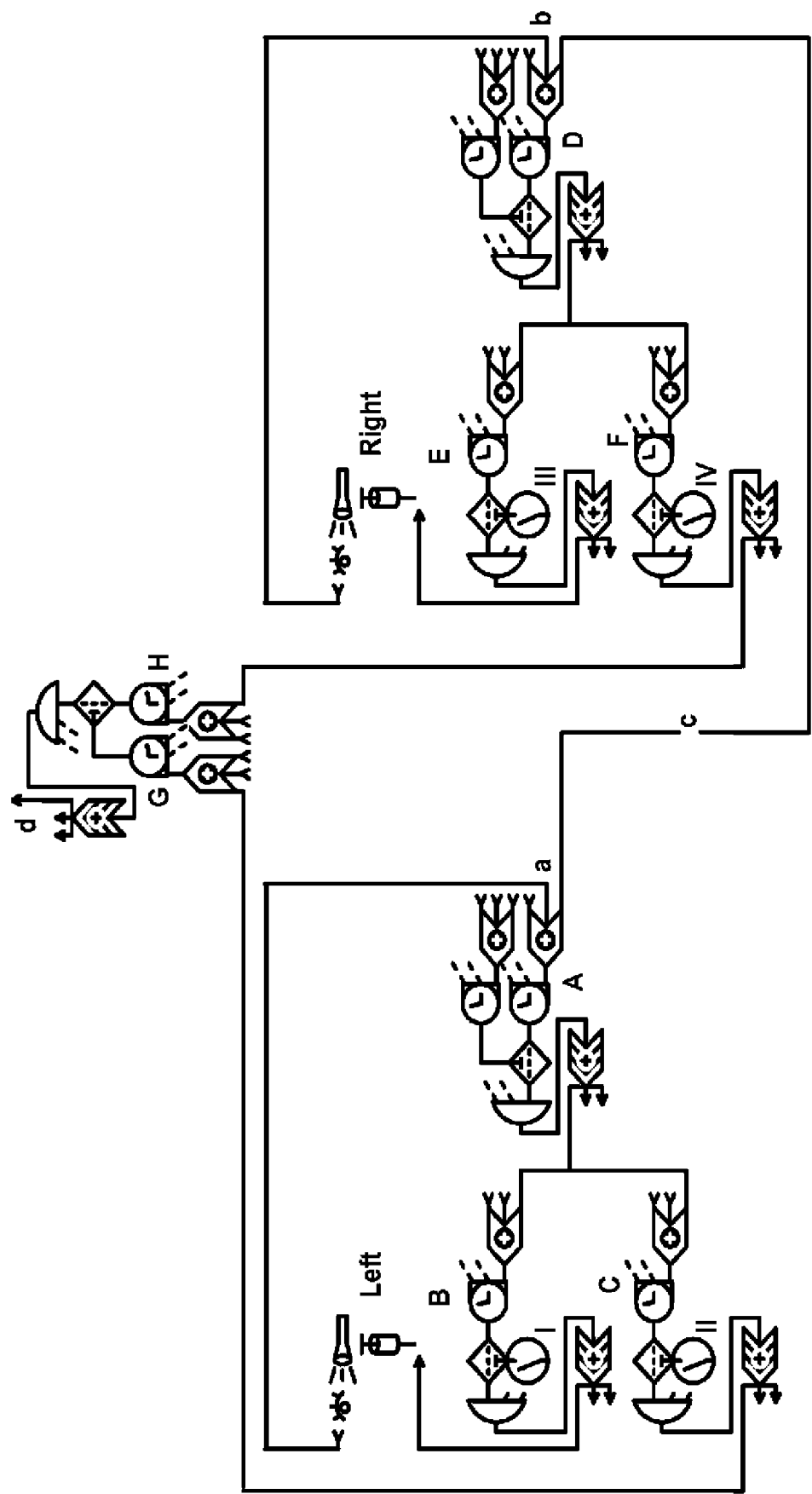
Figure 93E:
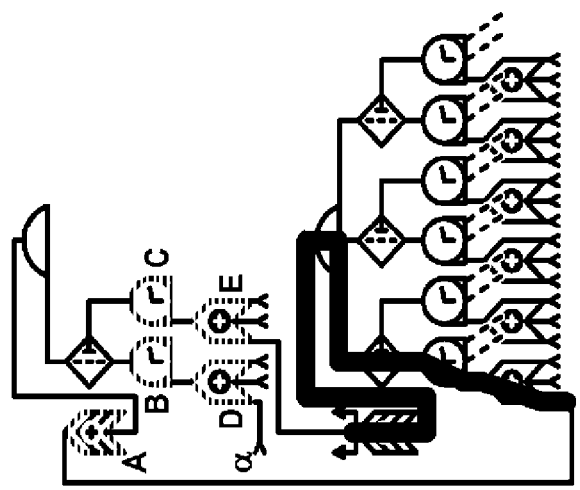
Figure 93C:
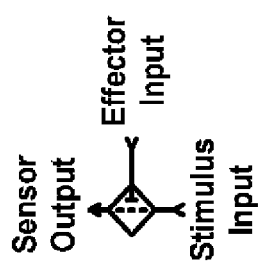
Figure 93D:
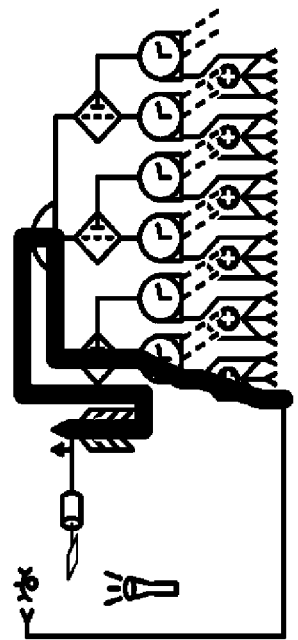
Figure 93B:
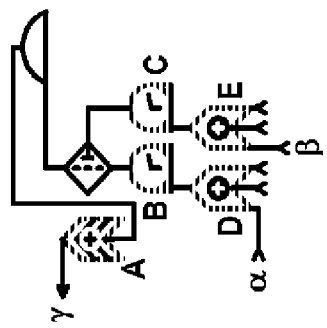
Figure 93A:
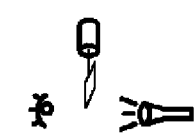
Figure 94:
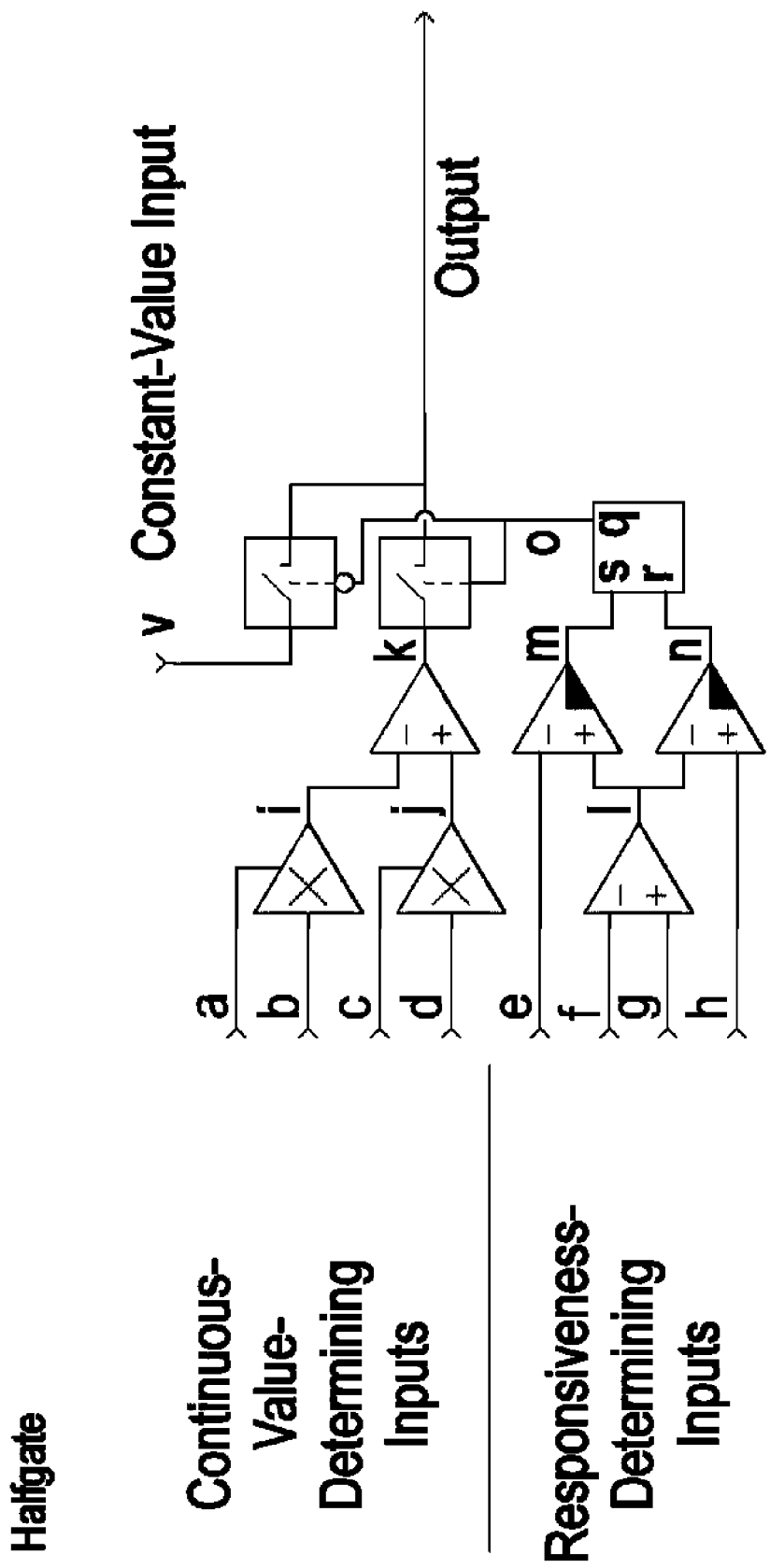
Figure 95:
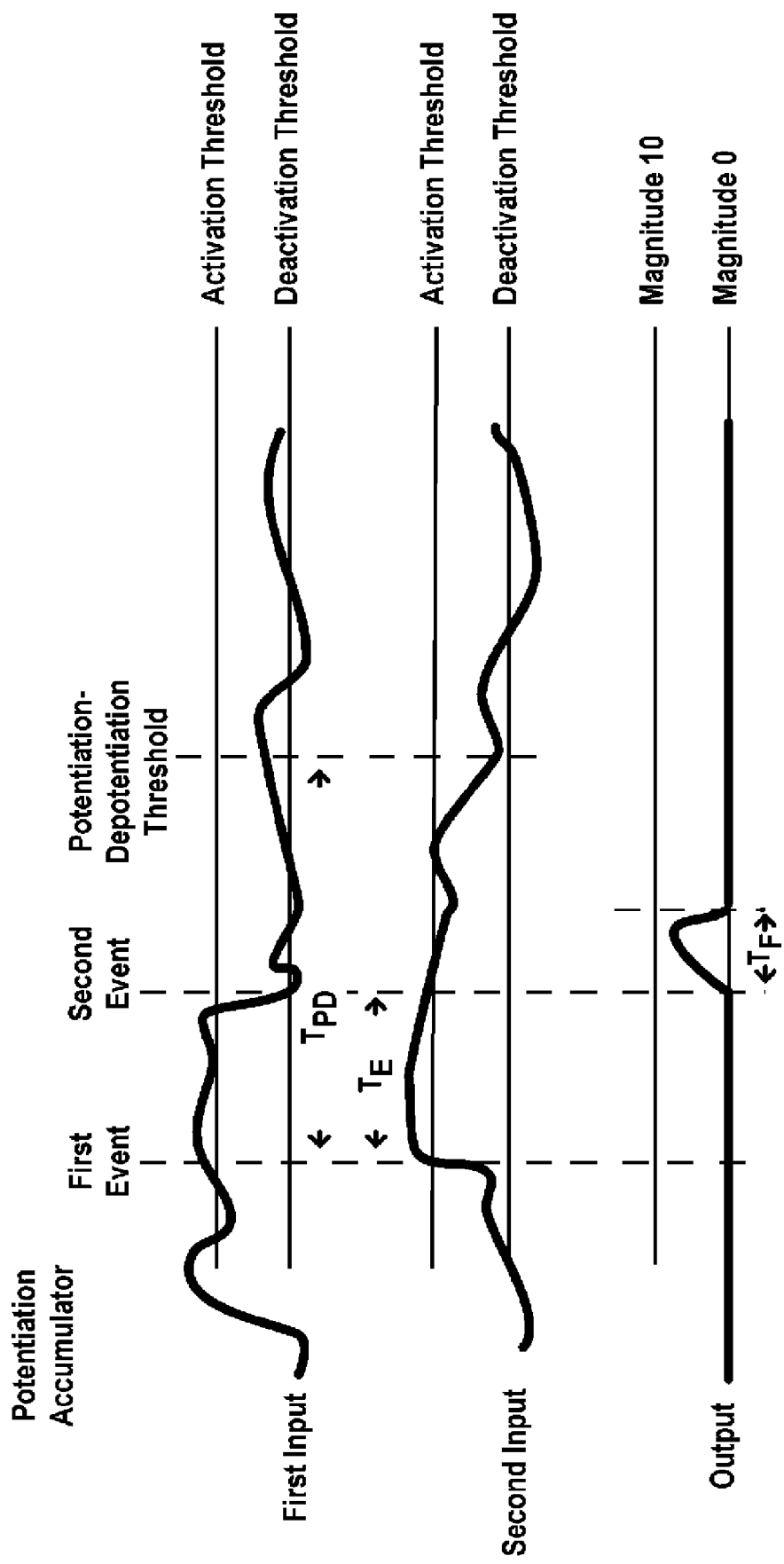
Figure 96:
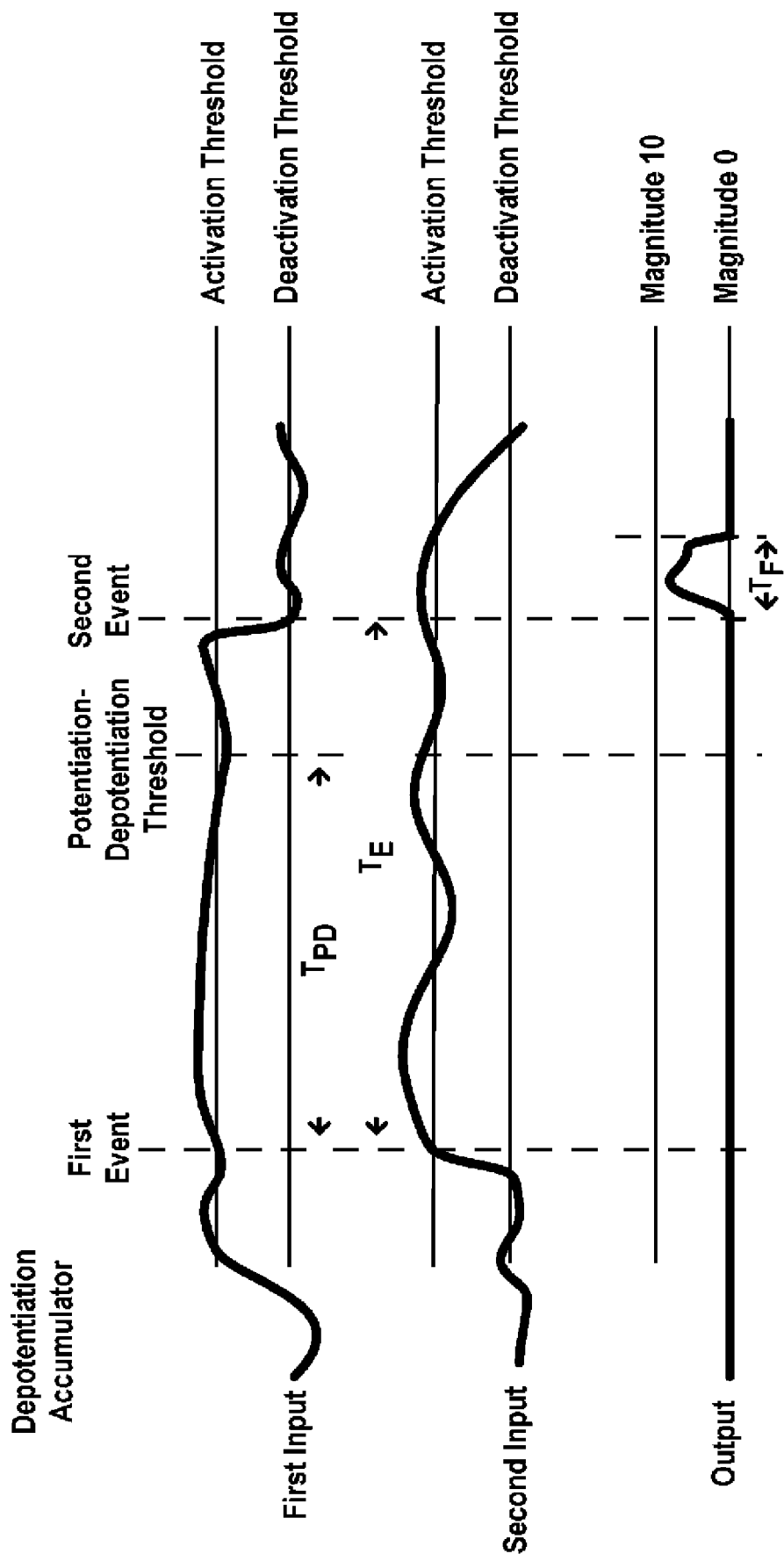
Figure 97:
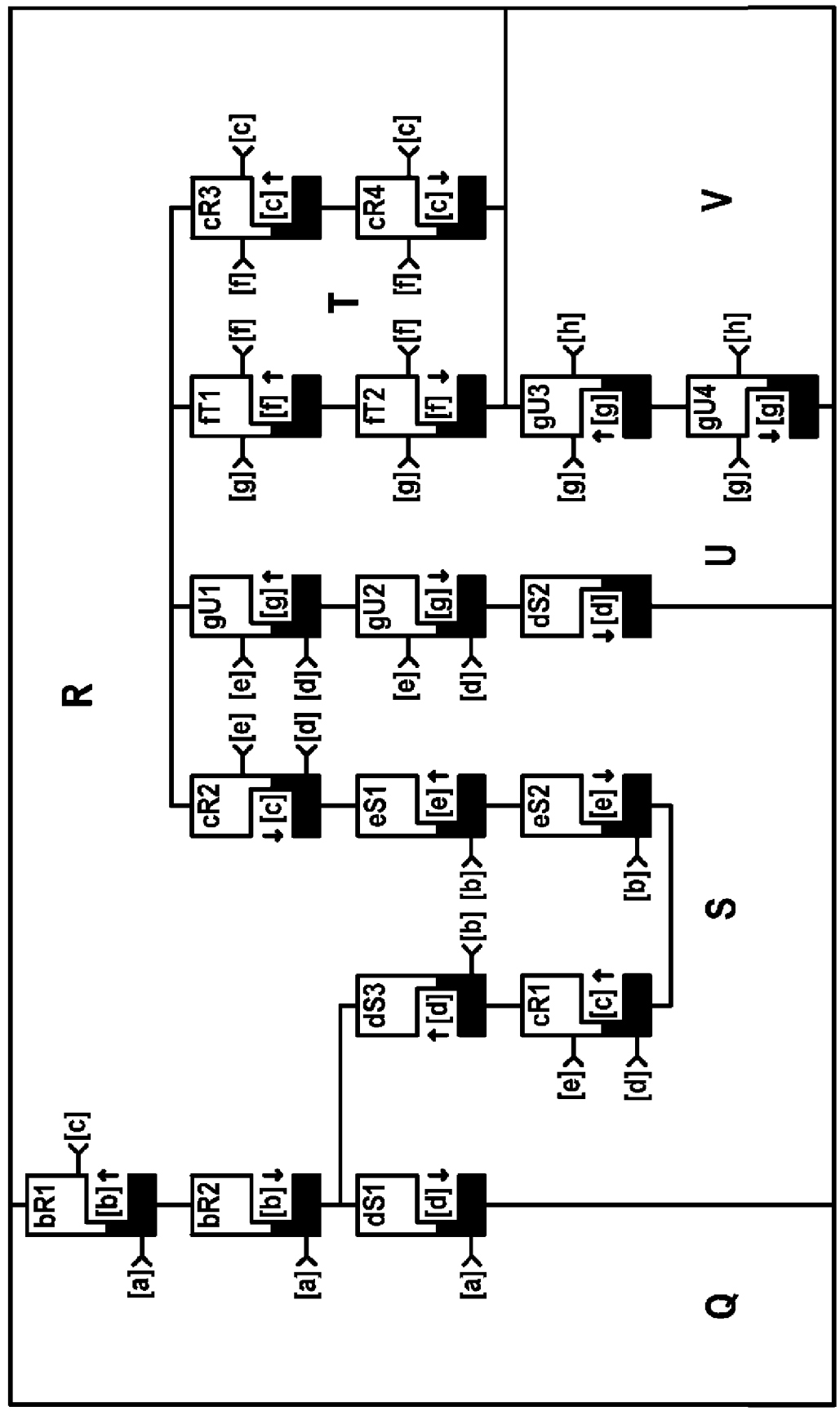
Figure 98:
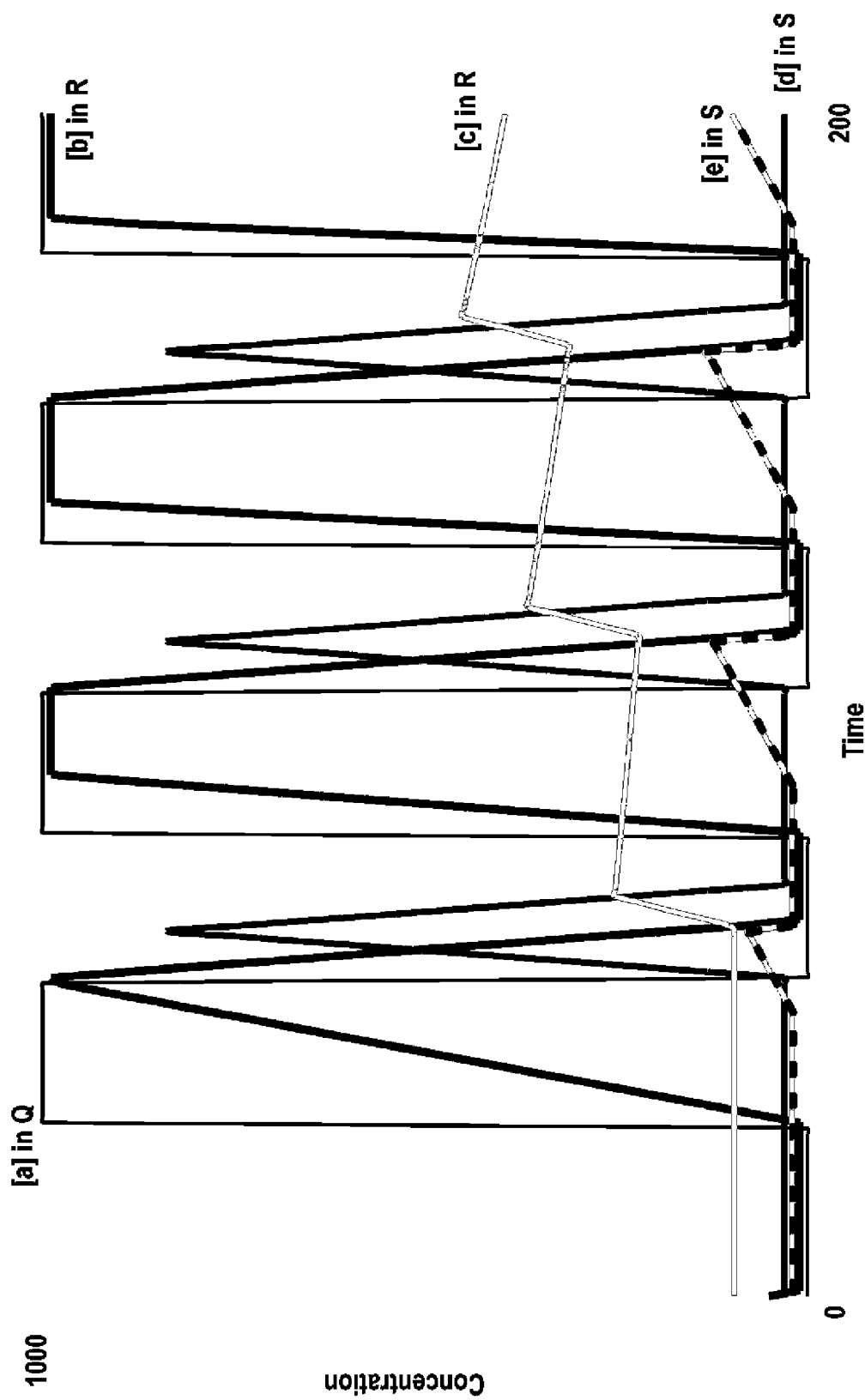
Figure 99:
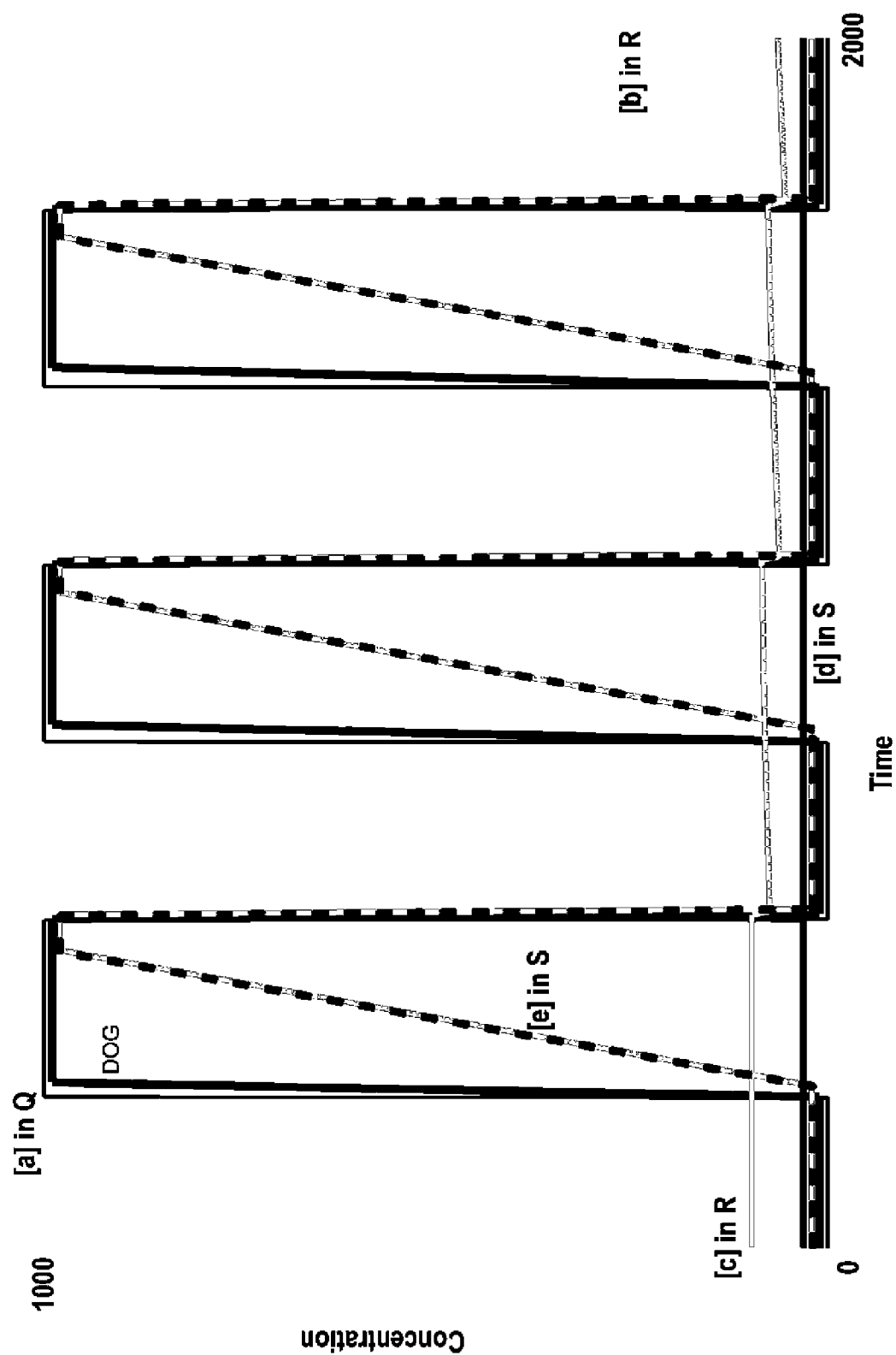
Figure 100:
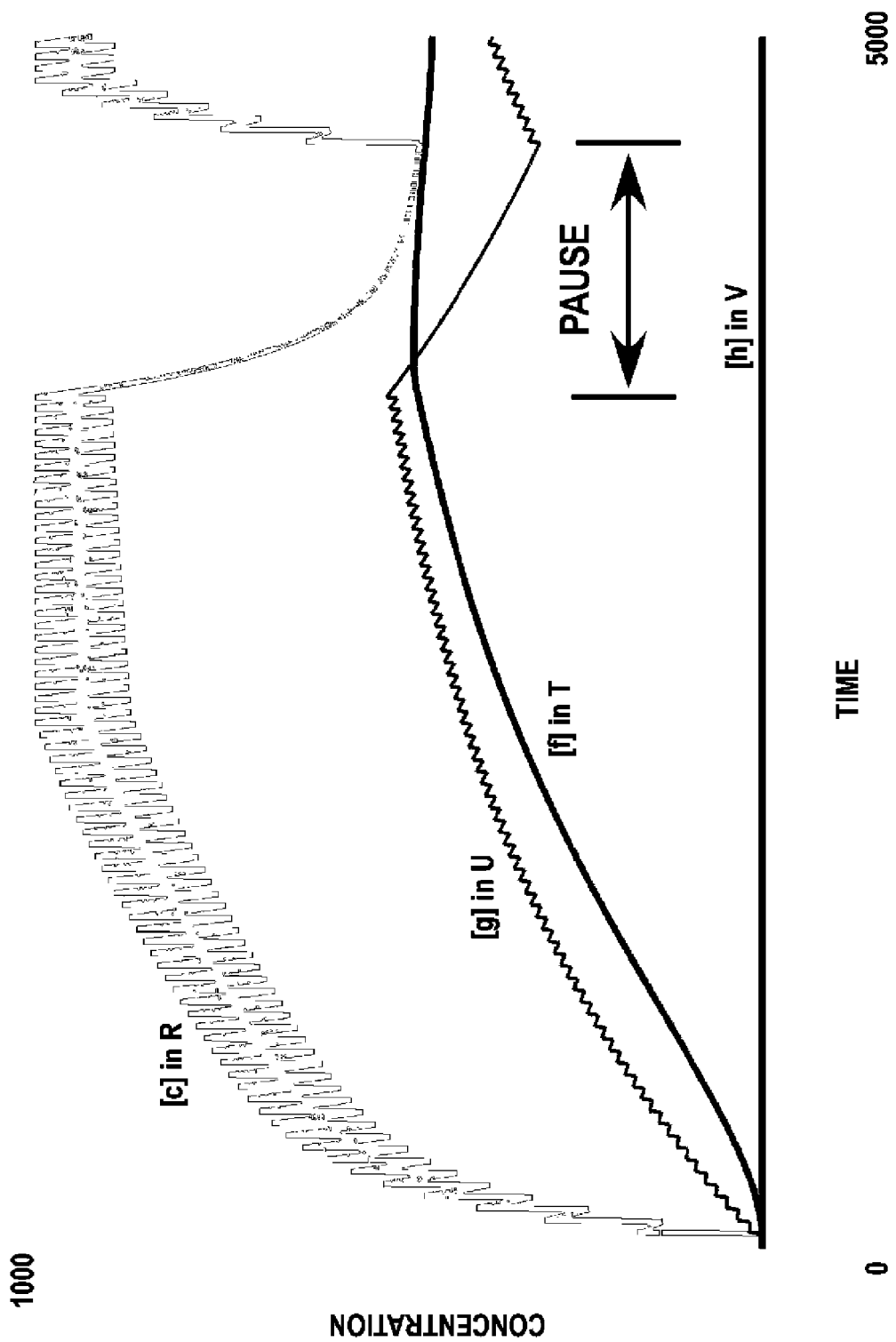

FIG. 92 is an illustration showing a comparer;

FIG. 93A is an illustration showing simulation of drug administration;

FIG. 93B is an illustration showing simulation of drug administration;

FIG. 93C is an illustration showing simulation of drug administration;

FIG. 93D is an illustration showing simulation of drug administration;

FIG. 93E is an illustration showing simulation of drug administration;

FIG. 94 is an illustration showing a Halfgate according to the invention;

FIG. 95 is a timing chart showing operation of a potentiation accumulator according to the invention;

FIG. 96 is a timing chart showing operation of a potentiation accumulator according to the invention;

FIG. 97 is an illustration showing a Den system composed of chambers and Halfgate-Sets;

FIG. 98 is a graph showing Potentiation Accumulator function carried out by the Den system;

FIG. 99 is a graph showing Depotentiation Accumulator function carried out by the Den system; and FIG. 100 is a graph showing Memory in the Den system.

DETAILED DESCRIPTION

Referring to the drawings, the present invention will now be described in detail with reference to the disclosed embodiment.

Relevance to Neurobiological Data

Disclosed herein is an artificial neuron, referred to as the Ron. The Ron design integrates three features of the biological brain: selective avoidance, seizure susceptibility and the experimental phenomena long-term potentiation, LTP, and long-term depression, LTD. Collections of real model neurons demonstrate behavior akin to that reported by neuroscientists. The functioning of the Ron may be accomplished by processes akin to the movement of molecules across membranes via concentration-difference controlled pores or by the actual movement of molecules across membranes via concentration-difference controlled pores. This functioning may be carried out using non-computer materials (with or without biological relevance) or may be carried out abstractly using Rons made of microcontrollers (known as Abstract Rons, providing real-time output to a dumb terminal, having either real or virtual interconnections and being modified en masse or individually by commands from a dumb terminal). Such model neurons suggest testable hypotheses, through example, of how a general biological neuron (not a task specific neuron) may contribute to the production of a constellation of diverse observations (other features of the brain are mimicked by combinations of aspects of Ron avoidance, seizure and potentiation). New treatments for phobia (uncontrolled avoidance) and epilepsy can be examined with Ron artificial animals. Ron model neurons also provide a means of examining hypotheses inspired by experimental data. They also provide a means of creating machines (adaptive robotics) that are like animals at three levels: neurobiology, pathology and behavior. The closer a robot mimics the intricacies of the animal brain, the greater its potential to mimic the intricacies of animal intellectual function.

In 1949, the Hebbian theory provided a general explanation of how neurons may interact to facilitate adaptive behavior. When the axon of a first cell is close enough to a second cell to excite that cell and take place in firing of the first cell, changes occur in both cells that increase the efficiency of the first cell in firing the second cell. In 1966, through experimental neurobiology using isolated brain slices, the discovery of LTP, supported the Hebbian theory and provided some details of how neurons interact. In a system of two neurons linked though a synapse, after high-frequency electrical stimuli (tetanus) to the pre-synaptic neuron, individual electrical stimuli applied to the pre-synaptic neuron elicit stronger and more prolonged excitatory post-synaptic potentials, EPSP, than before tetanus. Typically tetanus, in such experiments, has a frequency of around 100 Hz and lasts for around 1 second. The magnitude of the rising slope of the EPSP after a single pulse to the pre-synaptic neuron is greater after tetanus than before. Consequently depolarization will be triggered in the post-synaptic neuron more quickly after tetanus than before tetanus. LTP in the adult CA1 hippocampus has been studied extensively due to its reliability. The expression of LTP can be divided into two phases.

The early phase, E-LTP, lasts a few hours and the late phase, L-LTP lasts much longer. Long-term depression, LTD, with corresponding E-LTD and L-LTD components, has also been reported. Low-frequency electrical oscillations (1 Hz) can produce lasting reductions in the magnitude of the rising slope of the EPSP.

Morris water maze experiments and avoidance learning experiments provide evidence that LTP is required for the formation of memories. LTP and LTD are influenced by the behavioral states of rodents before isolation of brain slices. This suggests that both LTP and LTD participate in the formation of memory.

In humans with neocortical epilepsy, spontaneous high-frequency oscillations (60-100 Hz) have been localized in seizure loci preceding seizure onset. Such oscillations occur around 20 minutes before seizures. Rat neocortical brain slices are protected from chemical induction of seizure-like activity by sustained low-frequency (0.1-5 Hz) electrical stimulation, while high-frequency stimulation is able to terminate seizure activity. Electrodes, implanted in the brains of epileptic humans, that produce low-frequency (4-6 Hz) electrical stimulation can reduce interparoxysmal activity in the neocortex.

The Ron model neuron consists of five elements: Syn, Den, Gatte, Tie and Ax. The Den, Gatte and Tie are sufficient to model avoidance, seizure and potentiation. (Use of the Syn and Ax elements allow the modeling of spike trains and the effects of drugs that affect behavior by their affects on neurotransmitter concentrations.) The Den facilitates E-LTP, L-LTP, E-LTD and L-LTD. A Ron may consist of a single Den. In neurobiological experiments, during the promotion of LTP, tetanus, the period between high-frequency pulses of current, Inter-pulse Interval, IPI, is short.

After tetanus, the rising slope of the EPSP is increased. During the promotion of LTD, the period between low-frequency pulses of current, IPI, is long. After this period of LTD promotion, the rising slope of the EPSP is decreased. Therefore, it appears that there is an intrinsic IPI threshold, IPI-T, with a value between 10 ms (the IPI in high-frequency LTP promotion) and 1000 ms (the IPI in low-frequency LTD promotion) that governs the direction and magnitude of change in EPSP. An IPI shorter than IPI-T increases the slope of EPSP. An IPI longer than IPI-T decreases the slope of EPSP. The Den models to this frequency dependence.

Considering the Simple Den, a Den with only one input and one output, an activating input to the Den initiates the rising of the Den EPSP from a baseline value toward a depolarization threshold. The period between the beginning of the activating Den input and reaching the Den depolarization threshold is called Den Induction. Without accounting for the pulsatile or refractory nature of depolarization, as long as this Den EPSP is above the depolarization threshold, the Den output is activating. This period in which the Den output and Den input are activating is called the Den Driving period. If the Den input is non-activating then the Den output quickly becomes non-activating. The length of the Den Driving period affects the subsequent Den EPSP slope. The Den EPSP slope is reciprocally related to the Den Induction period. With a faster rising Den EPSP, Den depolarization is reached more quickly. Negative deviation from a Den Driving threshold, the Den Driving period is less than the Den Driving threshold, results in increasing the Den EPSP slope. Positive deviation (up to a limit) results in decreasing the Den EPSP slope. The relationship of the Den Driving period to the Den EPSP mimics the relationship of the IPI to the EPSP in neurobiological experiments. The post-synaptic biological neurons appear to be experiencing activation during the ISI in these experiments rather than during the current pulse. The Ron more fully models E-LTP, L-LTP, E-LTD and L-LTD when mechanisms are included in its design that allow a slow return to original Den EPSP values and mechanisms that allow repeated bouts of LTP and LTD to have far lasting effects. This group of mechanisms that facilitates early and late LTP and LTD with a spontaneous return toward original Den EPSP values is called Rellief (intentional misspelling of relief). Rellief allows an activating input to be removed with increasing speed from the Ron, in the case where an activating output precipitates the blocking of the activating input. Therefore, while providing an adaptive mechanism to the animal, the economy of biological systems is mimicked: energy expenditures (driving an axon output over a long distance) are limited. Rellief also causes Rons to increase the Den Induction period when an activating output does not remove an activating input. Rellief, with the combined effects of LTP and LTD, allows Rons to generating an activating output within a window of opportunity, in which an input may be blocked. An artificial brain slice consisting of these single-Simple Den Rons will display behavior akin to LTP and LTD. The Abstract Ron I has been created. It was designed to facilitate LTP but not LDP. The Abstract Ron I models LTP. The Abstract Ron II is nearly built at the time of this writing. It is designed to facilitate both LTP and LDP.

Rons consisting of Den and Ties allow the spontaneous development of selective avoidance. This has been demonstrated using artificial animals having artificial brains consisting of small numbers of randomly interconnected Rons (Abstract Ron I devices). The Tie is a kind of logic OR gate. If any one input is activating then the output is activating.

The Tie is used here, to combine 3 Simple Den outputs into a single Tie output that is distributed. This combining of Den inputs mimics the economy of the biological neuron: one output (axon) serves many inputs (dendrites). Owing to Rellief, with repeated trials Ron circuits evolve spontaneously that precisely and quickly remove aversive stimuli. The brain from such artificial animals will display features akin to LTP and LTD that are highly influenced by its previous avoidance experiences. In the case where the aversive stimulus is removed only so long as the corresponding effector is activated, an oscillation that increases in frequency will develop in the corresponding external "looped" Ron circuit as the constituent Dens become increasingly potentiated (deeper LTP).

Rons consisting of Dens, Ties and Gattes allow the spontaneous development of seizures. Circuits that have the potential to precipitate seizures are the produce of happenstance interconnections in large collections of randomly interconnected Rons (brains). Most brains will not be susceptible to seizures. Those that are susceptible will seize only rarely. This may be akin to idiopathic epilepsy where random interconnections of neurons during organogenesis may cause seizures later. The Gatte is a kind of logic gate with an enabling input. There are two inputs, excitatory and inhibitory, and one output. If the inhibitory input is non-activating, the excitatory input and output states are the same. Otherwise the output is blocked from following the excitatory input and the output is non-activating without regard to the excitatory input. The Gatte allows an internal looped Ron circuit (akin to the external looped Ron circuit) to occur. Such internal looped circuits have a high-frequency oscillation because they are not dependent on the slow mechanics of external sensors and effectors. Seizures may occur if the Dens in the internal looped circuit are potentiated by the outputs of neighboring Rons. Simulations show that high-frequency oscillation from an internal looped circuit can recruit other incidental Rons into oscillation (a process know to occur in epilepsy). Pulses with long activating intervals applied continuously to a Ron seizure locus will serve to prevent seizures by helping to maintain the LTD of constituent Dens at an elevated level. The application of pulses with short intervals, but of fixed duration, during a seizure event, should disrupt the pattern of increasing frequency. (A Tie receiving two non-synchronous high-frequency inputs will yield an activating pulse width that is greater than either of the input activating pulse widths on average.) With the Ron brain, seizures can be precipitated by interaction with the environment since the activities of the Rons are felt globally (they can potentiate distant Rons). This has been carried out using a small collection of Abstract I Rons where an internal looped Ron circuit was intentionally set up. (Such looped circuits would have an increasing potential to occur randomly as the size of the Ron collection increases.) Epilepsy can be environmentally induced (purposely or unintentionally) in mammals.

The Rellief mechanism was created to facilitate selective avoidance with the constraint that artificial neurons must be made as autonomous units employing gradients and gated exchanges to accomplish function. For instance, experiments were done with heat reservoirs, electronic capacitors and static electricity generators. Simulation using software is inherently inferior to modeling with autonomous entities because of the vast number of simplifications, assumptions and large amounts of program code in simulations. I wanted to have real objects with observable properties. There was no attempt to make Rellief fit experimental data rigidly initially other than for the constituent parts to looks like concentration/voltage gated ion channels. It became apparent, however, that relevant experimental data was consistent with Rellief. This served to validate the concept of Rellief.

The Ron brain is a generalist. Many simple tasks can be performed by the same Ron brain (which starts out completely naive and inept). Limiting factors are sensor constellation, effector constellation and number of randomly interconnected Rons (most importantly the number of Dens). Seemingly complex behaviors such as addiction and volition are possible. The Ron brain learns behaviors and forgets them depending on experience reiteration.

Circuits compete temporally. Relearning consists of a new circuit responding (removing the stimulus, if it's aversive) faster than a formerly adaptive circuit. If the formerly adaptive circuit is exceptionally fast in responding and has undergone much experience reiteration, relearning is hindered and may take place only after a long period of time has elapsed. Relearning may be incomplete: the formerly adaptive behavior may be carried out almost simultaneously Oust prior) with the new adaptive behavior. The temporal pairing of tasks may lead to conditioned response as circuits behave as if incidental responses have a causative link to the removal of an aversive stimulus. Random overlap of activated circuits can cause quirky responses which may fade with experience reiteration. The Ron brain can model maladaptive behavior in a sophisticated artificial animal and thereby suggest strategies for minimizing maladaptive behavior. The Ron animal should be useful to sociologists (interaction of artificial animals in group) and psychiatrics (development of personality and refractory maladaptive behaviors). Simple artificial animals using Abstract Ron I neurons have demonstrated learning, relearning and the development of maladaptive behavior (which is dependent on temporal features of training and dependent on the occurrence of incidental events).

A Need for a Multidimensional Neuron Model

The development of multidimensional neuron models could advance our knowledge of the functioning of biological neurons, make the treatment of psychiatric disease more targeted, advance robot engineering and advance the development of prosthetic neuron devices. As modern laboratory techniques and neural networks have not yet revealed how neuron-neuron interactions orchestrate behavior, there is a need for such models. The Ron, through discrete time-sensitive neuron-neuron interactions allows a variety of primed circuits to form spontaneously among randomly interconnected model neurons. The Ron attempts to integrate both the functional and physical nature of biological neurons. It attempts to integrate normal brain function with environmentally induced and organogenetically induced brain dysfunction. (Organogenesis is a term meaning period of organ-formation. For the brain, neuron interconnections are being made at this time.) The Ron is material-nonspecific meaning that neurons can be built from a variety of materials. Randomly interconnected groups of Rons, called brain models, orchestrate a spectrum of normal and abnormal behavior in real environments. (Such brains are interfaced to physical environments through sensors and effectors.) Therefore, the Ron could help laboratory brain research in terms of suggesting mechanisms underlying specific behavioral patterns in biological animals that spontaneously occur in model animals. Because these brain models can be constructed with a variety of materials, including those with various levels of relevance to biological neuron physiology, it would be possible to model, in an abbreviated fashion, relationships between the internal functioning of neurons and animal behavior. Such devices could aid the development of medically useful prosthetic neuron devices. In psychiatry, there are pharmacological and non-pharmacological approaches to modifying problematic interactions with the environment. Neither pharmacological nor non-pharmacological approaches have been shown to be clearly and consistently efficacious. Both approaches could be improved using the Ron. Behavioral therapy, which does not use drugs, attempts to modify only the neurons that cause an objectionable behavior. This is accomplished through the skilled exposure of patients to designed experiences. The Ron may lead to a better understand of how the quality and timing of environmental experiences affect the development of behavior. This understanding may lead to the refinement of techniques to suppress problematic circuits in a specific manner leading to a selective suppression of specific behaviors. Some diseases, such as idiopathic epilepsy and manic depression, appear to be a consequence of happenstance interconnections of neurons during organogenesis. These diseases are also influenced by environment. Ron brains generate seizures spontaneously. This occurs only in some of the brains due to the randomness of neuron interconnections. Studying neuron-neuron interactions in such a model brain has the potential to help gain insight into human seizures. The seizure incidence in such model brains is affected by environment. Therefore, such a model could help to limit seizures in humans by the skillful manipulation of environment. Some model brains may display an alternation between hyperactivity and hypoactivity, with a progressively increased rate of cycling. Again, this occurs only in some of the brains due to the randomness of neuron interconnections. This bipolar behavior in a brain model would be relevant to brain science and manic-depression. Especially since the changes in activity are influenced by environment. The pharmacological treatment of brain dysfunction would also be helped by the Ron, since the relationships between neurotransmitters, drugs (such as SSRIs, for instance) and animal behavior can be physically modeled. Because the Ron can mimic many features of animal brains, and because animals demonstrate more ingenuity than present-day smart machines, Rons have a greater potential to advance the field of robotics than do present-day intelligence devices. Ron brain models will demonstrate exceptional levels of autonomy, sensitivity to environment and the ability to innovate.

Biological Neuron and Model Requirements

I have made several assumptions about biological neurons which I have used to set requirements for a relevant neuron model. All biological brains, even brains with small numbers of neurons, are capable of "directed movement", a made-up term meaning the ability to orchestrate the movement of a physical body in a physical environment in a time-sensitive manner in response to a challenge (presentation of aversive stimulus, for example). Directed-movement circuits must have evolved first among brain functions. Advanced functions must have used neurons that were capable of participating in directed movement. Therefore, a model neuron must be able to participate in both simple and advanced circuits with little modification of the neuron's mechanism. The model neuron should be able to respond in a time-sensitive manner. Model neurons that participate in directed movement should also be able to participate in "windowing", conditioned response, desensitization and "comparison" circuits, for instance. "Windowing", a made-up term, is the ability to respond to a challenge where there is a narrow window of opportunity. A response must be made between two time points to be beneficial. In a conditioned response, an incidental stimulus elicits the same response as an aversive stimulus if both stimuli are temporally paired. An example of desensitization is the cessation of reactions to an aversive stimulus that cannot be removed. An example of "comparison", a made-up term, is movement away from an unmarked spot then a purposeful return to that spot making approximately the same number of steps returning as going away. Using combinations of these types of circuits, a model brain should be able to generate complex behavioral profiles according to experiences in a real environment. Circuits, primed paths via neuron interconnections, must develop spontaneously. This is because animals, even animals of the same species and in the same environment, will have different challenges. Pre-priming of neural circuits would be wasteful and problematic. Therefore, model neurons should prime circuits spontaneously. Biological systems are driven by economy. In brains with many neurons, the preprogrammed configuration of neuron interconnections would be error-prone and require a high expenditure of energy and resources to direct a massive addressing of interconnections. Therefore, according to the principle of economy, neurons should make interconnections randomly in the developing brain predominately. A model neuron should be able to spontaneously participate in primed circuits when it is randomly interconnected to other neurons. For reasons of economy, biological neurons must be driven to maintain a lower energy homeostasis. Therefore, a model neuron must use a mechanism that limits the expenditure of energy. As animals are able to learn to remove aversive stimuli after several trials, model neurons must be able to modify their internal properties in a stable fashion so that circuits become increasingly adaptive. As animals forget what they have learned, the internal properties of a model neuron should slowly return to their original magnitudes. Like biological brains, such model brains should demonstrate a susceptibility to circuitry-induced dysfunction and a susceptibility to environment-induced dysfunction. As biological neurons are real entities using real materials, the mechanism of the model neuron must be amenable to being carried out by a variety of materials.

Neuron Interaction

I have hypothesized that biological neurons use a specific mechanism that provides the basis for a relevant model neuron. I have named this mechanism, and the corresponding biological hypothesis, "Rellief" (intentional misspelling). The Ron uses this mechanism. There are temporal components to this mechanism that allow individual Rons to demonstrate short-term and long-term memory. (Specific aggregations of neurons may have memory storage akin to that of digital electrons, See "FLIP-FLOP" section.) There are randomization components that promote fidelity and innovation in circuits. The Ron serves as a test of my biological neuron hypothesis. This makes it especially interesting regarding basic research into brain physiology. Aside from the goal of testing this hypothesis, the invention serves as a practical means to create animal-like artificial intelligence that will have applications in the behavioral and robotic sciences.

Ron, Ax, Orr, Tie, Syn, Gatte, Rellief

The present invention most generally relates to a data processing method, referred to herein as the Rellief mechanism, processing elements that employ the Rellief mechanism, and physical artificial animals formed from either a single Ron or a plurality of interconnected Rons.

The Ron, as specifically defined herein, is an artificial intelligence element or physical computational device that is not material-specific, and does not necessarily rely on computer hardware or software. Each Ron includes receives at least one input signal and generates at least one output signal in response to the input signal. The input signal and the output signal are both binary values, and are either on or off at any given time. An "on" signal may also be referred to as an activating signal, while an "off" signal may also be referred to as a non-activating signal. As will be explained in detail herein, there are four categories of Ron subunits: Den, Orr, Ax and Gatte. There are two types of Orrs: Tie and Syn.

Functional-Type, Physical-Type

Using various numbers of each Ron subunit type, with subunits connected in various ways, many different Rons may be created. Each such Ron is referred to as a particular "functional-type". (The functional-type designator precedes the word "Ron" and is separated by a hyphen.) Different types of materials can be used to create a particular functional-type. The manner in which these materials behave overall in a particular functional-type is critical but the particular materials that are used are not critical. Systems within Ron subunits use a "Transferant" (alteration of word 'transfer') to carry out subunit functioning. A Transferant is a material or kind of energy that is moved around. Each Ron made from a specific set of materials is a referred to as a "physical-type". (The physical-type designator follows the word "Ron" separated by a hyphen.) In the Ron-electron, electrons are the Transferant in a system containing capacitors. In the Ron-solute, solute molecules are the Transferant in a system containing aqueous chambers. Randomness and inexactness in such systems can be beneficial to the overall functioning of the Ron. Machine-like precision is detrimental to the Ron functioning. Due to the absence of stringent requirements on Transferants, a variety of equations having high degrees of randomness can serve in software models of Rellief. Therefore, a wide variety of materials may be used to create different Ron physical-types. The principal difference between physical-types is the rate at which the Ron functions.

Non-Biological Intelligence

There may exist naturally occurring non-biological intelligence. "Non-biological" here means not being like an animal on earth. Rons may be useful for investigating this possibility. For instance, one might create a geo-Ron-water. This Ron might be intended to model a putative directed behavior of a geological feature over vast periods. Water would serve as the Transferant in this particular Ron. Water need not be the Transferant but may be used due to relevance to the geological feature being considered. Even though Ron models may function relatively quickly, the rate at which such geological features, which are being modeled, function would be vastly slower than that of biological neurons. Such examinations for non-biological intelligence is relevant to space exploration where non-biological intelligence may be encountered eventually.

Physical Artificial Neuron

Rons that mimic the biological neuron in both functionality and physicality may be created. For example, a bio-Ron-solute is one such physical artificial neuron. Mimicking the transmittance of information in the biological neuron, the Ax subunit generates a pulsatile spike-like activating output and the Syn subunit is activated by such an output in this particular functional-type. Bio-Rons, regardless of physical-type, when randomly interconnected in groups spontaneously form primed circuits in reaction to environmental challenges, which are capable of orchestrating directed interactions with physical environments, mimicking the behavior of animals. Such Ron groups are also susceptible to syndromes relevant to epileptic seizure and bipolar disease. The movement of solute molecules between aqueous chambers in this physical-type is relevant to biological neurons. The movement of neurotransmitters between aqueous chambers is of critical importance to the function of the biological neuron. The bio-Ron-solute would be useful for modeling the effects of psychotropic drugs, which modify the presence of neurotransmitters such as, for example, SSRIs. The elaboration of the construction of Rons to include synthetic and cloned biologicals may be valuable for the development of relevant biological neuron models. The creation of a variety of Bio-Rons could lead to the development of prosthetic neuron entities with medical applications.

Animal-Like Robot

Ron-electron groups could be integrated into electronic devices. Bio-Ron groups exhibit behavior like that of animals. Therefore, the Bio-Ron-electron, for instance, can be useful for making machines behave like animals. Animals are superior to present-day machines in autonomy and innovation. The bio-Ron-electric could be created at high densities on silicon chips for such endeavors.

Ron-Abstract

The Transferant in a Ron can be abstract numbers. This is the case in a Ron-abstract, which consists of several to many microcontrollers for each Ron. The Ron-abstract can be used to achieve a completely parallel, rather than sequential, simulation of Ron-Ron interactions with Rons having various physical-types. Hypothetical biological neuron-neuron interactions could be simulated. The behavior of the Ron-abstract can be altered easily since microcontrollers can communicate serially with desktop computers. The Ron-abstract would be useful in developing physical artificial neurons for various purposes.

Pruning, Arborization and Fatigue

The Ron can be constructed such that it, or a part of it, becomes permanently disabled if unused for a long period. Therefore, dendrite pruning, as occurs in biological neurons (destruction of neuron interconnections), may be mimicked. Hence, the number of potential primed circuits in a newly created Ron group diminishes with time according to experience (lack of challenges). Similarly, the Ron can be constructed such that dormant Ron interconnections become active in a random or directed fashion. Therefore, arborization, as occurs in biological neurons (creation of new neuron interconnections), may be mimicked. Thus modeling of the biological brain and neuron would be more complete. The modeling of animal behavior would be more complete. Likewise, subunits can be made to be fatigable with subsequent recovery or with various levels of permanent disability.

Organogenesis, Drug Effects and Genetics

The Ron-invention modeling of behavior and physiology does not require the use of computer devices, however the specific use the Ron-abstract, which uses microcontrollers, may provide a superior means of recording the interactions between Rons. The Ron-abstract may also provide a superior method of quickly reordering the interconnections between Rons. Ron-abstract groups, akin to biological brains, can be reconfigured, in a random fashion easily. The potential for the priming of specific types of neural circuits would be examined. Then these Ron groups could be tested for the development of function and dysfunction in various environments. Such studies would be pertinent to brain organogenesis where happenstance neuron interconnections may dispose animals to disease. With Ron-abstracts, the selective or universal altering of the internal properties of Rons and the quality of the Rellief mechanism would be convenient. This is valuable in the modeling of the administration of drugs on neuron physiology and consequent behavioral changes. Ron groups with a particular configuration of Ron interconnections may be regenerated while universally modifying the values of internal properties and the quality of Rellief each time. Then these Ron groups could be tested for the development of function and dysfunction with various drug administration scenarios. Such studies would be pertinent to genetics where inherited differences in neuron physiology may dispose animals to specific reactions to drugs.

Temporal and Randomized Components, Material Non-Specific

The temporal components of the Rellief mechanism are chiefly responsible for the ability of interconnected Rons to behave in a directed fashion. The functioning of the Den, which employs the Rellief mechanism, is highly influenced by temporal aspects of previous experiences. The Rellief mechanism has randomized components. Therefore, the exact amount of influence by temporal aspects of experiences is variable. Aside from the Rellief mechanism, the internal properties of each Den, which affect and which are affected by the Relief mechanism, are randomized at the time the Den is created. The two aspects of randomness, the aspect in the Relief mechanism and the aspect in the Den internal properties, improve the performance of Rons when there is more than one Den receiving the same activating input. Materials, which innately contribute randomness to a system, may be used for the construction of Rons. Rons may be constructed specifically to have random aspects as well.

Points and Periods

Figure 1:
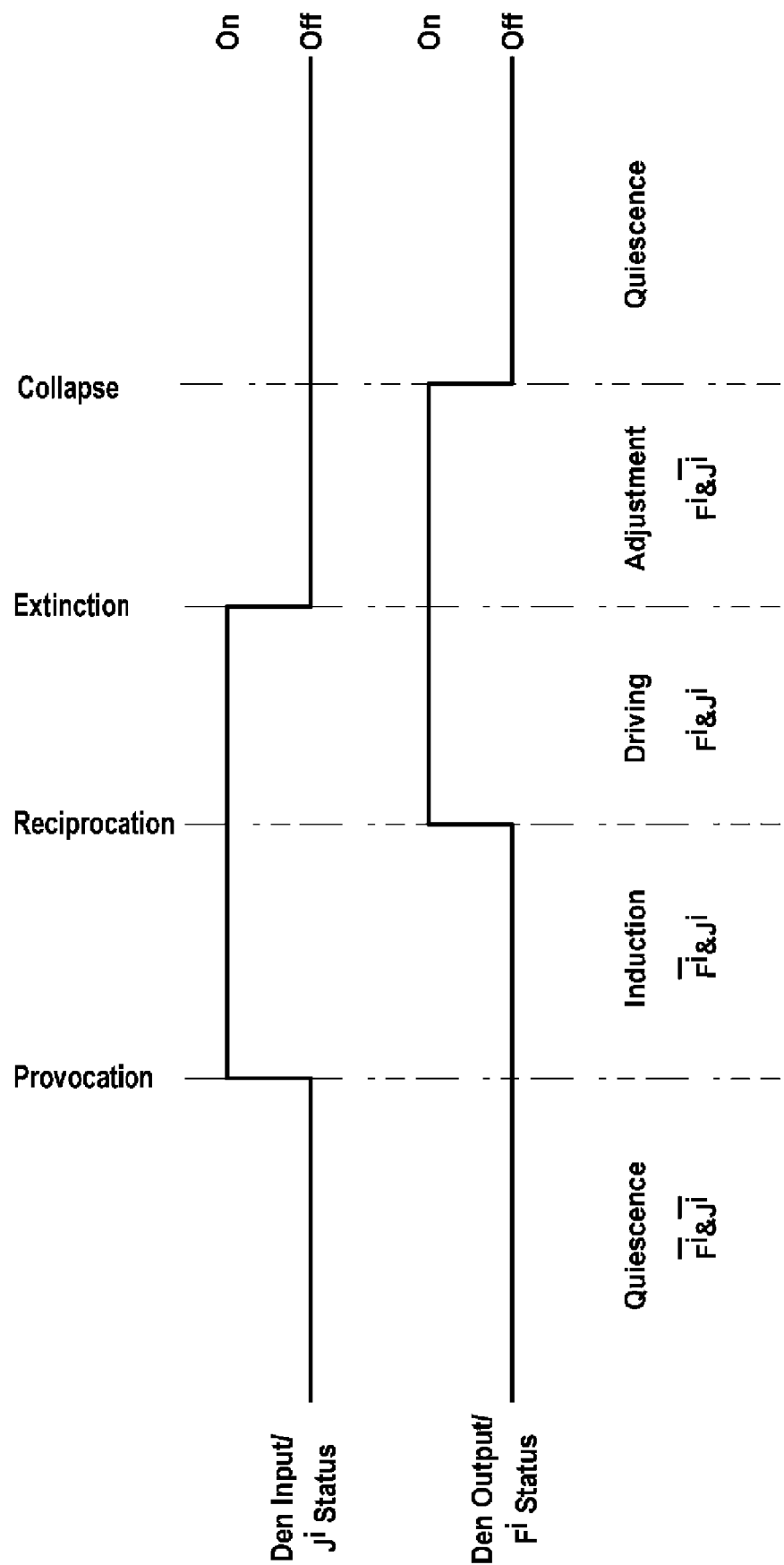
FIG. 1 is an illustration showing points and periods of the Rellief mechanism according to the artificial neuron of the present invention.

There are four events or time points of particular interest in the Relief mechanism, provocation, reciprocation, extinction, and collapse, as shown in FIG. 1. Each of these time points corresponds to a change in state of either the input signal or the output signal, and a complete cycle through these four time points is referred to herein as a challenge. The first time point, provocation, is defined as the time at which the input signal at the Den changes from non-activating to activating. The second time point, reciprocation, is defined as the time at which an activating output signal is first generated by the Den in response to provocation. The third time point, extinction, is defined as the time at which the input signal at the Den input becomes non-activating or is removed. The fourth time point, collapse, is defined as the time at which the output signal at the Den becomes non-activating. There are four periods framed by these points: induction; driving; adjustment; and quiescence. Induction is defined as the time period between provocation and reciprocation, and thus represents the time that elapses after the Den receives an activating input signal until the Den produces an activating output signal. During the induction period, the Den input is activating and the Den output is non-activating. Driving is defined as the time period between reciprocation and extinction, and represents the time that elapses after the Den produces an activating output until the input at the Den becomes non-activating. During the driving period, both the Den input and the Den output are activating. Adjustment is defined as the time period between extinction and collapse, and represents the time that elapses after the input at the Den becomes non-activating until the output of the Den becomes non-activating. During the adjustment period, the Den input is non-activating and the Den output is activating. Quiescence is defined as the time period between collapse and provocation, and represents the time that elapses between successive challenges. During the quiescence period, the Den input and the Den output are both non-activating.

The length of the Induction period is the latency to react. The potential latency is the length of the next Induction period, which is determined by the present state of internal properties. In this disclosure's description of Relief, there are four internal properties governing potential latency. There can be more internal properties in a Relief mechanism. The internal property "Current Latency", $L^{cur}$, is equal to the current potential latency. It represents the length of the Induction period if Provocation occurred immediately. $L^{cur}$ changes with time and experience. The internal property "Present-Resting Latency", $L^{prr}$, influences the potential latency after a long Quiescence. The internal property "Future-Resting Latency", $L^{fur}$, influences the potential latency after a longer Quiescence, which is in the near future. The internal property "Base Latency", $L^{bas}$, influences the potential latency after a still longer Quiescence, which is in the distant future. $L^{bas}$ is the potential latency of the naïve Den as well. Arbitrarily, the average $L^{bas}$ value is 100τ in length. Tau is a relative time unit. The actual time represented by τ for any Den's $L^{bas}$, for a particular Den construction, depends on the materials used to construct the Den. $L^{cur}$, $L^{prr}$ and $L^{fur}$ have τ values as well. The maximum and minimum values of $L^{cur}$, $L^{prr}$, $L^{fur}$ and $L^{bas}$, are $L^{max}$ and $L^{min}$, respectively.

Sizing and Coalescence

Relief has two major temporal aspects: sizing and coalescence, which are (made-up terms). Sizing is the process of stretching of shrinking the Induction period, which is determined by Den internal properties, to mirror the Driving period, which is determined by environmental properties. (Other Rons can be the environment of a particular Ron.) Sizing occurs during the Adjustment period. The values of $L^{cur}$ and $L^{fur}$ are directly affected. Generally, there are three possible outcomes of sizing. Potentiation is one possibility: the magnitudes of $L^{cur}$ and $L^{fur}$ are decreased. Depotentiation (made-up term) is another possibility: the magnitudes of $L^{cur}$ and $L^{fur}$ are increased. Another possibility is that $L^{cur}$ and $L^{fur}$ are not changed. The next Induction is likely to be shorter if potentiation occurs, longer is depotentiation occurs. Coalescence is continuous. As time passes, the values of $L^{cur}$, $L^{fur}$, $L^{prr}$ and $L^{bas}$ move toward becoming equal. $L^{cur}$ moves toward $L^{prr}$. $L^{prr}$ moves toward $L^{fur}$. $L^{fur}$ moves toward $L^{bas}$.

Driving Threshold

Sizing is controlled by a Driving threshold. To further describe Sizing, let $A_{ij}$ signify the present Adjustment period being considered. Used in other terms also, the subscript "i" signifies events preceding $A_{ij}$ and "j" signifies events after $A_{ij}$. Therefore, $D_i$ signifies the Driving period before $A_{ij}$. $D_j$ signifies the Driving period after $A_{ij}$. $D^t$ signifies the Driving threshold, which determines if the $L^{cur}_j$ and $L^{fur}_j$ will be shorter or longer than $L^{cur}_i$ and $L^{fur}_i$, respectively. If little time has passed between $I_i$, Induction period i, and $I_j$, less than 1000τ for instance, the Coalescence aspect of the Relief mechanism may be ignored. See FIG. 2 and FIG. 3. "Input Not Output" means "input value (LOGICAL AND) (LOGICAL NOT) output value". In this simplification the Induction before $A_{ij}$, $I_i = L^{cur}_i$ and the Induction after $A_{ij}$, $I_j = L^{cur}_j$. See EQU. 1-3. $L^{fur}$ is similarly affected by $D_i$ but not to the same degree.

If $D_i < D^t$ then $I_j \leq I_i$      EQU. 1

If $D_i > D^t$ then $I_j \geq I_i$      EQU. 2

If $D_i = D^t$ then $I_j = I_i$      EQU. 3

Sizing can be stated roughly in terms of then $L^{cur}$ and $L^{fur}$. See EQU. 4-6.

If $D_i < D^t$ then $L^{cur}_j \leq L^{cur}_i$ and $L^{fur}_j \leq L^{fur}_i$      EQU. 4

If $D_i > D^t$ then $L^{cur}_j \geq L^{cur}_i$ and $L^{fur}_j \geq L^{fur}_i$      EQU. 5

If $D_i = D^t$ then $L^{cur}_j = L^{cur}_i$ and $L^{fur}_j = L^{fur}_i$      EQU. 6

Following

Figure 4A:
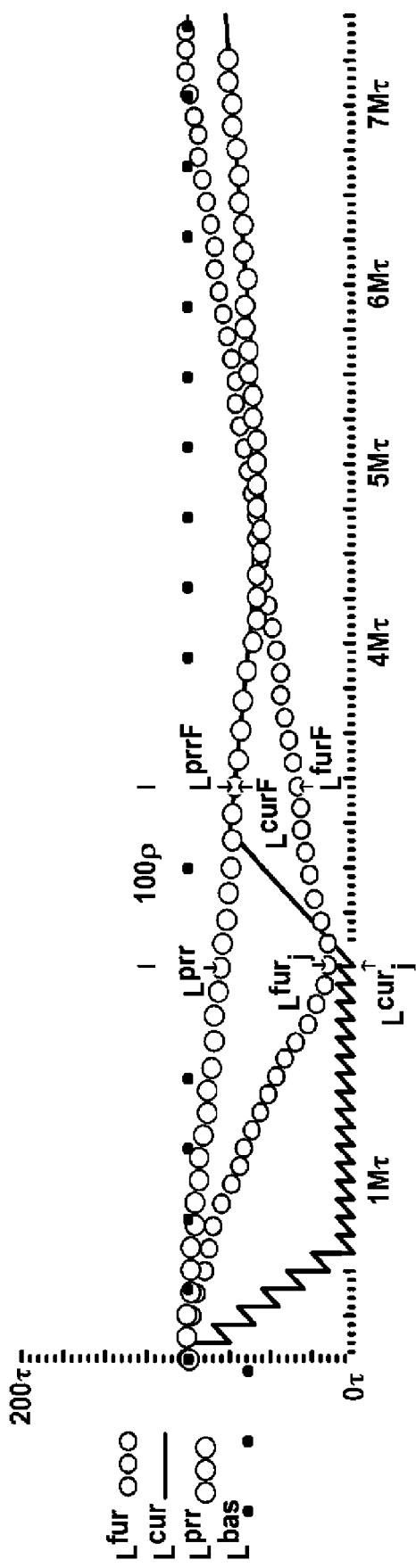
FIG. 4A is an illustration showing τ Sizing and Coalescence of potential during potentiation of a Den according to the artificial neuron of the present invention.
Figure 4B:
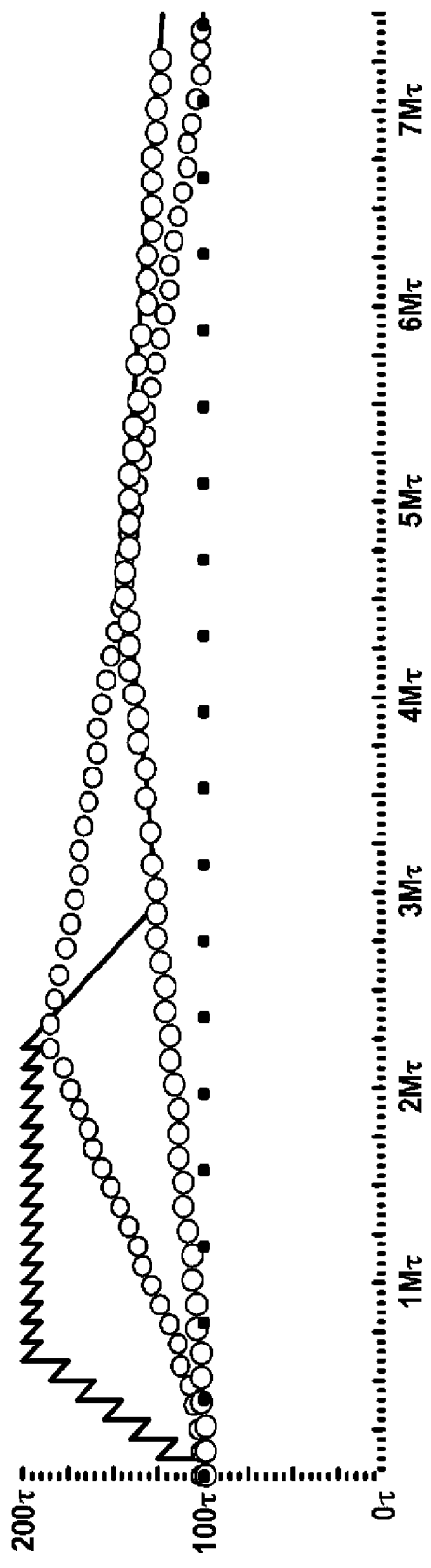
FIG. 4B is an illustration showing τ Sizing and Coalescence of potential during depotentiation of a Den according to the artificial neuron of the present invention.

Following is the process where the value of one property follows another. I use arrows to describe Following in equations: ⇑ means "increasing", ⇓ means "decreasing" and ⇒ means "toward". Hence, ⇑A⇒B means "increasing A toward B" or "A increases toward B". ⇑⇓A⇒B means "increasing and decreasing A toward B", or "A follows B". $L^{cur}$, $L^{fur}$ and $L^{prr}$ slowly change continuously through out Induction, Driving, Adjustment and Quiescence. $L^{cur}$ and $L^{fur}$ may change abruptly during the Adjustment period. These continuous changes are responsible for the waxing and waning of long-term memory. Long-term memory here means the persistence of the effects of experience on Den internal properties. $L^{fur}$ slowly follows $L^{bas}$. $L^{prr}$ slowly follows $L^{fur}$. $L^{cur}$ follows $L^{prr}$. $L^{cur}$ generally changes more rapidly then $L^{fur}$ and $L^{prr}$. See EQU. 7-9. When the Den is naïve $L^{cur}=L^{fur}=L^{prr}=L^{bas}$. Arbitrarily, the length of time it takes $L^{cur}$ to change by one Tau, $\tau$, during Coalescence is referred to as one Rho, $\rho$. FIG. 4A demonstrates potentiation of a Den and FIG. 4B demonstrates depotentiation of a Den, wherein $L^{max}=200\tau$ and $L^{min}=0\tau$. M$\tau$ means 1,000,000$\tau$. Initially the Den is naïve: $L^{cur}=L^{fur}=L^{prr}=L^{bas}$. In the time between 0$\tau$ to 2.25M$\tau$. Sizing occurs during the Adjustment periods following a challenge (Provocations). There are around 20 challenges. The effects of Sizing are combined with the continuous effects of Coalescence. $L^{cur}_j$, $L^{fur}_j$ and $L^{prr}_j$ represent the internal properties after the challenges have ceased. $L^{curF}$, $L^{furF}$ and $L^{prrF}$ represent internal properties after a period equivalent to 100$\rho$ has elapsed since challenges ceased. 1$\rho$ is the amount of time required for $L^{cur}$ to increase by 1$\tau$ when $L^{cur}$ is following $L_{prr}$, $L^{cur}$ does not reach $L^{prr}$ and no Sizing occurs. In this example, 1$\rho$ is equivalent to 10,000$\tau$. Hence, 100$\rho$ is equivalent to 1M$\tau$. After a 5M$\tau$ period of Quiescence, $L^{cur}$, $L^{fur}$, $L^{prr}$ and $L^{bas}$ have nearly coalesced.

$$\Uparrow\Downarrow_{L^{cur}} \Rightarrow_{L^{prr}} \qquad \text{EQU. 7}$$

$$\Uparrow\Downarrow_{L^{prr}} \Rightarrow_{L^{fur}} \qquad \text{EQU. 8}$$

$$\Uparrow\Downarrow_{L^{fur}} \Rightarrow_{L^{bas}} \qquad \text{EQU. 9}$$

General Behavior of Den

During the Adjustment period, internal changes occur in the Den that will affect the next Induction period. These changes depend of the length of the previous Driving period. There is an immediate short-term effect and a delayed long-term effect on Induction. The Den will react quickly, that is will have a short Induction period, in a future experience if generating an activating output has quickly resulted in Extinction in a previous experience, that is resulted in a shorter Driving period. Generally, the Den will react more slowly, will have a longer Induction period, when generating an activating output has not quickly resulted in Extinction, resulted in a longer Driving period.

Potentiation and Depotentiation

The Den, or the Ron containing it, is said to be potentiated when $L^{cur}$ is shortened and said to be depotentiated when the $L^{cur}$ is lengthened. The degree of temporal association between Reciprocation and Extinction modifies subsequent Ron Inductions because the internal property $L^{cur}$ is modified. If there is a close association between Reciprocation and Extinction, the Ron is potentiated. If there is a loose association between Reciprocation and Extinction, the Ron is depotentiated. Such effects of potentiation and depotentiation fade over time during Coalescence because $L^{cur}$ is influenced by $L^{prr}$, which is influenced by $L^{fur}$, which is influenced by $L^{bas}$.

A Mathematical Representation of Rellief Mechanism

To clarify the Rellief mechanism, a possible mathematical representation of it is given here. The behavior of the Dens is simulated using this representation in graphs labeled Chart F, G, H, I, J, K, L, M N, P Q and R. Individual simulations are represented as well as values averaged over 375 randomized simulations. Variables that are constant through these simulations are listed below, LIST 1. These variables will be explained as they arise.

LIST 1.
$D^t=10\tau$
max$\Delta D^{eff}=50\tau$
maxD$^{dif}$PT=50$\tau$
decD$^{dif}$PT=100$\tau$
noD$^{dif}$PT=150$\tau$ Variables that are changed to clarify aspects of the Rellief mechanism are listed below, LIST 2. These variables will be explained as they arise.
LIST 2.
RM
RA
R
$D_i$ Variables that change for each simulation within each set are enumerated in LIST 3 (described as they arise). These are the internal properties of the Den. They are relevant to the Rellief mechanism.
LIST 3.
$L^{bas}$
$L^{prr}$
$L^{fur}$
$L^{cur}$
$L^{max}$
$L^{min}$

Three-Step Short-Term Potentiation

If the Driving threshold is greater than the Driving period preceding Adjustment ($D^t>D_i$), then generally the internal property $L^{cur}$ will be smaller after the Adjustment period ($L^{cur}_j<L^{cur}_i$). This is termed "short-term" potentiation because changes in $L^{cur}$ are less persistent than changes in $L^{fur}$. Delta Driving Effective, $\Delta D^{eff}$, for this potentiation calculation is simply the absolute difference between $D^t$ and $D_i$, EQU. 10, which is valid for potentiation only.

$$\Delta D^{eff}=|D^t-D_i| \qquad \text{EQU. 10}$$

To obtain $L^{cur}_j$ from $L^{cur}_i$, three intermediate values are calculated: $L^{curA}$; $L^{curAB}$ and $L^{curABC}$. To symbolize the generation of a random number, I use the format Rnd(A,B). A number between A and B is randomly generated. RM, Randomized Multiplier, is used in the random functions of $L^{curAB}$ and $L^{curDE}$ (described later). See EQU. 12 and 18. RA, Randomized Addend, stands for such a random that is used in the calculation of $L^{curABC}$ and $L^{curDEF}$ (described later). See EQU. 13 and 19. In this example of potentiation, $L^{cur}_i$ is non-randomly decremented according to $\Delta D^{eff}$, then randomized in a multiplicative manner and then randomized in an additive manner (EQU. 11-14).

$$L^{curA}=L^{cur}_i-5\tau\times\Delta D^{eff}; \qquad \text{EQU. 11}$$

If $L^{curA}<L^{min}$ then $L^{curA}=L^{min}$ $$L^{curAB}=(1+Rnd(-RM, RM))\times L^{curA}; \qquad \text{EQU. 12}$$

If $L^{curAB}>L^{cur}_i$ then $L^{curAB}=L^{cur}_i$ $$L^{curABC}=L^{curAB}+Rnd(0, RA); \qquad \text{EQU. 13}$$

If $L^{curABC}>L^{cur}_i$ then $L^{curABC}=L^{cur}_i$

If $D^t>D_i$ then $L^{cur}_j=L^{curABC}$ \qquad EQU. 14

Effective Difference Driving and Threshold: Depotentiation

Figure 5:
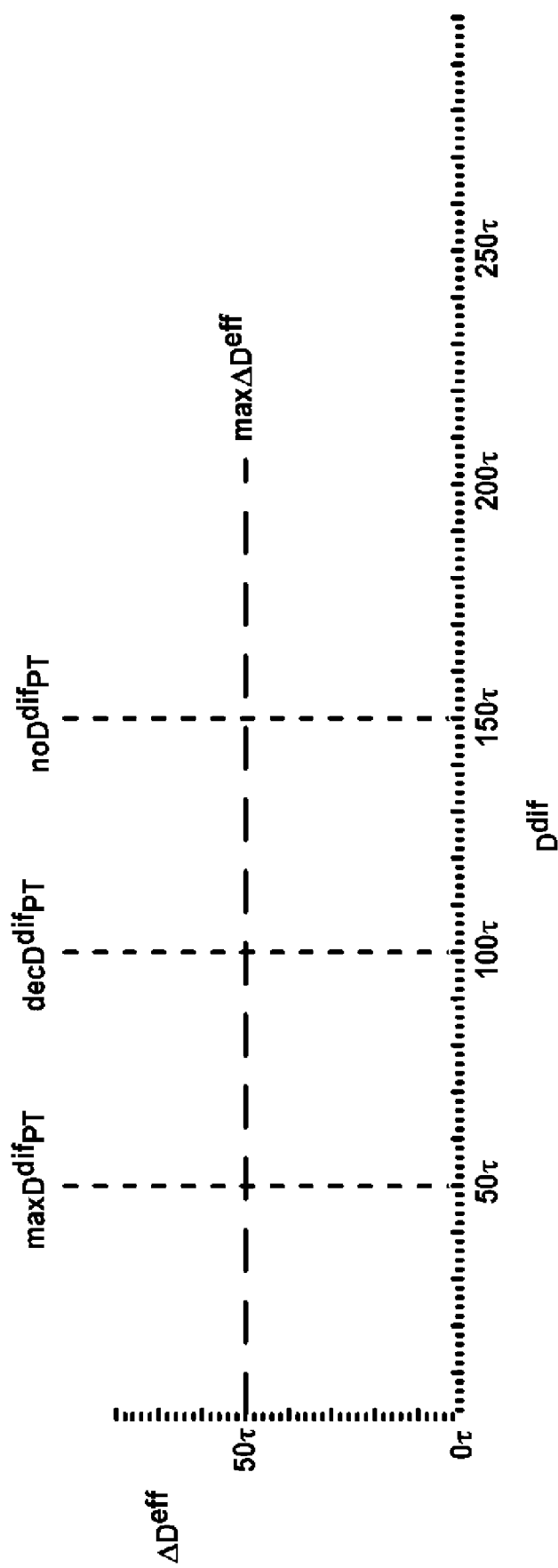
FIG. 5 is an illustration showing Delta Driving Effective and Driving Difference according to the artificial neuron of the present invention.
Figure 7A:
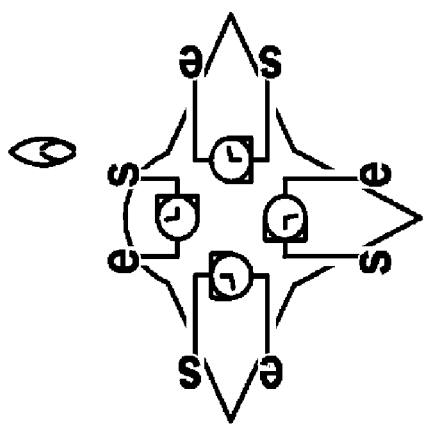
FIG. 7A is an illustration showing a Ron Animal Flame time course according to the artificial neuron of the present invention.
Figure 7D:
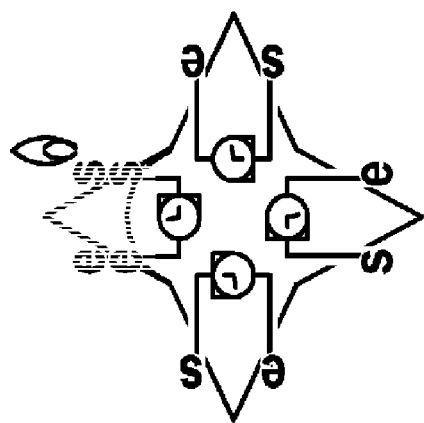
FIG. 7D is an illustration showing a Ron Animal Flame time course according to the artificial neuron of the present invention.
Figure 7B:
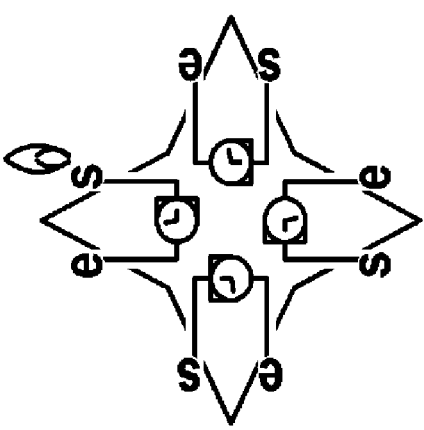
FIG. 7B is an illustration showing a Ron Animal Flame time course according to the artificial neuron of the present invention.
Figure 7E:
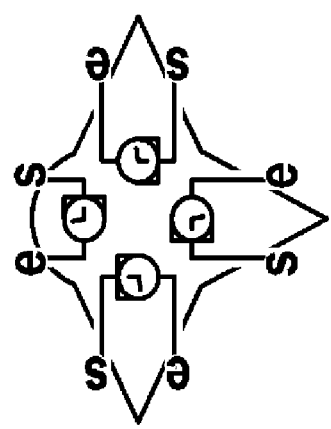
FIG. 7E is an illustration showing a Ron Animal Flame time course according to the artificial neuron of the present invention.
Figure 7C:
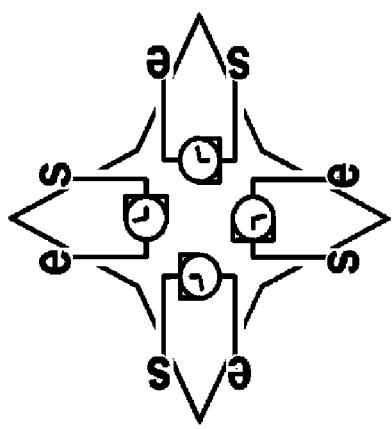
FIG. 7C is an illustration showing a Ron Animal Flame time course according to the artificial neuron of the present invention.
Figure 7F:
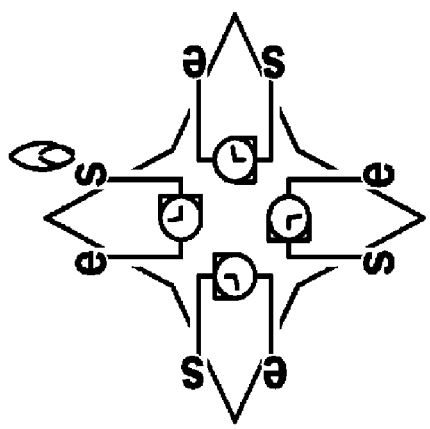
FIG. 7F is an illustration showing a Ron Animal Flame time course according to the artificial neuron of the present invention.
Figure 8C:
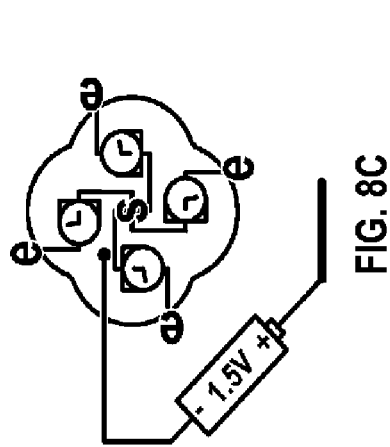
FIG. 8C is an illustration showing a Ron Animal Volt time course.
Figure 8F:
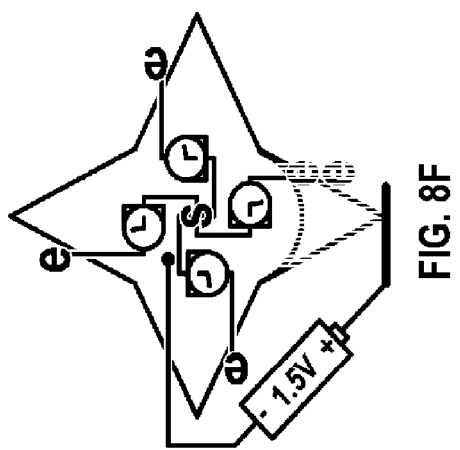
FIG. 8F is an illustration showing a Ron Animal Volt time course.
Figure 8B:
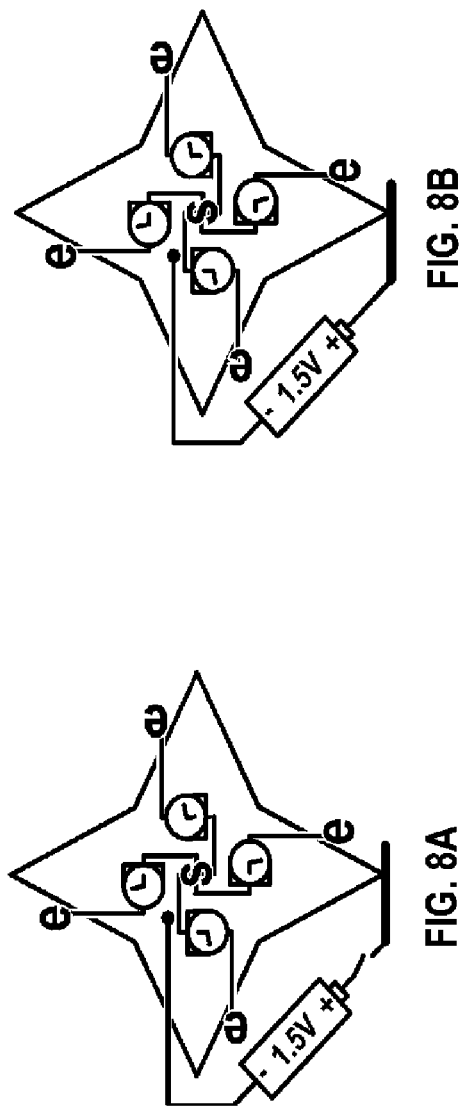
FIG. 8B is an illustration showing a Ron Animal Volt time course.
Figure 8E:
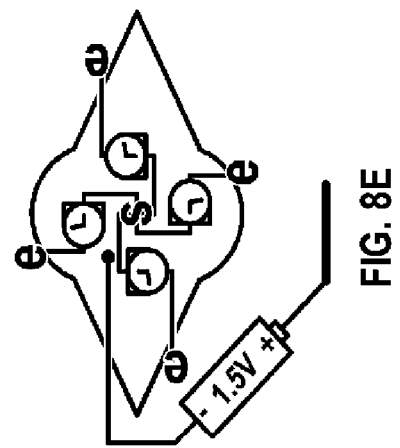
FIG. 8E is an illustration showing a Ron Animal Volt time course.
Figure 8A:
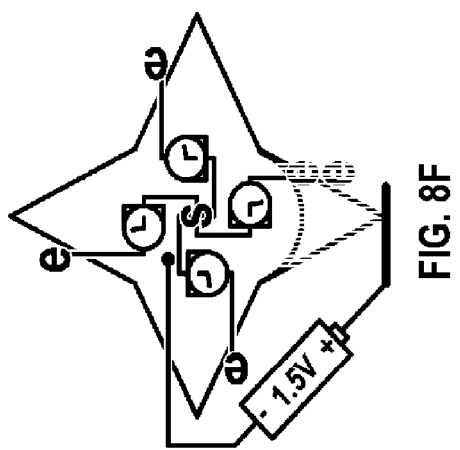
FIG. 8A is an illustration showing a Ron Animal Volt time course.
Figure 8D:
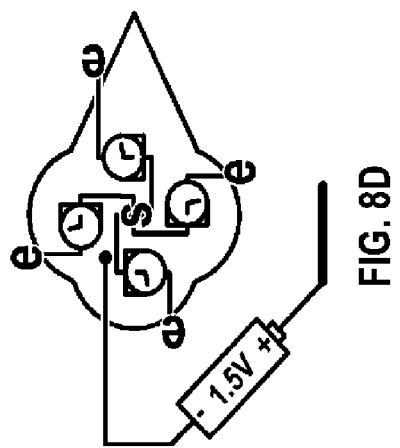
FIG. 8D is an illustration showing a Ron Animal Volt time course.

For depotentiation, $\Delta D^{eff}$ is calculated to account for very big differences between $D_i$ and $D^t$ that would occur if Extinction is very late or does not occur at all. For depotentiation, this difference, $D^{dif}$, will be a positive value (EQU. 15). $noD^{dif}PT$, No Driving Difference Point, is the point past which $\Delta D^{eff}$ has no effect. See EQU. 16 and FIG. 5. Before (left side) $maxD^{dif}PT$, Maximum Driving Difference Point, $\Delta D^{eff}=D^{dif}$. If $D^{dif}$ is between $decD^{dif}PT$, "Decrementing Driving Difference Point, and $noD^{dif}PT$", then $\Delta D^{eff}$ will be proportionately between $max\Delta D^{eff}$, "Maximum Delta Driving Effective", and 0. If $D^{dif}$ is between $decD^{dif}PT$ and $maxD^{dif}PT$, $\Delta D^{eff}=max\Delta D^{eff}$.

$$D^{dif}=D_i-D^t \qquad \text{EQU. 15}$$

If $D^{dif} \geq noD^{dif}PT$ then $\Delta D^{eff}=0$; \qquad EQU. 16

If $D^{dif}<maxD^{dif}PT$ then $\Delta D^{eff}=D^{dif}$;

If $(D^{dif}>decD^{dif}PT)$ AND $(D^{dif}<noD^{dif}PT)$ then $\Delta D^{eff}=max\Delta D^{eff} \times (1-(decD^{dif}PT-D^{dif})/(noD^{dif}PT-decD^{dif}PT))$;

If $(D^{dif}>maxD^{dif}PT)$ AND $(D^{dif}<decD^{dif}PT)$ then $\Delta D^{eff}=max\Delta D^{eff}$

Three-Step Short-Term Depotentiation

If the Driving threshold is less than the Driving period preceding Adjustment ($D^t<D_i$), then generally the internal property $L^{cur}$ will be greater after the Adjustment period ($L^{cur}_j>L^{cur}_i$). Delta Driving Effective, $\Delta D^{eff}$, for this depotentiation calculation is not simply the absolute difference between $D^t$ and $D_i$. See EQU. 15 and 16. To obtain $L^{cur}_j$ from $L^{cur}_i$, three intermediate values are calculated: $L^{curD}$, $L^{curDE}$ and $L^{curDEF}$. In this example of depotentiation, $L^{cur}_i$ is non-randomly incremented according to $\Delta D^{eff}$, then randomized in a multiplicative manner and then randomized in a subtractive manner (EQU. 17-20).

$$L^{curD}=L^{cur}_i+5\tau \times \Delta D^{eff}; \qquad \text{EQU. 17}$$

If $L^{curD}>L^{max}$ then $L^{curD}=L^{max}$ $$L^{curDE}=(1+Rnd(-RM, RM)) \times L^{curD}; \qquad \text{EQU. 18}$$

If $L^{curDE}<L^{cur}_i$ then $L^{curDE}=L^{cur}_i$ $$L^{curDEF}=L^{curDE}-Rnd(0, RA); \qquad \text{EQU. 19}$$

If $L^{curDEF}<L^{cur}_i$ then $L^{curDEF}=L^{cur}_i$

If $(D^t<D_i)$ AND $(\Delta D^{eff}>0)$ then $L^{cur}_j=L^{curDEF}$ \qquad EQU. 20

Long-Term Potentiation and Depotentiation

If the Driving threshold is less than or greater than the Driving period preceding Adjustment ($D^t<>D_i$), then generally the internal property $L^{fur}$ will be altered after the Adjustment period ($L^{fur}_j<>L^{fur}_i$). $L^{fur}_i$ follows $L^{cur}_i$ in this regard to the Driving threshold. The movement of $L^{fur}_j$ toward $L^{cur}_j$ is determined by $\Delta D^{eff}$. This following effect is abrupt, occurring during the Adjustment period only. See EQU. 21-23 for the particular equations used in this disclosure's discussion of long-term potentiation and depotentiation.

If $L^{cur}_j<L^{fur}_i$ then $L^{fur}_j=L^{fur}_i-0.3 \times \Delta D^{eff}$; \qquad EQU. 21

If $L^{fur}_j<L^{cur}_j$ then $L^{fur}_j=L^{cur}_j$;

If $L^{fur}_j<L^{min}$ then $L^{fur}_j=L^{min}$

If $L^{cur}_j>L^{fur}_i$ then $L^{fur}_j=L^{fur}_i+0.3\tau \times \Delta D^{eff}$; \qquad EQU. 22

If $L^{fur}_j>L^{cur}_j$ then $L^{fur}_j=L^{cur}_j$;

If $L^{fur}_j>L^{max}$ then $L^{fur}_j=L^{max}$

If $(\Delta D^{eff}=0)$ OR $(L^{fur}_i=L^{cur}_j)$ then $L^{fur}_j=L^{cur}_j$ \qquad EQU. 23

Rate of Continuous Following

In Coalescence, internal properties follow one another, EQU. 7-9. For the examples of Rellief used here the EQU. 24-32 apply. The rate of Following in expressed in terms of $\rho$. The number of $\rho$ periods that have elapsed is represented by R, Rho Periods. If, for instance 1 $\rho$ periods have elapsed, R=1, then R may be replaced with $1\tau$ in the equations below. Recall that $\rho$ is the time it takes $L^{cur}$ to change by $1\tau$ when $L^{cur}$ is following $L^{prr}$. $L^{furF}_j$ is the value of $L^{fur}_j$ after a period of R immediately following $A_{ij}$, EQU. 24-26. $L^{prrF}_j$ is the value of $L^{prr}$ after a period of R immediately following $A_{ij}$, EQU. 27-29. $L^{curF}_j$ is the value of $L^{cur}_j$ after a period of R immediately following $A_{ij}$, EQU. 30-32.

If $L^{fur}_j<L^{bas}$ then $L^{furF}=L^{furj}+(0.01 \times R)$; \qquad EQU. 24

If $L^{furF}>L^{bas}$ then $L^{furF}=L^{bas}$

If $L^{fur}_j>L^{bas}$ then $L^{furF}=L^{fur}_j-(0.01 \times R)$; \qquad EQU. 25

If $L^{furF}<L^{bas}$ then $L^{furF}=L^{bas}$

If $L^{fur}_j=L^{bas}$ then $L^{furF}=L^{fur}_j$ \qquad EQU. 26

If $L^{prr}<L^{furF}$ then $L^{prrF}=L^{prr}+(0.1 \times R)$; \qquad EQU. 27

If $L^{prrF}>L^{furF}$ then $L^{prrF}=L^{furF}$

If $L^{prr}>L^{furF}$ then $L^{prrF}=L^{prr}-(0.1 \times R)$; \qquad EQU. 28

If $L^{prrF}<L^{furF}$ then $L^{prrF}=L^{furF}$

If $L^{prr}=L^{furF}$ then $L^{prrF}=L^{furF}$ \qquad EQU. 29

If $L^{cur}_j<L^{prrF}$ then $L^{curF}=L^{cur}_j+R$; \qquad EQU. 30

If $L^{curF}>L^{prrF}$ then $L^{curF}=L^{prrF}$

If $L^{cur}_j>L^{prrF}$ then $L^{curF}=L^{cur}_j-R$; \qquad EQU. 31

If $L^{curF}<L^{prrF}$ then $L^{curF}=L^{prrF}$

If $L^{cur}_j=L^{prrF}$ then $L^{curF}=L^{prrF}$ \qquad EQU. 32

Randomized Internal Properties

For the purposes of illustration, in the examples in this description, the Den internal properties have been randomized in a simple fashion. Each of 26 Dens in each of 375 simulations were randomized as follows. See EQU. 33-38. Recall the average magnitude of $L^{bas}$ was defined as $100\tau$ $L^{bas}=(1+Rnd(-0.25, 0.25)) \times 100\tau=100\tau \pm 25$ \qquad EQU. 33

$L^{prr}=(1+Rnd(-0.25, 0.25)) \times L^{bas}$ \qquad EQU. 34

$L^{fur}=(1+Rnd(-0.25, 0.25)) \times L^{bas}$ \qquad EQU. 35

$L^{cur}=(1+Rnd(-0.25, 0.25)) \times L^{bas}$ \qquad EQU. 36

$L^{max}=3 \times L^{bas}$ \qquad EQU. 37

$L^{cur}=0.001 \times L^{bas}$ \qquad EQU. 38

Subunit Inputs and Outputs

The four categories of Ron subunits discussed herein, Den, Orr (including Tie and Syn), Ax and Gatte, are representative, rather than exhaustive, of the many subunit variants that might be used in Ron. The Den has a clock face because of its temporal sensitivity. The Ax and the Syn have pluses to signifying that they use positive logic in this example of Relief. All subunits have a single output. The Ax output is split in subunit representation to suggest that it usually serves as an input for many other subunits. See FIG. 6. There may be either one of many inputs for a Orr or Den. There is only one input for the Ax and only two inputs for the Gatte. Like the Den, other subunits may have a latency to react that is dependent of external factors. For this disclosure, only examples are provided of the Syn and Den having a latency to react. The Tie, Gatte are Ax are treated as if the output is determined by the input immediately.

Isolated Dens, Ron Animal Flame

A Ron brain is a collection of Rons. A Ron animal is an entity consisting of a Ron brain connected to a physical environment through sensors and effectors. An effector is a device that carries out a simple physical task. It is activated by a single binary input.

The Den employs the Relief mechanism to allow the Ron learn how to respond to an input signal based on the temporal aspects of previous experiences. The simplest Ron consists of a single Den with a single input and single output. The temporal components of the Relief mechanism, as embodied in the Den, are chiefly responsible for the ability of interconnected Rons to behave in a directed fashion.

The "Ron Animal Flame" exemplifies the behavior of the isolated Den, as shown in FIG. 7. The Ron functional-type here is a single Den with a single input. Rons here are non-interacting. The sensor (s) detects high temperature. The flame is an aversive stimulus in this set-up. If there is a flame near the sensor (FIGS. 7B and 7D), the sensor's output is ON, activating and the Den will subsequently produce an activating output. If the flame is not near (FIGS. 7A, 7C and 7E), the output is OFF, non-activating, and the Den output will become or remain non-activating. If the effector (e) receives an ON input, activating, it draws the corresponding limb, with its sensor, toward the body of the Ron Animal Flame. The flame is no longer sensed and the limb relaxes to the resting position. The flame is then sensed again. The affected Den is potentiated since the energizing of the effector, by the activating Den output, quickly halts the sensation of flame. After each cycle of flame-sensation/limb withdrawal, the reaction to the flame becomes increasing swift. See FIG. 2. In FIG. 7F, the sensation of the flame immediately causes a Den-Provocation and the activation of the effector immediately causes a Den-Extinction (removal of activating input). Therefore, the topmost limb oscillates rapidly. See FIG. 1. Only one limb, the affected one, responds to the flame.

Competing Rons, Ron Animal Volt

In the "Ron Animal Volt", there is a single sensor (s). See FIG. 8. The sensor detects an electrical voltage across the animal's skin. The voltage is an aversive stimulus in this set-up. If there is a voltage, the sensor immediately presents an activating input to all Dens. If the effector (e) of the bottommost limb is energized, with an activating input, that limb is immediately withdrawn toward the body and the sensor immediately presents a non-activating input to all Dens. The bottommost Den is potentiated more than the other Dens. Since the bottommost Den directly leads to Extinction, its Driving Period will tend to be relatively short and its potentiation will usually be greatest. See FIG. 1 and FIG. 2. Eventually the bottommost Den removes the activating input, which goes to all Dens, before the other Dens "Reciprocate". See FIG. 1. After several trials, the bottommost limb reacts selectively and rapidly. There are happenstance instances where the bottommost limb would not become selective. Randomization aspects of Relief reduce these instances. This is explained and illustrated later under "LOCK-UP, R, RM and RA".

Causative Den

"Causative functioning", made-up term, develops when an activating input to the Den is removed quickly following the generation of an activating output from that Den (short Driving Period). The closeness of the association between the generation of an activating output and the time at which the activating input is subsequently removed is indicative of the probability that the activating output caused the removal of the activating input. The Relief mechanism detects "Apparent Causation", made-up term. A Den, when the generation of its activating output indeed quickly causes the removal of the activating input is termed a "Causative Den". Each time Apparent Causation is detected the Den internal properties are changed such that an activating output will occur more quickly following the next activating input (potentiation). Each time Causation is not detected, that is an activating input does not remove an activating input quickly, Den properties are changed such that an activating output will occur more slowing following the next activating input (depotentiation). With the continued presentation of activating inputs, a Causative Den reacts with increasing speed while "Incidental Dens", Non-Causative Dens that share the Causative Den's input, react with decreasing speed. In the case where more that one Den is receiving the same activating input, eventually the Causative Den removes that common activating input before the Incidental Dens generate an activating output. Therefore, the Relief mechanism promotes an energy-conserving homeostasis by limiting the generation of purposeless outputs. The generation of Incidental Den activating outputs is reduced and the length of time in which activation inputs are present is reduced. FIG. 8 (already discussed) and FIG. 9 (discussed immediately below) provide examples of Apparent Causation.

Tie, Ron Animal Flashlight Simple

Figures 9A, 9B:
FIG. 9A is an illustration showing a Tie and Ron Animal Flashlight Simple.
FIG. 9B is an illustration showing a Tie and Ron Animal Flashlight Simple.
Figure 9E:
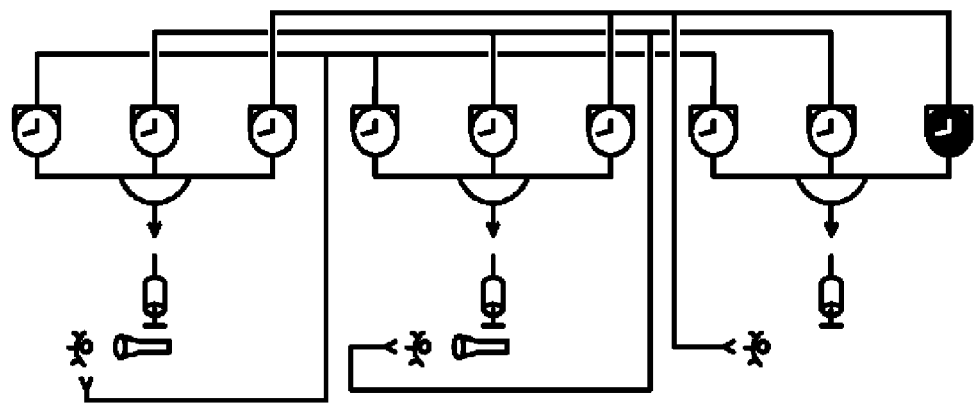
FIG. 9E is an illustration showing a Tie and Ron Animal Flashlight Simple.
Figure 9D:
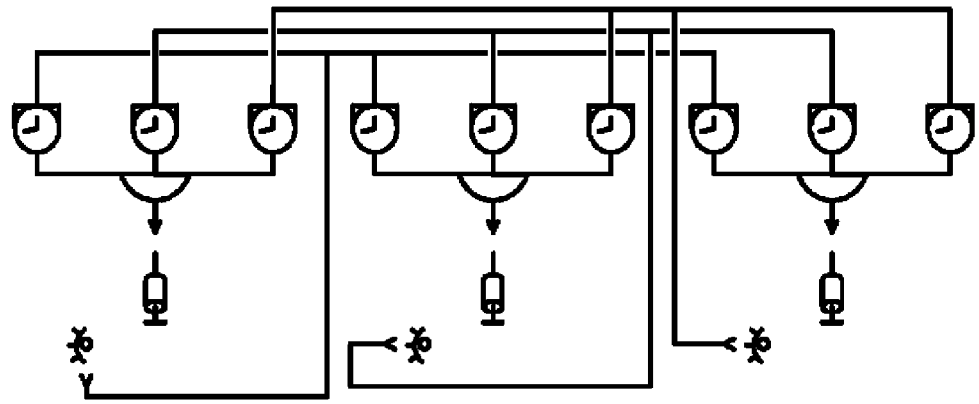
FIG. 9D is an illustration showing a Tie and Ron Animal Flashlight Simple.
Figure 9C:
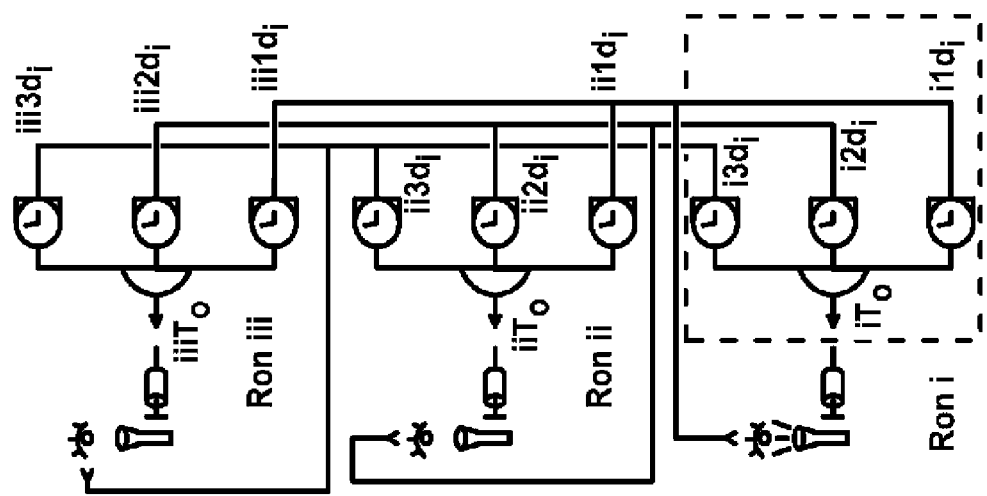
FIG. 9C is an illustration showing a Tie and Ron Animal Flashlight Simple.

The functional-type of the Rons in the "Ron Animal Flashlight Simple" consists of three Dens providing inputs for a single Tie. See FIG. 9. If any Den output in this Ron is activating then the Tie is activating (FIG. 9B). 1=ON (activating), 0=OFF (non-activating) and X means that the input can be either 1 or 0. The activating outputs of the Ties ($iT_o$, $iiT_o$ and $iiiT_o$) energize solenoids (rod normally not extended) to push away objects. It may push away flashlights placed in front of it. A light sensor, symbolized by an eye, can detect if a flashlight is ON or OFF. The light of the flashlight is an aversive stimulus in this set-up. The output of each sensor is connected to three different Rons. When an ON flashlight is placed in front of the Ron i solenoid (FIG. 9C), the nearest sensor places an ON input at Dens $i1d_i$, $ii1d_i$ and $iii1d_i$. With naïve Dens, it may happen that all three flashlights are pushed away. The Induction periods are randomized both by the initial values of the internal properties of the Dens and by the randomized aspects of the Relief mechanism. It may turn out that the Ron i is the last to energize its solenoid. After repeatedly placing OFF flashlights in front of the solenoids of Rons ii and iii and then placing an ON flashlight in front of the solenoid of Ron i, according to Causative Functioning, the Causative Den (i1$d_i$) becomes potentiated. Therefore, eventually Den i1$d_i$ reacts and removes the ON flashlight before the Incidental Dens, ii1$d_i$ and iii1$d_i$, can react. Therefore, with experience only the ON flashlight is pushed away (FIG. 9E). This is an example of "Selective Reaction". After many such challenges Den i1$d_i$ becomes so potentiated that the circuit behaves as if there is a direct connection between the Den i1$d_i$ input and output: i1$d_i$ is referred to as a "Shorted Den". This temporary condition is signified by the inverse clock face image. The Ron Animal Flashlight Simple may similarly be trained to selectively react to ON flashlights placed in front of Ron ii or Ron iii.

Ron Animal Flashlight Layer, Primed Circuit

Figure 10E:
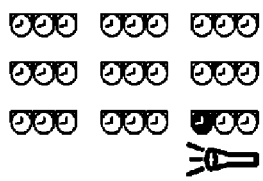
FIG. 10E is an illustration showing a Ron Animal Flashlight Layer.
Figure 10F:
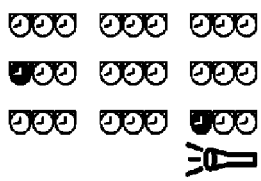
FIG. 10F is an illustration showing a Ron Animal Flashlight Layer.
Figure 10G:
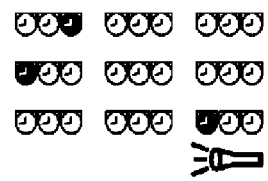
FIG. 10G is an illustration showing a Ron Animal Flashlight Layer.
Figure 10B:
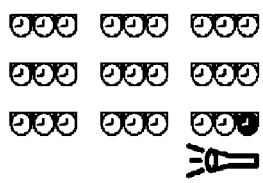
FIG. 10B is an illustration showing a Ron Animal Flashlight Layer.
Figure 10C:
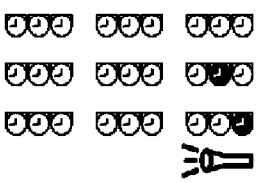
FIG. 10C is an illustration showing a Ron Animal Flashlight Layer.
Figure 10D:
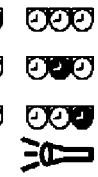
FIG. 10D is an illustration showing a Ron Animal Flashlight Layer.
Figure 10A:
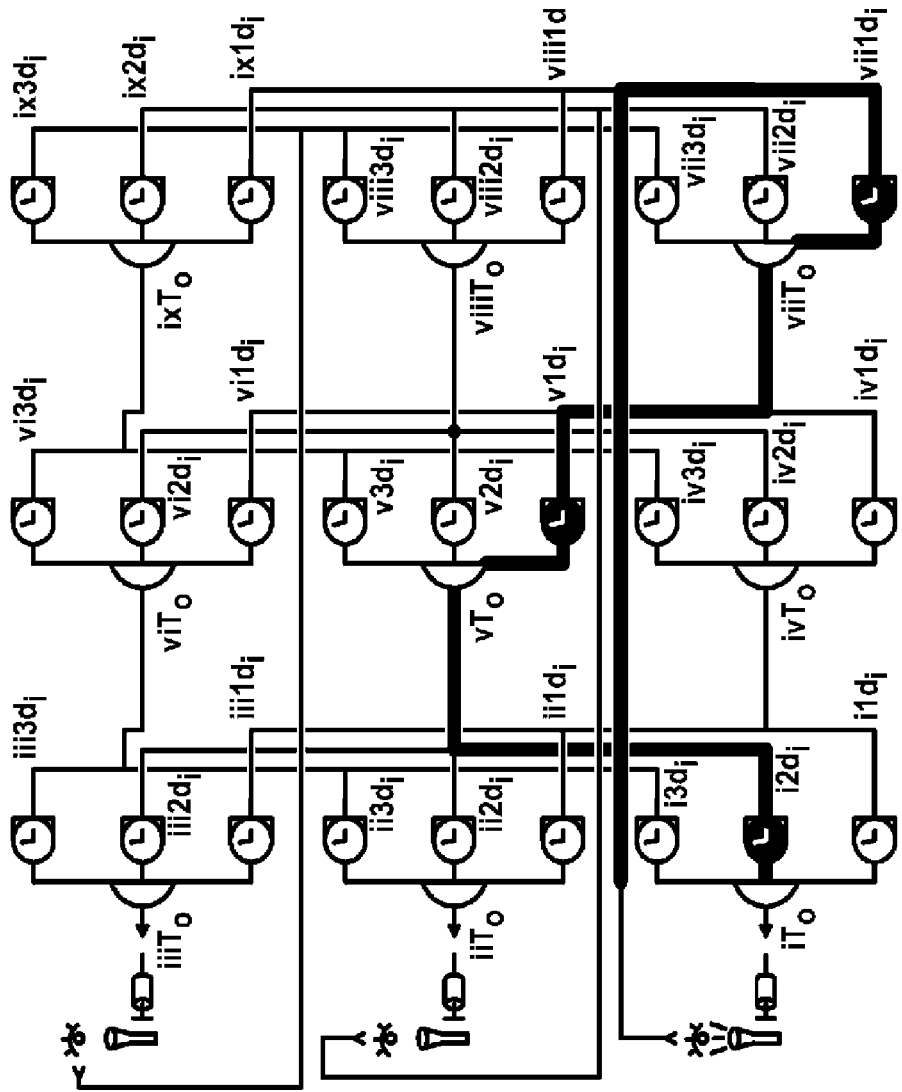
FIG. 10A is an illustration showing a Ron Animal Flashlight Layer.

The "Ron Animal Flashlight Layer" is the same as the Ron Animal Flashlight Simple except that there are more Rons, the outputs of Ties go to the inputs of Dens as well as the inputs of effectors and the participation of three Rons is required to push a flashlight away. See FIG. 10. (The name of the Ron is the same as the Tie output prefix. Dens have the same name as their single input.) After challenges like that in the Ron Animal Flashlight example above, Dens i2$d_i$, v1$d_i$ and vii1$d_i$ may become Shorted (FIG. 10A, inverse clock face). This circuit, heavy line, is a "Primed Circuit" because it consists of Dens that has been potentiated. The Dens closest to the Causative solenoid become Shorted first. FIG. 10B-D and 10D-F show the developing sequence of Shorted Dens starting each with a naïve Ron Animal Flashlight Layer. Only the Dens are shown. Each Den-triplet represents a Ron. If Rons iv, v, vi are replaced with Rons which are randomly connected between Rons i, ii, iii and Rons vii, viii, ix, a Primed Circuit would occur and Selective Reaction would still be seen after a series of ON flashlight challenges.

Pulsatile Interface Between Rons

Figure 11:
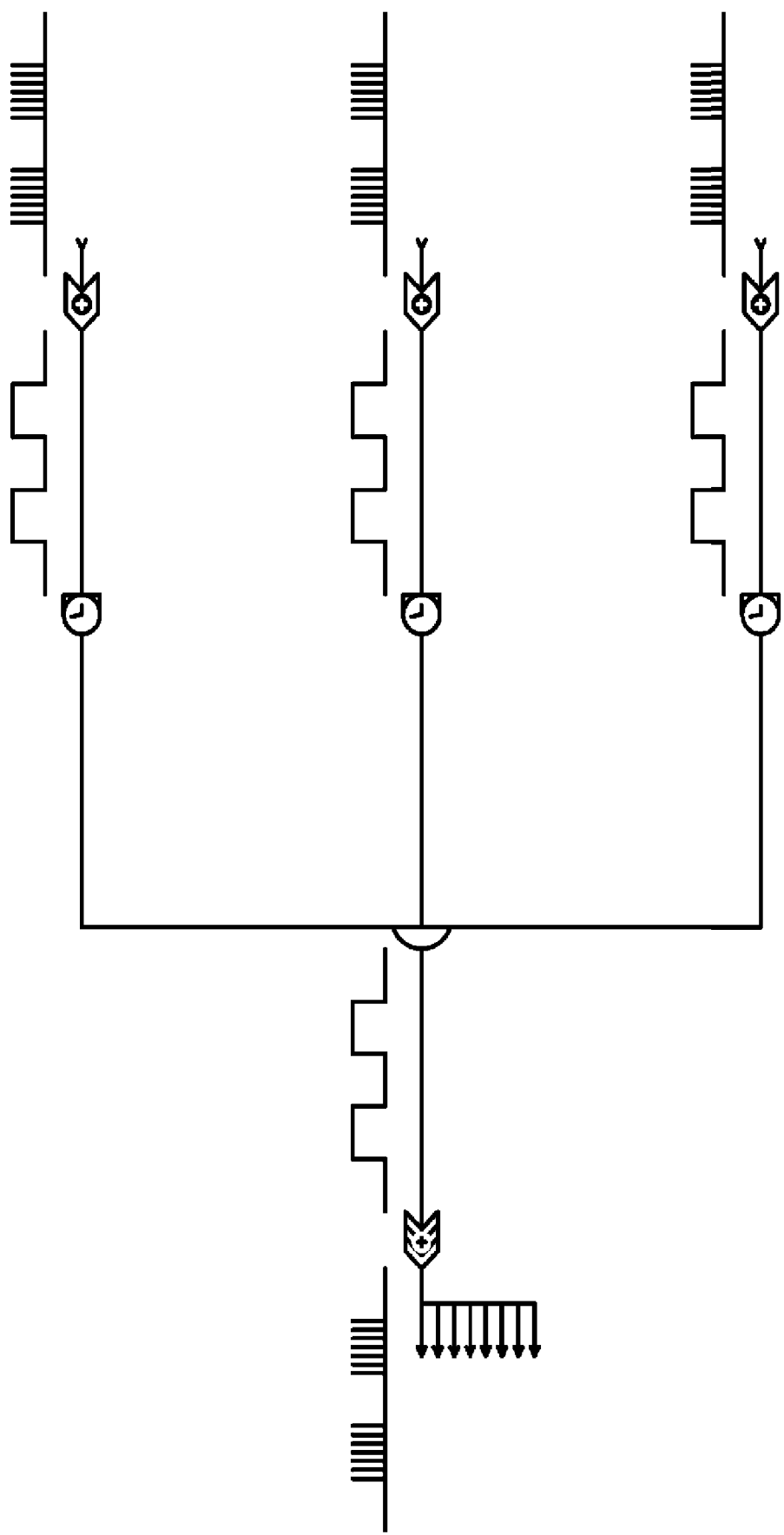
FIG. 11 is an illustration showing pulsatile interface between Rons mediated by Ax and Syn.

Signals between biological neuron are pulsatile. In a functional-type Ron that mimics this behavior, the Ax converts a static signal (from a Tie) into a train of spikes. The Syn receives such a train a spikes, which is converted into a static signal. This static signal is the input to a Den. See FIG. 11.

The Gatte Controls the Flow of Information

The Gatte has two inputs. One is inhibitory and one is excitatory. If there is a non-activating inhibitory input then the output is the same as the excitatory input. If there is an activating inhibitory input then the output is non-activating regardless of the state of the excitatory input. The Gatte, in most of the examples given in this disclosure, gets inputs from Dens and then its output goes to a Tie. See FIG. 12. An exception to this is given immediately below.

Ron Animal Salt, Inhibition

Figure 13C:
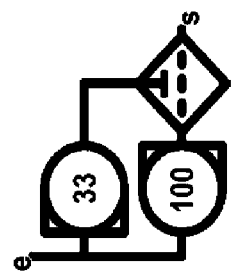
FIG. 13C is an illustration showing a Ron Animal Salt.
Figure 13D:
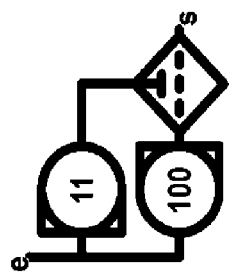
FIG. 13D is an illustration showing a Ron Animal Salt.
Figure 13F:
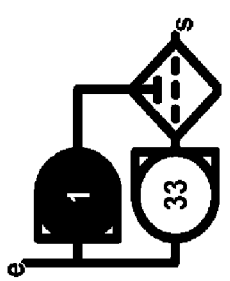
FIG. 13F is an illustration showing a Ron Animal Salt.
Figure 13G:
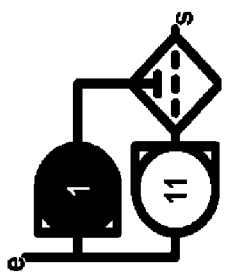
FIG. 13G is an illustration showing a Ron Animal Salt.
Figure 13I:
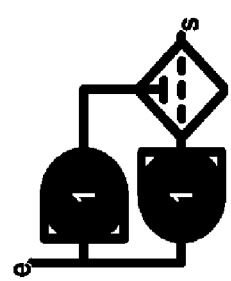
FIG. 13I is an illustration showing a Ron Animal Salt.
Figure 13J:
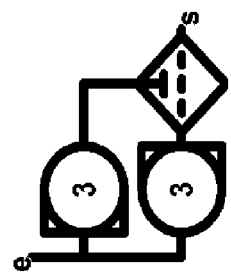
FIG. 13J is an illustration showing a Ron Animal Salt.
Figure 13B:
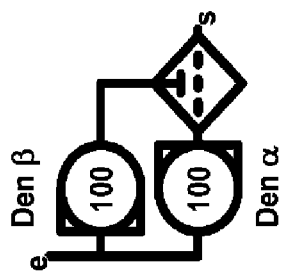
FIG. 13B is an illustration showing a Ron Animal Salt.
Figure 13E:
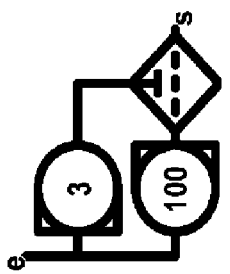
FIG. 13E is an illustration showing a Ron Animal Salt.
Figure 13H:
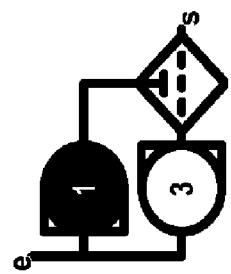
FIG. 13H is an illustration showing a Ron Animal Salt.
Figure 13A:
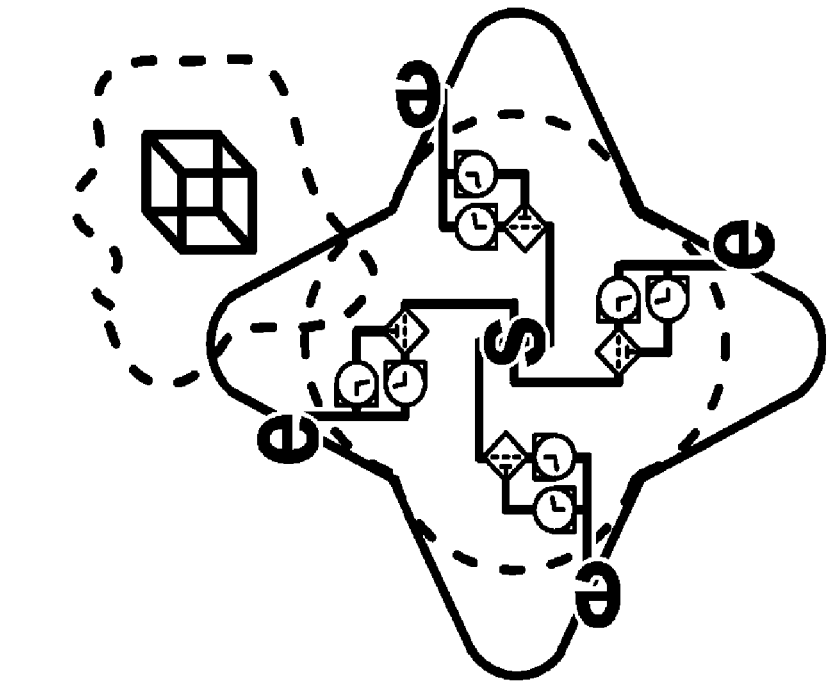
FIG. 13A is an illustration showing a Ron Animal Salt.

The Ron functional-type in the "Ron Animal Salt" (FIG. 13) consists of two Dens and one Gatte. There are four such Rons. They receive the same input from the single salt sensor (s). This sensor output goes to the excitatory inputs of the Gattes. The output of the Gatte goes to the input of Den α (FIG. 13B). The output of a Den goes to both the effector and the input of Den β. The Den β output goes to the inhibitory input of the Gatte. If any part of the animal (broken or unbroken gray line) is in contact with the salt solution (dark broken line with cube inside), then the sensor presents an activating input to the Gattes. Instead of clock faces, the Dens have the value of the internal property $L^{cur}$ displayed. For both Dens α and β, $L^{cur}$=100 and $L^{prr}$=100 initially. Effectors (e) draw individual limb toward body if corresponding Den α has an activating output. Solid gray line is limb when Den α output is OFF, broken gray line when Den α is ON. Contact with a salt solution is the aversive stimulus. There is no action that can abolish contact with the salt solution is this set-up. It would be economical to not react by withdrawing limbs in this case. Regarding all Rons, when salt is sensed centrally, an activating signal appears at the Gatte excitatory input, then immediately at Den α input, then later at Den β and effector inputs simultaneously. When the output of Den β becomes activating, the inhibitory input of the Gatte is activating, the output of the Gatte immediately becomes non-activating, then the Den α output immediately becomes non-activating. As the activating output of Den β has quickly caused the activating input of Den β to be removed, Den β in potentiated. With a non-activating signal at the inhibitory input of the Gatte, an activating input again appears at Den α. This type of cycling continues and Den β becomes increasingly deeply potentiated until is becomes a Shorted Den. See FIG. 13B-F. Den β$L^{cur}$ goes from 100 to 1. A value of 1 corresponds to the Den being Shorted. Now that Den β is Shorted or nearly Shorted ($L^{cur}$=3), the activating output of Den α quickly removes the activating input at Den α. Den α becomes increasingly potentiated until it becomes Shorted. See FIG. 13E-I. When the salt solution is removed (FIG. 13J) and the Dens are resting (non-activating inputs), $L^{cur}$ moves toward $L^{prr}$. The same process of Shorting the α and β Dens occurs in all Rons.

Multiple Syn Inputs

Figure 14A:
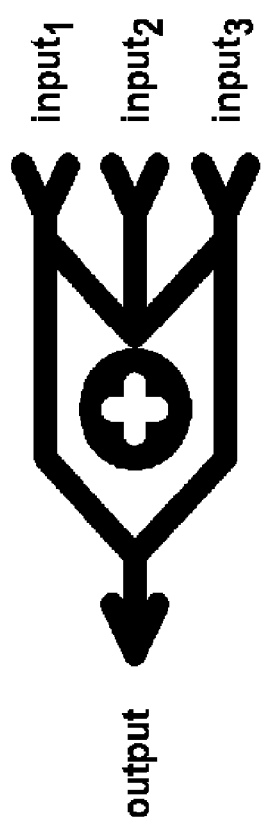
FIG. 14A is an illustration showing a Multi-input Syn Induction period.
Figure 14B:
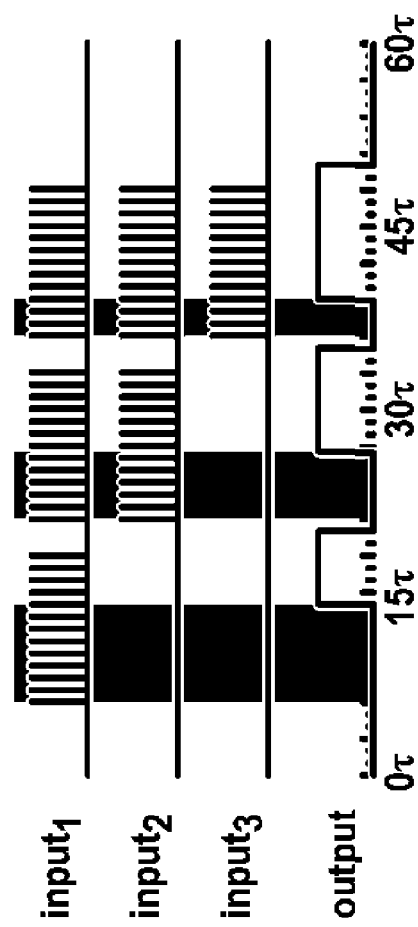
FIG. 14B is an illustration showing a Multi-input Syn Induction period.
Figure 15A:
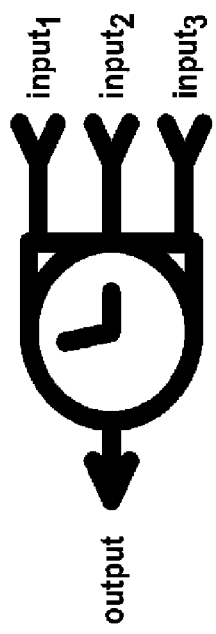
FIG. 15A is an illustration showing a Multi-input Den Induction period.
Figure 15D:
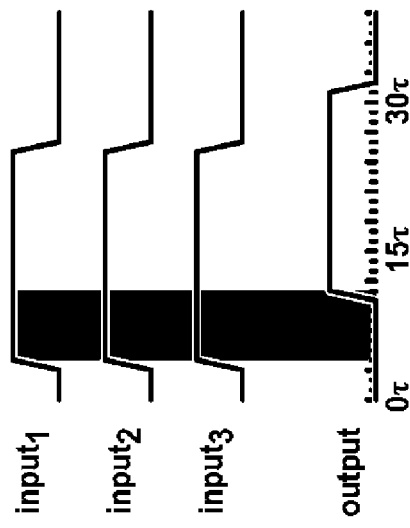
FIG. 15D is an illustration showing a Multi-input Den Induction period.
Figure 15C:
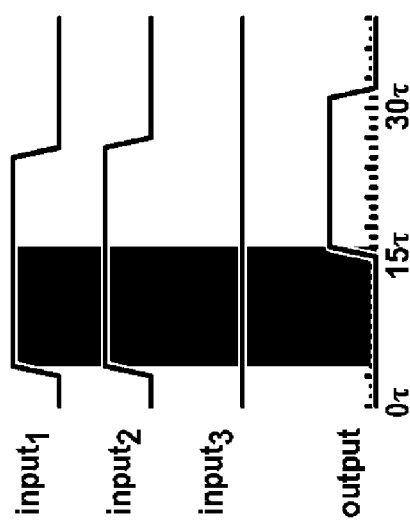
FIG. 15C is an illustration showing a Multi-input Den Induction period.
Figure 15B:
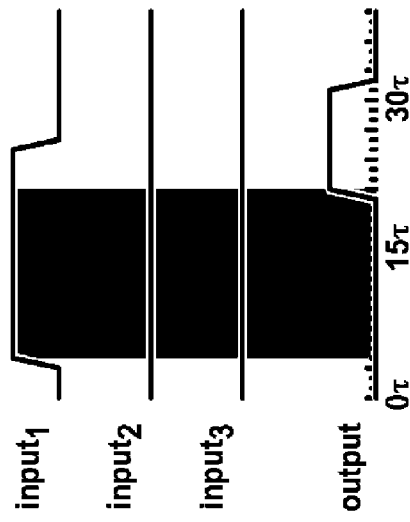
FIG. 15B is an illustration showing a Multi-input Den Induction period.

For the Simple Syn, where there is only one input, if the ratio of time spent ON to OFF is sufficient in the signal input to the Syn, an ON output will be generated after a short period (Induction period of Syn). In the Multi-input Syn, simultaneous inputs (from different sensors, from instance) will shorten the Syn Induction period (gray bars, FIG. 14).

Multiple Den Inputs

For the Simple Den, where there is only one input, the Induction period is determined by experience. In the Multi-input Den, simultaneous inputs (from different Syns linked to different sensors, from instance) will shorten the experience-determined Den Induction period (gray bars, FIG. 15).

Interconnection Between Rons

Figure 16:
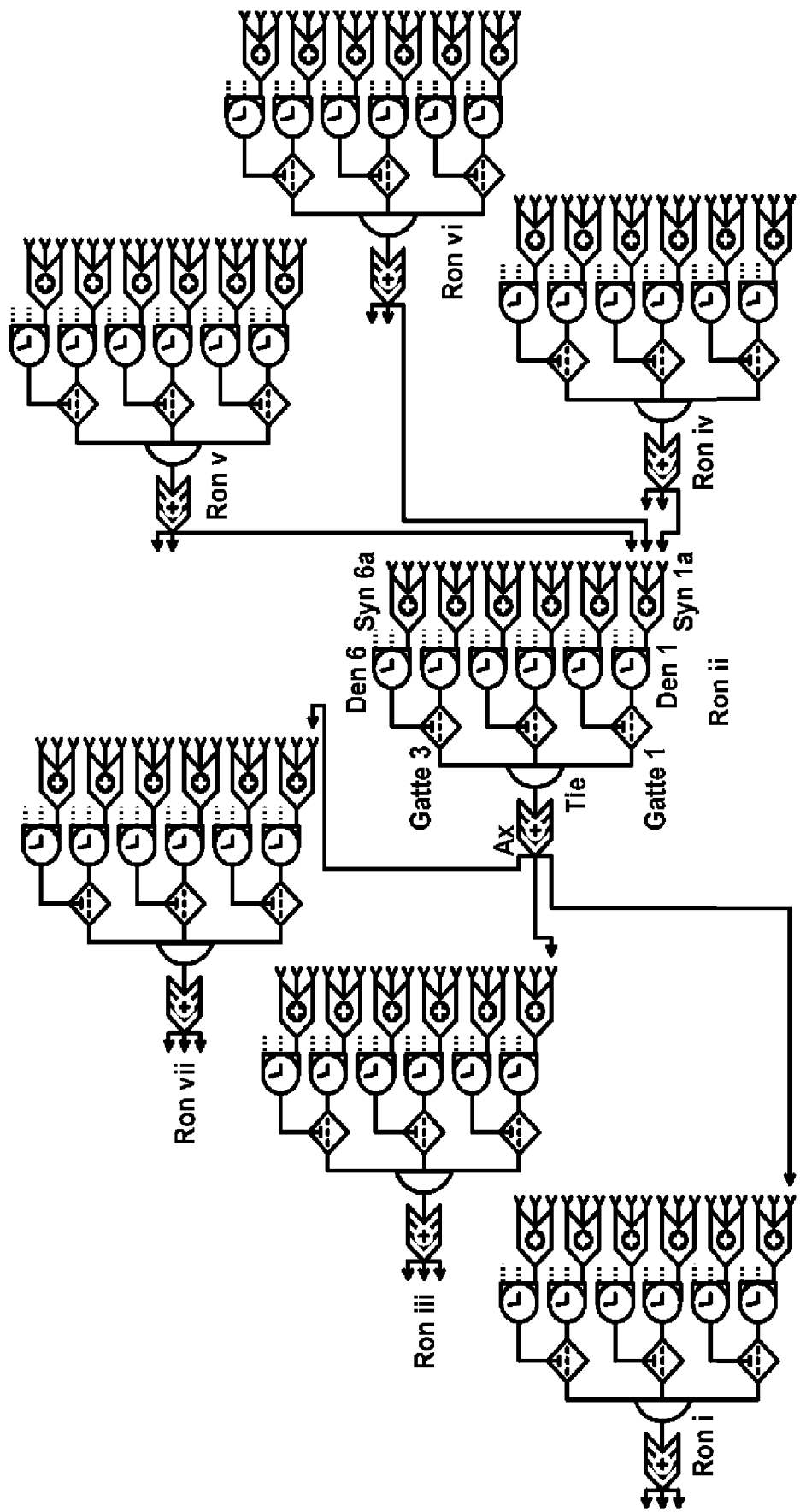
FIG. 16 is an illustration showing possible interconnections between Rons.

FIG. 16. shows Rons having all four types of subunits in their functional-type. Both types of Orr are used (Tie and Syn). Possible connections between these Rons are shown.

Causative Versus Incidental Dens, Internal Properties

Figure 17D:
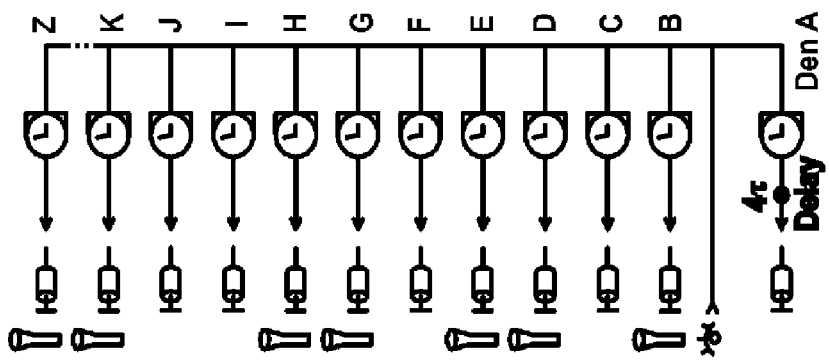
FIG. 17D is an illustration showing a Ron Animal Flashlight 26 pot./depot., RAF26pot, scheme.
Figure 17C:
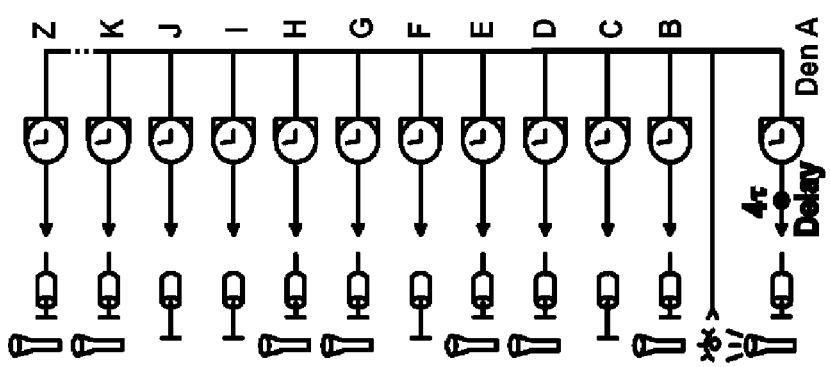
FIG. 17C is an illustration showing a Ron Animal Flashlight 26 pot./depot., RAF26pot, scheme.
Figure 17B:
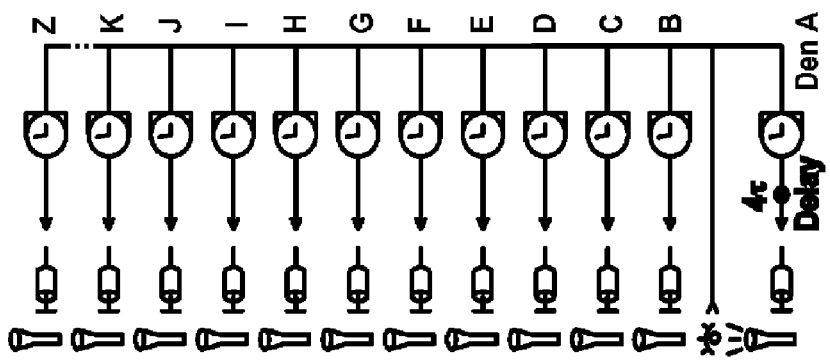
FIG. 17B is an illustration showing a Ron Animal Flashlight 26 pot./depot., RAF26pot, scheme.
Figure 17A:
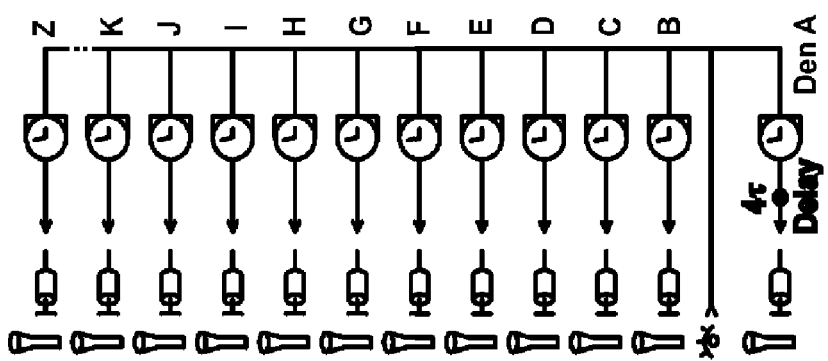
FIG. 17A is an illustration showing a Ron Animal Flashlight 26 pot./depot., RAF26pot, scheme.
Figure 18:
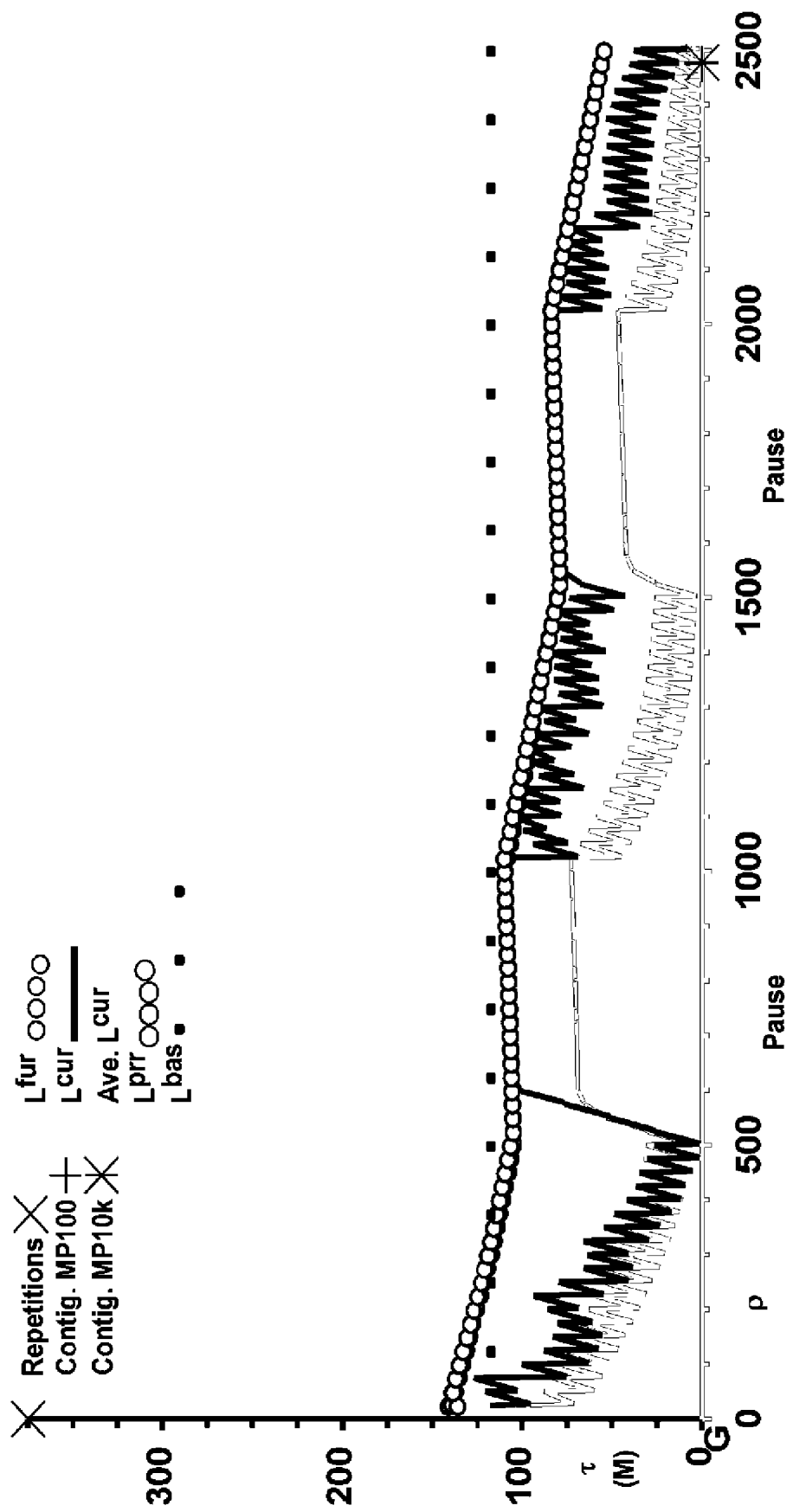
FIG. 18 is an illustration showing a Ron Animal Flashlight 26pot; Den A, pauses. (R=25ρ, RM=0.25, RA=2.5, $D_i$=4τ)
Figure 19:
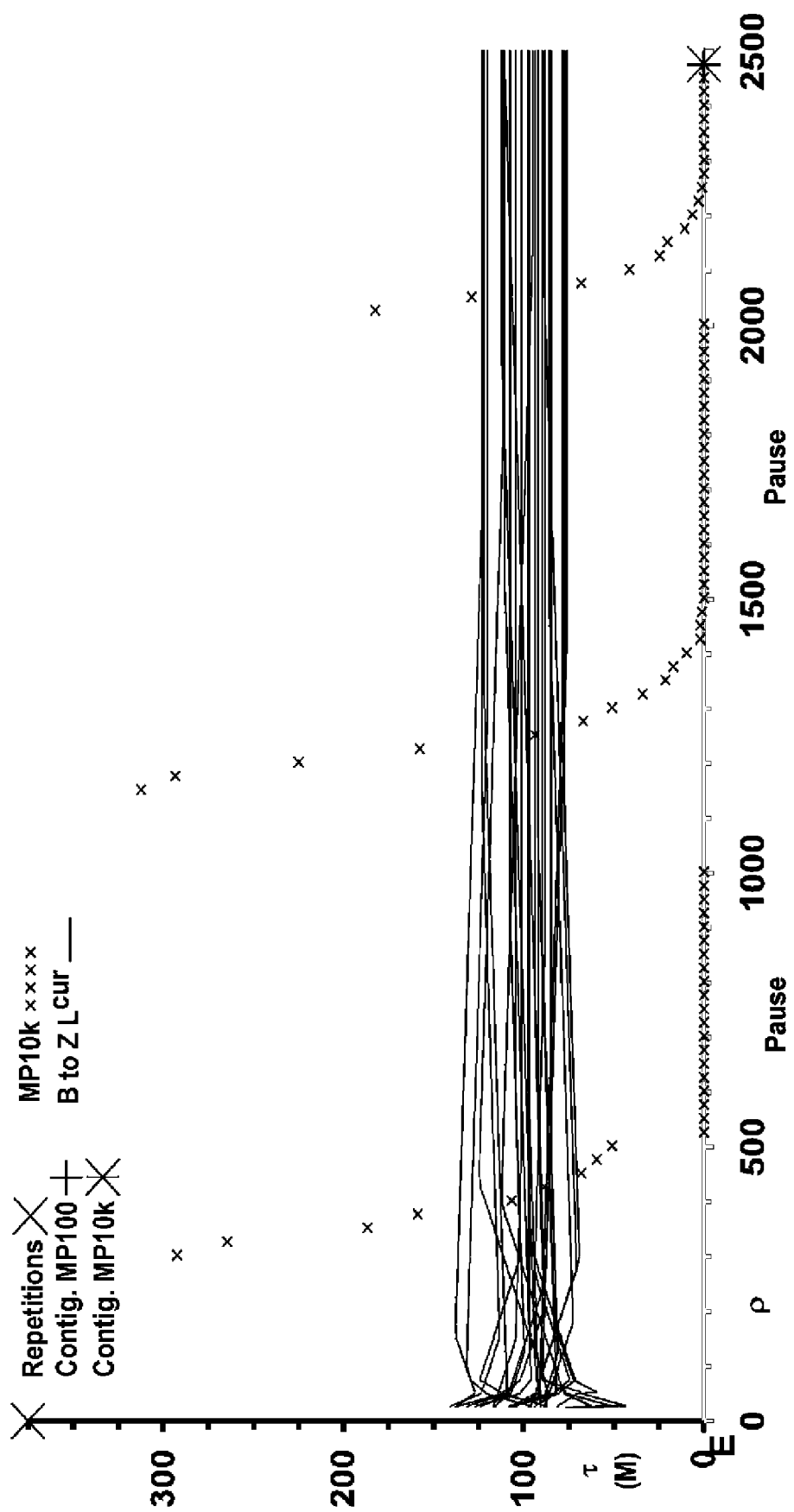
FIG. 19 is an illustration showing a Ron Animal Flashlight 26pot; Dens B-Z, pauses. (R=25ρ, RM=0.25, RA=2.5, $D_i$=4τ)

Using the Relllief equations (EQU. 10-32) in computer simulations, one Causative Den, Den A, is compared to 25 Incidental Dens, Dens B-Z, in the "Ron Animal Flashlight 26". See FIG. 17. This set-up is akin to that in FIG. 9 (Ron Animal Flashlight) regarding solenoids and flashlights. This animal is also akin to that in FIG. 8 (Ron Animal Volt): there are many Dens, each Den can energize an effector and one sensor provides an input for all Dens. In the Ron Animal Flashlight 26, a timer delays by 4τ the ON output of Den A from arriving at the input of the corresponding solenoid. The OFF output of Den A is not delayed. Since the Den A solenoid immediately pushes the flashlight away when it receives an activating input and this immediately causes the Den A sensor to present a non-activating input to all Dens, the Driving period of Den A is 4τ in total. This Driving period precedes the Adjustment period under consideration, therefore $D_i=4\tau$. As the Driving threshold, $D_t=10\tau$ (LIST 1), Den A will be potentiated. In the Ron Animal Flashlight 26, initially there are 26 OFF flashlights placed in front of the solenoids (FIG. 17A). The Den A flashlight is turned ON (FIG. 17B). In the first ON-flashlight challenge, where the animal is still naive, due to the randomized aspects of Rellief and the initial randomization of Den internal properties, some Incidental Dens may generate activating inputs before the Causative Den A does. These Incidental Den outputs remain ON and their solenoids remaining energized (FIG. 17C) until flashlight A is pushed away because the Den A output becomes activated and the 4τ delay passes allowing the corresponding solenoid to be energized (FIG. 17D). See FIG. 18. This cycle of events is repeated after a period of 25ρ (this is the time it takes $L^{cur}$ to increase by 25τ if $L^{cur}$ is continuously<$L^{prr}$[note $L^{cur}$ during pauses]). There are 20 flashlight challenge cycles followed by a period of 500ρ, another 20 cycles, a period of 500ρ and finally 20 cycles. Initially the internal properties of the Dens are randomized (EQU. 33-38). This training regime is repeated 375 times. See FIG. 18 and 19. A large "X" on the y-axis at 375 represents the number of repetitions. The average $L^{cur}$ values for Den A over these repetitions (heavy gray solid line) are presented in FIG. 18. The values for $L^{cur}$ (heavy black solid line), $L^{prr}$ (white-filled circles), $L^{fur}$ (gray-filled circles [here mostly hidden behind $L^{prr}$]) and $L^{bas}$ (horizontal row of black-filled squares) for Den A in a single randomly generated run of the regime are presented in FIG. 18. For each of the Dens B-Z, $L^{cur}$ (thin black lines) in a randomly generated run of the regime are presented in FIG. 19. MP10k (small "x"), Misfired Per 10,000, is the extrapolated average number of Incidental Dens that fire (cause an OFF flashlight to be pushed away) for every 10,000 Incidental Dens (as if there were 10,000 Incidental Dens instead of 25 in this set-up). This is calculated for each ON flashlight challenge (also shown as "0" during pause). Shown in both FIGS. 18 and 19 are Contig. MP100 and Contig. MP10k. Contig. MP100 (large cross), Contiguously Misfired Per 100, is the number of Incidental Dens out of 100 that push away their corresponding OFF flashlight in each of the last 20 challenges of the regime. This is extrapolated as if there were 100 Incidental Dens instead of 25 in this set-up). Contig. MP10k (large "X" with added vertical bar), Contiguously Misfired Per 10,000, is the number of Incidental Dens out of 10,000 that push away their corresponding OFF flashlight in each of the last 20 challenges of the regime. For Den A, during challenges, specifically during the Adjustment period, $L^{cur}$ is abruptly reduced. This is due to Causative Functioning, as described above. During this time $L^{prr}$ and $L^{fur}$ are reduced but more slowly. During the pauses, $L^{cur}$ relatively quickly moves toward $L^{prr}$ while $L^{prr}$ and $L^{fur}$ move toward $L^{bas}$ more slowly. As the regime progresses MP10k decreases (FIG. 19). At the start of the third group of challenges MP10k<200. This is equivalent to <2% misfiring of Incidental Dens. Half way through this last group of challenges MP10k=0. Therefore Contig. MP100 and Contig. MP10k also=0. Thus at the end of this training regime, when challenged, only the Causative Den produces an activating output. Because there is a low incidence of misfiring of Incidental Dens, the randomly selected simulation in FIG. 19 shows only a few abrupt changes in the $L^{cur}$ values at the beginning of the regime. Otherwise, the $L^{cur}$ values change slowly as the originally randomized internal properties undergo Coalescence.

Potentiation Versus Depotentiation, Internal Properties

Figure 20:
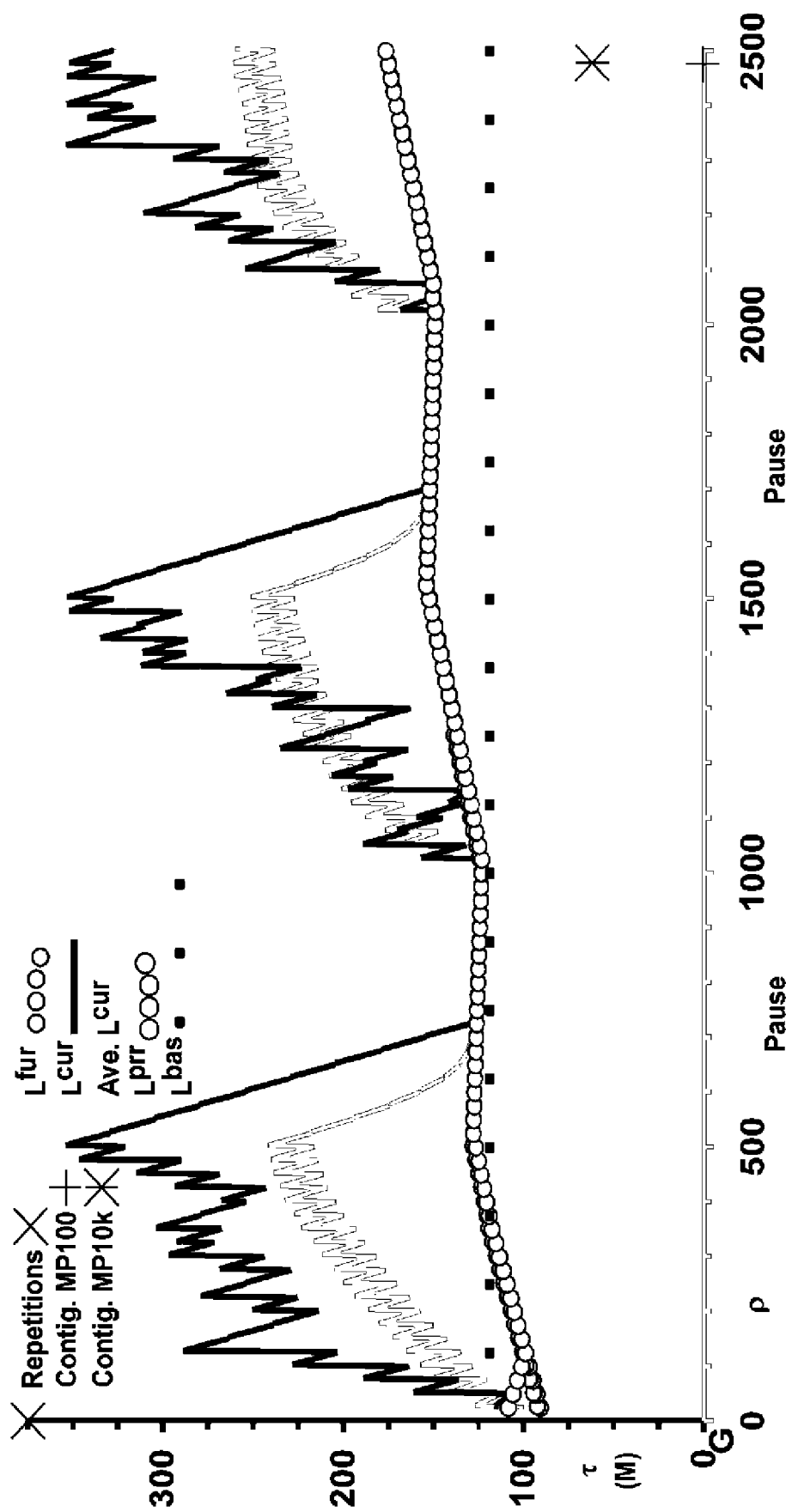
FIG. 20 is an illustration showing a Ron Animal Flashlight 26pot; Den A, pauses. (R=25ρ, RM=0.25, RA=2.5, $D_i$=16τ)
Figure 21:
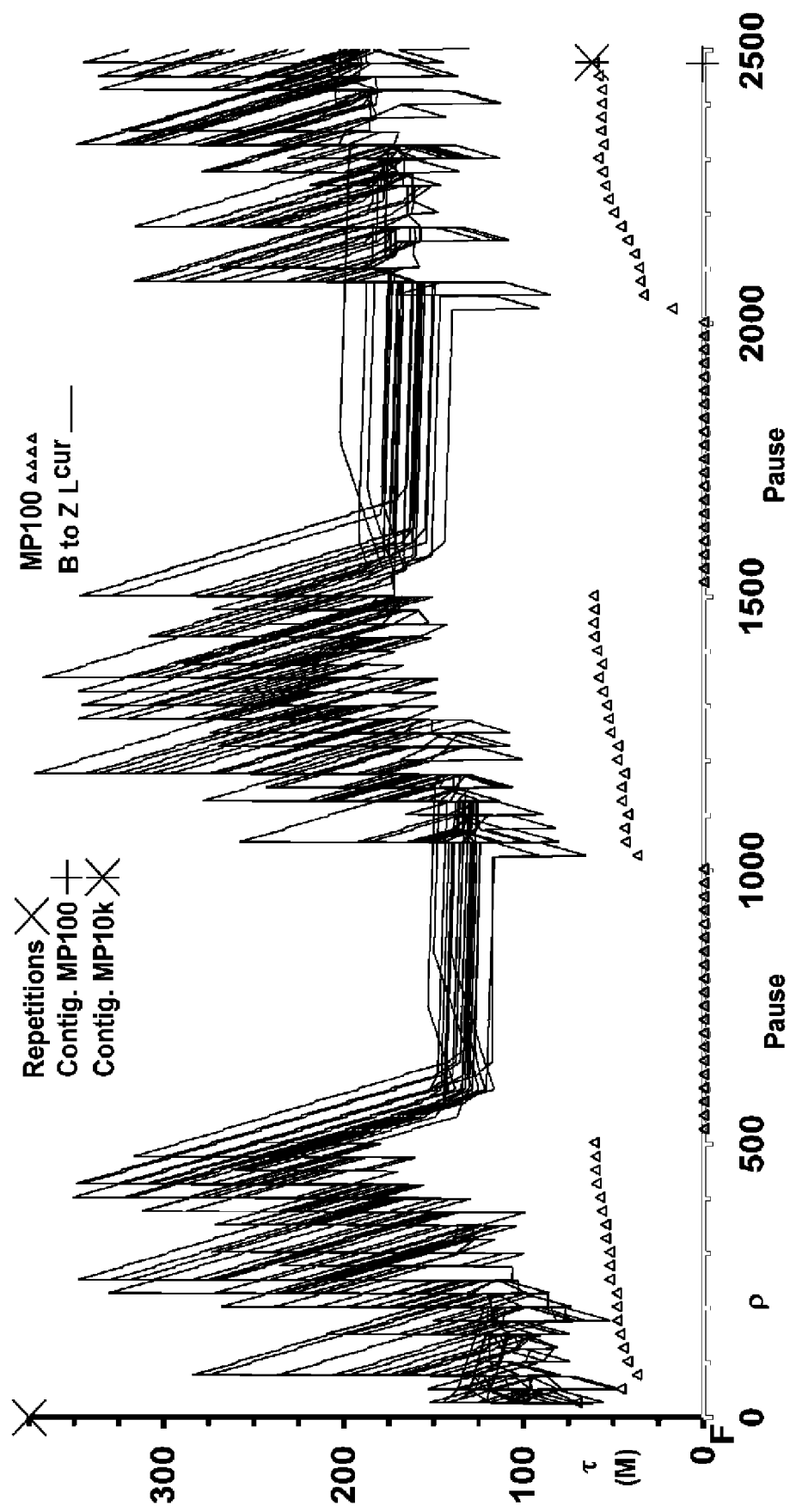
FIG. 21 is an illustration showing a Ron Animal Flashlight 26pot; Dens B-Z, pauses. (R=25ρ, RM=0.25, RA=2.5, $D_i$=4τ)
Figure 22:
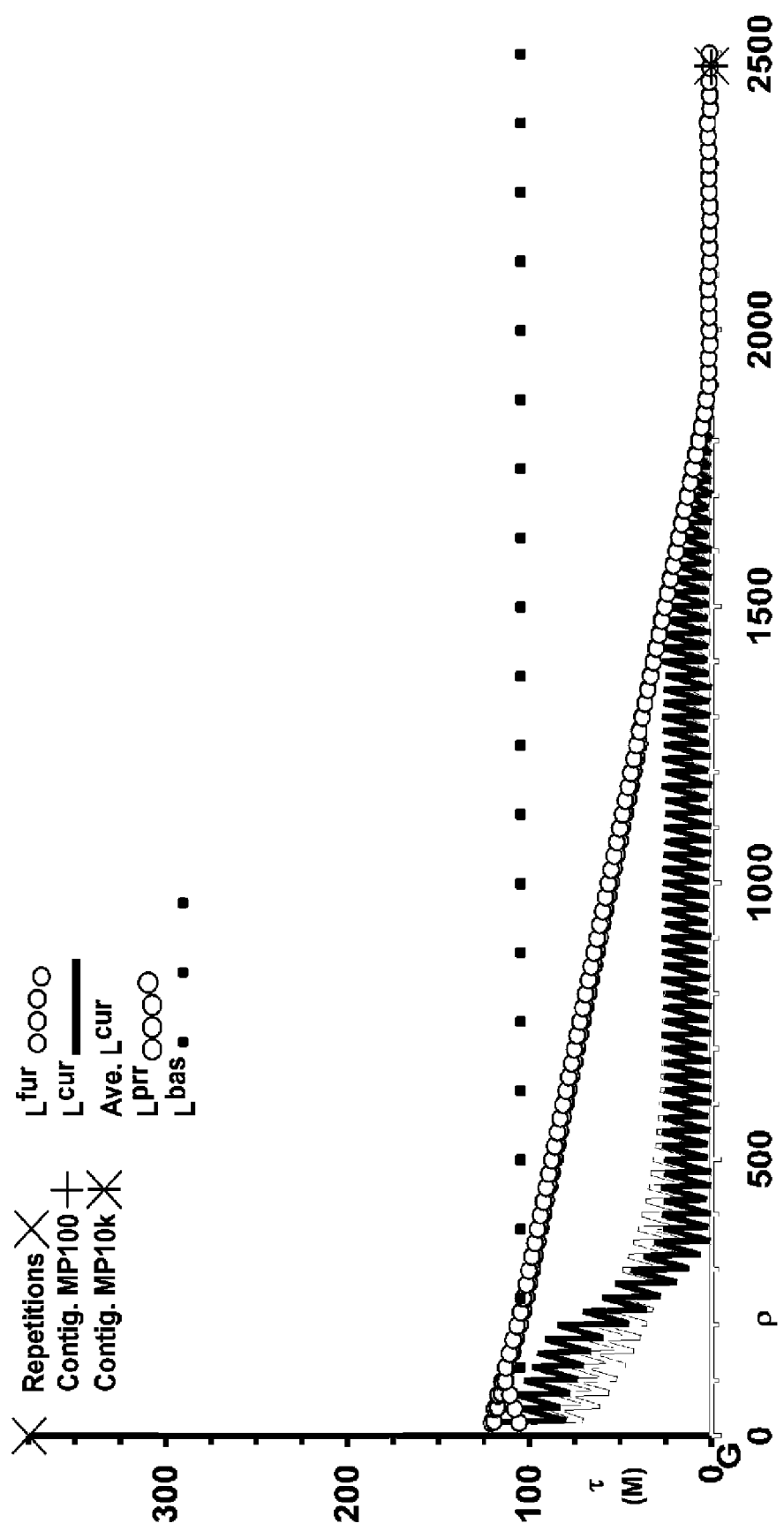
FIG. 22 is an illustration showing a Ron Animal Flashlight 26pot; Den A. (R=25ρ, RM=0.25, $D_i$=4τ)
Figure 23:
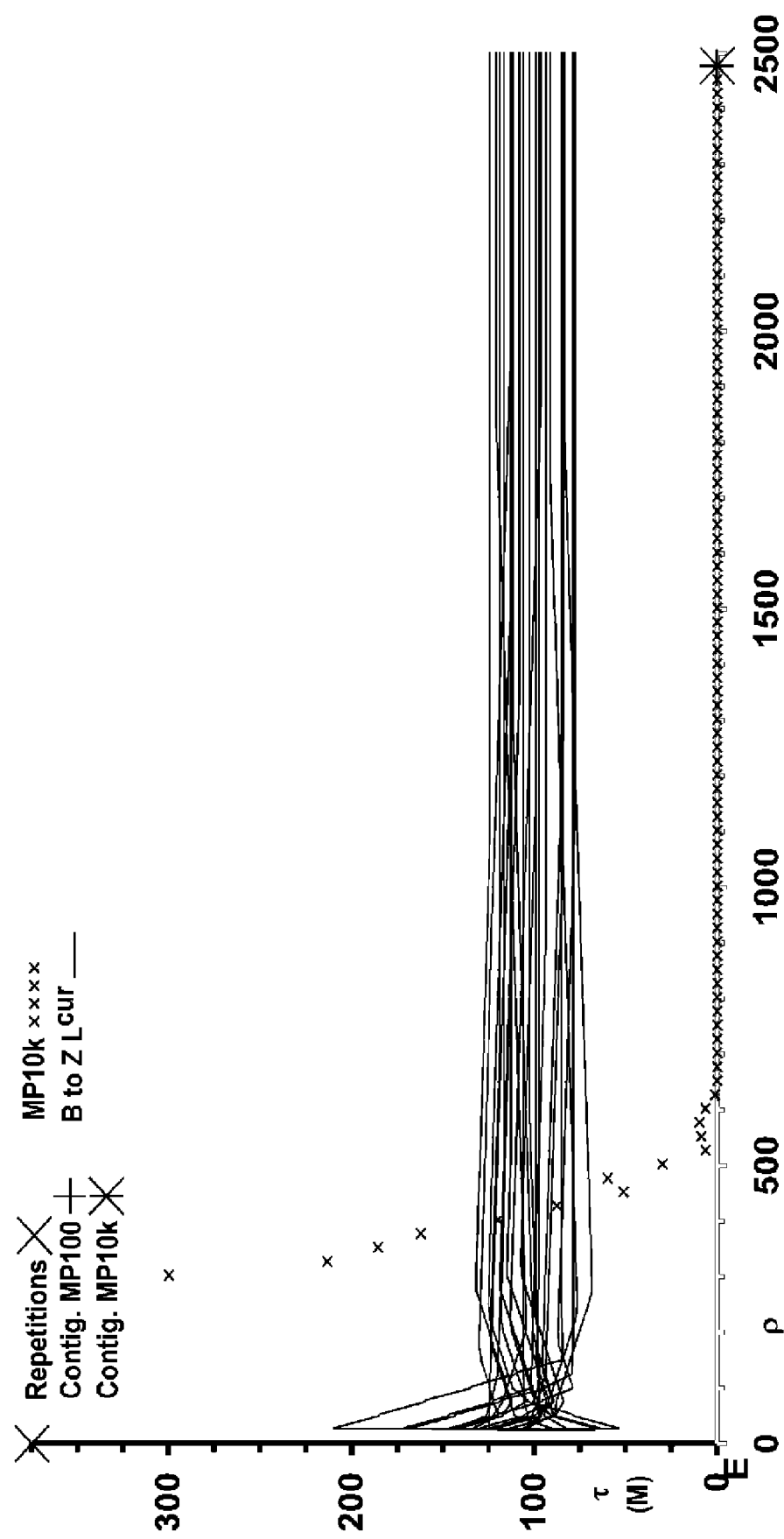
FIG. 23 is an illustration showing a Ron Animal Flashlight 26pot; Den B-Z. (R=25ρ, RM=0.25, RA=2.5, $D_i$=4τ)

The Ron Animal Flashlight 26 simulation immediately above is repeated except that the Den A timer delay is set to 16τ. Therefore $D_i=16\tau$. As the Driving threshold, $D_t=10\tau$ (LIST 1), Den A will be depotentiated. See FIGS. 20 and 21. About 50% of Incidental Dens misfire for each challenge throughout (MP100≈50), excluding pauses. 0.5% of Incidental Dens fire contiguous during last 20 challenges (Contig. MP10k≈50). If the misfired ratio (≈1/2) is randomly generated then the contiguously misfired ratio (over last 20 challenges) should=$(1/2)^{20}\approx 1\times 10^{-6}$. Contig. MP10k should $1\times 10^{-2}=0.01$. In comparing repeated potentiation and repeated depotentiation, where the absolute difference between $D_i$ and $D^t=6$, for the potentiation scenario Incidental Dens are relatively unaffected regarding internal properties while the corresponding Causative Den internal properties are reduced almost to $L^{min}$. Consequently, the Causative Den reacts to the flashlight but the Incidental Dens do not in the above Ron Animal Flashlight 26 scenario of potentiation. In the scenario of depotentiation, the internal properties of the Causative Den and the Incidental Dens are increased. Consequently, both the Causative Den and the Incidental Dens become less reactive. In depotentiation, the Incidental Dens misfire contiguously at a rate that is much higher than can be attributed to randomness.

Lock-Up, R, RM and RA

Figure 29:
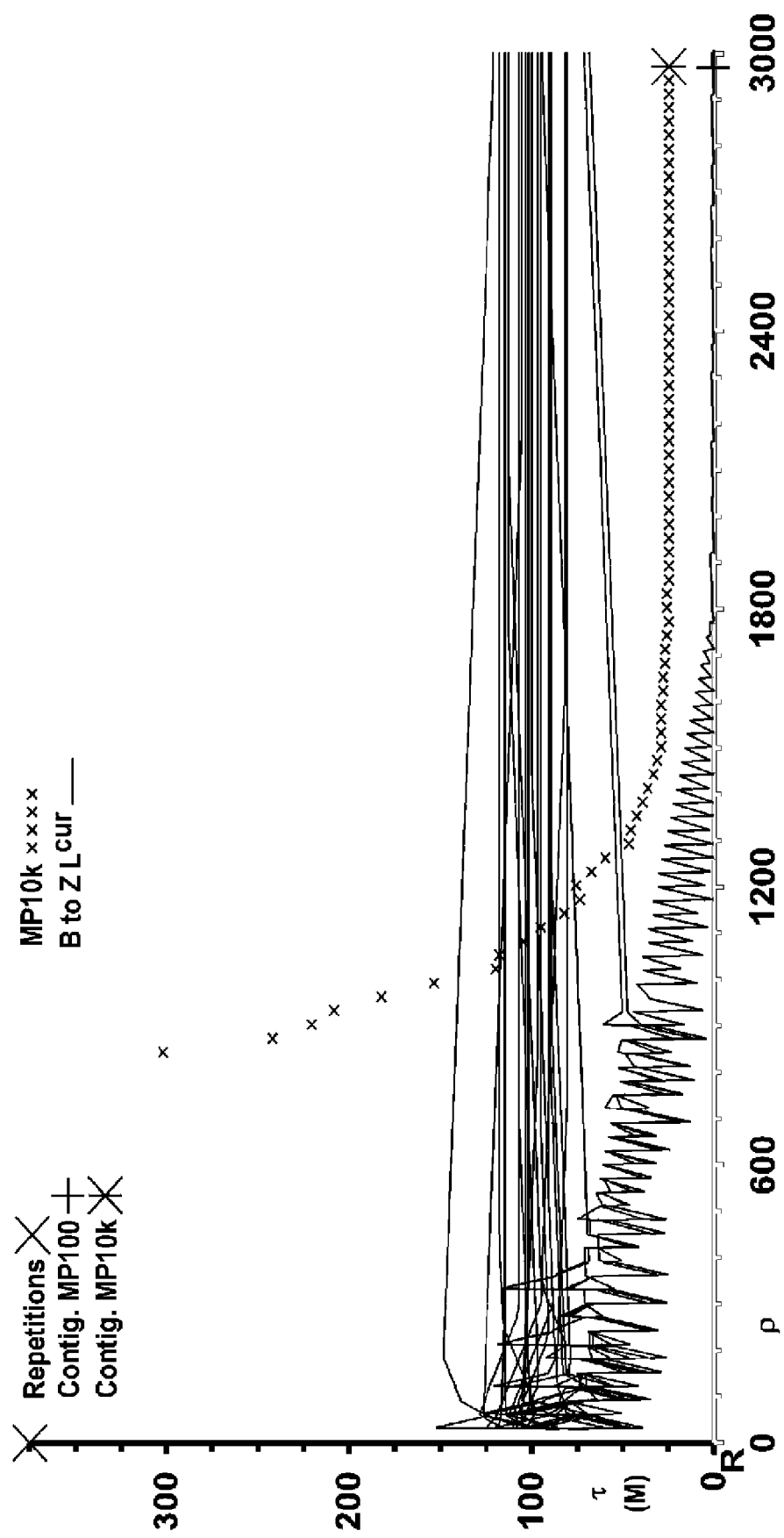
FIG. 29 is an illustration showing a Ron Animal Flashlight 26pot; Dens B-Z. (R=30ρ, RM=0.25, RA=2.5, $D_i$=4τ)
Figure 30:
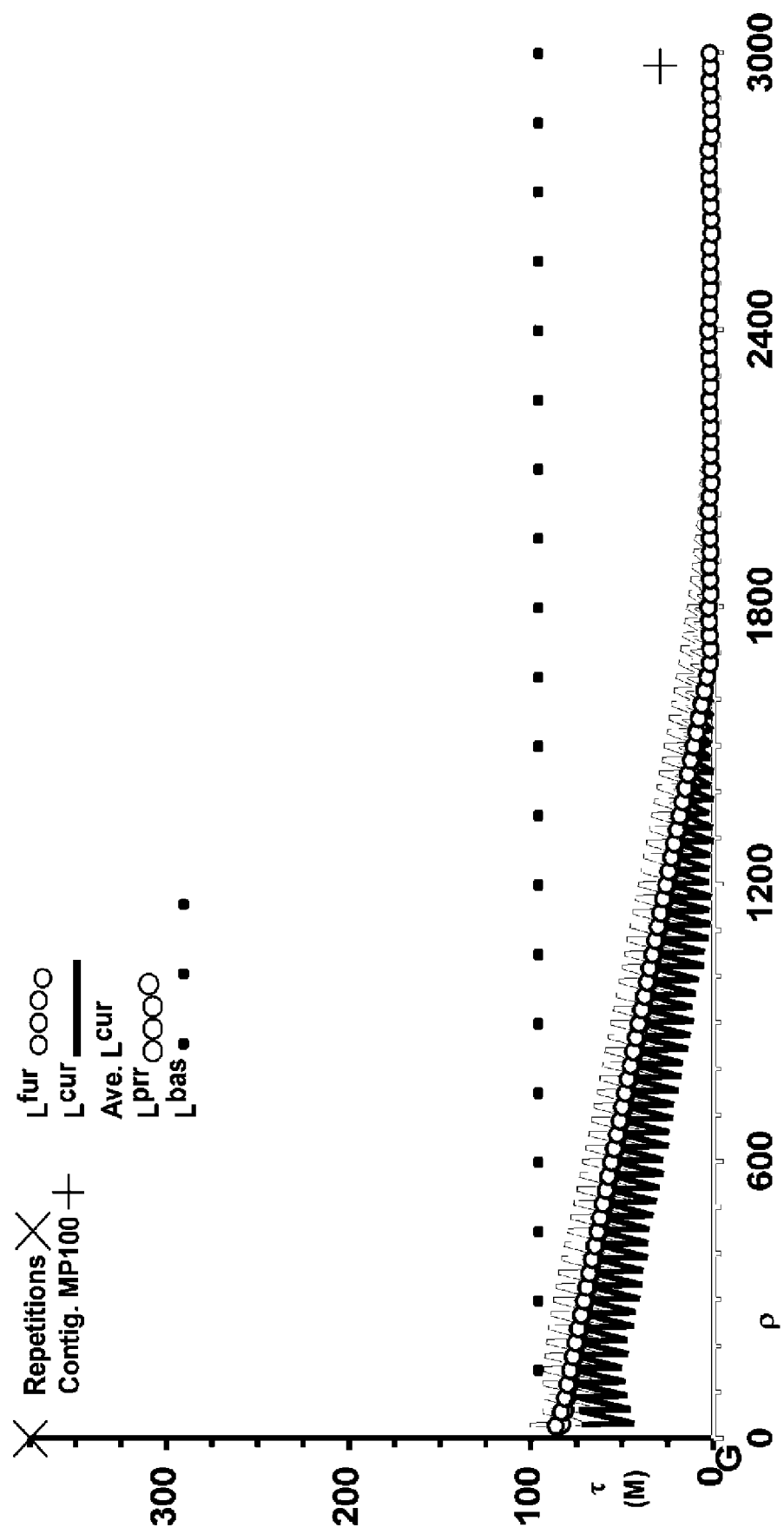
FIG. 30 is an illustration showing a Ron Animal Flashlight F26pot; Den A. (R=30ρ, RM=0, RA=2.5, $D_i$=4τ)
Figure 31:
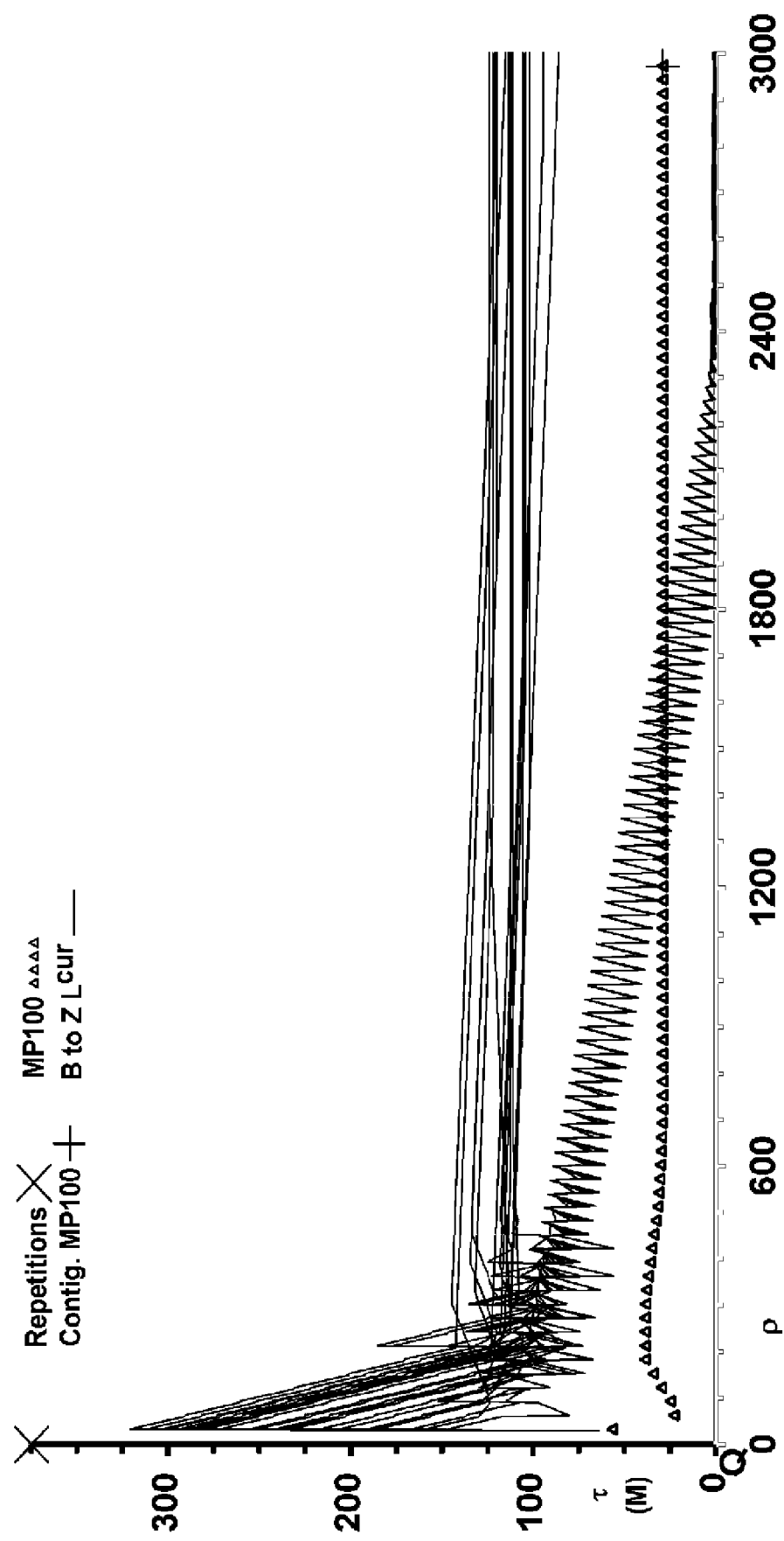
FIG. 31 is an illustration showing a Ron Animal Flashlight pot; Dens B-Z. (R=30ρ, RM=0, RA=2.5, $D_i$=4τ)
Figure 32D:
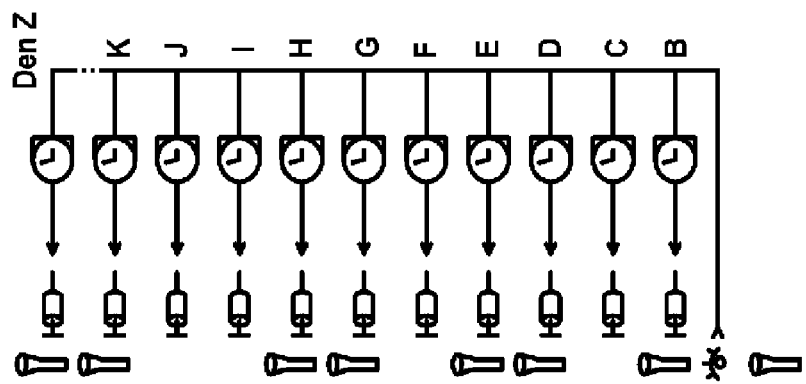
FIG. 32D is an illustration showing a Ron Animal Flashlight 26 used in Windowing scenarios.
Figure 32C:
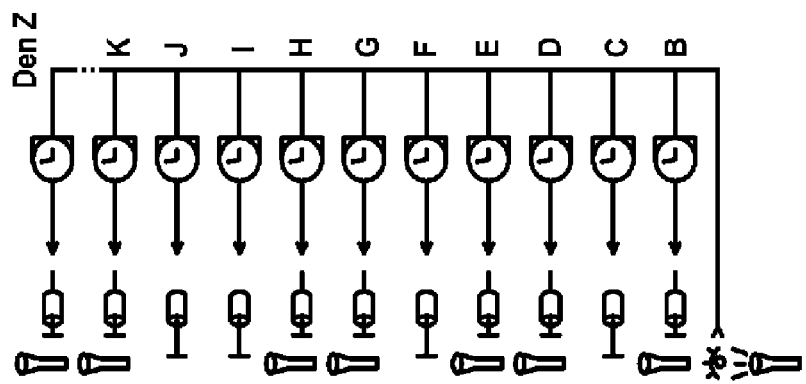
FIG. 32C is an illustration showing a Ron Animal Flashlight 26 used in Windowing scenarios.
Figure 32B:
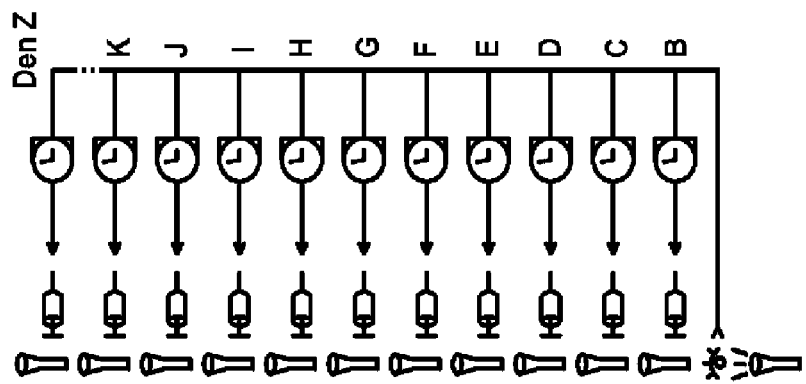
FIG. 32B is an illustration showing a Ron Animal Flashlight 26 used in Windowing scenarios.
Figure 32A:
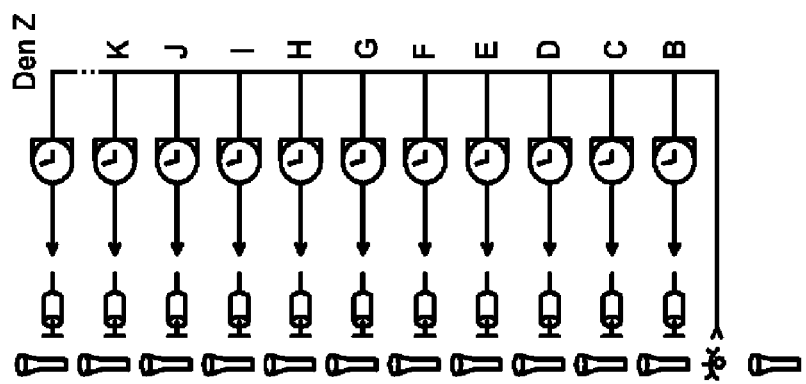
FIG. 32A is an illustration showing a Ron Animal Flashlight 26 used in Windowing scenarios.

Lock-up is here defined as the condition of an Incidental Den contiguously firing in response to challenges to the Causative Den. Contiguous here means 20 challenges in a row. Lock-up may be related to R, the time (rho periods) between challenges, RM, the Randomized Multiplier of Rellief, and/or RA, the Randomized Addend of Rellief. The term "figure pair" used here, is the representation of a computer simulation where the Dens internal properties are divided between two graphs for easier examination. This was done in FIGS. 18 and 19 for one scenario. Figure pair 22/23 represents the same Ron Animal Flashlight 26 continuous potentiation scenario as figure pair 18/19 except there are no pauses between challenges. R=25ρ, RM=0.25, RA=2.5 and $D_i=4\tau$ in both figure pairs. Figure pairs 22/23 and 24/25 have the same RM, RA, $D_i$ values, each representing 100 challenges and demonstrating potentiation but R=25ρ in 22/23 and R=1ρ in 24/25. When R=25ρ then MP10k=0. When R=1ρ then MP10k>30 (0.3% individual misfirings) throughout. 0.3% of Incidental Dens firing contiguously during last 20 challenges (Contig. MP10k≈30). If the misfired ratio (≈0.4/100) were randomly generated in individual challenges then the contiguously misfired ratio (over last 20 challenges) should=$(0.4/100)^{20}\approx 1\times 10^{-48}$. Contig. MP10k should≈$1\times 10^{-46}$. Therefore, due to this discrepancy, contiguous misfires were much higher than expected for randomness. When there is less than 100% discrete misfirings and the percentage of discrete misfirings is the same as the percentage of contiguous misfirings then all the discrete misfirings are part of contiguous strings of misfiring and there are no non-contiguous firings. All of the contiguous misfiring that occurred are like that shown in FIG. 25 where the $L^{cur}$ value of one of the Incidental Dens is misfiring synchronously with the Causative Den. The $L^{cur}$ of this Incidental Den quickly approaches $L^{min}$, as does the Causative Den. This is defined as Lock-up. (FIG. 25 does not represent a randomly generated simulation; simulations were randomly generated until one that demonstrated Lock-up was produced.) When challenges occur more closely (R is smaller), then the incidence of Lock-up may increase. Figure pairs 24/25 and 26/27 demonstrate potentiation having the same R, RM, $D_i$ values but RA=2.5 in 24/25 and RA=25 in 26/27. Increasing RA decreases misfirings and Lock-up. Figure pairs 28/29 and 30/31 demonstrate potentiation having the same R, RA, $D_i$ values but RM=2.5 in 28/29 and RM=0 in 30/31. Decreasing RM may increase misfirings and Lock-up. Hence, randomization of Relllief improves fidelity of Den functioning (minimizes misfiring of Incidental Dens). (FIGS. 29 and 31 do not represent randomly generated simulations; simulations were randomly generated until they demonstrated Lock-up in several Incidental Dens at once.)

Windowing

Figure 33:
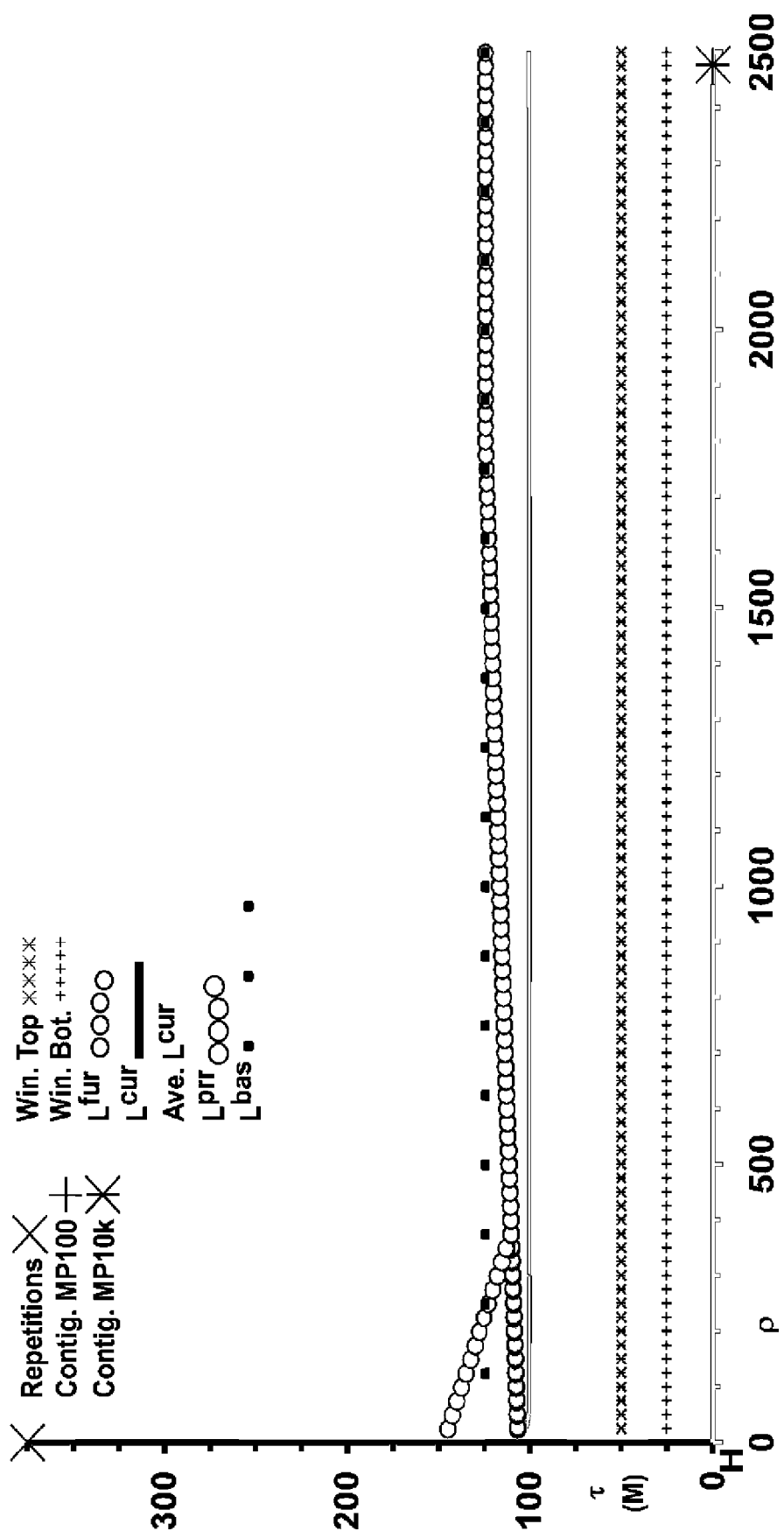
FIG. 33 is an illustration showing Win. 25-50τ. (R=25, RM=0.25, RA=2.5, delay=4τ)
Figure 34:
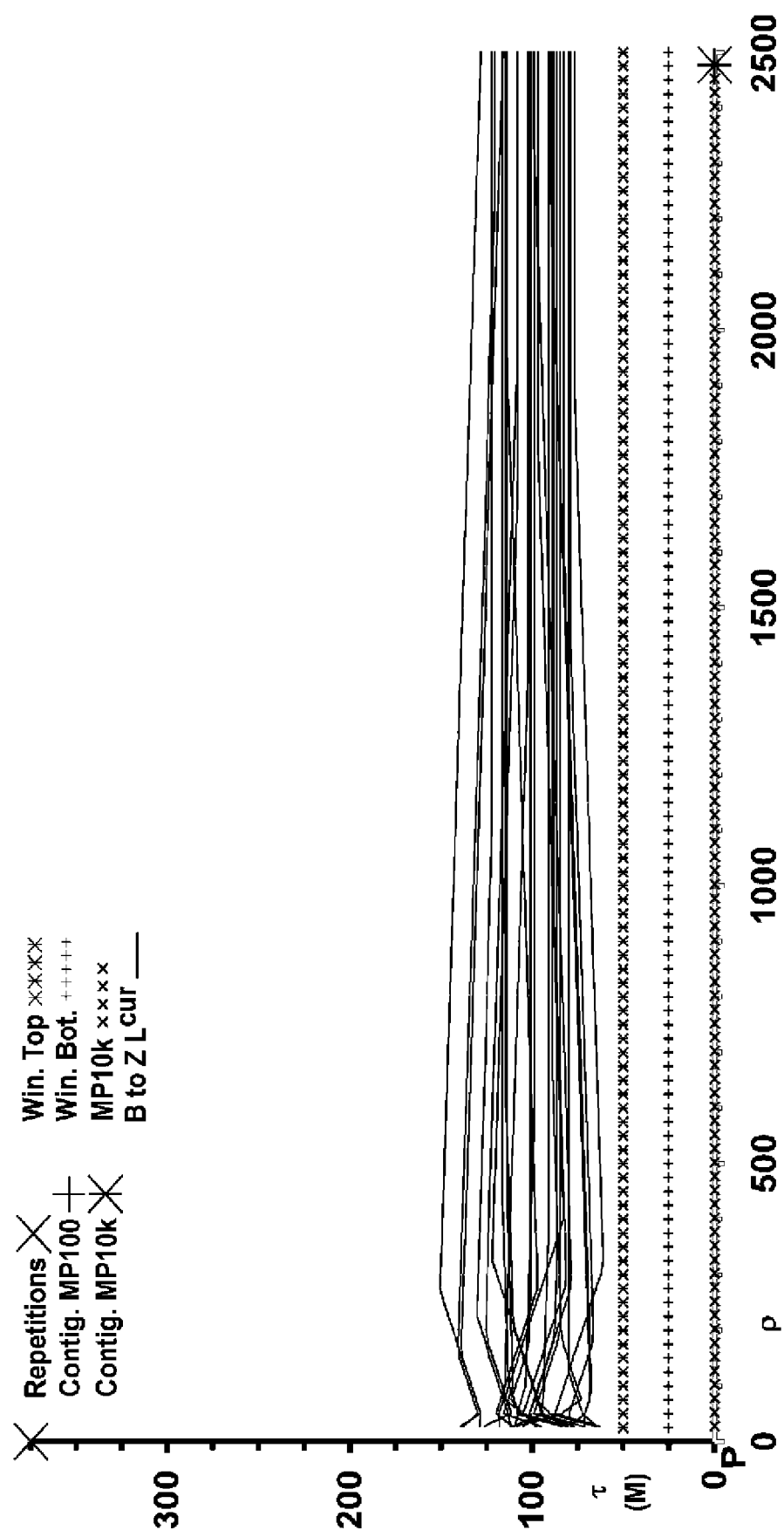
FIG. 34 is an illustration showing Win. 25-50τ. (R=25ρ, RM=0.25, RA=2.5, delay=4τ)
Figure 35:
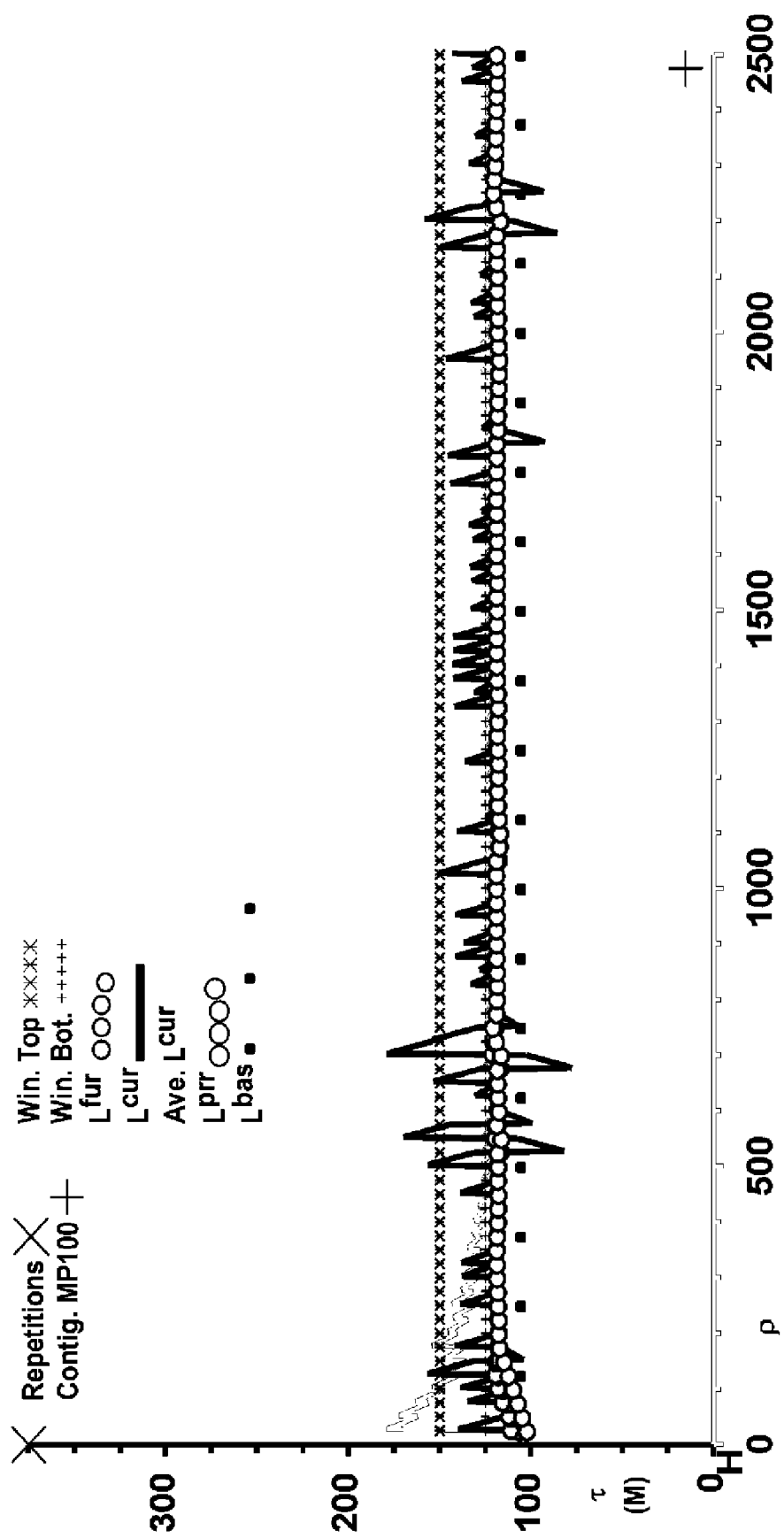
FIG. 35 is an illustration showing Win. 125-150τ. (R=25ρ, RM=0.25, RA=2.5, delay=4τ)
Figure 36:
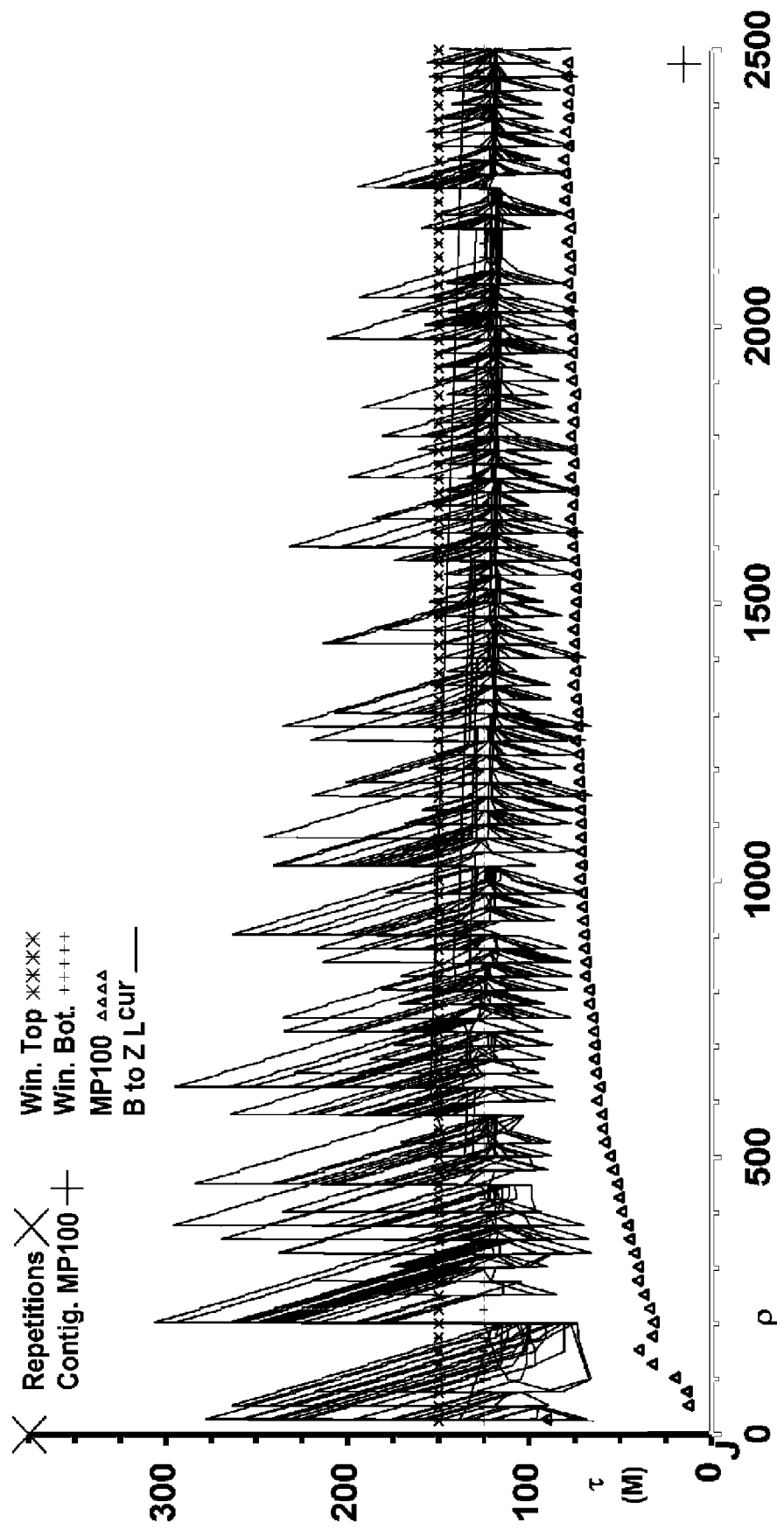
FIG. 36 is an illustration showing Win. 125-150τ. (R=25ρ, RM=0.25, RA=2.5, delay=4τ)
Figure 37:
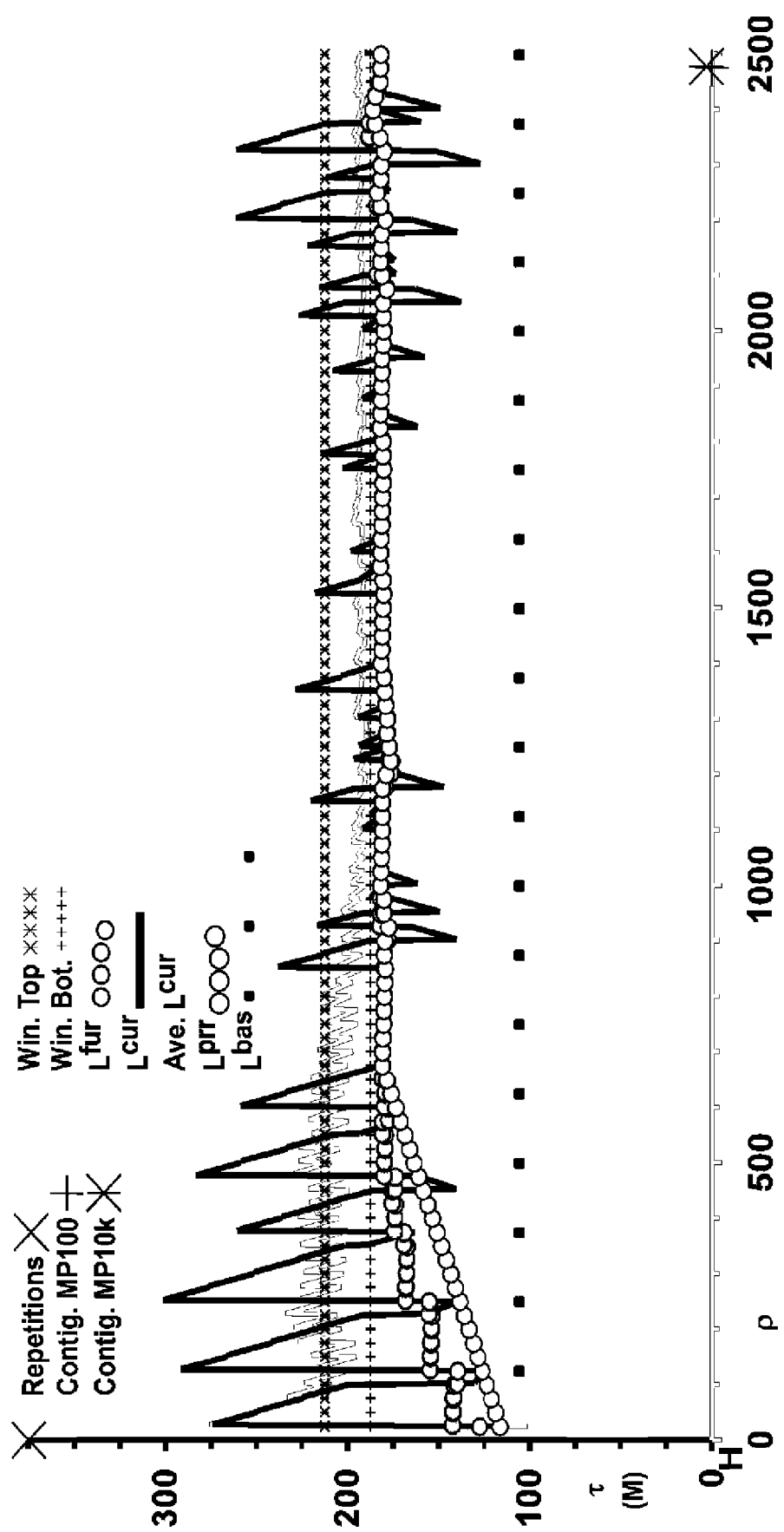
FIG. 37 is an illustration showing Win. 187.5-212.5τ. (R=25ρ, RM=0.25, RA=2.5, delay=4τ)
Figure 38:
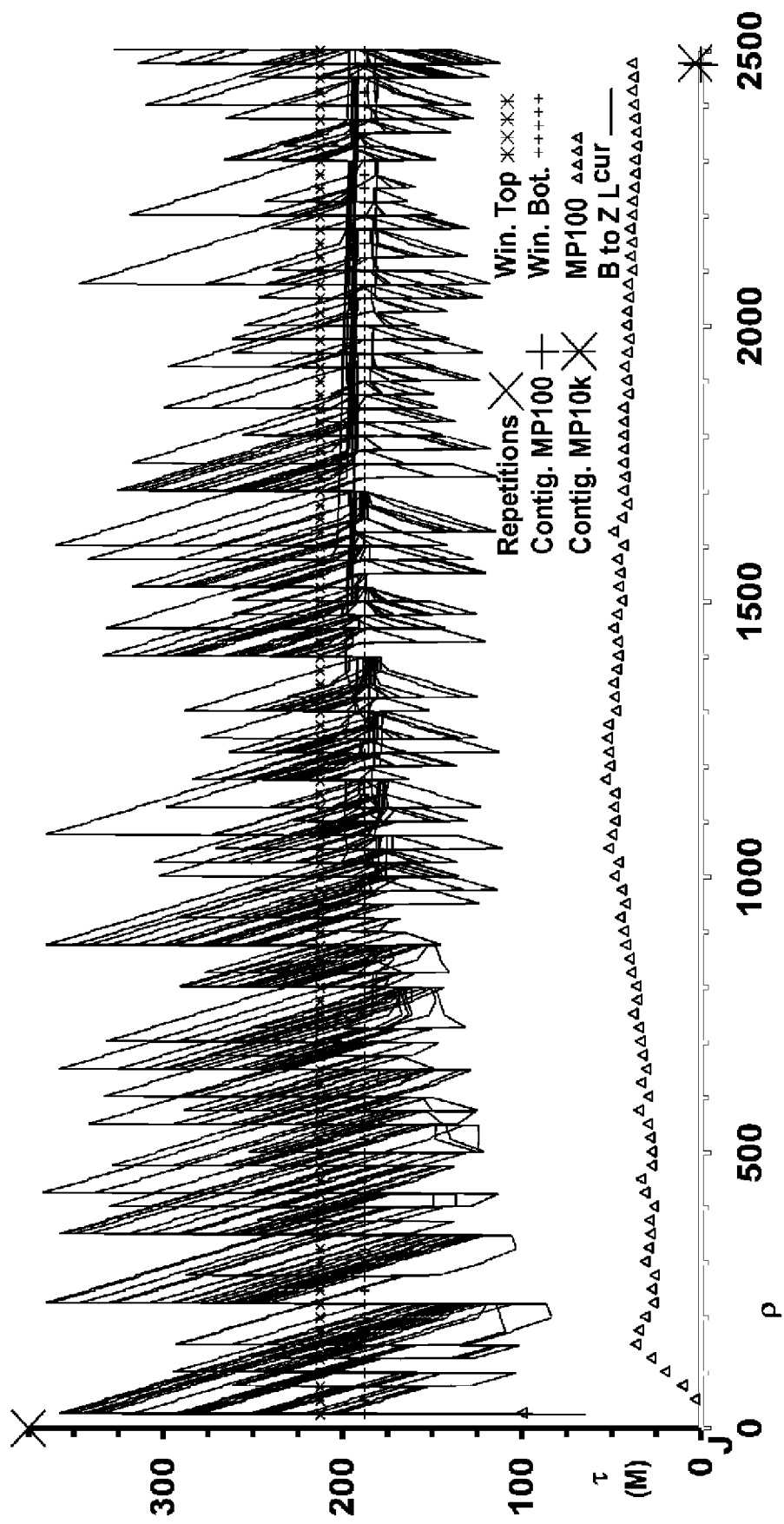
FIG. 38 is an Illustration showing Win. 187.5-212.5τ. (R=25ρ, RM=0.25, RA=2.5, delay=4τ)
Figure 39:
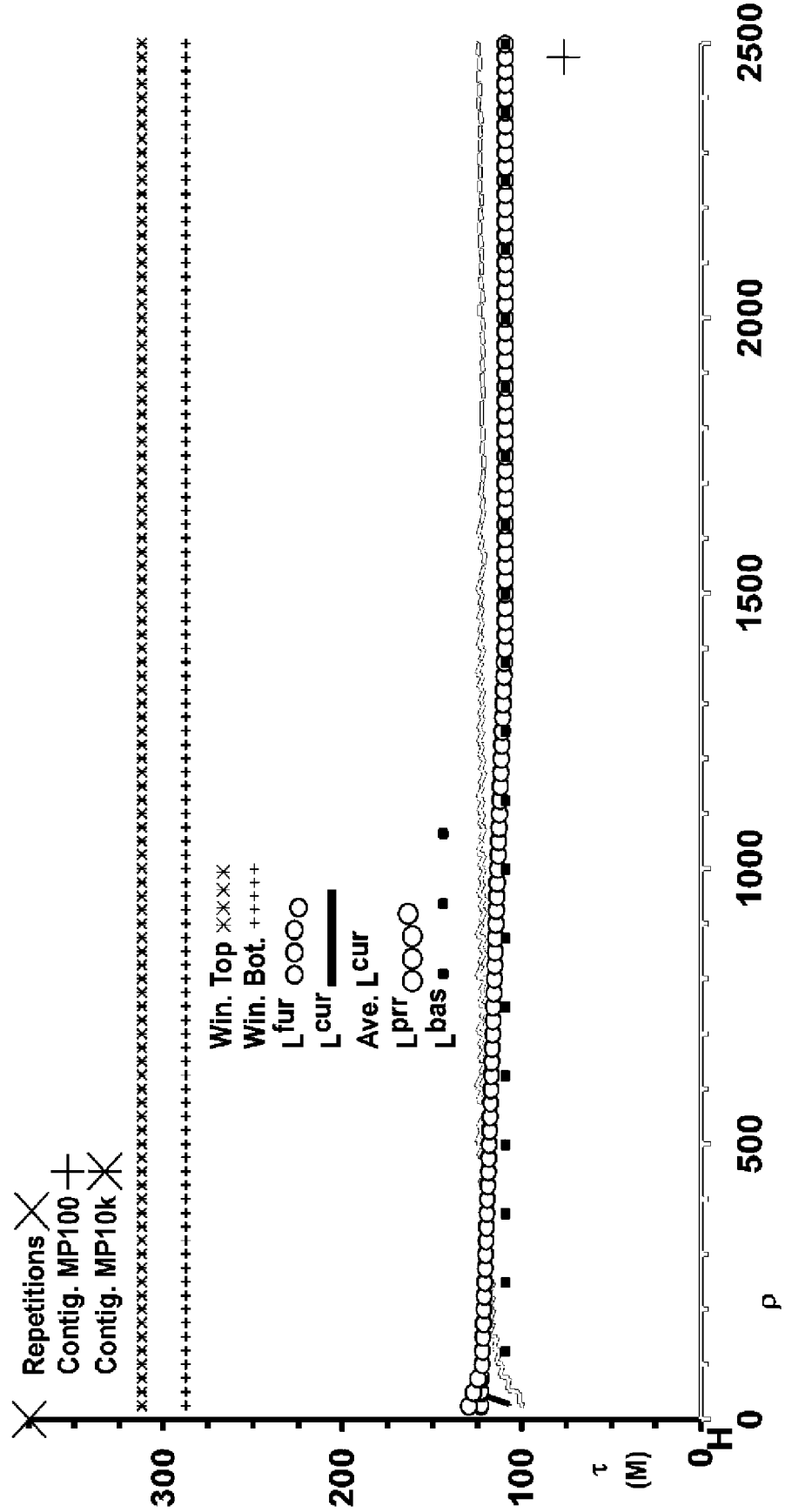
FIG. 39 is an illustration showing Win. 287.5-312.5τ. (R=25ρ, RM=0.25, RA=2.5, Delay=4τ)
Figure 40:
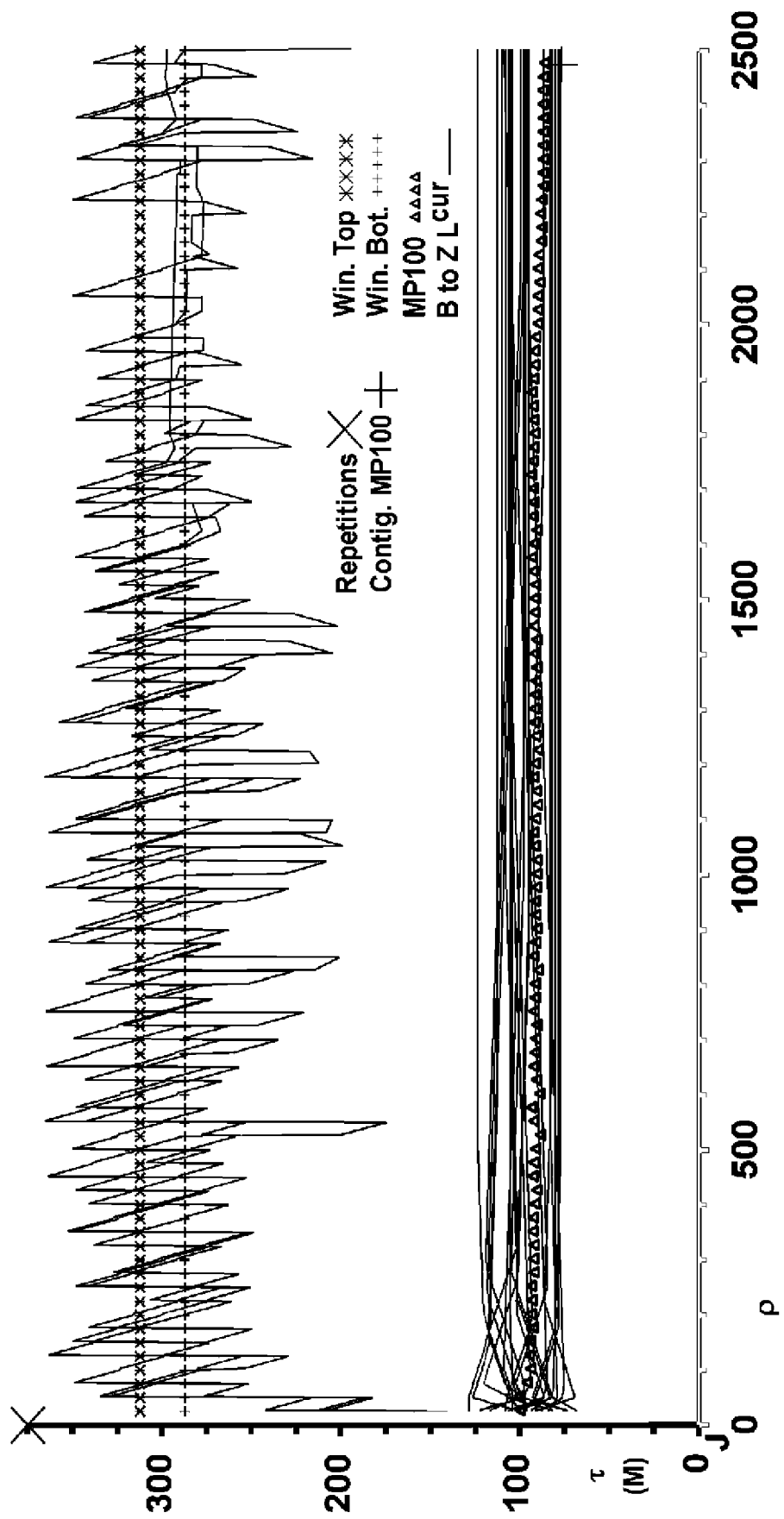
FIG. 40 is an illustration showing Win. 287.5-312.5τ. (R=25ρ, RM=0.25, RA=2.5, delay=4τ)
Figure 41:
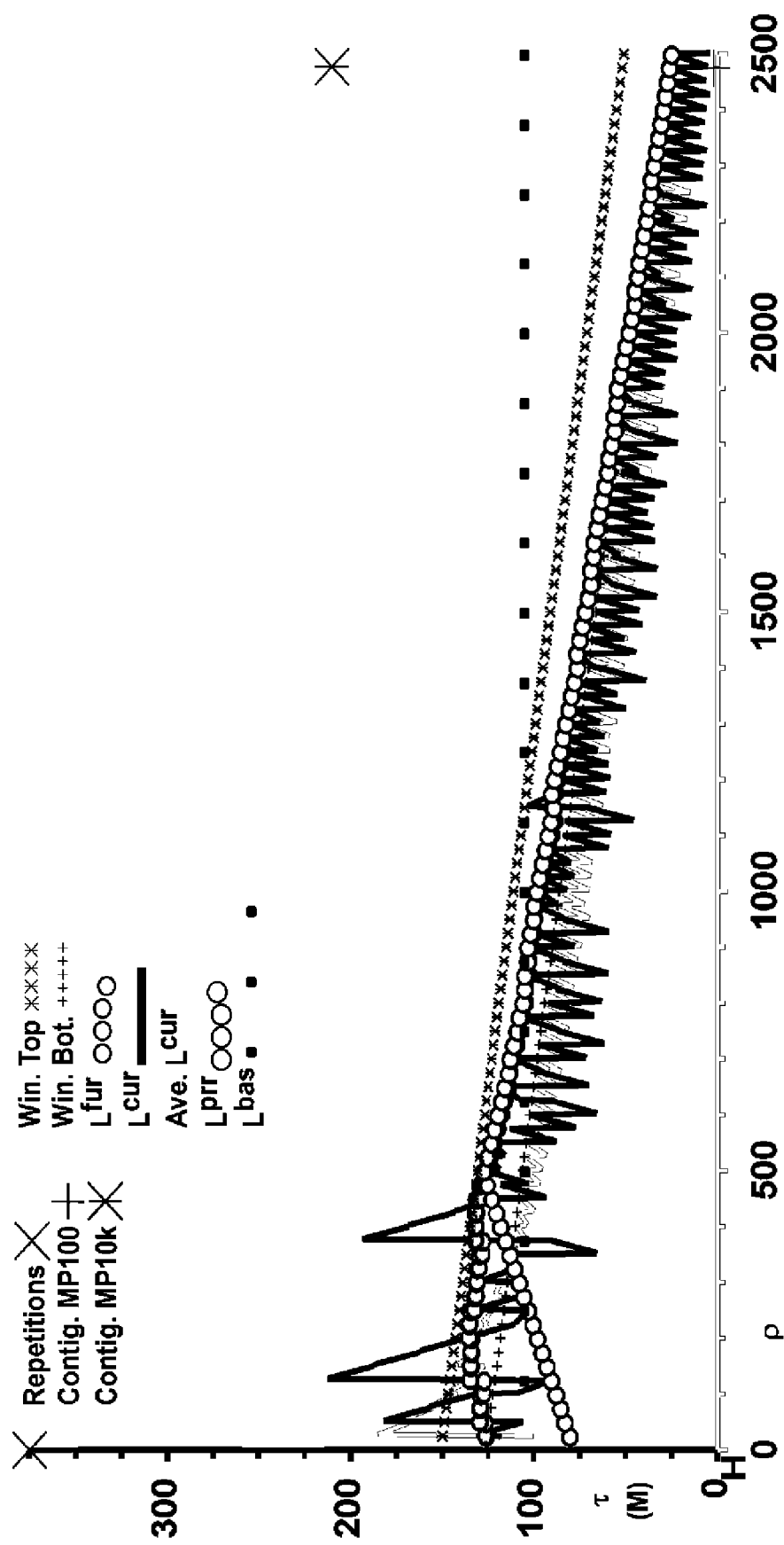
FIG. 41 is an illustration showing Win. 125-150 to 25-50τ. (R=25ρ, RM=0.25, RA=2.5, Delay=4τ)
Figure 42:
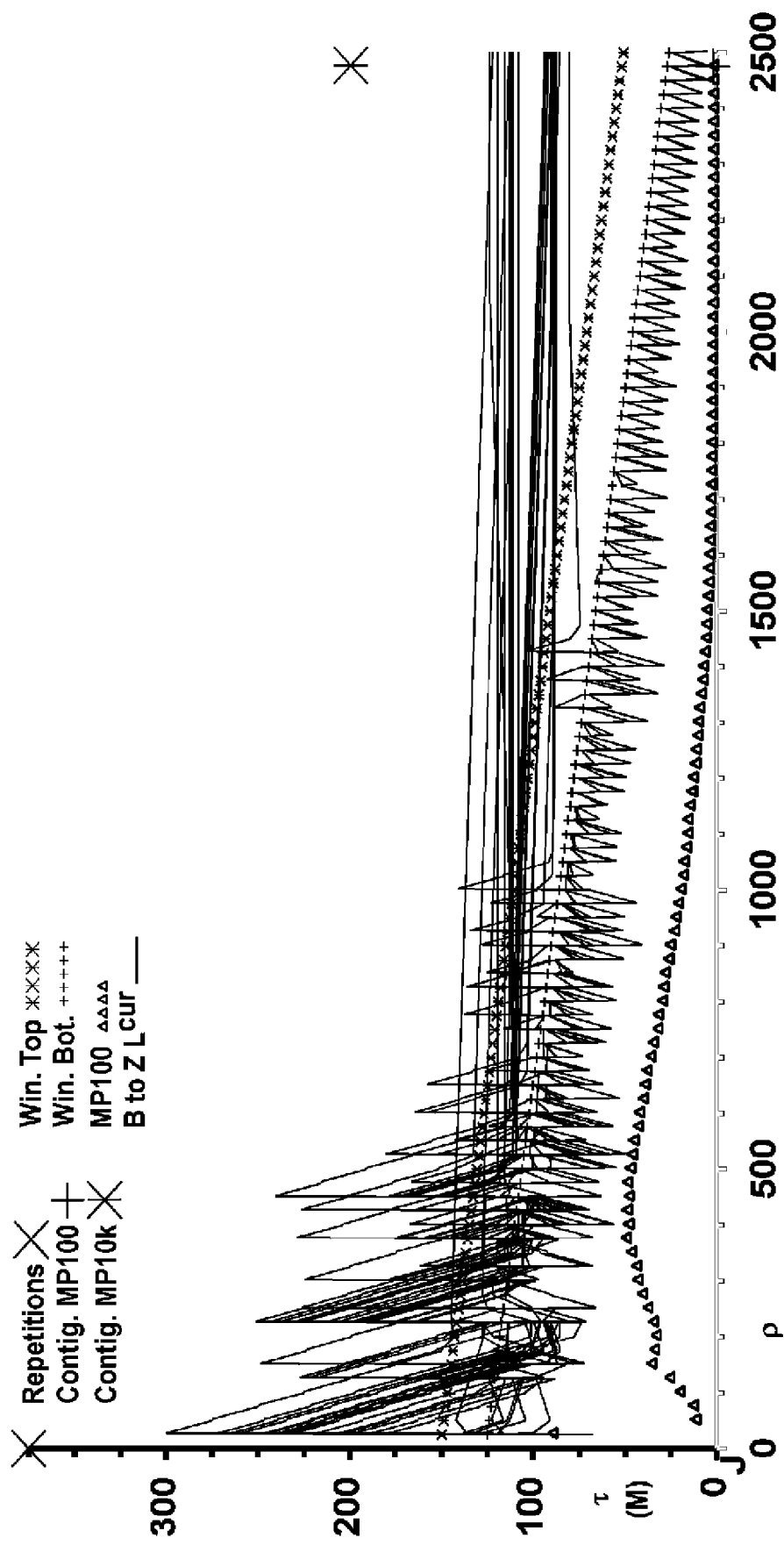
FIG. 42 is an illustration showing Win. 125-150 to 25-50τ. (R=25ρ, RM=0.25, RA=2.5, delay=4τ)
Figure 43:
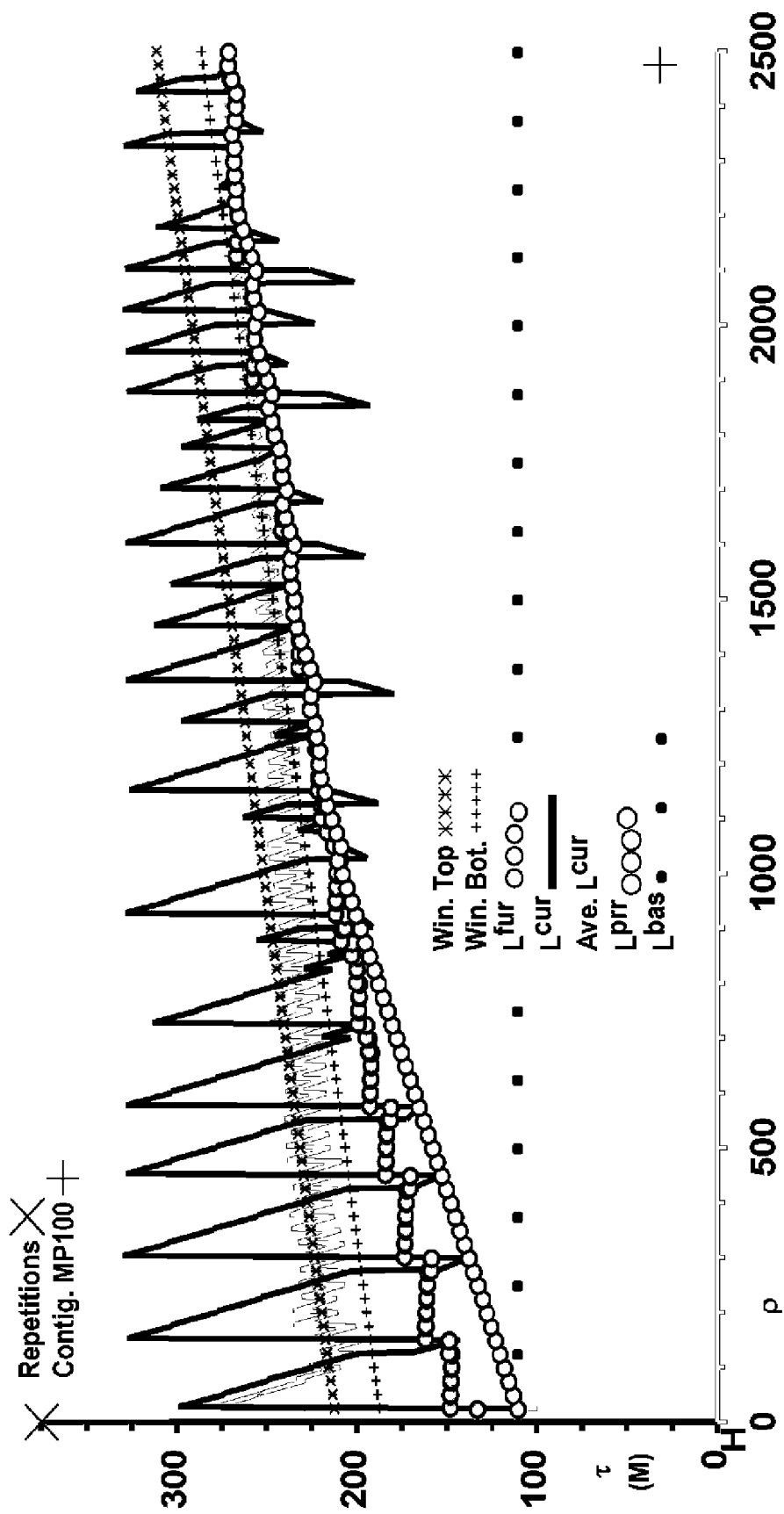
FIG. 43 is an illustration showing Win. 187.5-212.5 to 287.5-312.5τ(R=25ρ, RM=0.25, RA=2.5, delay=4τ)
Figure 44:
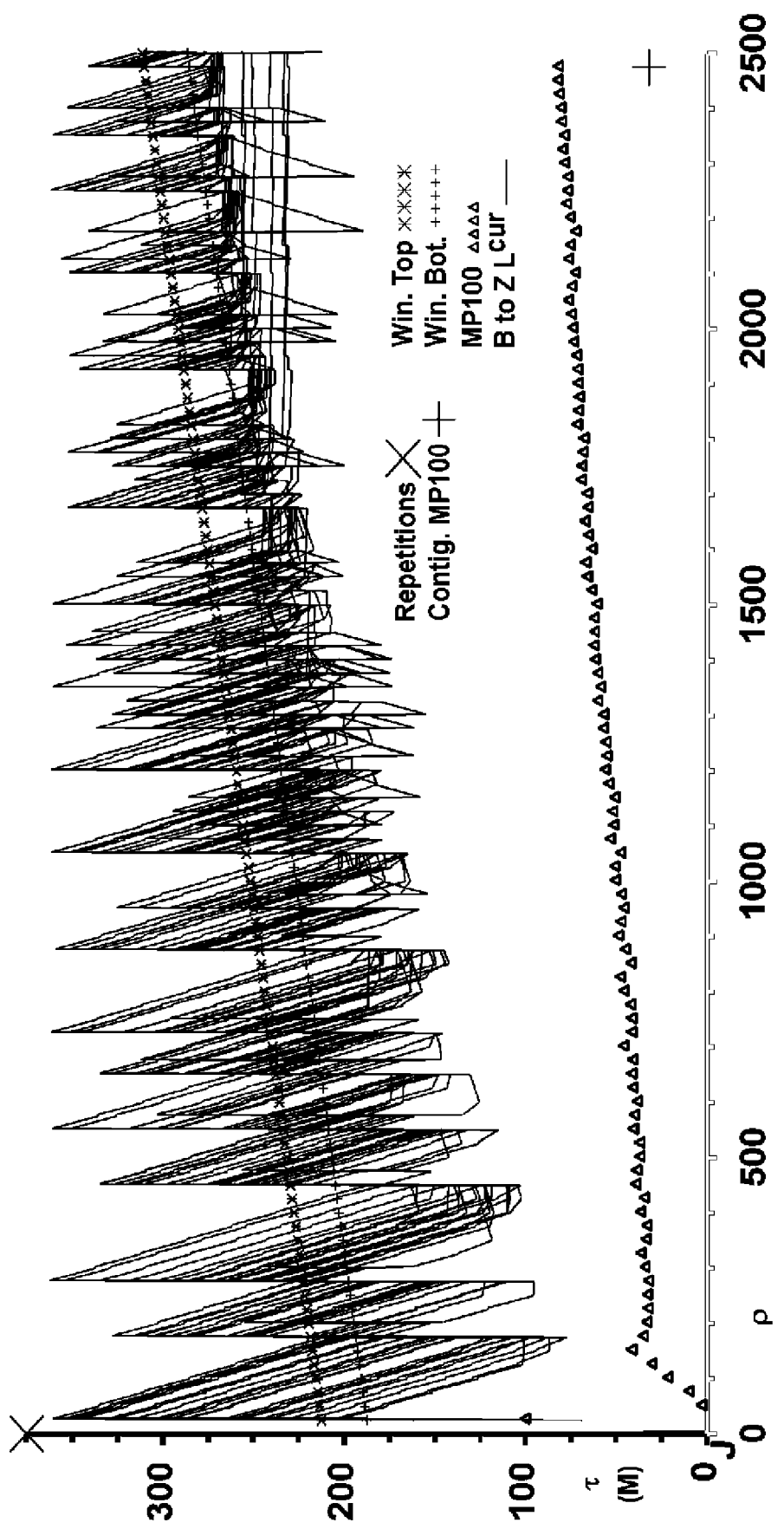
FIG. 44 is an illustration showing Win. 187.5-212.5 to 287.5-312.5τ. (R=25ρ, RM=0.25, RA=2.5, delay=4τ)

FIG. 32 shows the Ron Animal Flashlight 26 in a Windowing scenario. The difference between this set-up and that above (FIG. 17) is a peg that can prevent the solenoid from contacting the ON flashlight of Den A. In FIG. 32A, the peg is down and has no affect on the flashlight. Also the Den A flashlight is OFF. In FIG. 32B, the start of a challenge, the Den A flashlight is ON and the peg is up. FIG. 33C represents a "window of opportunity" because the peg is down and the Den A may now effectively push away the ON flashlight. In the first ON-flashlight challenge, where the animal is still naive, the solenoids of some Incidental Dens have been energized. In FIG. 33D, the window of opportunity has passed: the peg is up and blocking the Den A solenoid. Therefore when the Den A solenoid is energized it is ineffective and the ON output of the light sensor is not removed. (If the peg were lowered after the Den A solenoid started pushing against it, the solenoid would be able to push away the flashlight.) It this scenario Den A $D_i$ is not constant. Den A may be potentiated, depotentiated or unaffected (See EQU. 16). In figure pairs 33/34-43/44, R=25ρ, RM=0.25, RA=2.5 and Delay timer=4τ, but the Windowing is changed. Below the line of small crosses, the peg is up (blocking). Above the small "x" line, the peg is also up. Between the small cross and small "x" lines, the peg is down and the Den A solenoid is unblocked. In FIG. 33 the cross and "x" lines indicate that a challenge consists of the following: time point 0τ the Den A flashlight is ON and is in front of the Den A solenoid, also the peg is raised at the same time. At time point 25τ the peg is lowered. At time point 50τ, the peg is raised again until the end of the challenge period (25ρ). To be effective the Den A must generate an activating output before 46τ(50τ−4τ delay before solenoid is activated). "Static" Windowing, where the window of opportunity is constant throughout challenges is shown is figure pairs 33/34-39/40. "Moving" Windowing is shown in figure pairs 41/42 and 43/44. Previous experience affects Windowing: Den A is effective in FIGS. 41 and 43 with Windowing parameters corresponding to those in FIGS. 33 and 39, respectively. Windowing is ineffective in FIGS. 33 and 39. In this scenario with the Ron Animal Flashlight 26, there are high degrees of misfiring and Lock-up in Incidental Dens, especially when Den A is effective. (Occasionally, simulations were randomly generated until one that demonstrated Lock-up was produced.)

Potentiation Caused by Oscillating Input

Figure 45D:
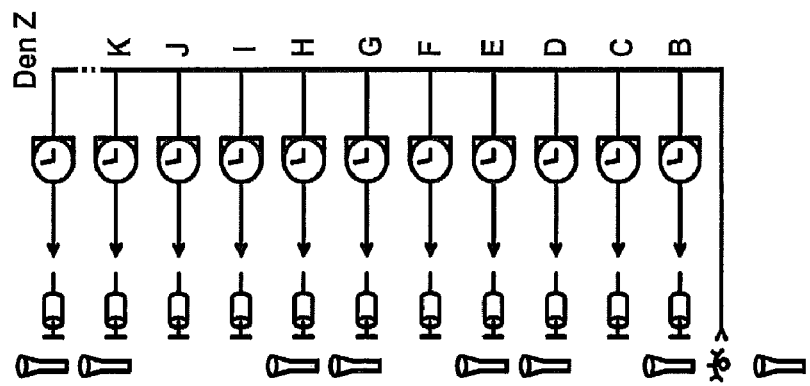
FIG. 45D is an illustration showing a Ron Animal Flashlight Pulse, RAFpul.
Figure 45C:
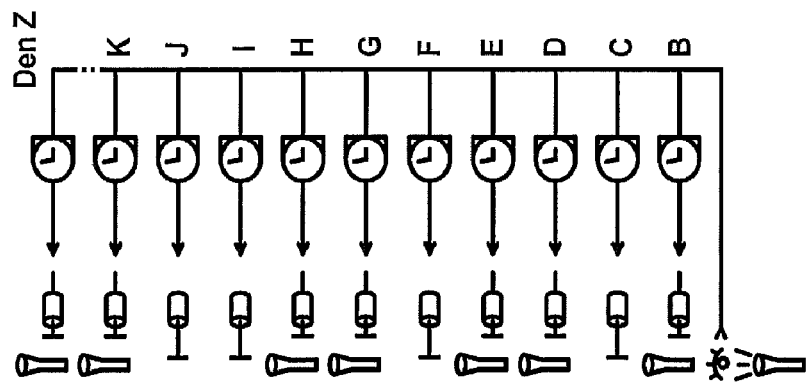
FIG. 45C is an illustration showing a Ron Animal Flashlight Pulse, RAFpul.
Figure 45B:
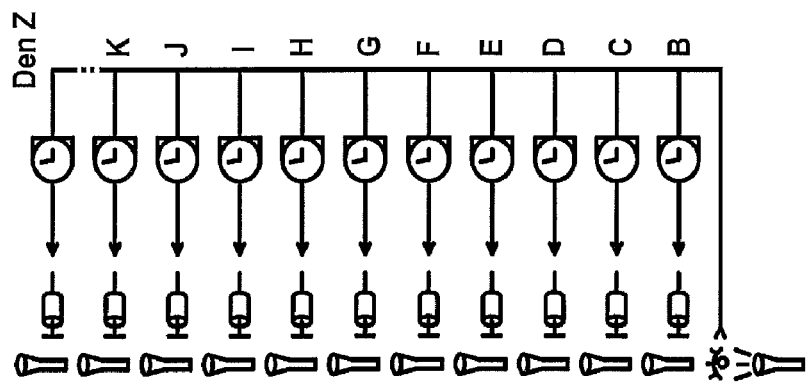
FIG. 45B is an illustration showing a Ron Animal Flashlight Pulse, RAFpul.
Figure 45A:
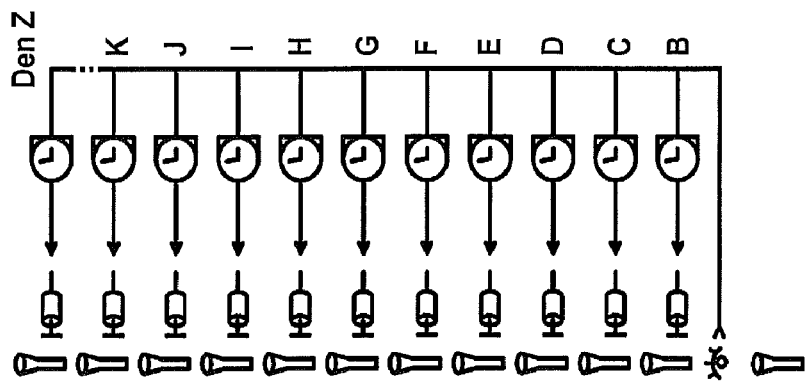
FIG. 45A is an illustration showing a Ron Animal Flashlight Pulse, RAFpul.
Figure 46:
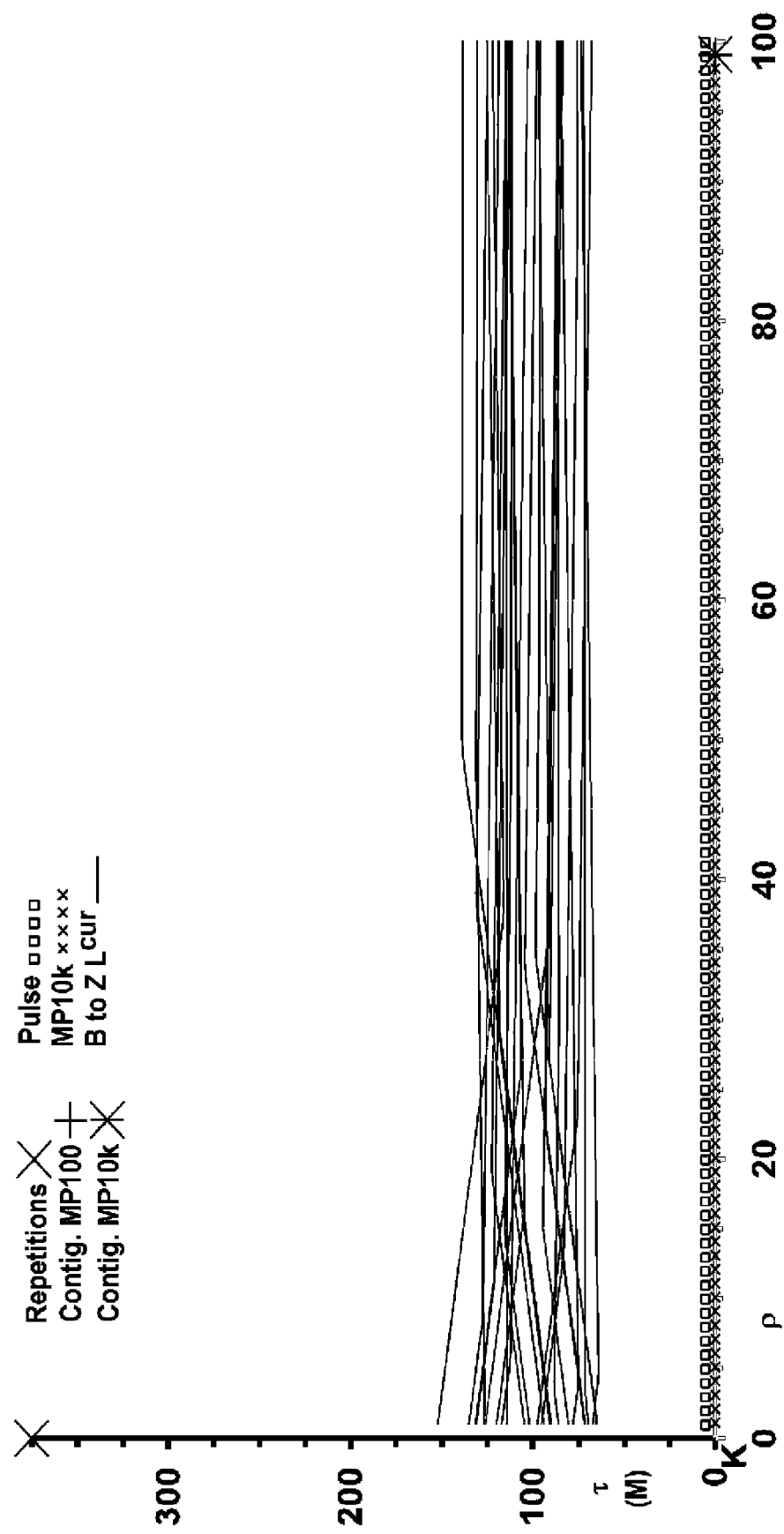
FIG. 46 is an illustration showing a Ron Animal Flashlight Pulse. R=1ρ, RM=0.25, RA=2.5, Pulse=5τ.
Figure 47:
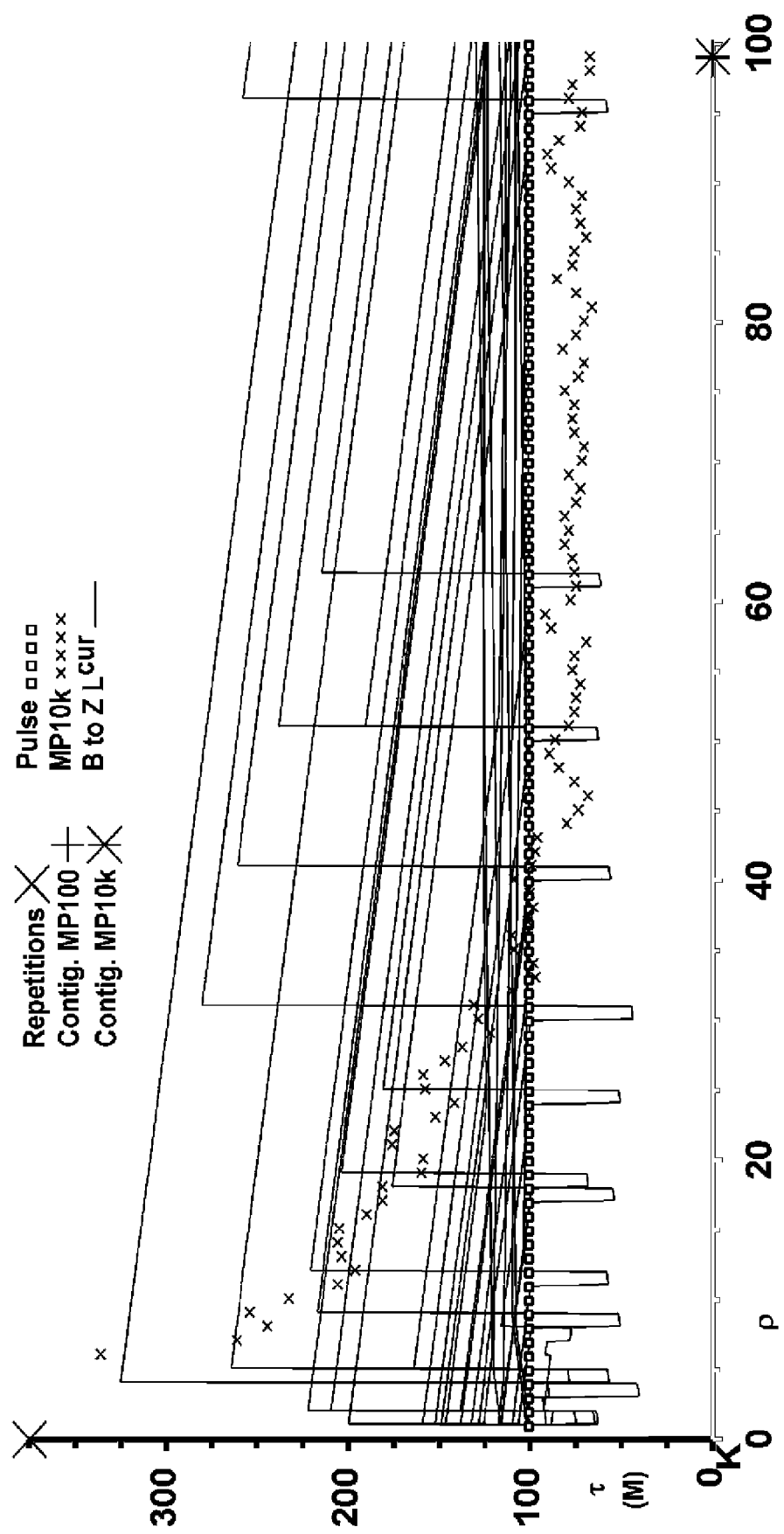
FIG. 47 is an illustration showing a Ron Animal Flashlight Pulse. R=1ρ, RM=0.25, RA=2.5, Pulse=100τ.
Figure 48:
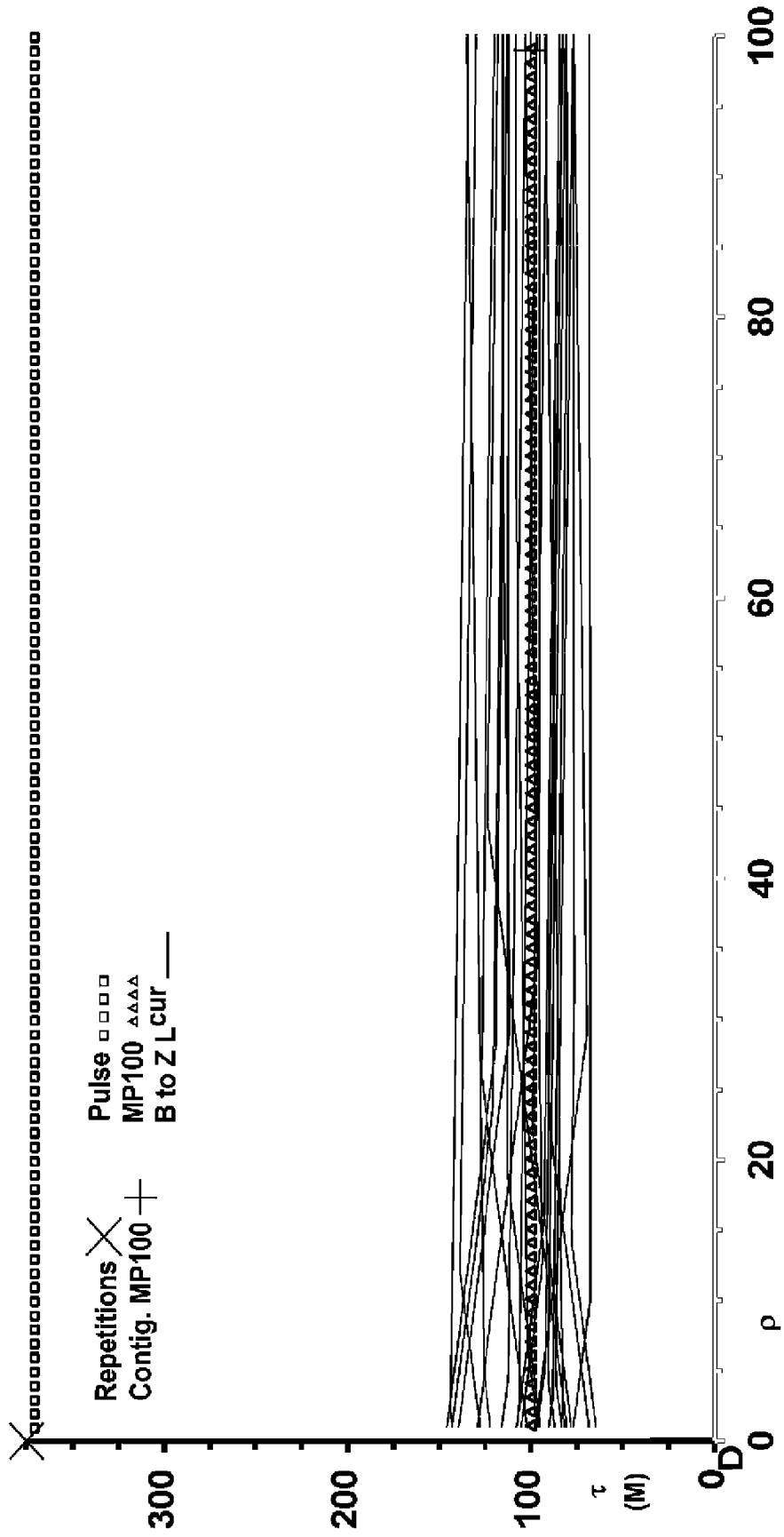
FIG. 48 is an illustration showing a Ron Animal Flashlight Pulse. R=1ρ, RM=0.25, RA=2.5, Pulse=370τ.
Figure 49:
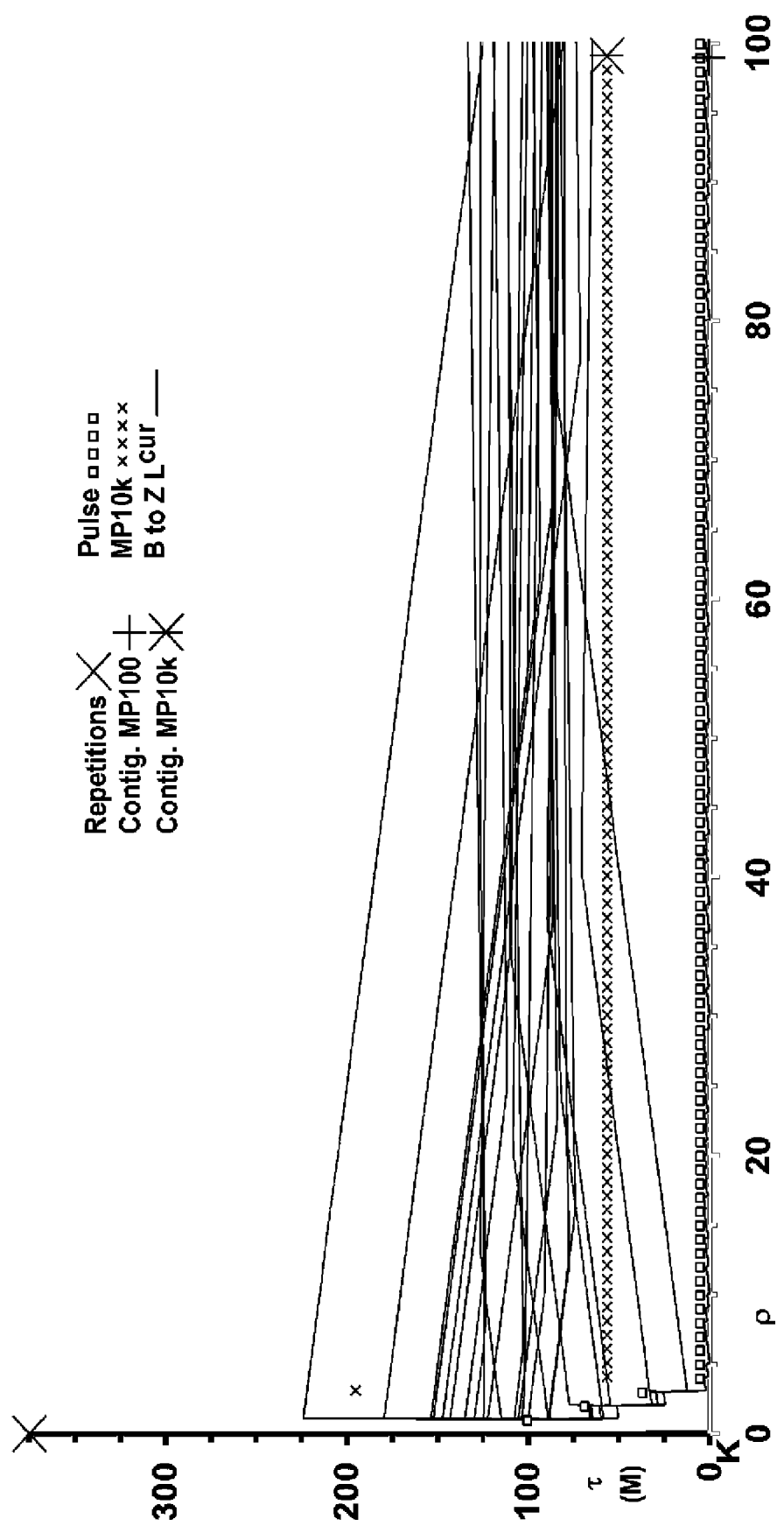
FIG. 49 is an illustration showing a Ron Animal Flashlight Pulse. R=1ρ, RM=0.25, RA=2.5, Pulse=100 to 5τ.
Figure 50:
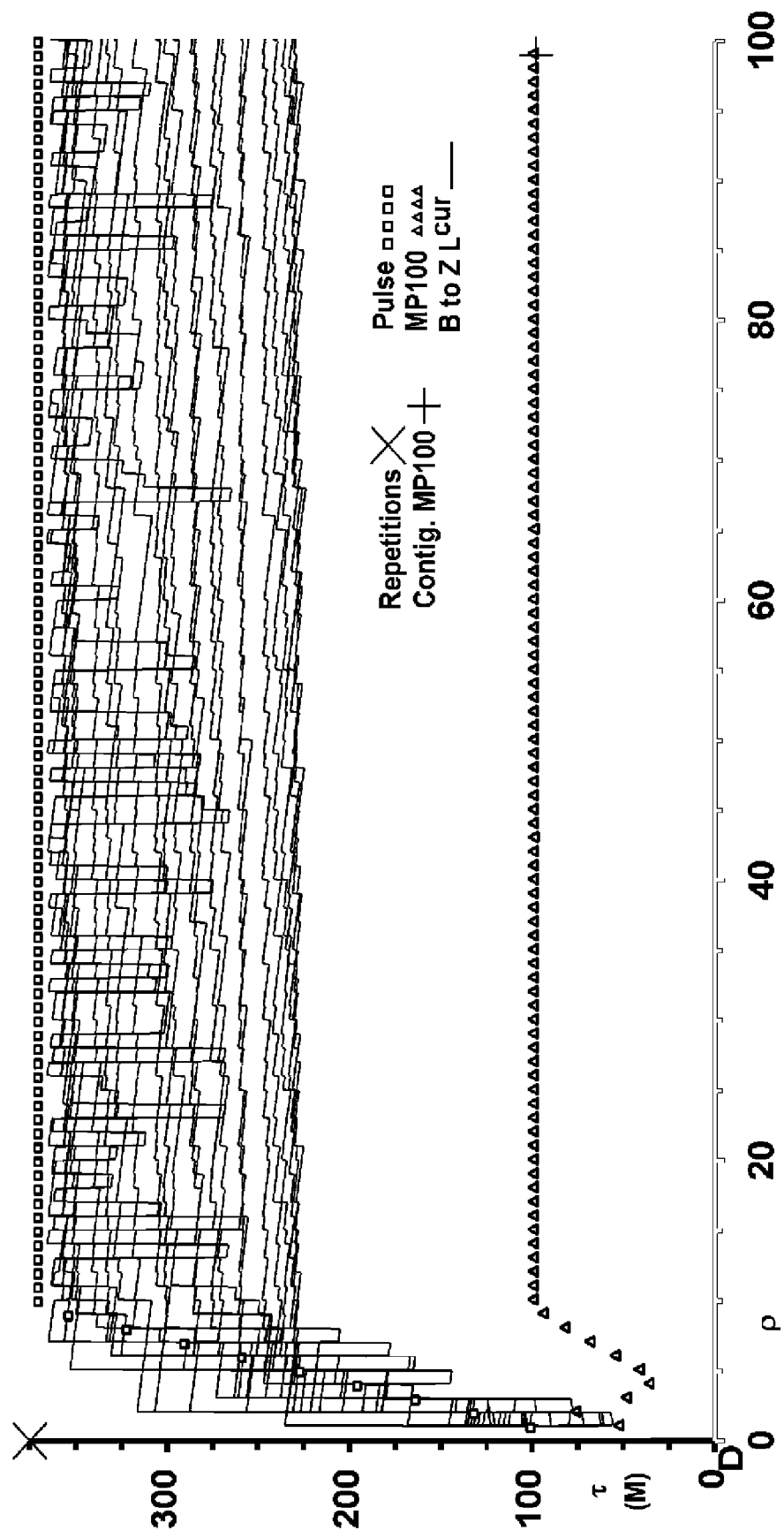
FIG. 50 is an illustration showing a Ron Animal Flashlight Pulse. R=1ρ, RM=0.25, RA=2.5, Pulse=100 to 370τ.
Figure 51:
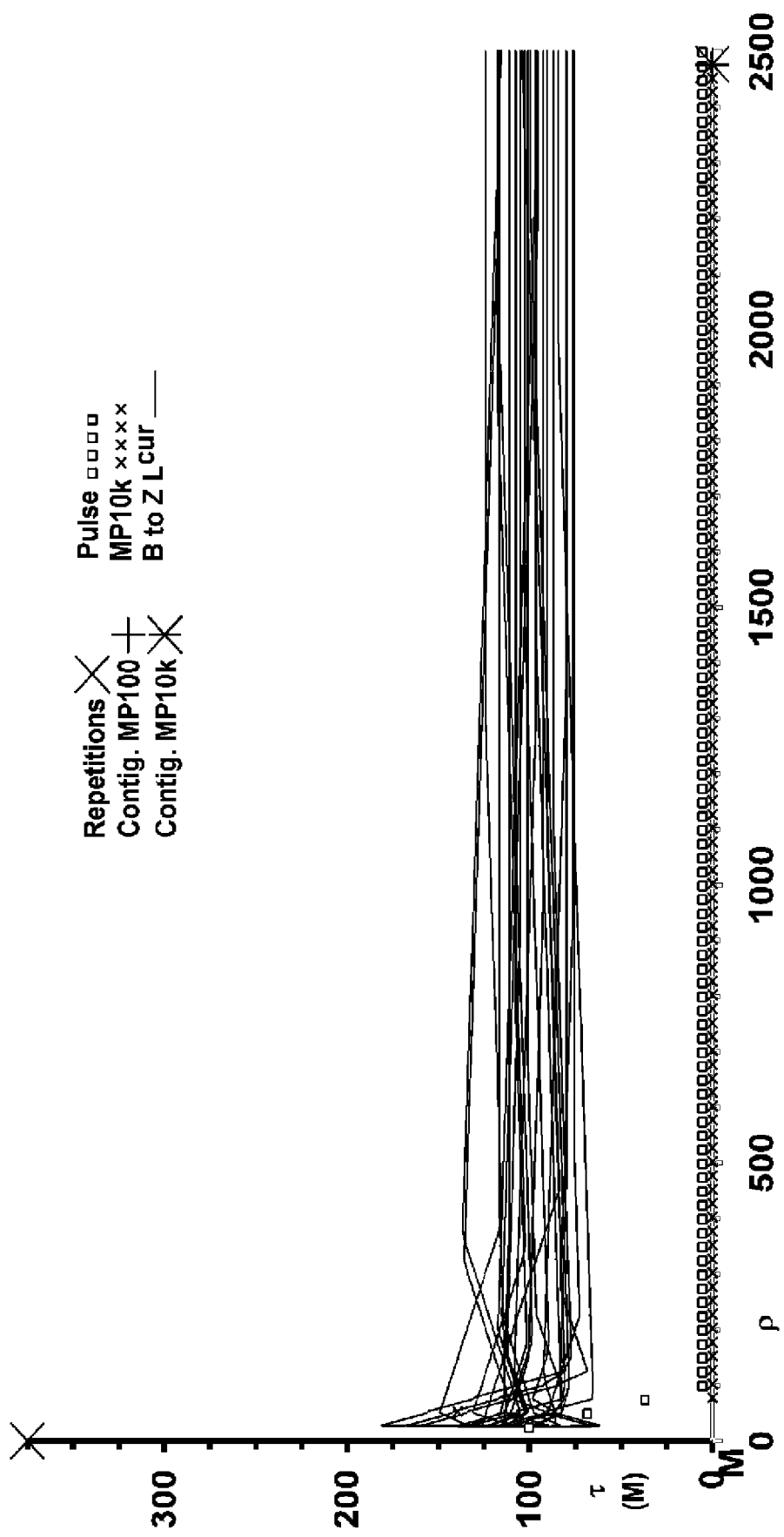
FIG. 51 is an illustration showing a Ron Animal Flashlight Pulse. R=25ρ, RM=0.25, RA=2.5, Pulse=100 to 5τ.

FIG. 45 shows a set-up like that of Windowing, described above, but where there is no Causative Den. This entity is called the "Ron Animal Flashlight Pulse". A flashlight that is turned ON and OFF. There is no Den A, just 25 Incidental Dens, but the flashlight is still referred to as the Den A flashlight. The ON flashlight turns ON a light sensor, eye symbol, ON and OFF. This flashlight cannot be pushed away. In FIG. 45A the flashlight is OFF. FIG. 45B, the beginning of the challenge, the flashlight is turned ON. FIG. 45C, in the first challenge of the naive animal, some Dens have been energized. In FIG. 45D, the flashlight is turned OFF and the outputs of the Dens become non-activating. R rho periods from the start of the first challenge the second challenges begins. This is called the Oscillatory input scenario. In the FIG. 45-51 oscillatory input scenarios, RM=0.25 and RA=2.5. There are no figure pairs since there are only Incidental Dens: no Den A properties. A line of small open squares indicates length of the ON period of oscillation. "Static" input oscillation, where the width of the ON flashlight period is constant throughout challenges is shown is FIG. 46-48. "Moving" input oscillation is shown in FIG. 49-51. In FIG. 46 from challenge time point 0τ to 5τ the Den A flashlight is ON; Pulse=5τ. The flashlight is OFF from that point until the end of the challenge period (1ρ). Due to the brevity of this pulse, there is no effect on the internal properties of the Incidental Dens and there are no misfirings. In FIG. 47, R=1ρ and Pulse=100τ. While there is a rate of about 1% individual misfirings and the Den internal properties are being affected there are is a 0% rate of contiguous misfirings. The length of the ON period may influence misfirings and internal properties. In FIG. 48 R=1ρ and Pulse=370τ. There is a rate of 100% individual misfirings and therefore a rate of 100% contiguous misfirings. The internal properties are unaffected because $D^{dif} \geq noD^{dif}PT$. Therefore $\Delta D^{eff}=0$. Therefore $L^{cur}_j = L^{cur}_i$. See LIST 1 and EQU. 16. In FIG. 49 R=1ρ and Beginning Pulse=100τ Ending Pulse=5τ, Pulse Change Rate=−31.67τ/challenge. Previous experience affects the oscillatory input scenario. Oscillatory input profiles in FIGS. 46 and 49 are very similar except that in FIG. 49 the Pulse width starts at 100τ and transitions to 5τ over the first four challenges. While there is no affect on misfiring or internal properties in FIG. 46, contiguous misfirings at the end of the regime>0.5% and there are no non-contiguous misfirings in FIG. 49. In FIG. 49 simulations were randomly generated until one that demonstrated Lock-up well was produced. In FIG. 50 R=1ρ and Beginning Pulse=100τ, Ending Pulse=370τ, Pulse Change Rate=31.67τ/challenge. Again, it is seen that previous experience affects the oscillatory input scenario. Oscillatory input profiles in FIGS. 48 and 50 are very similar except that in FIG. 50 the Pulse width starts at 100τ and transitions to 370τ over the first ten challenges. While there is no affect on internal properties in FIG. 48, the internal properties of all Dens were affected in FIG. 50. Oscillatory input profiles in FIGS. 49 and 51 are identical. R=1ρ in FIG. 49 and R=25ρ. While there is Lock-up in FIG. 49 there is not in FIG. 51.

Diversity of Equations Able to Facilitate Relllief

EQU. 10-32 may be modified without undoing the actions of the Relllief mechanism as long as EQU. 1-9 hold. For example, EQU. 11 and 17 may be replaced with EQU. 39 and 40, respectively.

$$L^{curA} = L^{cur}_i - 200\tau/\Delta D^{eff}; \quad \text{EQU. 39}$$

If $L^{curA} < L^{min}$ then $L^{curA} = L^{min}$ $$L^{curD} = L^{cur}_i + 200\tau/\Delta D^{eff}; \quad \text{EQU. 40}$$

If $L^{curD} > L^{max}$ then $L^{curD} = L^{max}$

The graphs generated with these replacements according to the above continuous potentiation and continuous depotentiation schemes are almost identical to FIG. 18-21, with the exception that in the depotentiation scheme that are many more individual misfirings and contiguous misfirings with the replacement of the equation. Therefore, the quality of Rellief may be refined by altering the exact relationships (equations) that represent it. The modification of the quality of Rellief may be relevant to the physiology of biological neurons regarding pharmacological and genetic nuances.

Transferants and Tanks

Figure 52C:
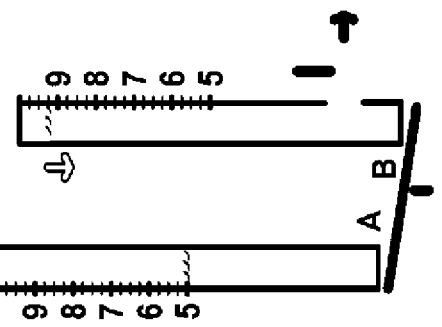
FIG. 52C is an illustration showing Transferants and Tanks.
Figure 52E:
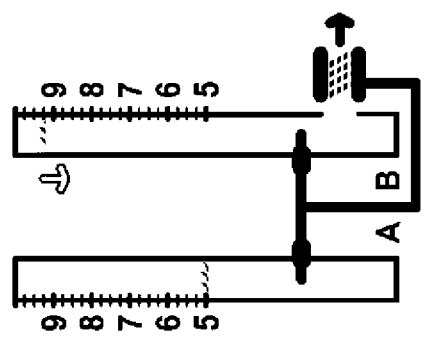
FIG. 52E is an illustration showing Transferants and Tanks.
Figure 52B:
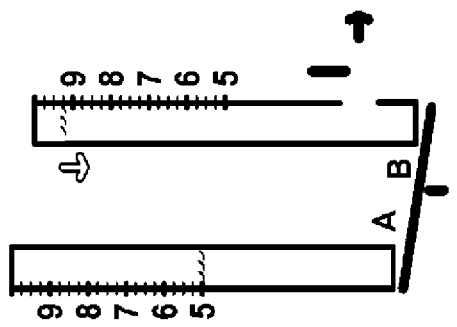
FIG. 52B is an illustration showing Transferants and Tanks.
Figure 52D:
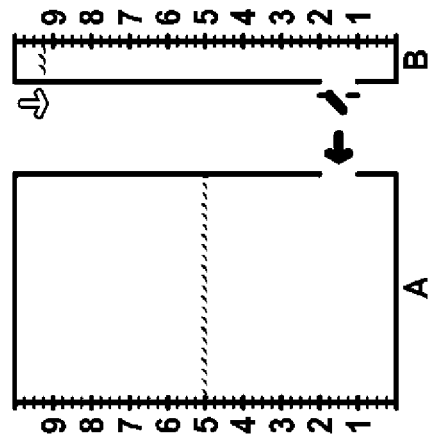
FIG. 52D is an illustration showing Transferants and Tanks.
Figure 52A:
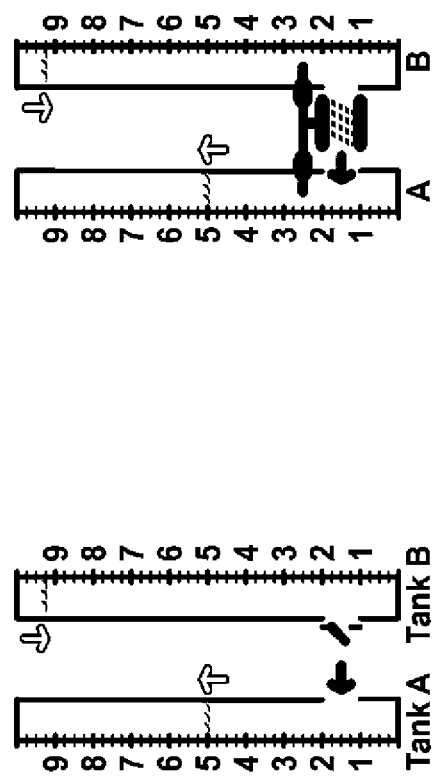
FIG. 52A is an illustration showing Transferants and Tanks.

Rons can be built using a variety of materials. A Transferant mediates the actions of the Ron subunits. Transferants, such as a substance or a kind of energy, are transferred into or out of a 'tank', changing the state (value) of individual tanks. Tanks can be thought of as internal properties of a physical subunit, as $L^{cur}$, $L^{prr}$, $L^{fur}$, $L^{bas}$, $L^{min}$ and $L^{max}$ are internal properties of the conceptual Den. The tank has a value (state) that corresponds to a force it exerts or amount of substance it contains. The value of a particular tank influences the flow of Transferant into and out of other tanks. This influence may control an equilibrium aspect or kinetic aspect of a system of tanks. The relationship between the values of two tanks may cause one of the tanks to move Transferant in or out until a specific relationship is attained (equilibrium aspect). The absolute value of a tank may influence the rate of flow of Transferant into or out of another tank (kinetic aspect). Since a wide assortment of Transferants is able to accomplish the functionality of the Ron, the Ron device is considered material-nonspecific. In FIG. 52*a-e*, some graphical conventions for tanks, which are used throughout subsequent representations, are presented. The tank is represented by a graduated vertical column. The value of the tank is represented by a vertical bar inside this column. For clarification of these conventions, in panels, FIG. 52*a-e*, the Transferant is specified. The Transferant is water. The value of the tank reflects the height of water in the tank. This value may be related to the amount of water. In FIG. 52*a-e*, the value of tanks A and B is the heights of water in the tanks, 5.00ϵ and 9.25ϵ, respectively. "ϵ", epsilon, is an arbitrary Transferant quantity. The value of a tank, as read from the gradations on the right side of a tank, is the number of ϵ units contained in the tank. This is a relative number. For example, the maximum and minimum capacities of tanks A and B may be 50 and 40 gallons of water, respectively. The tanks may be regular cylinders with the same dimensions. Tank A may contain 50 gallons of water and tank B may contain 40 gallons of water, tank A might be represented as having +5ϵ and tank B as having −5ϵ where the ϵ unit is the difference in the height for one gallon of water, in this particular situation. There is a sprung one-way value in a conduit between the tank A and B in FIG. 52*a*. When the value (height) of tank B is sufficiently greater than A, as is depicted, then water flows (direction of solid gray arrow) from B to A. This causes the tank A value (height of water) to increase (direction of hollow arrow) and the tank B value (height of water) to decrease (direction of hollow arrow). A valve, as is the case here, which depends on the relationship between the values of two tanks, is termed an "equilibrium valve". The "kinetic valve" will be discussed later. The valve in FIG. 52*a* is a passive exchanging equilibrium valve. It is considered "exchanging" because Transferant flows between the tanks that affect the valve. In FIG. 52*b*, the values of tanks A and B are sensed (gray bars projecting into tanks). An active transfer device, which has been energized, is depicted with four slanted broken lines. FIG. 52*b* depicts the facilitated movement of water from tank B to A. The value of B decreases as that of A increases. The valve in FIG. 52*b* is an active exchanging equilibrium valve. In FIG. 52*c*, tanks A and B are balanced over a fulcrum. Tanks A and B have the same shape, size and weight. The weight of the water rather than the amount of water controls the valve. If tank B weighs significantly more than A, then tank B is lowered (right side of tank B). There is a partition with a fixed position inside the outlet conduit of tank B (solid bar). When tank B is lowered Transferant flows out of tank B since the partition does not move with tank B. The valve in FIG. 52*c* is a passive non-exchanging equilibrium valve. In FIG. 52*d* the heights of the water in tanks A and B control the sprung valve. The shapes and sizes of the tanks are not the same. Since the capacity of A is much greater than that on B, the height of water in tank A is virtually unaffected by the exchange between tanks A and B when the height of B is significantly more than that of A. Therefore, the valve in FIG. 52*d* is a passive non-reciprocating valve: the value of one tank remains fixed while the value of the other tank is changed. A non-exchanging valve is a non-reciprocating valve. The valve in FIG. 52*e* is an active non-exchanging equilibrium valve. There are many possibilities for making passive exchanging, active exchanging, passive non-exchanging, active non-exchanging, passive non-reciprocating and active non-reciprocating valves with many different Transferants. FIG. 52*f-h* show different kinds of tanks containing other Transferants. The relationship between tanks A and B in these panels may cause the state of one of the tanks to change. Systems utilizing the transfer of molecules between aqueous chambers (FIG. 52*f*), electrons between capacitors (FIG. 52*g*) and calories (heat) between heat reservoirs (FIG. 52*g*) and many other Tank/Transferants systems may be used to construct Rons.

Flow-Controlled-Relationship Tanks, Equilibrium Valve

Figures 53B, 53C, 53D, 53E, 53F, 53G:
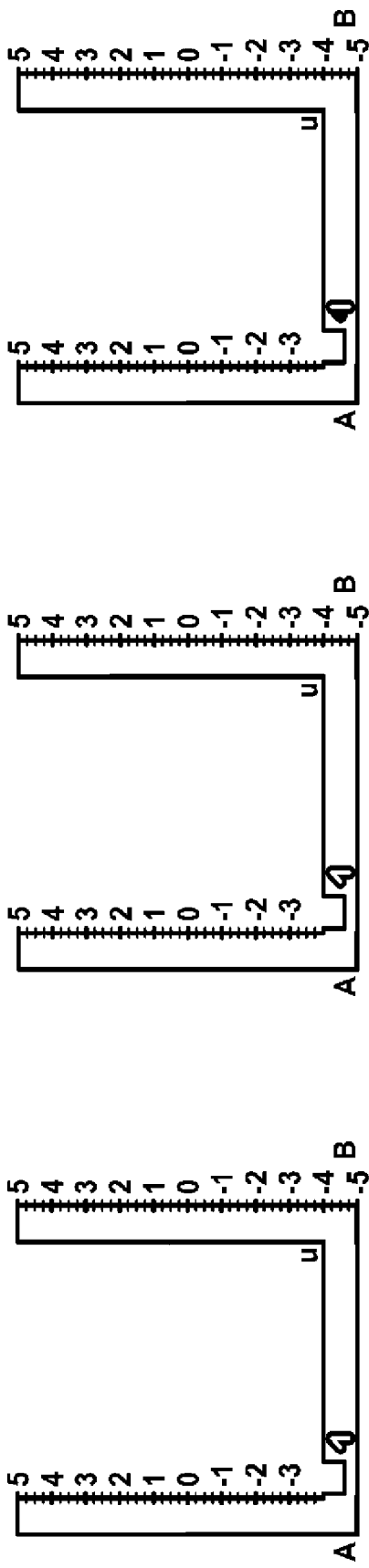
FIG. 53B is an illustration showing Tank A increasing toward B with hysteresis.
FIG. 53C is an illustration showing Tank A increasing toward B with hysteresis.
FIG. 53D is an illustration showing Tank A increasing toward B with hysteresis.
FIG. 53E is an illustration showing Tank A increasing toward B with hysteresis.
FIG. 53F is an illustration showing Tank A increasing toward B with hysteresis.
FIG. 53G is an illustration showing Tank A increasing toward B with hysteresis.

Flow-Controlled-Relationship, FCR, tanks are 2 tanks where the relationship between the values of the tanks governs the equilibrium aspect of the flow of Transferant into or out of one of the tanks. Subsequently, the relationship between the values of the tanks changes. FIG. 53 shows tanks A and B. The tanks are represented with graduated vertical columns. The value of the Transferant is represented with a vertical bar. The existence of a Flow-Controlled-Relationship, FCR, is represented by parallel lines between the tanks. Elements affecting this FCR are placed on or within these parallel lines. The FCR is named "u" in the panels of this figure. A cartoon depicting an FCR will itself be referred to as an FCR. An FCR will have an equilibrium valve. For simplicity, for the remained of this disclosure, such valves will be of the active-non-reciprocal type; a change is one tank has little direct effect of the value of the other tank. The parallel lines do not represent a channel through which the tank contents may be exchanged. Here the equilibrium valve is represented by a hollow half arrow that points up, with the half arrow part on the "A" side of bar. This particular type of representation, hollow half arrow or hollow bar, represents a valve at a particular instance. In FIG. 53*a*, the valve is facilitating Transferant to flow with the consequence that the value of tank A increases. A is the "target tank" of the equilibrium relationship between tanks A and B. The half arrow being on the A tank side signifies this. B tank is the "non-target" tank. Elements in the FCR cartoon affect the target tank. This FCR cartoon depicts a constriction that slows the increase in the value of tank A. Such a constriction influences the flow of Transferant into or out of the target tank from another tank, other than the non-target tank. This other tank is not shown. The mechanism that facilitates this flow of Transferant into or out of the target tank is not shown. The hollow bar indicates a valve that blocks the change of the tank A value at a particular instance. EQU. 41 describes the behavior of the valve. "A|B$_u$:" means "for FCR named "u" between tanks A and B". The horizontal arrow indicates that changes in A depend on A's relationship to B. The h above the horizontal arrow in the equation stands for hysteresis. Hysteresis refers to the fact that A starts to increase at a different A-B relationship point that when A stops increasing. "$" means "start if". "#" means "stop if". EQU. 41 has the meaning "for tanks A and B, FCR u, A increases hysteresis: start if B>A+4ϵ; stop if B<A+2ϵ. The equation does not specify if the valve is passive or active, exchanging, non-exchanging or non-reciprocating.

$$A\mid B_u: \| A \stackrel{h}{\Rightarrow} B, \$ B > A + 4\varepsilon, \# B < A + 2\varepsilon \qquad \text{EQU. 41}$$

FIG. 53a-f shows whether the valve would be facilitating flow or not, at particular instances, for various B tank values. FIG. 53a-f is a time course sequence; it demonstrates hysteresis. The "upward pointing shadow" behind the "OFF" (blocking) valves in FIG. 53c-e, indicates that the valve has the potential to facilitate the increase of the tank A value, though it is not at that instance. In FIG. 54a, the hollow half arrow that points down, with arrow on "A" side of bar, represents a valve that is at that time facilitating Transferant to flow with the consequence that the value of tank A decreases. A is the target tank as indicated by the half arrow being on the A side. EQU. 42 describes the behavior of the valve.

$$A\mid B_u: \| A \stackrel{h}{\Rightarrow} B, \$ B < A - 4\varepsilon, \# B > A - 2\varepsilon \qquad \text{EQU. 42}$$

Figure 55B:
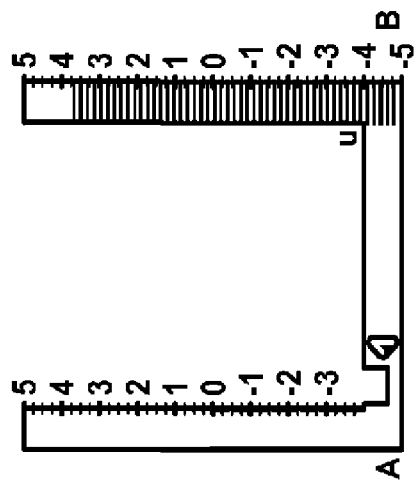
FIG. 55B is an illustration showing Tank A following B without hysteresis.
Figure 55C:
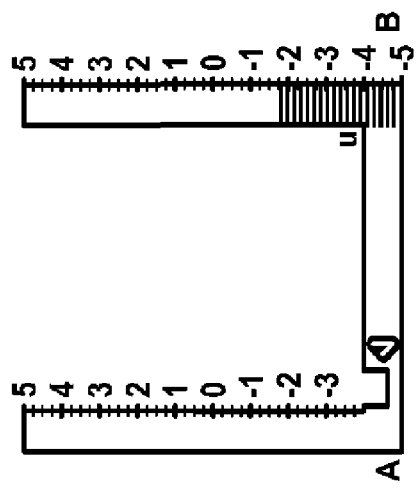
FIG. 55C is an illustration showing Tank A following B without hysteresis.
Figure 55D:
FIG. 55D is an illustration showing Tank A following B without hysteresis.
Figure 55E:
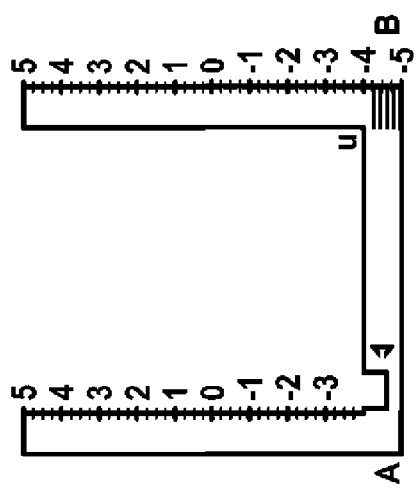
FIG. 55E is an illustration showing Tank A following B without hysteresis.
Figure 55F:
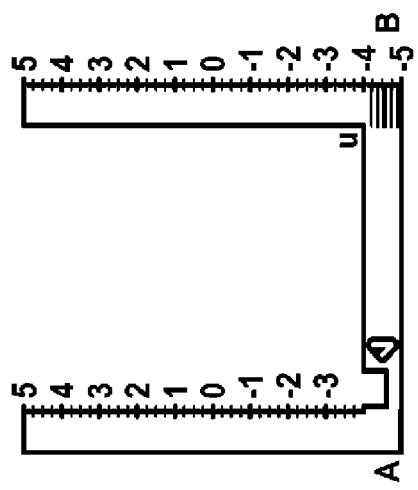
FIG. 55F is an illustration showing Tank A following B without hysteresis.
Figure 55G:
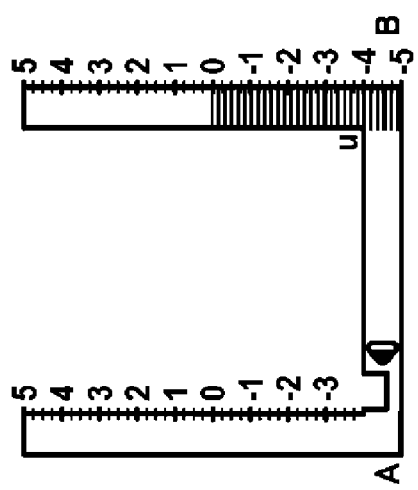
FIG. 55G is an illustration showing Tank A following B without hysteresis.

For tanks A and B, FCR u, A decreases with hysteresis: start if B<A−4ϵ; stop if B>A−2ϵ. FIG. 54a-f shows whether the valve would be open (facilitating) or not, at particular instances, for various B tank values. FIG. 54a-f is a time course sequence. The "downward pointing shadow" behind the OFF valves in FIG. 54c-e, indicates that the valve has the potential to facilitate the decrease of the tank A value. In FIG. 55a and f there is a half two-headed arrow that is composed of a solid vertical bar with an upward-pointing arrow half on the A side of the bar and a downward-pointing arrow half on the A side of the bar. A is the target tank since the arrow halves are on the A side. This particular representation of the valve means that the valve may facilitate the increase of tank A, may facilitate the decrease of tank A or may block change tank A. This type of valve depiction (solid bars and arrows) indicates the possible states of the valve, not the state of the valve at a particular instance (hollow bars and arrows). In FIG. 55f, an abbreviated figure is shown. Instead of indicating the value (state) of tank B with a graduated column and a vertical bar, the value of tank B, B$^s$, is used inside a short vertical bar (striped in this case). EQU. 43 describes the behavior of the valve and the valve status is shown for various instances of tank B values in FIG. 55b-e (time course). There is no hysteresis and therefore FIG. 55 is referred to "simple following". The value of A moves toward B whether A is less or greater than B. Simple Following is represented by EQU. 44, where $ and # are implied. To show that Following is at work, the contents of tank B, the non-target tank, is striped. The "upward pointing shadow" behind the downward pointing valves in FIGS. 55b and e, indicate that the valves have the potential to facilitate the increase of the tank A value. The "downward pointing shadow" behind the upward pointing valve in FIG. 55c, indicates that the valve has the potential to facilitate the decrease of the tank A value. The "upward pointing and downward shadows" behind the downward OFF valve in FIG. 55d, indicate that the valve has the potential to facilitate the increase or decrease of the tank A value.

$$A\mid B_u: \Uparrow_A \Rightarrow B, \$B>A, \#B=A; \Downarrow_A \Rightarrow B, \$B<A, \#B=A \qquad \text{EQU. 43}$$

$$A\mid B_u: \Updownarrow_A \Rightarrow B \qquad \text{EQU. 44}$$

Kinetic Valve

The absolute value of a non-FCR tank may modify the effect of an equilibrium valve. In FIG. 56-59 the equilibrium valve, A|B$_u$ will facilitate the increase of the tank A value if flow is otherwise unblocked. See EQU. 45a. There is no hysteresis and therefore FIG. 45a is referred to as "simple increasing". Simple increasing is represented by EQU. 45b, where $ and # are implied. To show that "increasing" (with or without hysteresis) is at work the contents of tank B, the non-target tank, are represented by a black vertical bar.

$$A\mid B_u: \Uparrow_A \Rightarrow B, \$B>A, \#B\leq A \qquad \text{EQU. 45a}$$

$$A\mid B_u: \Uparrow_A \Rightarrow B \qquad \text{EQU. 45b}$$

The kinetic valve is controlled by the absolute value of tank C. Thresholds are marked with a plus or minus on the tank C representation. The kinetic valve is depicted in FCR u. It is designated C$_u$ in equations and C in the cartoon. Its state is depicted by a hollow rectangle that can move up and down to symbolize the constriction of the flow of Transferant into or out of the target tank (the limiting of the rate of increase in A). Elements in the FCR cartoon always pertain to the target tank. Long upward-pointing arrows next to tank A indicate the relative rate at which the value of tank A is increasing. No arrows indicate there is no increase, one arrow is the slowest rate of increase and 7 arrows is the highest rate of increase. In FIG. 56, the square wave next to the kinetic valve indicates that the valve has two positions. One position completely occludes flow corresponding to FCR u. The other position does not constrict flow at all. EQU. 46 characterizes the behavior of the kinetic valve: move kinetic valve C$_u$ to the most constricting position if the value of the corresponding tank C is less than −2.5ϵ; move kinetic valve C$_u$ to the least constricting position if the value of the corresponding tank C is greater than 2.5ϵ. See FIG. 56a-f time course sequence.

$$\vee C_u \subset -2.5\epsilon, \wedge C_u \supset 2.5\epsilon \qquad \text{EQU. 46}$$

In FIG. 57 the two positions of kinetic valve are partial occlusion and incompletely open. This is represented by letter p above upward and downward pointed arrows in EQU. 47. See FIG. 57a-f time course sequence.

$$\stackrel{p}{\vee} C_u \subset -2.5\varepsilon, \stackrel{p}{\wedge} C_u \supset 2.5\varepsilon \qquad \text{EQU. 47}$$

In FIG. 58 tank C has a continuous affect of the kinetic valve. There are intermediate positions between the most occluding and most open positions. The continuous effect is indicated by the smooth wave next to the open rectangle. In addition, there are three marks inside the FCR carton next to the valve rectangle and three marks to the left of the tank C representation. See EQU. 48. Note that upward and downward arrows are blunted. If tank C valve is less than −2.5ϵ then the kinetic valve is at the most occluding position. If tank C valve is greater than 2.5ε then the kinetic valve is at the least occluding position. See 58a-f time course sequence. Hysteresis can be an aspect of the continuous kinetic valve, but is not the case here. Note that upward and downward arrows are blunted.

$$\overset{p}{\bigcup} C_u \subset -2.5\varepsilon, \overset{p}{\bigcap} C_u \supset 2.5\varepsilon \quad \text{EQU. 48}$$

Multiple Tanks, Steady State

FIG. 59 shows FCR tanks (A, D and B) and one non-FCR tank (C). Tank A linked to tank D through FCR v. The discrete partial kinetic valve $C_v$ controls the rate of flow of Transferant regarding FCR v. This valve may be partially closed, as depicted in FIG. 59b, or the valve may be completely open, as depicted in FIG. 59a. This valve is controlled by the value of tank C according to EQU. 49.

$$\overset{p}{\vee} C_v \subset -2.5\varepsilon, \wedge C_v \supset 2.5\varepsilon \quad \text{EQU. 49}$$

The equilibrium valve of FCR v either blocks or facilitates the decrease of the value of tank D. The combination of both possibilities is depicted with a solid half arrow pointing down with the arrow on the D side of the vertical bar. D is the target tank. The state of the equilibrium valve is controlled by the relationship between tanks A and D according to EQU. 50. There is no hysteresis and therefore FIG. 50a is referred to as "simple decreasing". Simple decreasing is represented by EQU. 50b, where $ and # are implied. To show that "decreasing" (with or without hysteresis) is at work the contents of tank A is represented by a white vertical bar (edged in gray).

A|D$_v$: ⇓D ⇒A,$D>A,#D≤A    EQU 50a

A|D$_v$: ⇓D ⇒A    EQU. 50b

FCR s has a fixed constriction absent from FCR v. Therefore, if the kinetic valve were open, then the facilitated flow of Transferant into tank D would be slower than the facilitated flow of Transferant out of tank D. There is an equilibrium valve in FCR s that functions according to EQU. 51. To show that increasing is at work the contents of tank B, the non-target tank, is represented by a vertical black bar.

B|D$_s$: ⇑D ⇒B    EQU. 51

The triangle marks the steady state (value) of tank D. The two equilibrium valves may oscillate between blocking or facilitating flow but the value of tank D remains steady after the value of tank C has been held constant for a sufficiently long time. In FIG. 59b the steady state point is the same as in FIG. 59a even though the kinetic valve is partially closed. In FIG. 59b-e the equilibrium valves are depicted at particular instances (hollow bars and arrows with shadows). Possible valve states, without reference to current states, are represented with solid half arrows in FIGS. 59a and f. Since equilibrium valves have kinetic properties (equilibrium is not reached immediately), when the kinetic valve $C_v$ is partially closed the steady state of D increases in FIG. 59d relative to FIG. 59c. In FIG. 59e, the steady state is increased as the value of B is increased but the relationship between the steady state and tank B value is not necessarily simple. FIG. 59f is an abbreviation of FIG. 59e. The value of the correspond A and B tanks is used instead of the depiction of the tanks. "$A^S$" means the "state of tank A", also meaning the "value of tank A". Here $A^s = -4\varepsilon$ as in the previous panels.

Gatte Tank System

Figure 61:
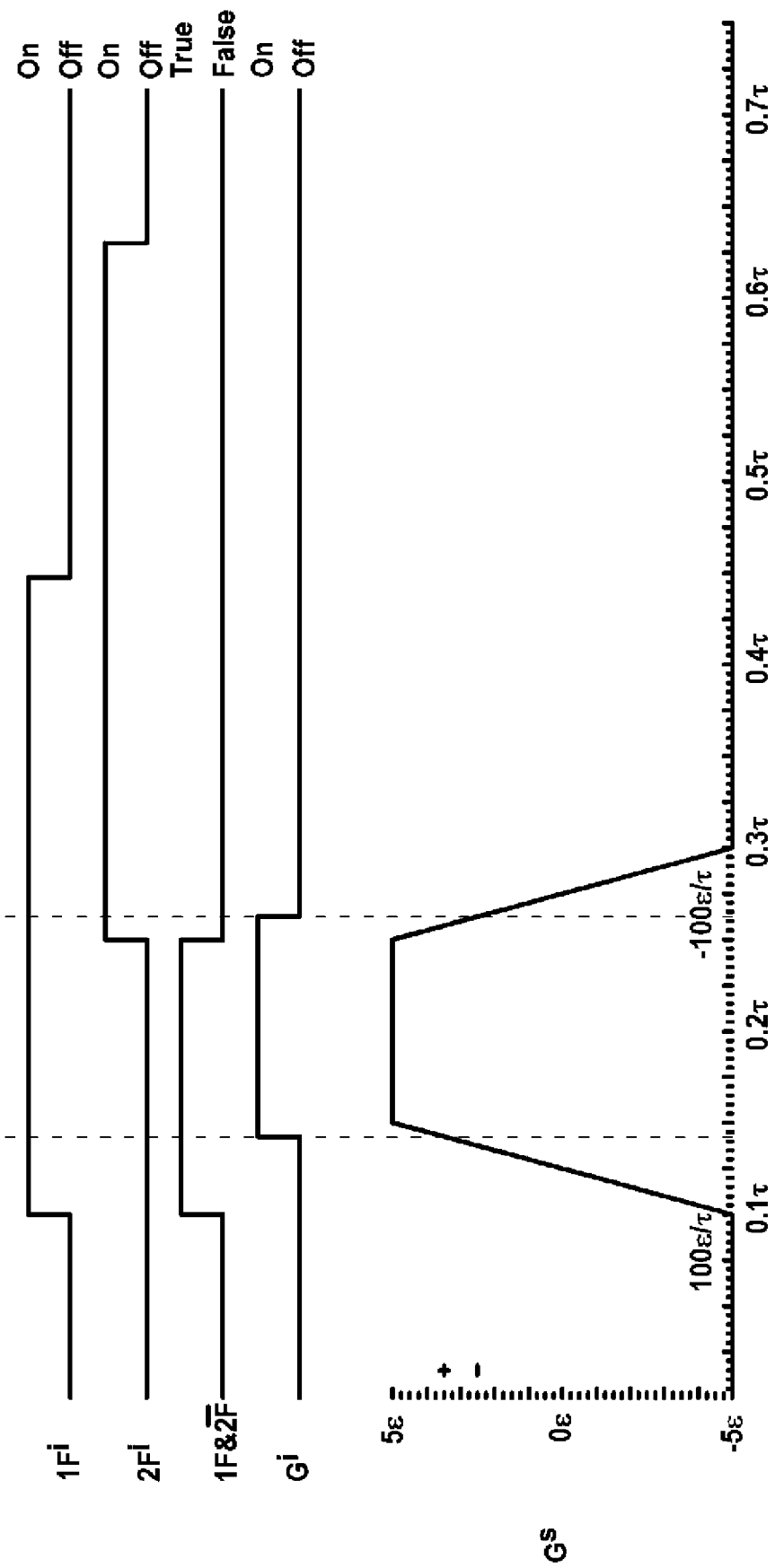
FIG. 61 is an illustration showing timing of logic operation of a Gaffe system.

A "source tank", for the descriptions of possible tank systems in this disclosure, is defined as the non-target tank of an "increasing" FCR that has a constant valve of 5ε. The letter "U" is used to designate the source tank. A "sink tank", for the following descriptions of possible tank systems, is defined as the non-target tank of a "decreasing" FCR that has a constant valve of −5ε. The letter "N" is used to designate the sink tank. A possible tank system for the Gatte subunit is presented in FIG. 60. The value of the tank G controls the discrete valve $G_r$. This system consists of three tanks; the source tank U, the sink tank N and the tank G. FIG. 60C describes the behavior of the equilibrium valves. In the first equilibrium equation "U" has been replaced with the value of U, which is 5. In such a case, when the constant is 5, in these examples, then it is implied that this is a sourcing equation. Similarly in a "decreasing" equation, "N" has been replaced with the value of tank N, −5. It is implied that it is a sinking equation. There are two "full" discrete kinetic valves in FCR r, "full" meaning they are either fully open or fully closed. The designation "$1F^i_r$" means the input to kinetic valve $1F_r$. Normally, a non-activating input (0) causes the discrete valve to be at the most closed position and an activating input (1) causes the discrete valve to be at the most open position. When the "^", hat, appears over the valve, such as with "2F" in FIG. 60B, then a 0 input opens the valve and a 1 input closes the valve. In the "logic" section of FIG. 60C, for the full discrete valve, "U" means "unblocking" changes in the target tank. "B" means blocking. "&" signifies the logical AND operation in FIG. 60C. The bar above an input signifies the logical NOT operation. The "FCR r" column tells if flow, regarding FCR r, is blocked or not. FIG. 60C "Logic" describes the relationships between kinetic valve inputs and valve states (U or B). These relationships are not realized immediately since Transferant has to flow to accomplish changes in values. The kinetic valve $G_r$, FIG. 60A, is described under "Kinetics". If FCR r is blocked the value of G decreases 100ε/τ, if not blocked it increases 100ε/τ. For simplicity, the rate at which Transferant can be sourced (200ε/τ) or sank (100ε/τ) is considered constant without regard to the value of tank G. The kinetics rate equations are valid as long as $G^s$ is not at the maximum (+5ε) or minimum (−5ε) value already. The timing of logic operations is shown in FIG. 61. $G^i$ and $G^s$, depend on $1F^i$ and $2F^i$, which may be outputs from Den tank systems (FIG. 16). The plus and minus signs correspond to the G tank thresholds. The broken lines show effects of the tank G thresholds on $G^i$, which is the input to $G^i_t$ in FIG. 60C. $G^i$, where the FCR is not specified, represents all the kinetic valves that are controlled by tank G, such as hypothetical valves $G^i_x$, $G^i_y$ and $G^i_z$. The rate of change appears next to the slope of $G^s$.

Orr Tank System

Figure 62:
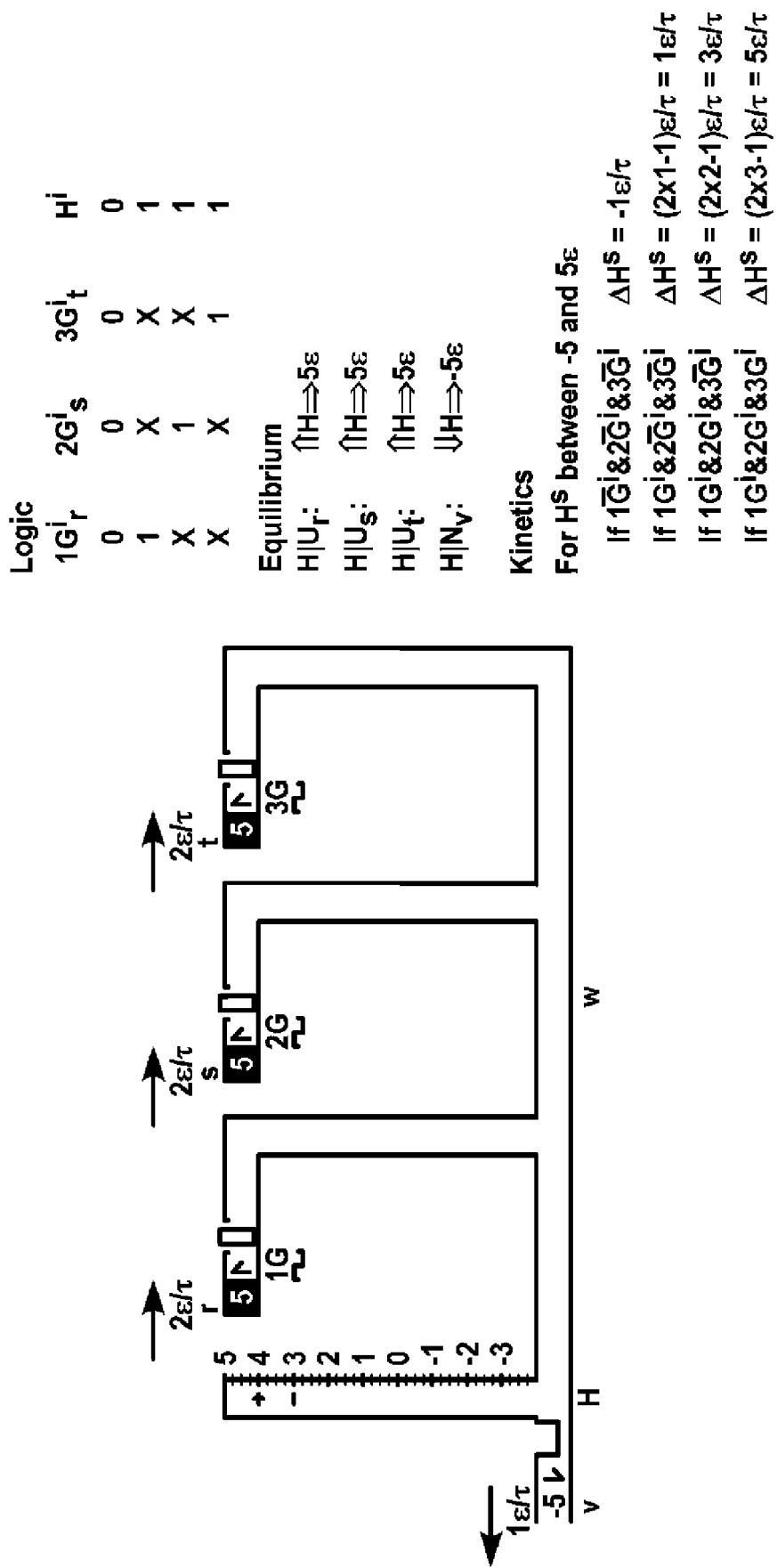
FIG. 62 is an illustration showing an Orr system.
Figure 63:
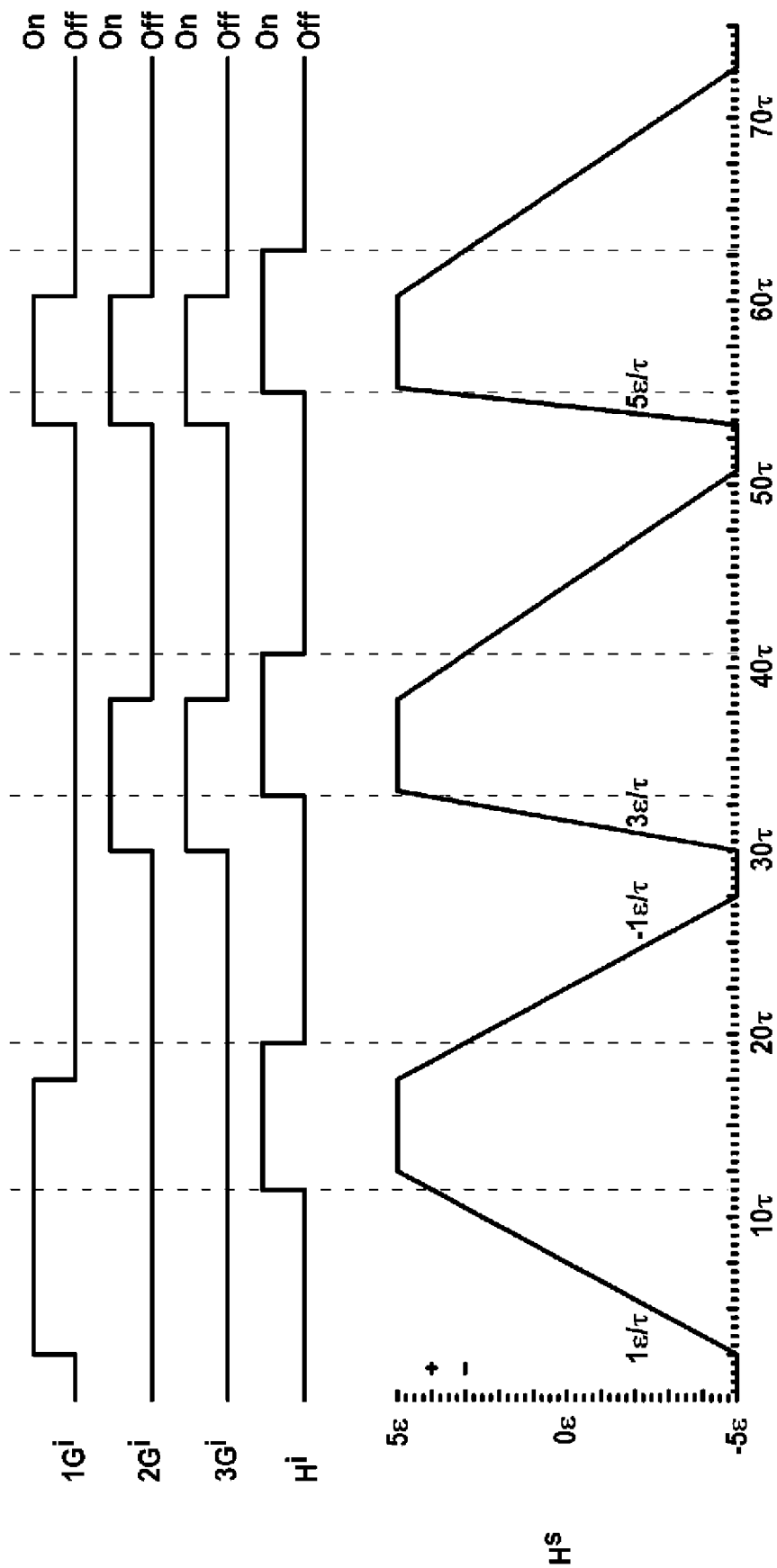
FIG. 63 is an illustration showing a logic diagram for a Tie subunit.
Figure 64:
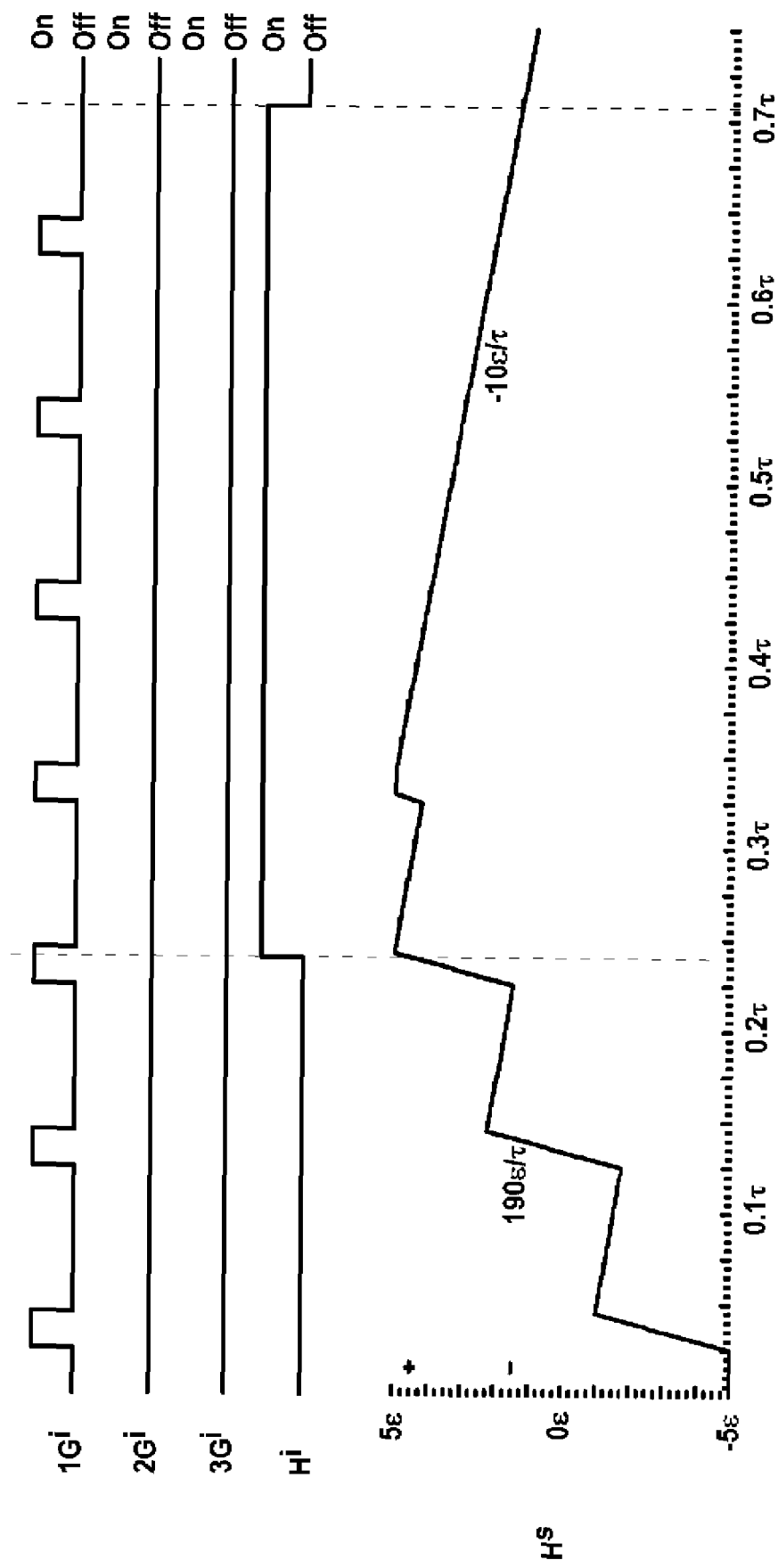
FIG. 64 is an illustration showing a logic diagram for a Syn subunit over a period of $0.75\tau$.
Figure 65:
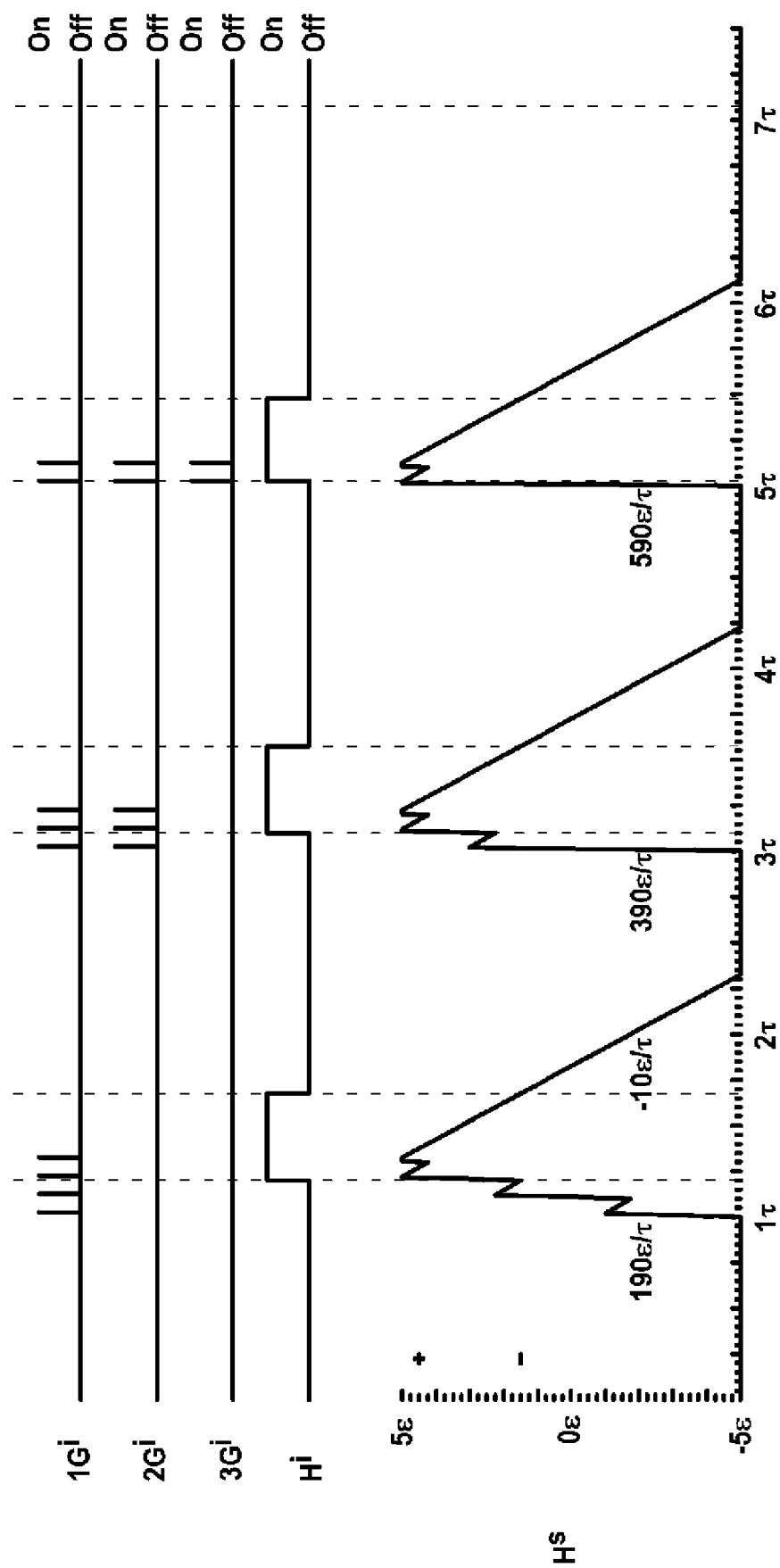
FIG. 65 is an illustration showing a logic diagram for a Syn subunit over a period of $7.5\tau$.

The tank designation is implied when it is evident that a tank is sourcing or sinking. In FIG. 62 black-bar tanks with the constant value of 5, connected to tank H through FCR r, s and t, represent the same source tank U. The white-bar tank (lower left) with the constant value of −5, connected to tank H through FCR v, represents the sink tank N. A possible tank system for the Orr subunit is presented in FIG. 62. This system consists of 3 tanks; the source tank U, the sink tank N and the tank H. FIG. 62 "Equilibrium" describes the behavior of the equilibrium valves. There are three full discrete kinetic valves. FIG. 62 "Logic" describes the relationships between kinetic valve inputs. These relationships are not realized immediately since Transferant has to flow to accomplish changes in valves. The kinetic valve $H_t$, which is not depicted, is described under FIG. 62 "Kinetics". For simplicity, the rate at which Transferant can be sourced or sank is considered constant without regard to the value of tank H. The kinetics rate equations are valid as long as $H^s$ is between the maximum (+5ϵ) or minimum (−5ϵ). The timing of logic operations is shown in FIG. 63-65. Source and sink rates are different in figures. $H^i$ and $H^s$, depend on $1G^i$, $2G^i$ and $3G^i$, which may be outputs from Gatte tank systems (FIG. 16). The plus and minus signs correspond to the H tank thresholds. The broken lines show effects of the tank H thresholds on $H^i$, which is the input to $H^i_t$. The rate of change appears next to the slope of $H^s$. As more inputs to the Orr are activated, the transition of the Orr output from non-activating to activating increases. FIG. 63, which uses the source and sink rate in FIG. 62, serves as an example of a Tie subunit system. FIGS. 63 and 64, which uses a higher source and sink rate for the Orr subunit, serve as examples of a Syn subunit system receiving pulsatile inputs.

Continuous Oscillation

A possible tank system that produces a smooth oscillating output is presented in FIG. 66B. This system consists of 3 tanks; the source tank U, the sink tank N and the tank R. FIG. 66C "Equilibrium" describes the behavior of the equilibrium valve in FCR r, which has hysteresis. The thresholds for this valve are marked with an inverse image of the $ and # symbols. The valve itself is marked as an inverse image. When the value of tank R decreases to −5ϵ then the equilibrium valve causes the R tank value to start increasing. When the value of tank R increases to 5ϵ then the equilibrium valve stops facilitating an increase in the tank R value. There is one continuous kinetic valve. In is depicted with a striped bar in FIG. 66A. FIG. 66C "Logic" describes the state of the kinetic valve (continuous oscillation) without reference to inputs. The kinetic valve $R_t$ is described under FIG. 66C "Kinetics". For simplicity, the rate at which Transferant can be sourced or sank is considered constant without regard to the value of tank R. The timing of logic operations is shown in FIG. 67. $R^i$ is not dependent on inputs. The plus and minus signs correspond to the R tank kinetic valve thresholds. The inverted $ and # signs correspond to the FCR r equilibrium valve thresholds. The gray-filled rectangles show effects of the tank R thresholds on $R^i$, which is the input to $R^i_t$. The rate of change appears next to the slope of $R^s$.

Ax Tank System

Figure 66:
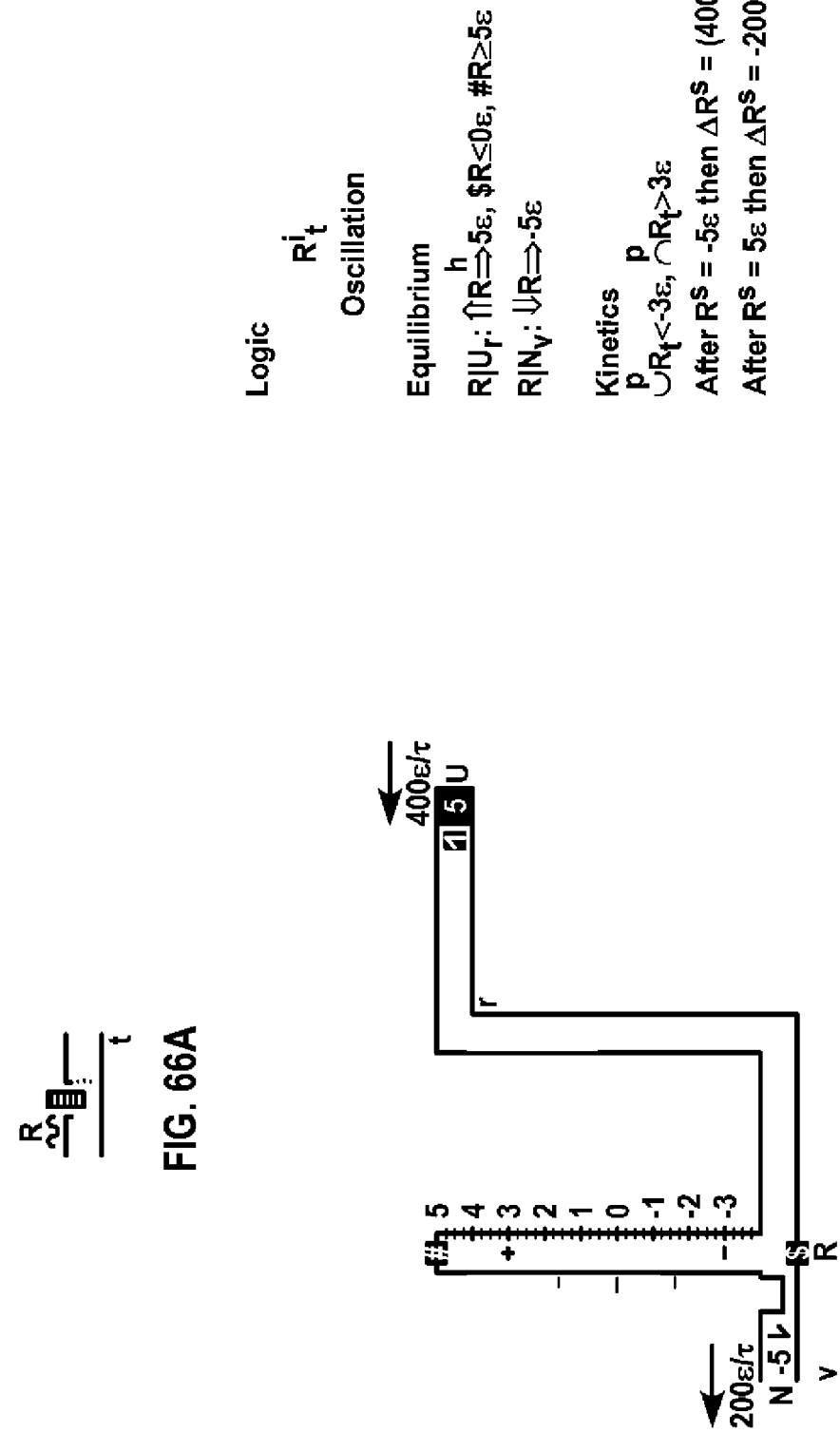
FIG. 66A is an illustration showing a Continuous oscillation system.
FIG. 66B is an illustration showing a Continuous oscillation system.
FIG. 66C is an illustration showing a Continuous oscillation system.
Figure 67:
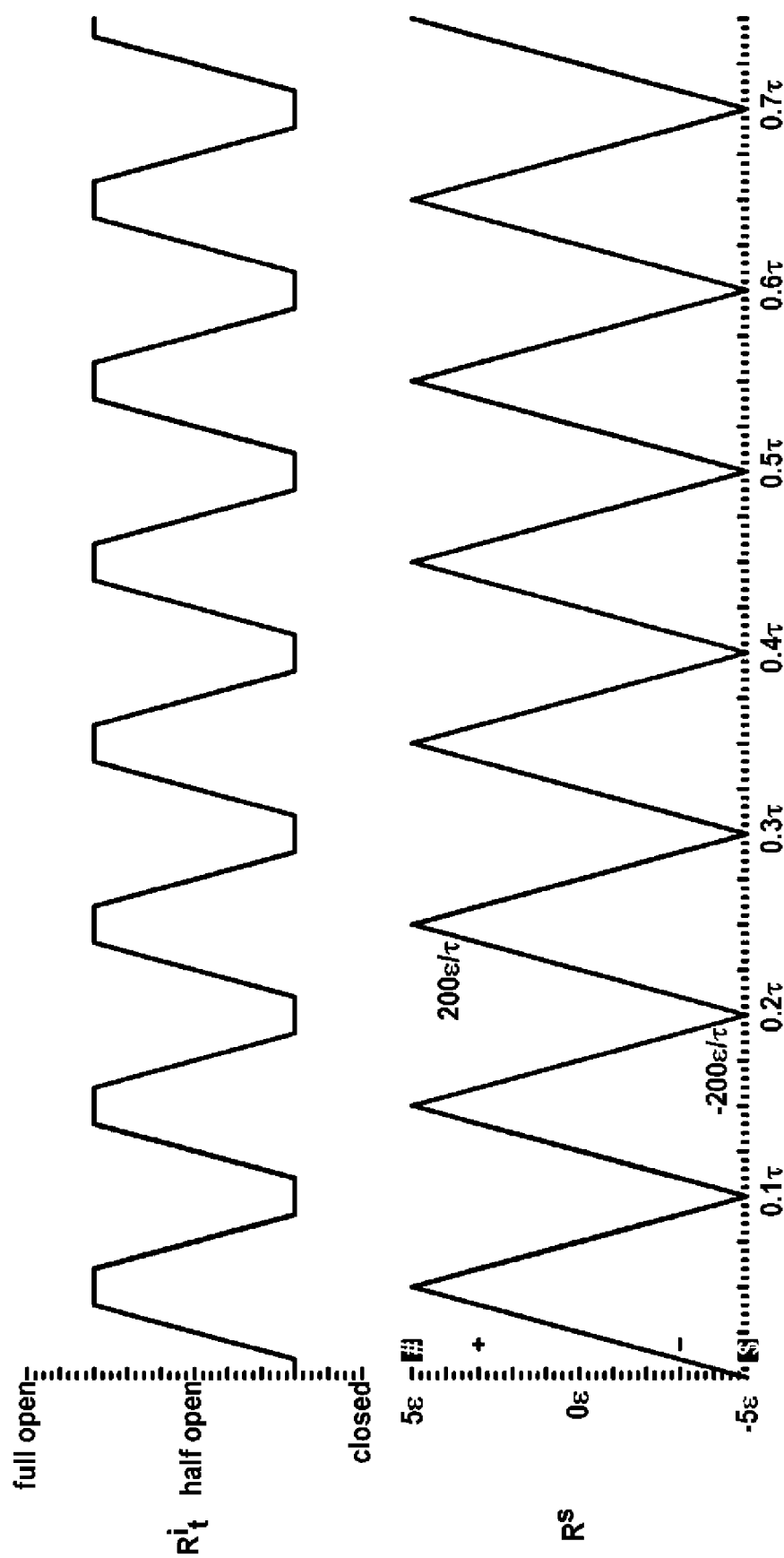
FIG. 67 is an illustration showing a logic diagram for a freely oscillating system.
Figure 69:
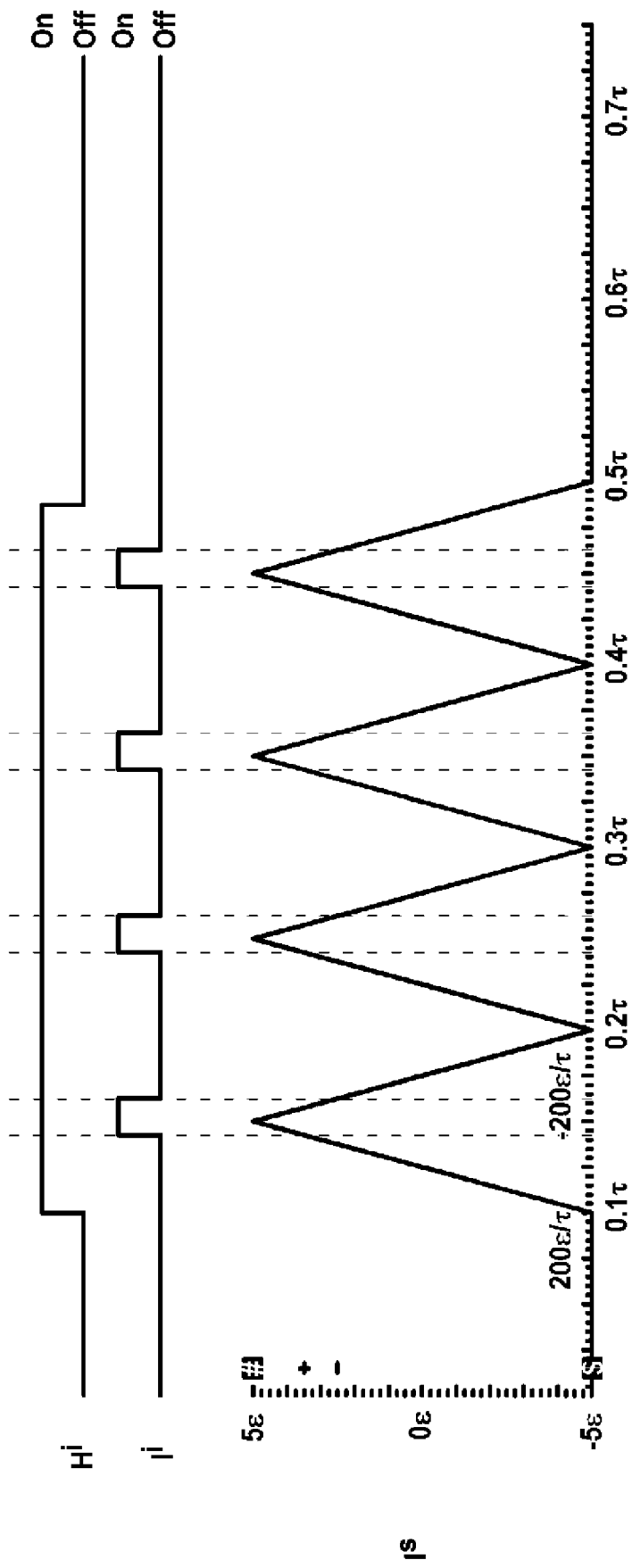
FIG. 69 is an illustration showing a Logic diagram for an Ax system.

A possible Ax system (FIG. 68A-C) is derived from the continuous (smooth) oscillator model (FIG. 66). The Ax system is different from FIG. 66 is two ways. The central tank, I, controls a discrete kinetic valve (different thresholds, also) instead of a continuous valve. In addition, the oscillation is controlled by the kinetic valve H. Again, the thresholds and valve for the hysteresis equilibrium valve is in inverse image. The timing of logic operations is shown in FIG. 69. $I^i$ and $I^s$, depend on $H^i$, which may be an output from a Tie tank system (FIG. 16). The plus, minus, inverted $ and inverted # signs correspond to the I tank thresholds. The broken lines show effects of the tank I thresholds on $I^i$, which is the input to $I^i_t$. The rate of change appears next to the slope of $I^s$.

Potentiation, τ Versus ϵ Internal Properties

Figure 2:
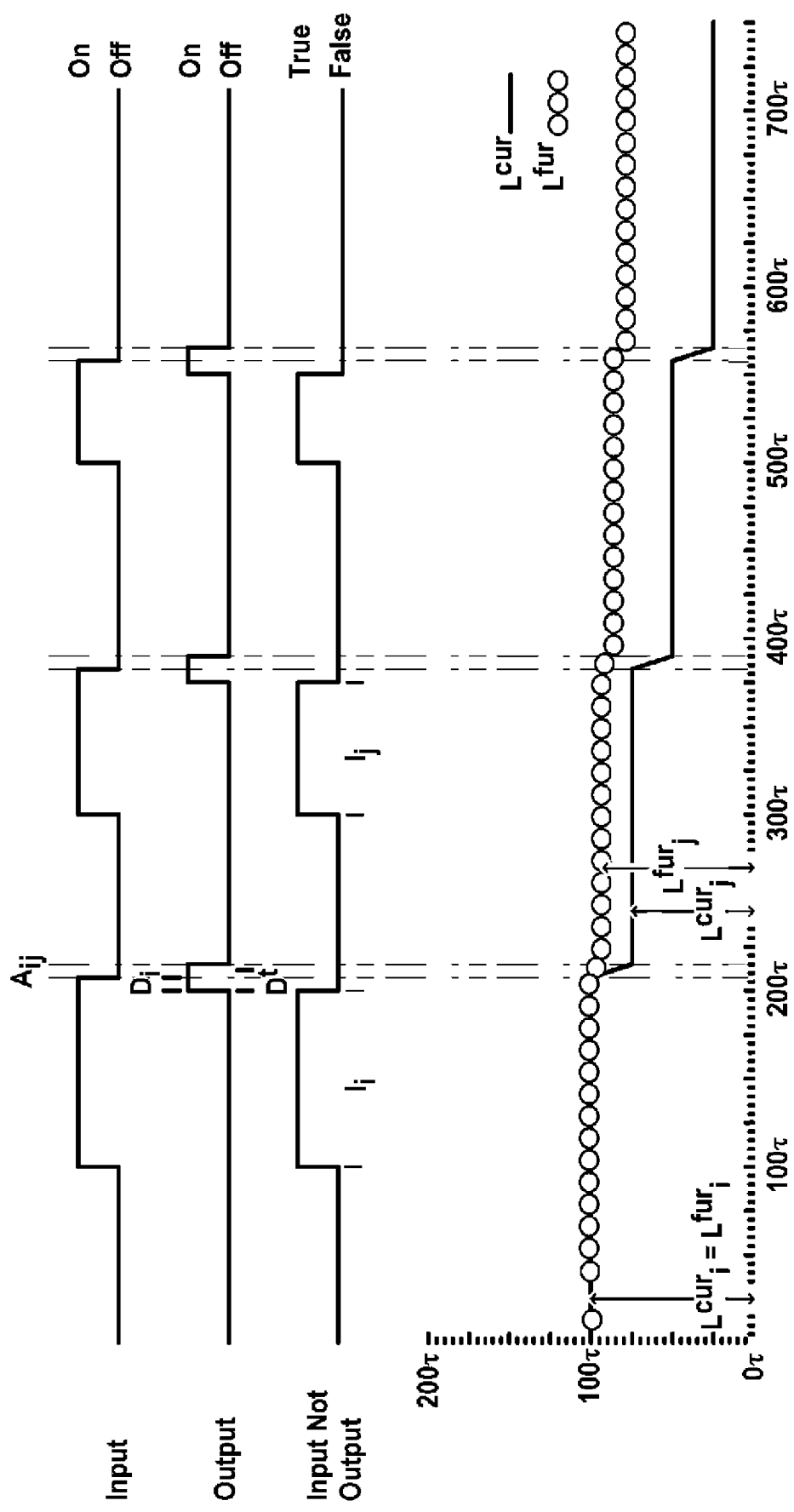
FIG. 2 is an illustration showing τ potentiation of a Den according to the artificial neuron of the present invention.
Figure 3:
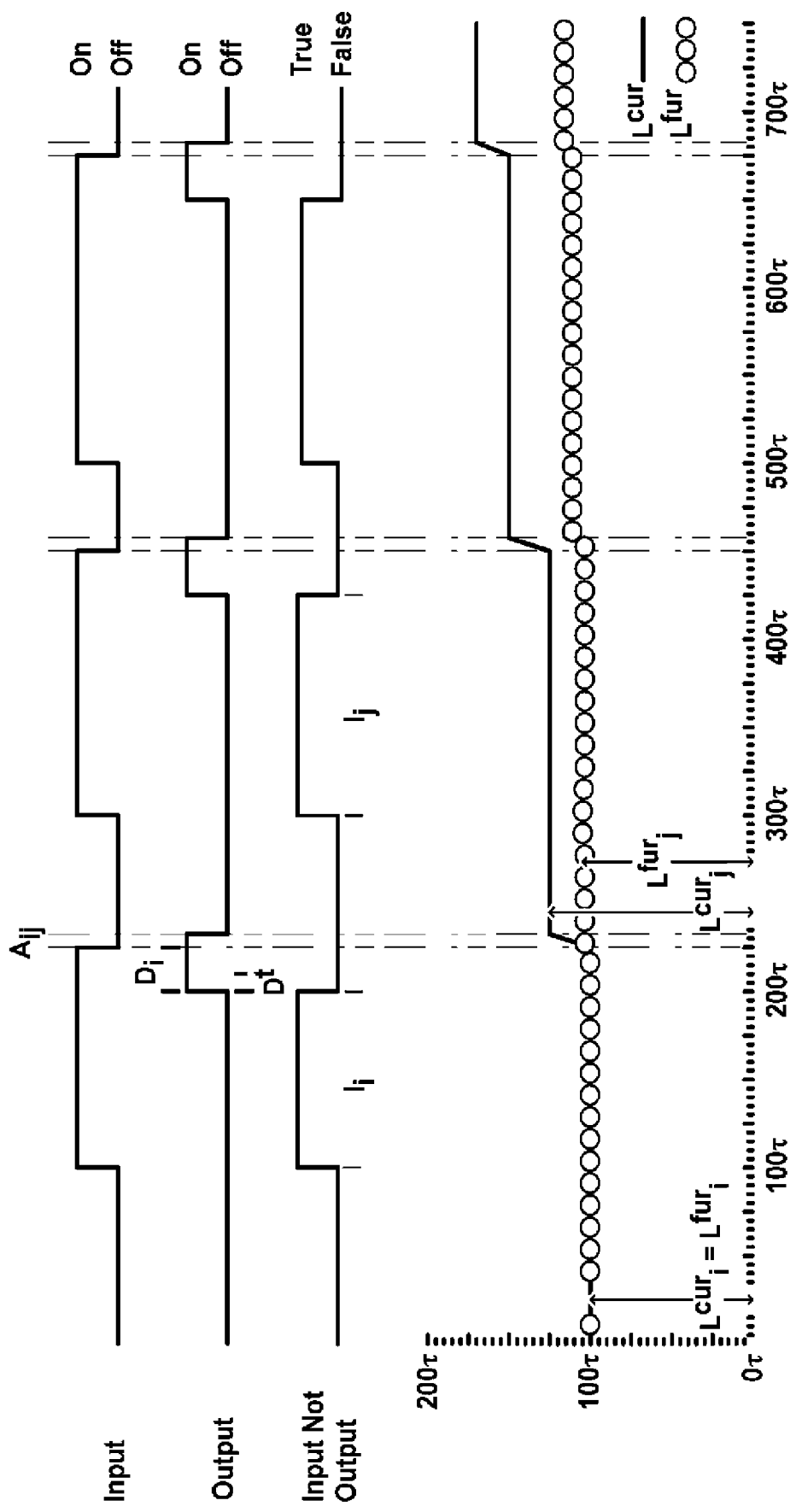
FIG. 3 is an illustration showing τ depotentiation of a Den according to the artificial neuron of the present invention.
Figure 70:
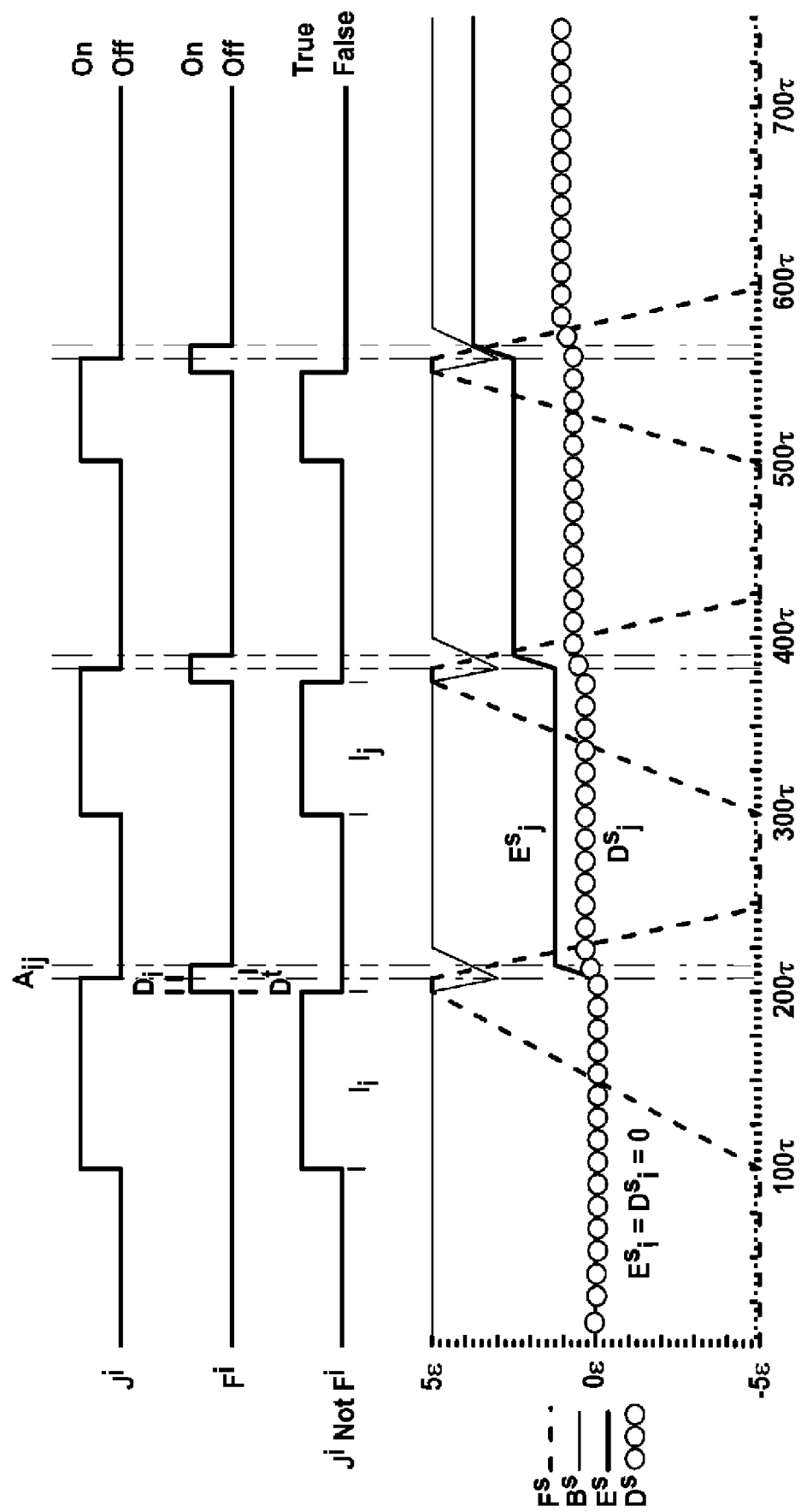
FIG. 70 is an illustration showing a den tank system during 3 bouts of potentiation.
Figure 71:
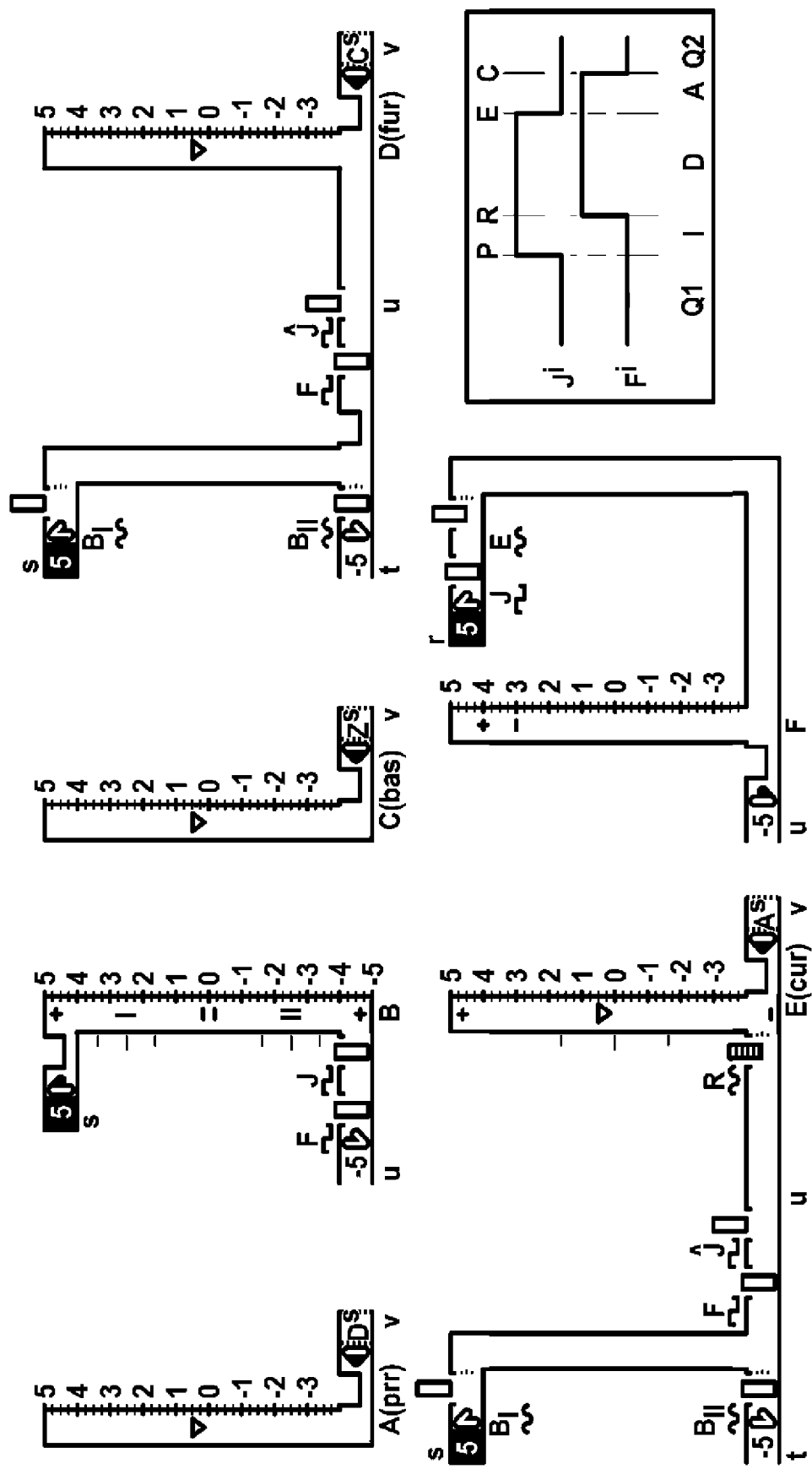
FIG. 71 is an illustration showing a den tank system at Quiescence period 1.

Potentiation was previously defined only in terms of the time unit τ (FIG. 2). Potential latencies, $L^{cur}$, and $L^{fur}$ were defined as internal properties of the Den. Potentiation may also be defined in terms of the Transferant unit E. Tank values may be defined as internal properties of the Den (FIG. 70). These tank values are changed by experience and they determine the values of potential latencies. FIG. 71-79 describe a possible simple Den tank system where potentiation is occurring. The status of the kinetic valve input $J^i$ and output $F^i$ is the same as the simple Den input and output, respectively, described in FIG. 1 in relation to Points and Periods. In FIG. 71 the physical simple Den is in the Quiescence period as indicated by the gray bar in the right lower corner. This time course figure is an abbreviation of FIG. 1. In FIG. 71 there are target tanks A-F, the source tank U and the sink tank N. Tanks D and E have compound FCRs consisting of 3 individual FCRs, s, t and u. The following is true for both the D and the E tanks. The relationship between the source tank value and that of D/E determines if the value of D/E will increase (FCR s). The relationship between the sink tank value and that of D/E determines if the value of D/E will decrease (FCR t). The kinetic valve B, can block the increase. The kinetic valve $B_{II}$ can block the decrease. The kinetic valves F and J-hat can block both the increase and decrease of tank value D/E. The FCR u differs between tank D and E in two ways. For D there is a fixed constriction that is absent from E. Therefore, other factors being equal, D changes more slowly than E. In addition, there is an oscillating kinetic valve that brings randomness into the tank E system. Regarding the subunit as a whole, there are twelve equilibrium valves. The 4 black-bars marked with the number 5 represent the sourcing tank U. The associated equilibrium valves, $B|U_s$, $D|U_s$, $E|U_s$ and $F|U_s$, are characterized by EQU. 52. X represents the target tank and y the associated FCR. The white-bars (no apparent bars due to white background) marked with the number −5 represent the sinking tank N. The four associated equilibrium valves, $B|N_u$, $D|N_t$, $E|N_T$ and $F|N_u$, are characterized by EQU. 53. The maximum increase rate of the target tank is equal to the maximum decrease rate of the target tank (when flow is otherwise unimpeded). The stripe-bars marked with the symbol for "value of tank" represent four tanks serving as non-target tanks associated with "Following" valves (EQU. 54-57).

| | |
|---|---|
| $X\|U_y: \Uparrow X \Rightarrow 5\epsilon$ | EQU. 52 |
| $X\|N_y: \Downarrow X \Rightarrow -5\epsilon$ | EQU. 53 |
| $E\|A_y: \Updownarrow E \Rightarrow A^s$ | EQU. 54 |
| $A\|D_y: \Updownarrow A \Rightarrow D^s$ | EQU. 55 |
| $D\|C_y: \Updownarrow D \Rightarrow C^s$ | EQU. 56 |
| $C\|Z_y: \Downarrow C \Rightarrow Z^s$ | EQU. 57 |

There are three discrete kinetic valves associated with tank F. See EQU. 58. This equation applies for the u channel of tanks B, D and E. There is a continuous kinetic valve associated with tank E. See EQU. 59.

| | |
|---|---|
| $\vee F_u \subset 3\epsilon,\ ^\top F_u \supset 4\epsilon$ | EQU. 58 |
| $\cup E_r \subset -5\epsilon, \cap E_r \supset 5\epsilon$ | EQU. 59 |

There are two sets of continuous kinetic valves associated with tank B. Those valves associated with the $B_I$ part of tank B are described in EQU. 60. This equation applies for the s channel of tanks D and E.

| | |
|---|---|
| $\cup B_{I\text{-}s} \subset 0\epsilon, \cap B_{I\text{-}s} \supset 5\epsilon \therefore$ | EQU. 60 |

Those valves associated with the $B_{II}$ part of tank B are described in EQU. 61. This equation applies for the s channel of tanks D and E. When $B^s$ is greater than 0, the $B_{II-t}$ valves are fully closed and the $B_{I-s}$ valves are partially to fully open. When $B^s$ is less than 0, the $B_{I-s}$ valves are fully closed and the $B_{II-t}$ valves are partially to fully open. Note that the plus and minus threshold order is reversed; tank B section I compared to tank B section II.

$$\cup B_{II-t} \supset 0\epsilon, \cap B_{II-t} \subset -5\epsilon \qquad \text{EQU. 61}$$

$R_u$ is a freely oscillating continuous kinetic valve. The associated tank R is not shown. There are three discrete kinetic valves that are activated by the $J^i$ input (tank J not shown). $J_u$ of tank B is open when $J^i$ is activating (ON) and closed when $J^i$ is non-activating (OFF). $J_u$ of tanks D and E is closed when $J^i$ is activating (ON) and open when $J^i$ is non-activating (OFF); note the ^above the J. All of the discrete kinetic valves are "full": either completely open or completely closed. The steady states of tanks A, C, D and E are shown with triangles. $Z^s=0\epsilon$ and is unaffected by any other tanks in this example of a Den subunit. When the Den tank system is in the Quiescence period for a sufficiently long time the Z value ($0\epsilon$) is obtained for tanks A,C, D and E (Coalescence). The values of tank E and D are inversely related to the values of $L^{cur}$ and $L^{fur}$, respectively. The larger the tank E value, the smaller the $L^{cur}$ value. This is because the larger the tank E value the greater is the potential increase rate of the F tank (at the next challenge) and therefore the sooner the Den system output $F^i$ goes from non-activating to activating (Den output). FIG. 70 shows how the values (states) of tank B, F, D and E ($B^s$, $F^s$, $E^s$ and $D^s$) change when the physical Den demonstrates Apparent Causative functioning.

Den Tanks, Potentiation

Figure 72:
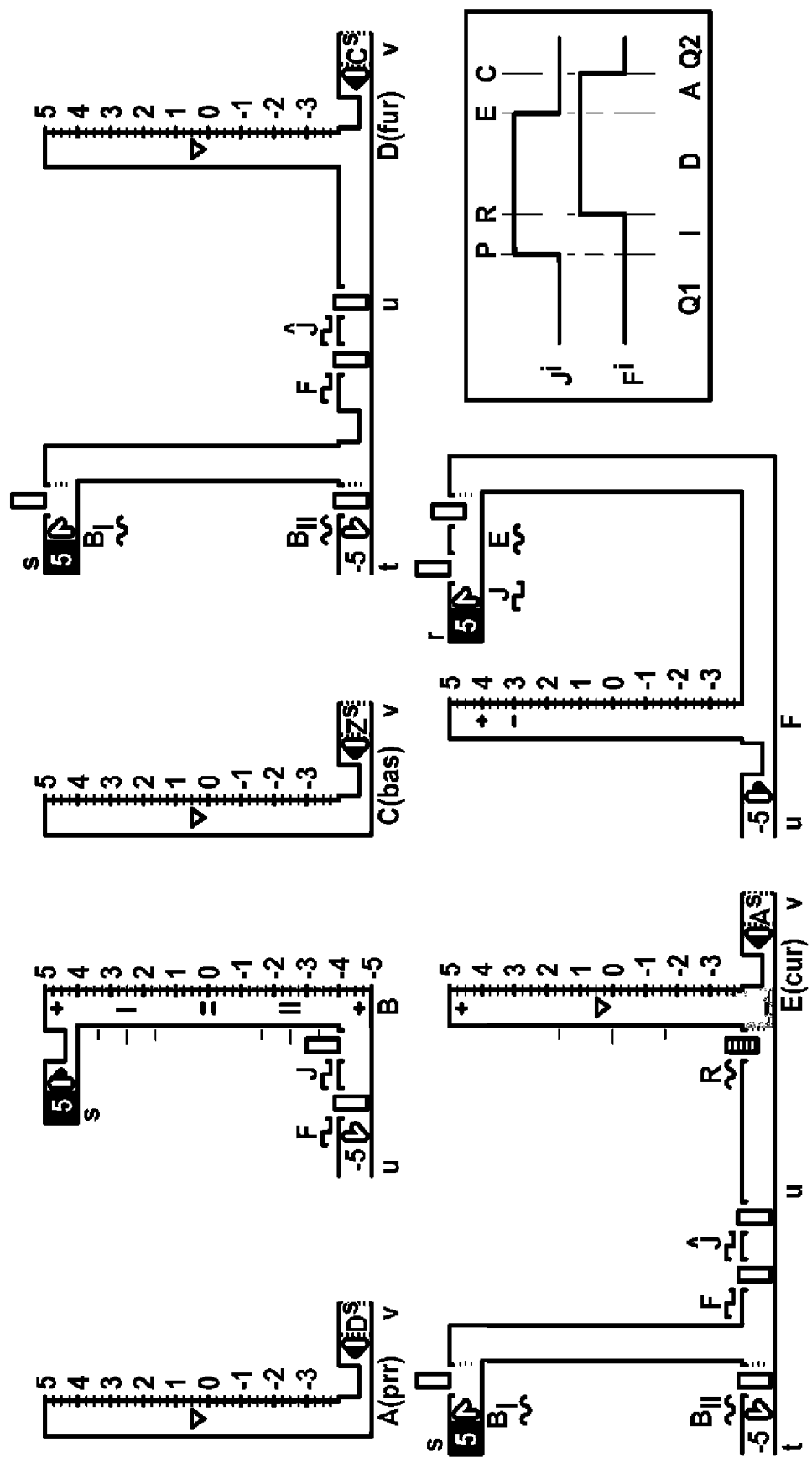
FIG. 72 is an illustration showing a den tank system at Provocation point.
Figure 73:
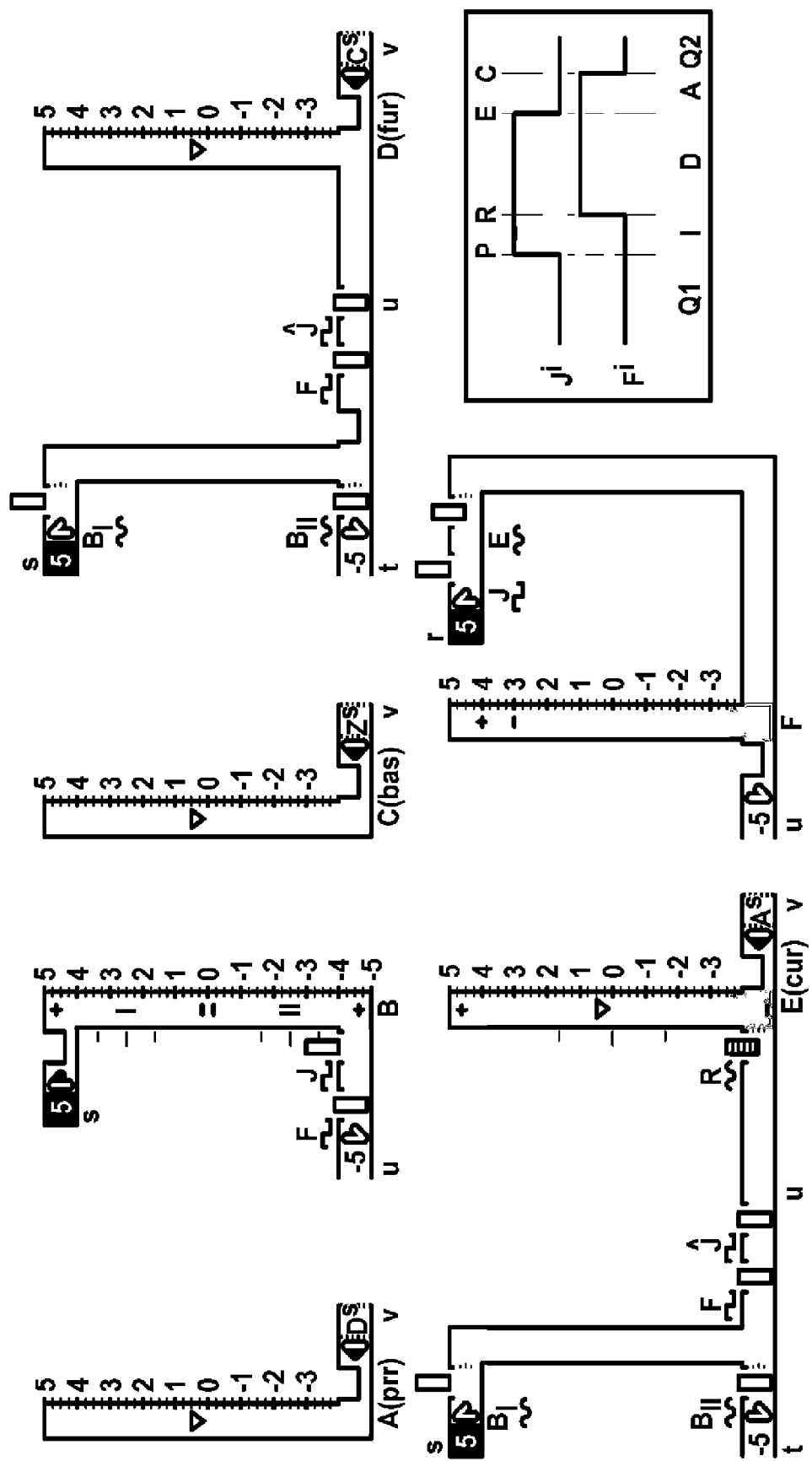
FIG. 73 is an illustration showing a den tank system at Induction period.
Figure 74:
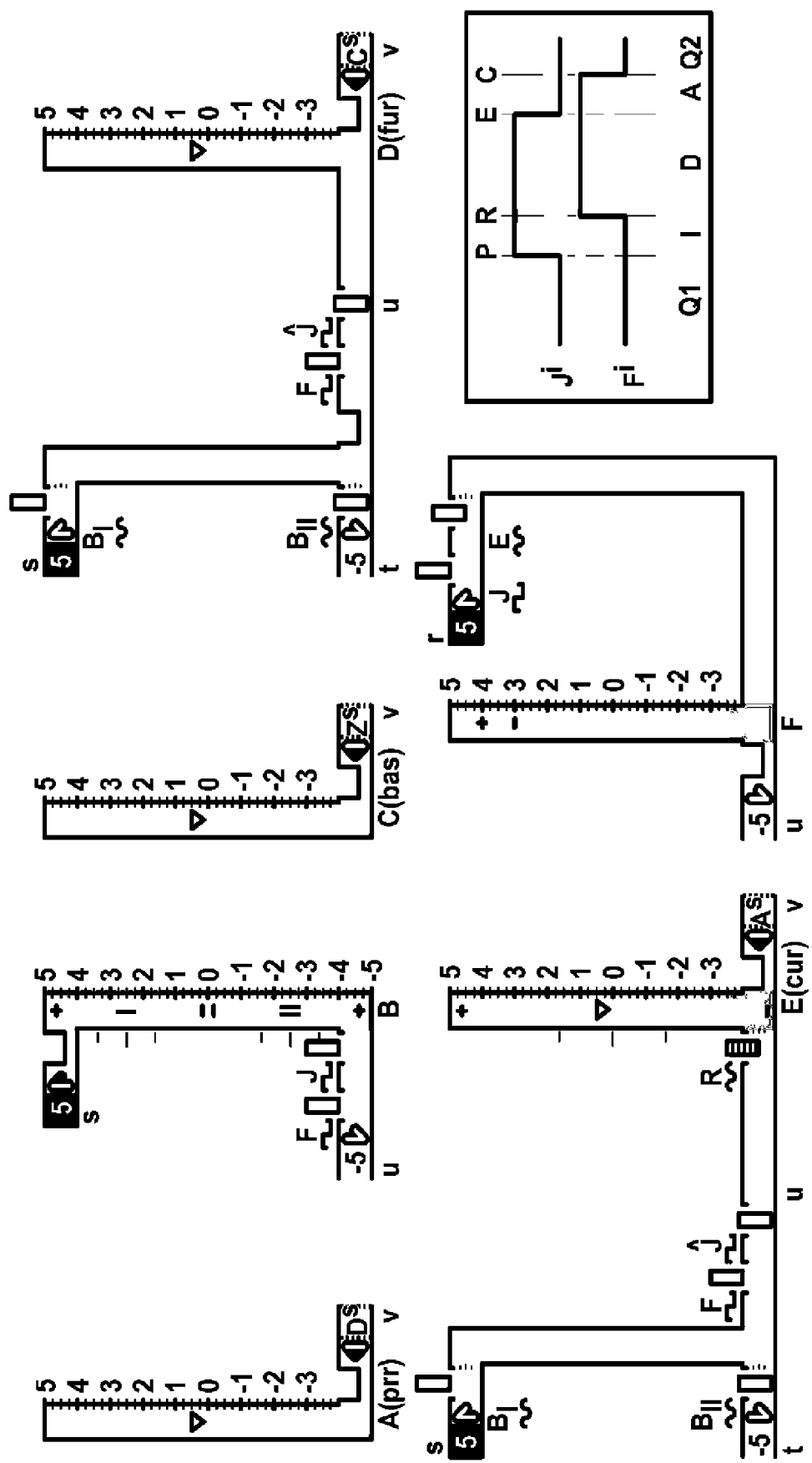
FIG. 74 is an illustration showing a den tank system at Reciprocation point.
Figure 75:
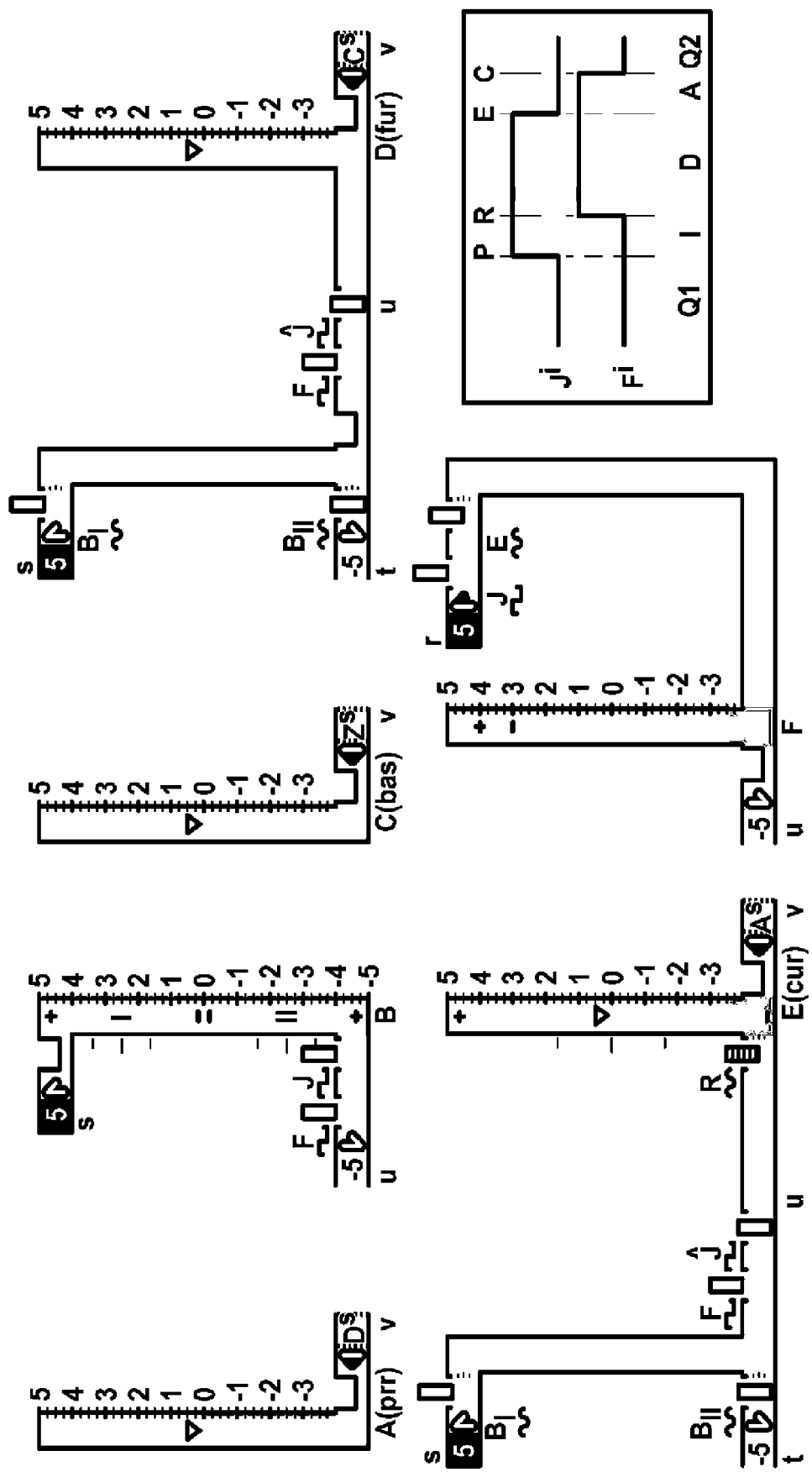
FIG. 75 is an illustration showing a Den tank system at Driving period.
Figure 76:
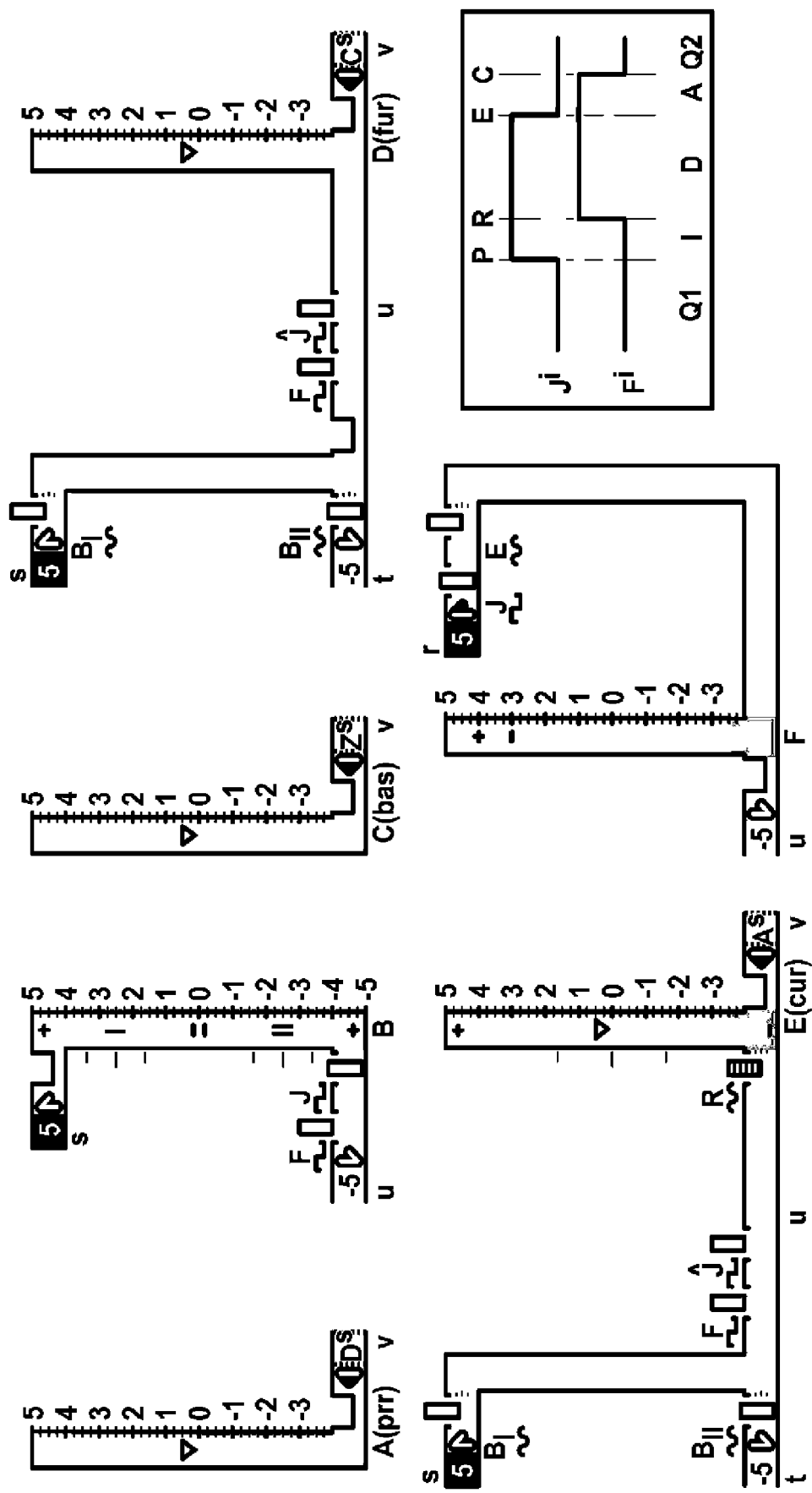
FIG. 76 is an illustration showing a Den tank system at Extinction point in potentiation.
Figure 77:
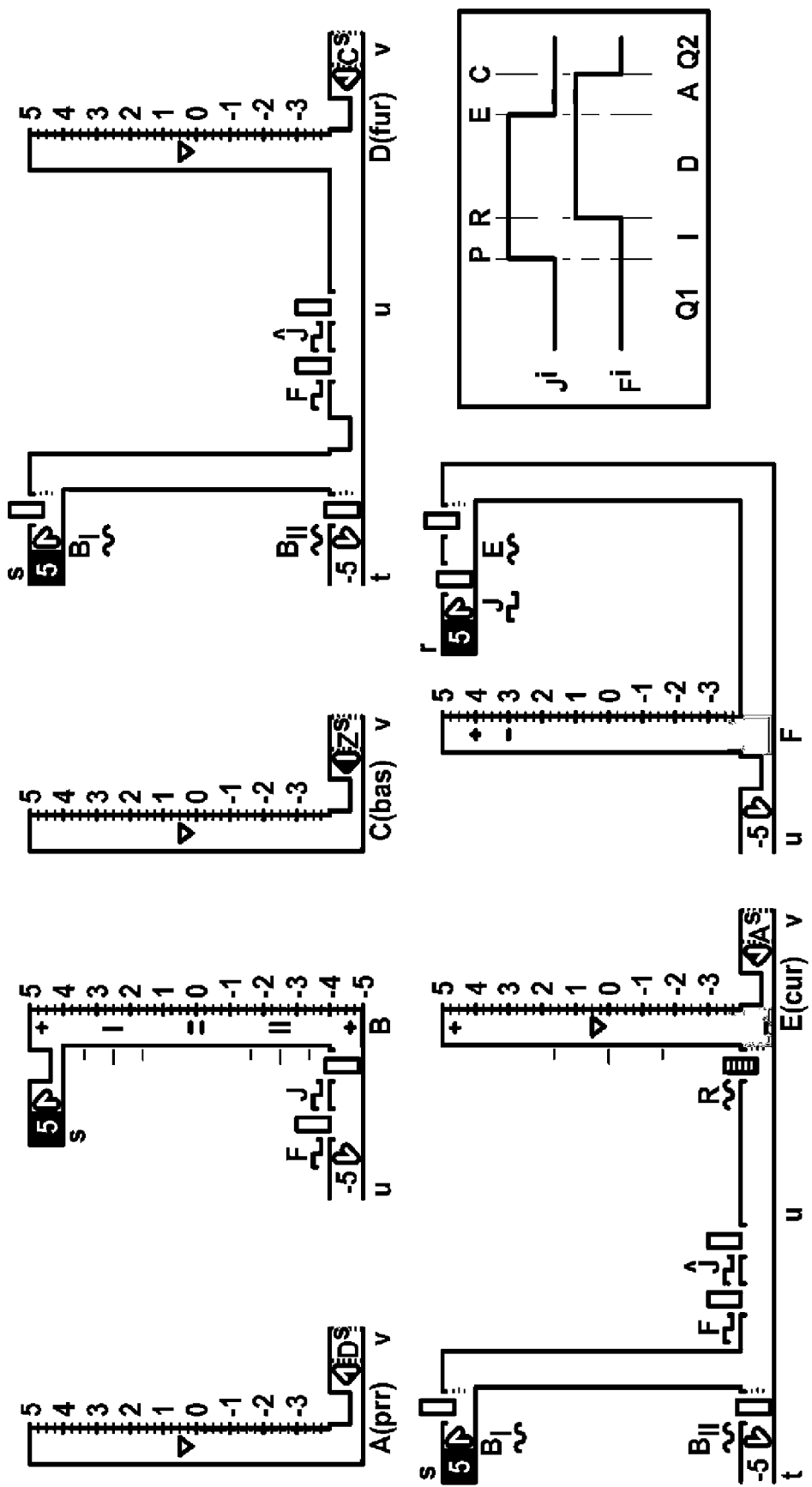
FIG. 77 is an illustration showing a Den tank system at Adjustment period in potentiation.
Figure 78:
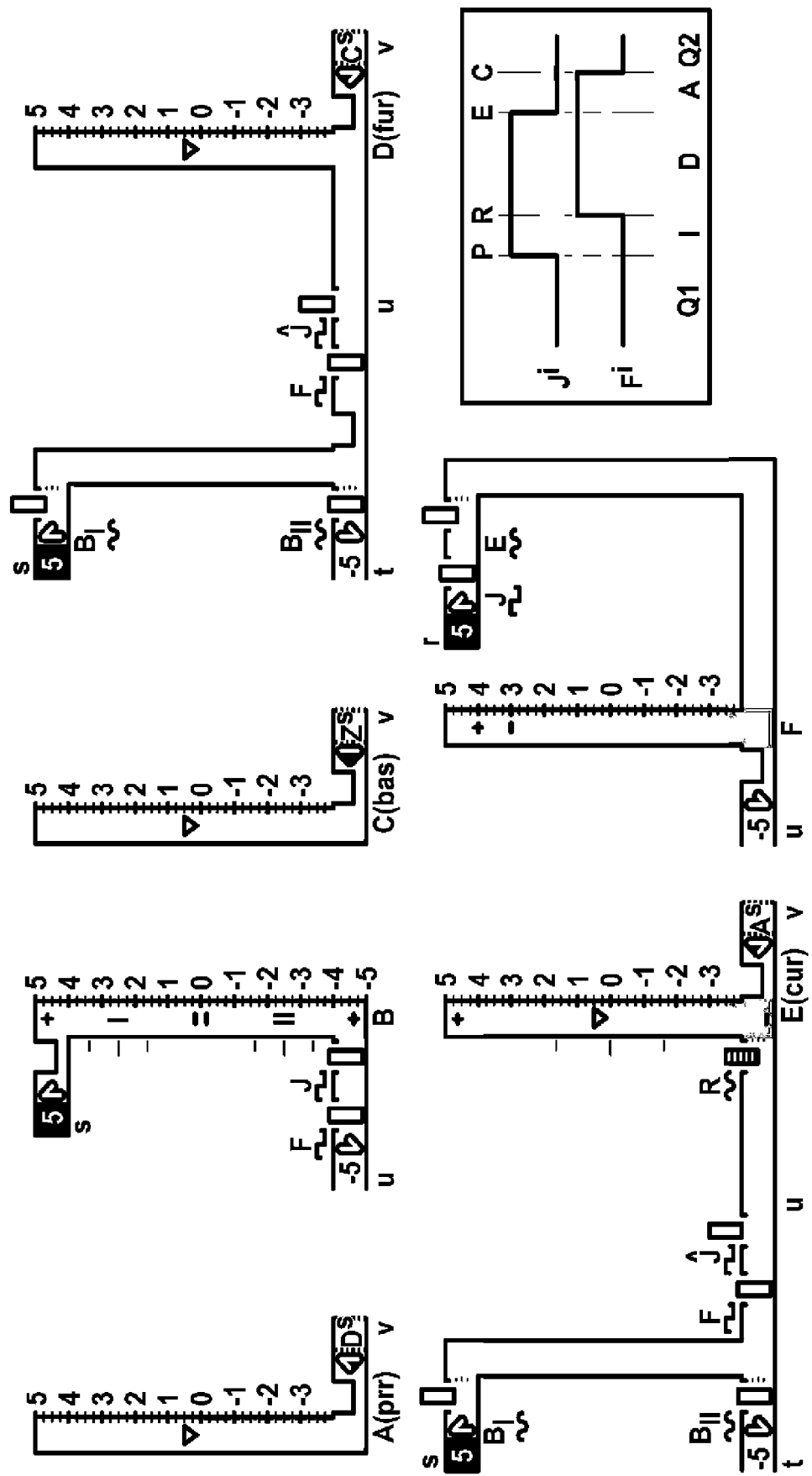
FIG. 78 is an illustration showing a Den tank system at Collapse point in potentiation.
Figure 79:
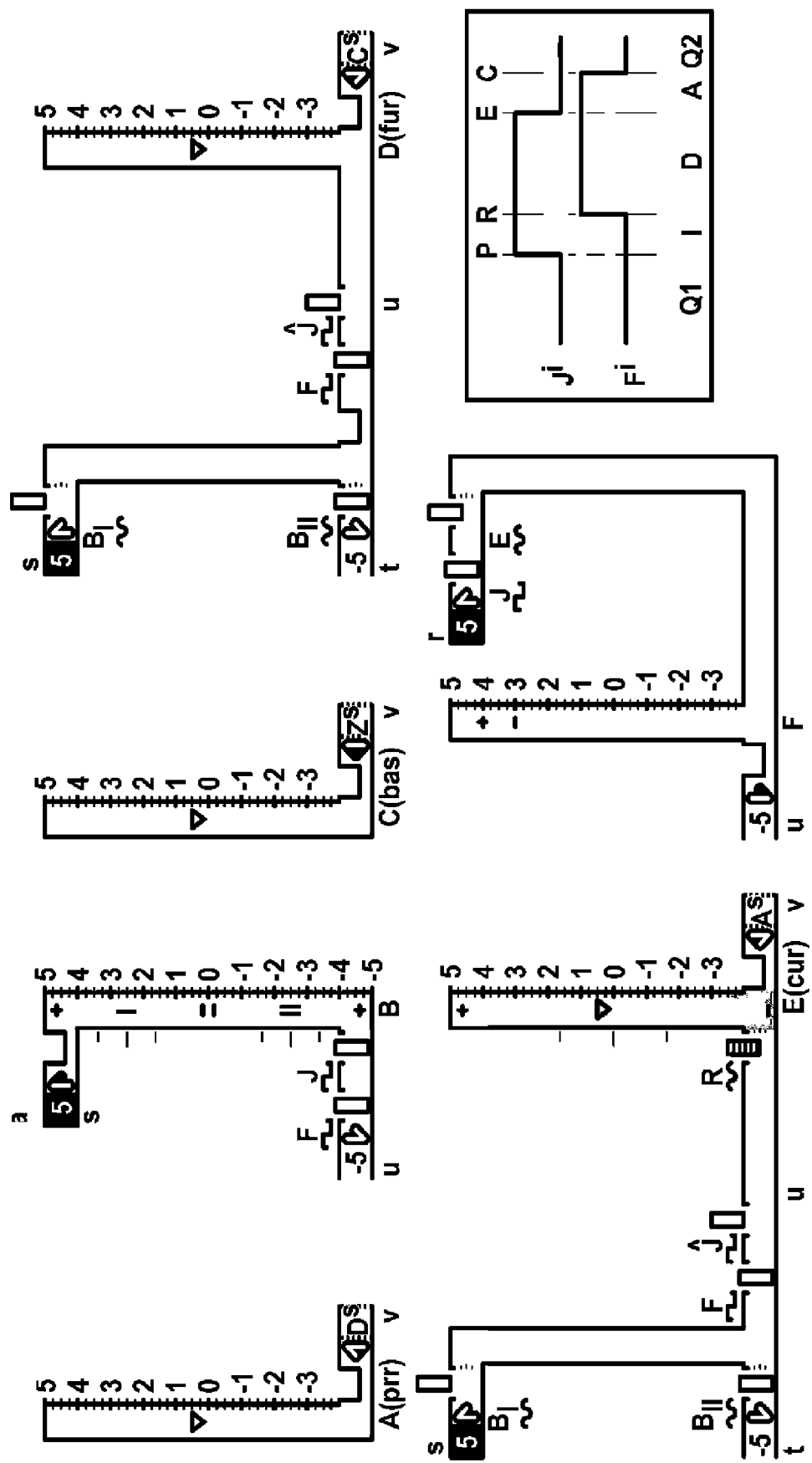
FIG. 79 is an illustration showing a den tank system at Quiescence period 2 in potentiation.

The mechanics of potentiation in the physical simple Den is illustrated in FIG. 71-79. The relative input/output timing for this potentiation in this system is depicted in FIG. 70. FIG. 71-79 show a progress of a single challenge ($J^i$ goes from non-activating to activating). FIG. 70 shows that challenge and two additional challenges. The "Following" valves cause very little change in tanks to occur in the short span of the potentiation event (Induction period to start of second Quiescence period). Such changes are therefore not depicted here. FIG. 71 shows the Quiescence period. $J^i$ and $F^i$ are non-activating. Since $C^s=Z^s(0\epsilon)$, simple Following equilibrium valve $C|Z_v$ does not influence $C^s$. Since $D^s=C^s$, simple Following equilibrium valve $D|C_v$ does not influence $D^s$. Since $A^s=D^s$, simple Following equilibrium valve $A|D_v$ does not influence $A^s$. Since $E^s=A^s$, simple Following equilibrium valve $E|A_v$ does not influence $E^s$. The sink tank is blocked from influencing tank B. Both the sink and source tank is blocked from influencing tanks E and D. The source tank is blocked from influencing tank F. Compare FIG. 70. FIG. 72 shows $J^i$, the input of the Den, as activating. The source tank may now influence $F^s$. Since FCR u of tank F is constricted, $F^s$ will increase. The rate of increase in $F^s$ will be modified by the E kinetic valve. FIG. 73 shows $F^s$ increasing. In FIG. 74, $F^s$ has reached the plus kinetic valve threshold. $F^i$, the output of the Den, is now activating. In addition, the sink tank may now influence $B^s$. Since FCR s of tank B is constricted, $B^s$ will decrease. In FIG. 75, $B^s$ has decreased and the FCR s of tanks D and E is being modified by the closing of the kinetic valve $B_I$. In FIG. 76, $J^i$, the input of the Den, in now non-activating. The sink tank is blocked from influencing tank B. Therefore $B^s$ increases. The source tank may now influence $D^s$ and $E^s$. $D^s$ and $E^s$ begin to increase. The rate of increase is greater for $E^s$ than $D^s$ because there is a constriction in FCR u of tank D. The source tank is blocked from influencing tank F again. $F^s$ begins to decrease. FIG. 77, $B^s$, $D^s$ and $E^s$ continue to increase. Valve R introduces a random element into the increase in $E^s$, more so the slower the oscillation. $F^s$ continues to decrease. In FIG. 78, $F^s$ has reached the minus kinetic valve threshold. $F^i$, the output of the Den, is now non-activating. The source tank is blocked from influencing tanks D and E again. $F^s$ continues to decrease. $B^s$ continues to increase. FIG. 79, the second Quiescence period looks like the first except that now $D^s$ and $E^s$ are greater. Because $E^s$ is greater, the next Induction period, if it occurs soon, will be shorter than the first: $L^{cur}_j < L^{cur}_i$ for potentiation.

Den Tanks, Depotentiation

Figure 80:
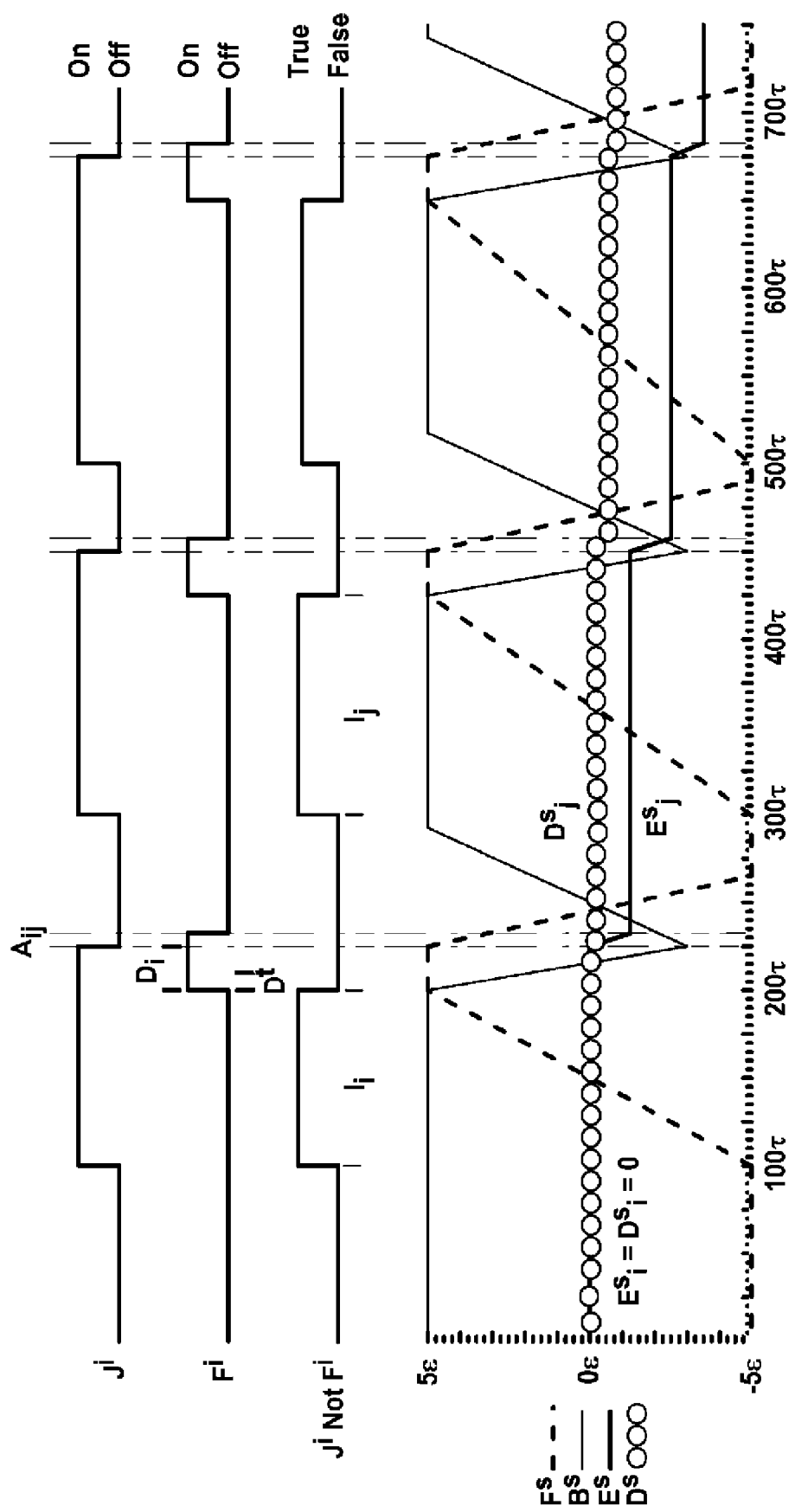
FIG. 80 is an illustration showing a den tank system during 3 bouts of depotentiation.
Figure 81:
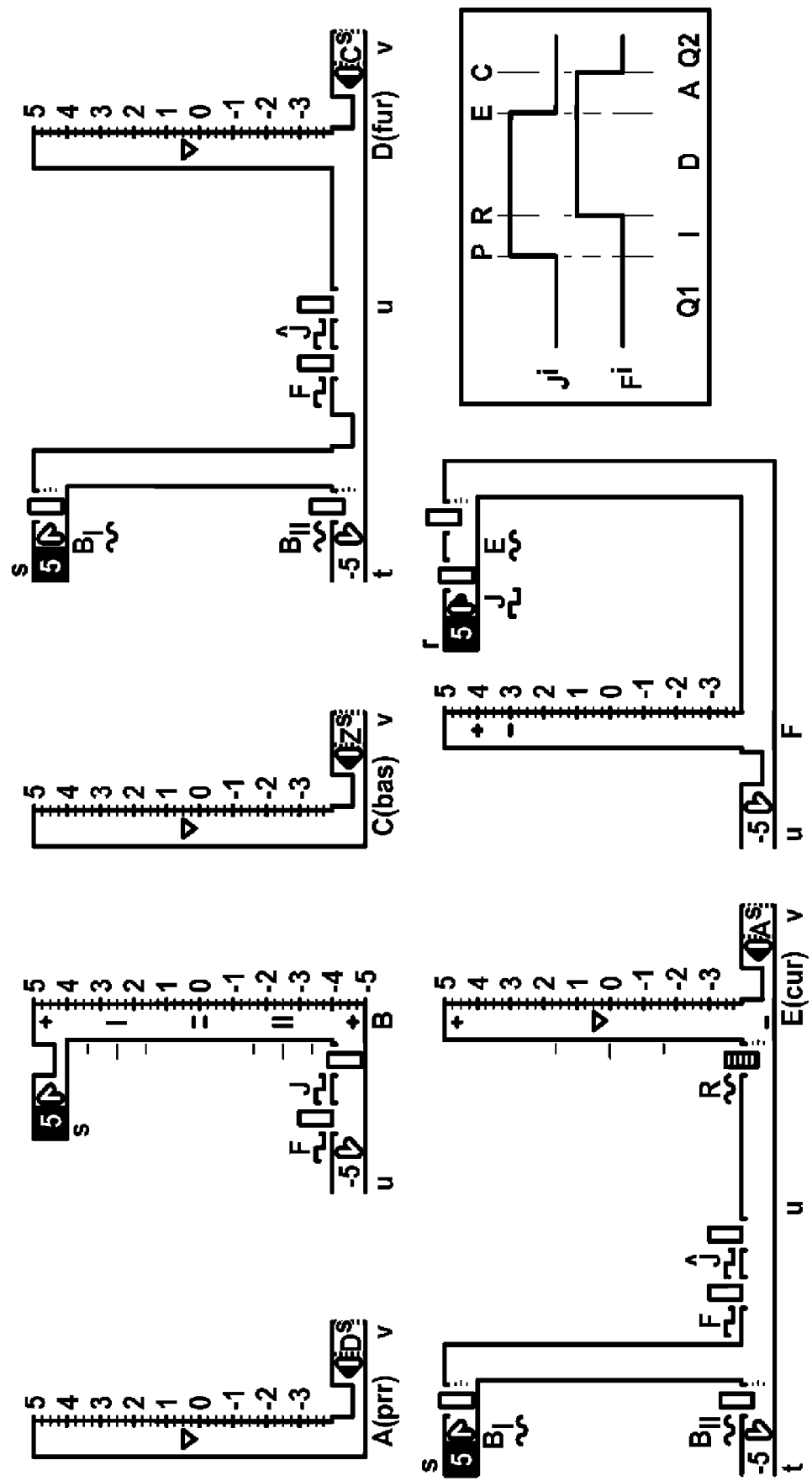
FIG. 81 is an illustration showing a den tank system at Extinction point in depotentiation.
Figure 82:
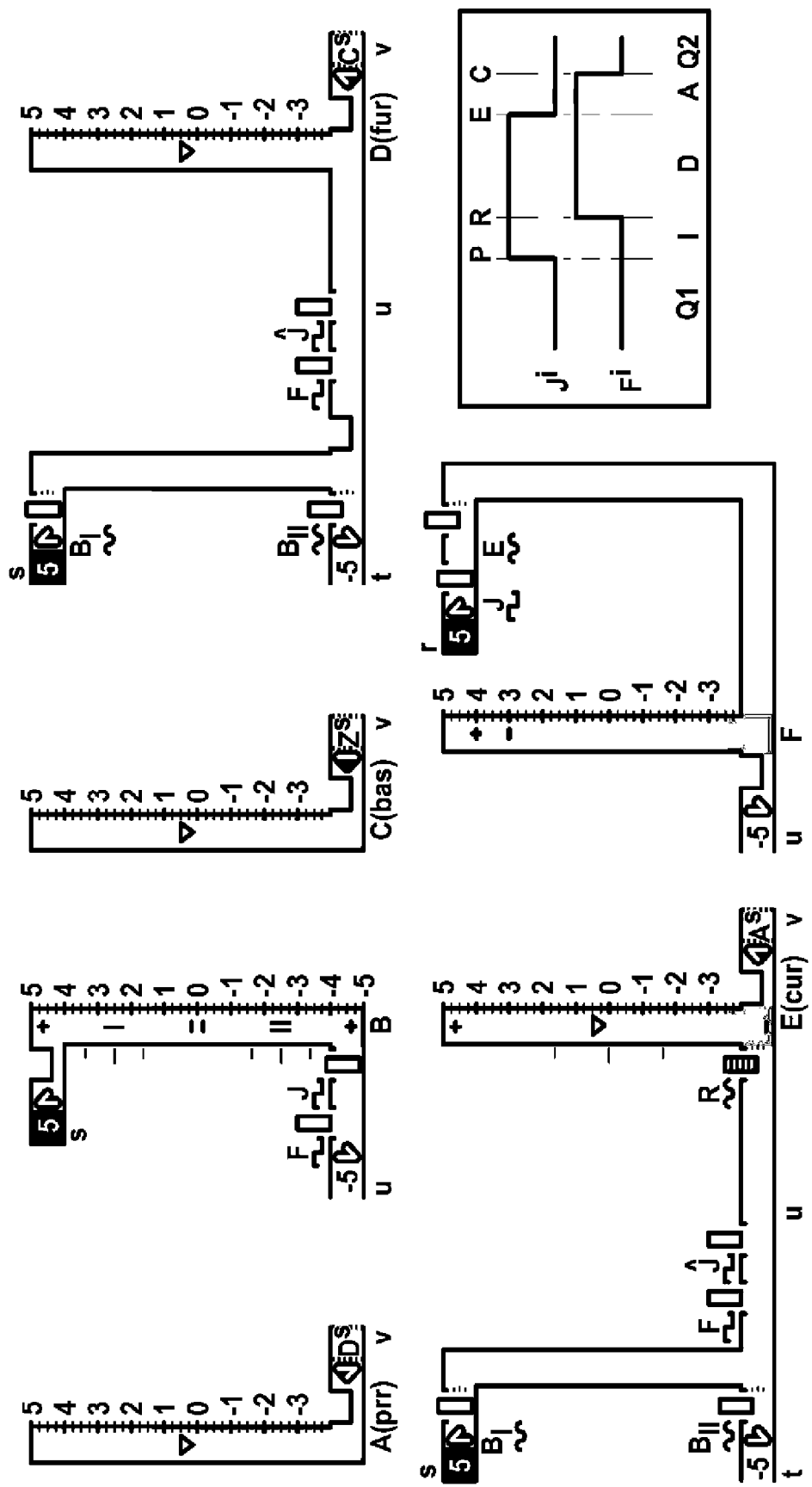
FIG. 82 is an illustration showing a den tank system at Adjustment period in depotentiation.
Figure 83:
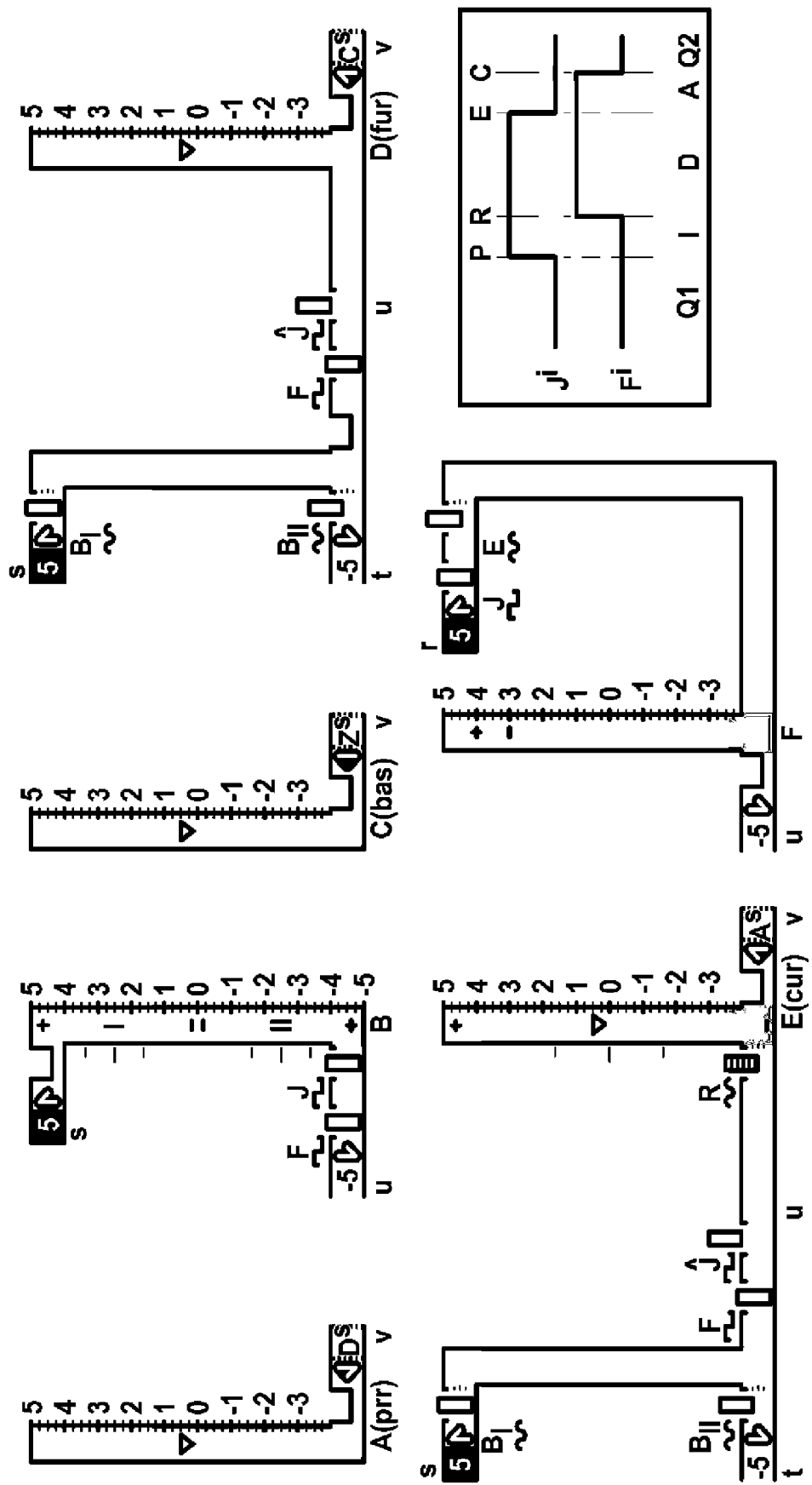
FIG. 83 is an illustration showing a den tank system at Collapse point in depotentiation.
Figure 84:
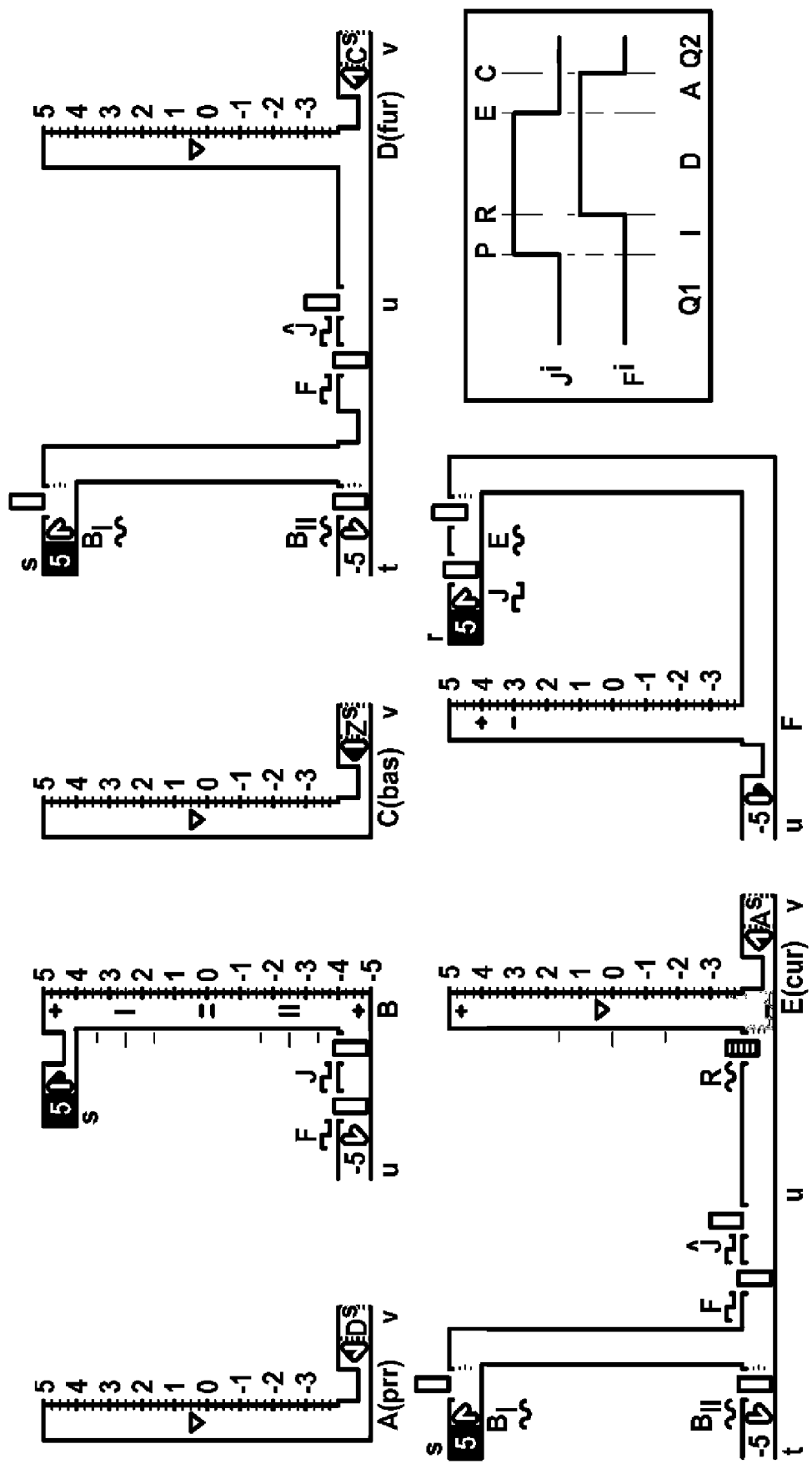

The mechanics of depotentiation in the physical simple Den is illustrated in FIG. 71-75 and FIG. 81-84. The relative input/output timing for this depotentiation in this system is depicted in FIG. 80. FIG. 71-75, 81-84 show a single challenge ($J^i$ goes from non-activating to activating). FIG. 80 shows that challenge and two additional challenges. The "Following" valves cause very little change in tanks to occur in the short span of the potentiation event (Induction period to second Quiescence period). Such changes are therefore not depicted here. The first 5 steps for potentiation and depotentiation are the same (FIG. 71-75). The last 4 steps in FIG. 76-79 are peculiar to potentiation. The last 4 steps in FIG. 81-84 are peculiar to depotentiation. In FIG. 81, $J^i$, the input of the Den, in now non-activating. The sink tank is blocked from influencing tank B. Therefore $B^s$ increases. Due to $B^s$, kinetic valve $B_{I-s}$ for tanks D and E blocks the influence of the source tank. Due to $B^s$, kinetic valve $B_{II-t}$ for tanks D and E partially unblocks the influence of the sink tank. $D^s$ and $E^s$ begin to decrease. The rate of decrease is greater for $E^s$ than $D^s$ because there is a constriction in FCR u of tank D. The source tank is blocked from influencing tank F again. $F^s$ begins to decrease. FIG. 82, $B^s$, $D^s$ and $E^s$ continue to decrease. Valve R introduces a random element into the decrease in $E^s$, more so the slower the oscillation. $F^s$ continues to decrease. In FIG. 83, $F^s$ has reached the minus kinetic valve threshold. $F^i$, the output of the Den, is now non-activating. The sink tank and the source tank is blocked from influencing tanks D and E again. $F^s$ continues to decrease. $B^s$ continues to increase. FIG. 84, the second Quiescence period looks like the first except that now $D^s$ and $E^s$ are less. Because $E^s$ is less, the next Induction period will be longer than the first: $L^{cur}_j > L^{cur}_i$ for depotentiation.

Den Tank, Aborted Input

Figure 85:
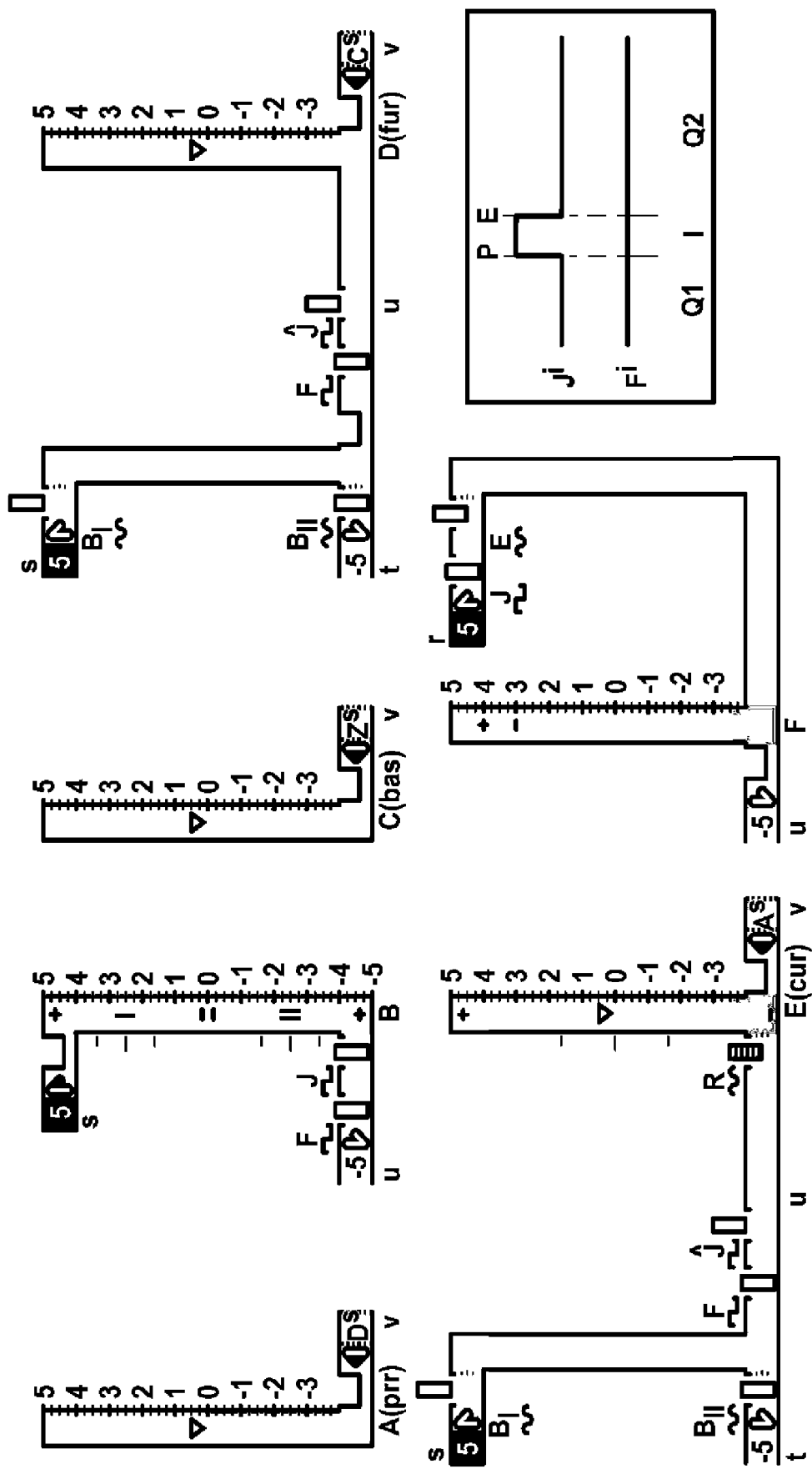

In the case where $J^i$ becomes activating and then non-activating before $F^i$ becomes activating, $D^s$ and $E^s$ are unaffected. This may be described with FIG. 71-73 (same as for potentiation and depotentiation), FIG. 85 and then FIG. 71 again (the first and second Quiescence period are the same).

Figure 86:
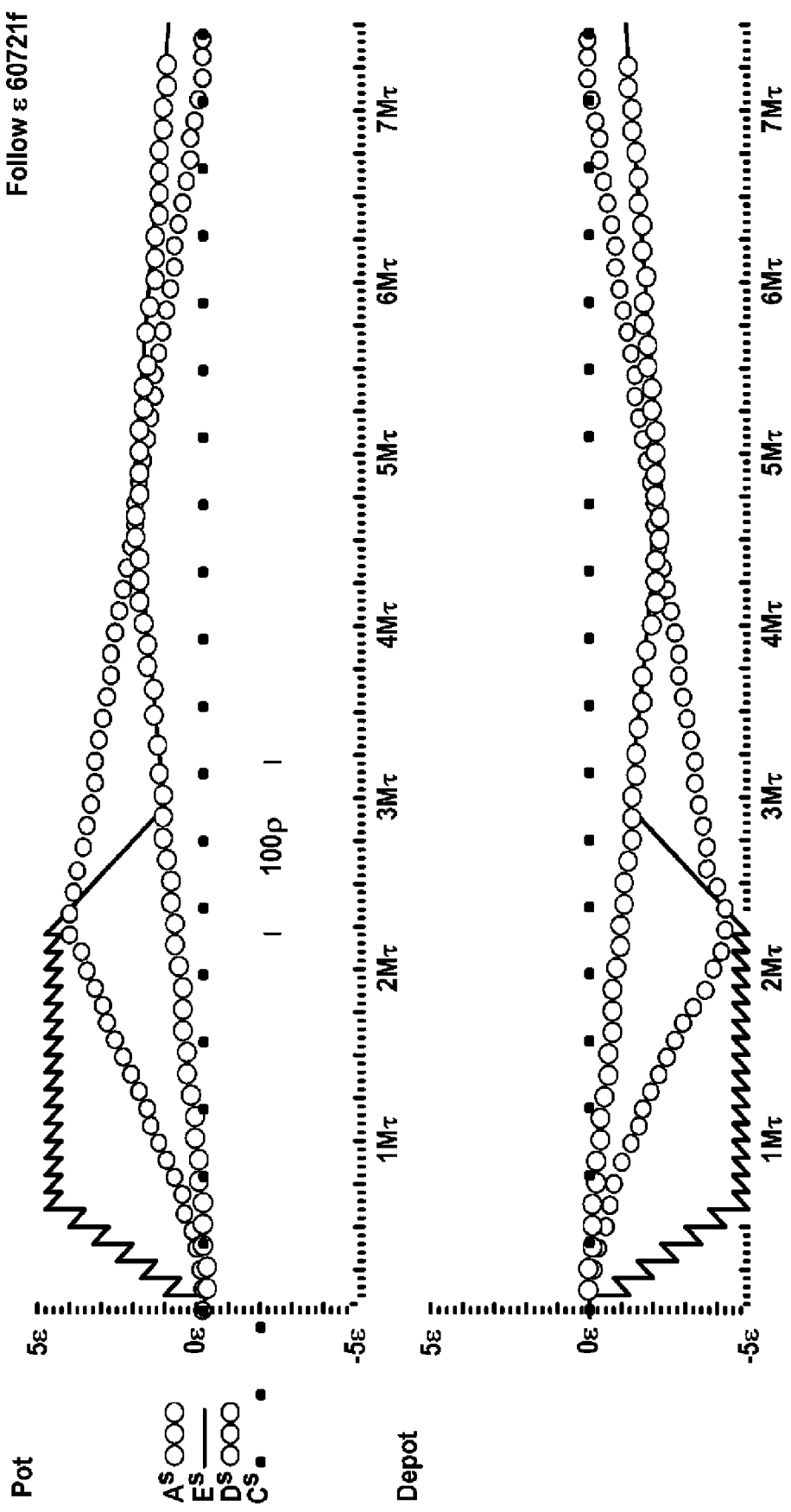

Following, $\tau$ Versus $\epsilon$ Internal Properties $E^s$ determines $L^{cur}$ (as described above). When $E^s$ decreases then $L^{cur}$ increases. When $E^s$ increases then $L^{cur}$ decreases. Similarly $A^s$, $D^s$, $C^s$, determine $L^{prr}$, $L^{fur}$ and $L^{bas}$, respectively. $E^s$ Follows $A^s$ which Follows $D^s$ which Follows $C^s$. Similarly $L^{cur}$ Follows $L^{prr}$ which Follows $L^{fur}$ which Follows $L^{bas}$ (Coalescence). This Following is "simple Following" type. Compare depotentiation, potentiation and Coalescence in FIG. 4 and FIG. 86.

Multiple Input Den Tank System

Figure 87:
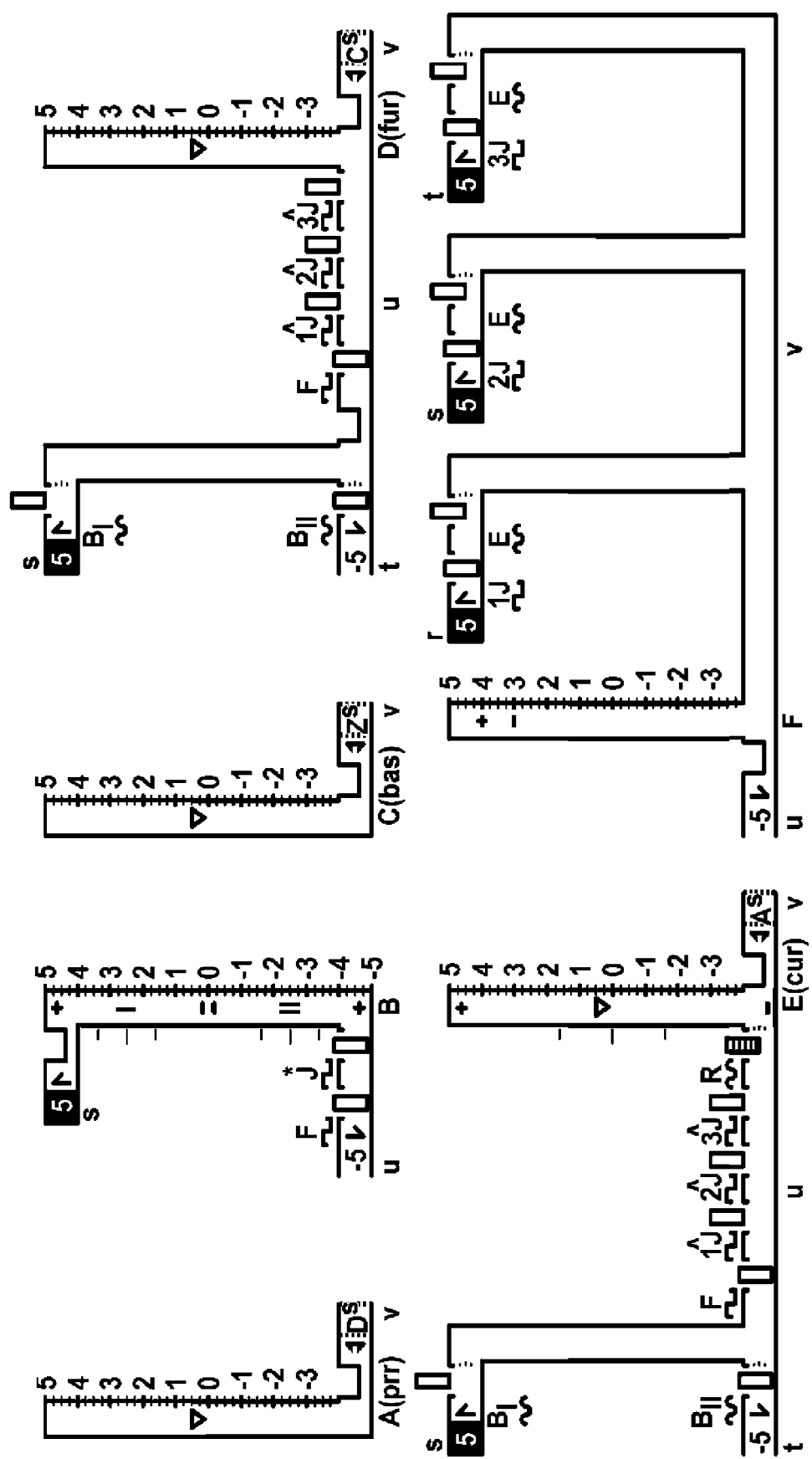

FIG. 87 shows a possible multiple input Den tank system in the Quiescence period. Compare to FIG. 71, the simple Den tank system in the Quiescence period. The main difference is that the multi-input system has more J kinetic valves. There are three different J tanks, 1J, 2J and 3J that can energize the corresponding valves. The J tanks are not shown. They might come from 3 different Syns. See FIG. 16. There are three instead of one F tank arm controlled by the E tank. The valve designated by J with an asterisk above signifies the logical formula 1J' OR 2J' OR 3J'. If any J input is activating then the J* valve will be full open otherwise full closed. If more that one J input is activating at the same time, then Induction will be shorter akin to the Orr system (FIG. 62). The behavior of the tank system multiple input Den is illustrated by FIG. 15, which was discussed earlier.

Brain Inputs and Outputs

Figure 88:
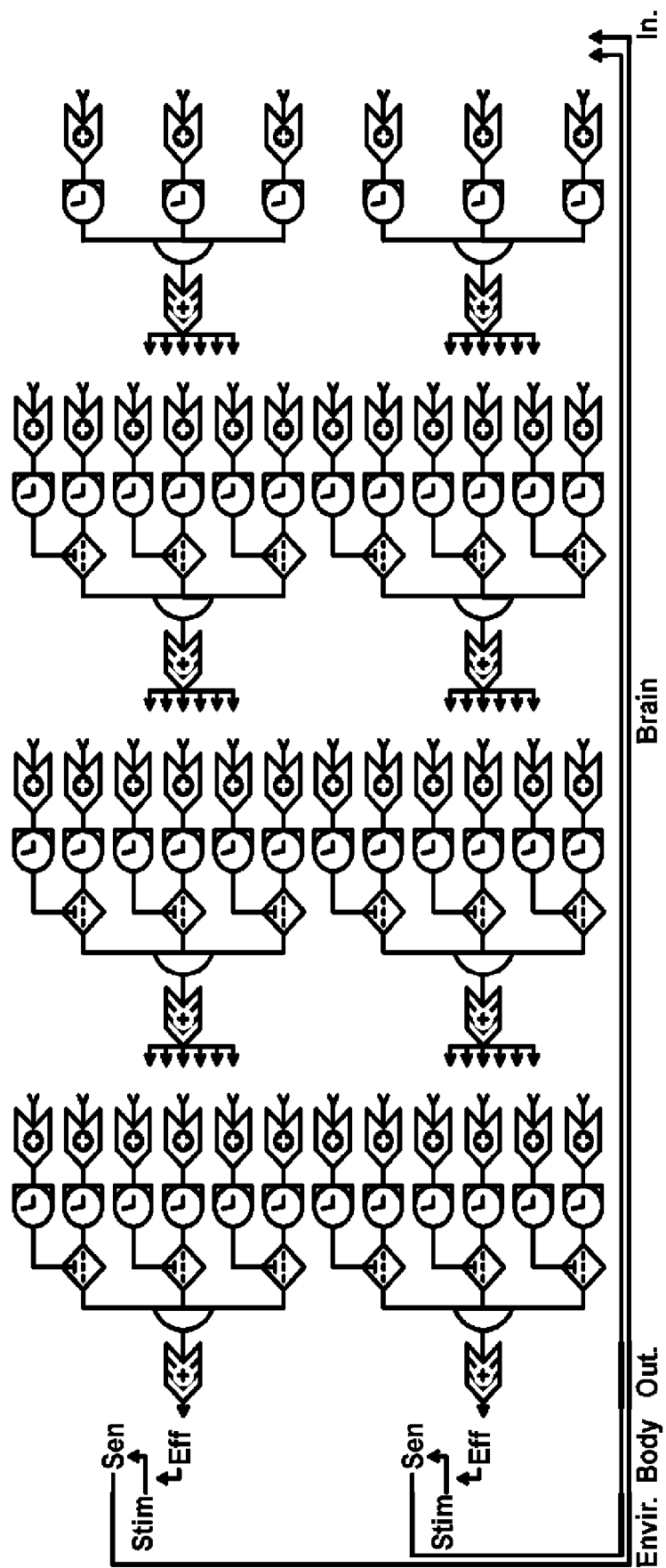
Figure 89D:
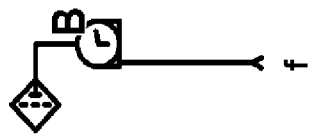
Figure 89C:
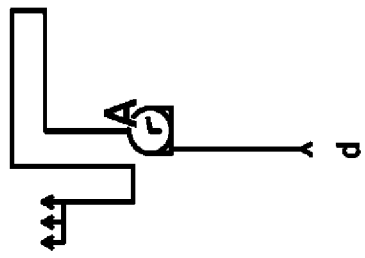
Figure 89B:
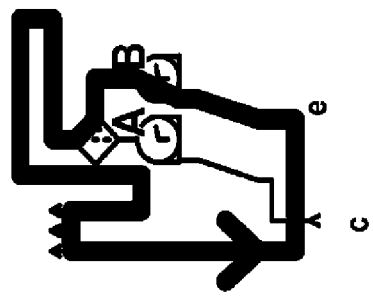
Figure 89A:
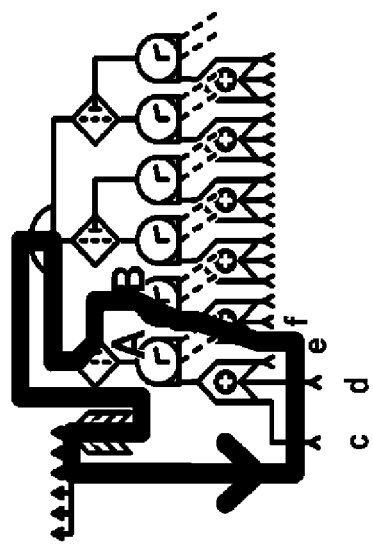

FIG. 88 shows how the Ron brain might be interfaced with a physical environment. In reaction to the stimuli (Stim) from the environment (Envir.), sensors (Sen) from the body of an artificial animal present activating and non-activating input (In.) signals to some Rons in the brain. Signals may be static or pulsatile. Stimuli may arise from the external environment or the internal environment (sensors within the body or within the brain). Rons interact with one another until signals are output (Out.) from the brain. Outputs energize effectors (Eff) to block stimuli (Stim) in the environment that are causing activating signals to present to the brain. The rapid and repeated blocking of such activating inputs will potentiate Rons and facilitate the development of primed circuits. For clarity, the Rons that receive inputs from the environment are depicted with a simpler functional-type than the other Rons in FIG. 88. The interconnections between Rons are not shown. The greater the number of Rons, which are randomly interconnected, the greater the number and diversity of happenstance circuits present in the artificial brain. Experience will determine which circuits are primed. Such happenstance complex circuits are discussed below.

Seizure, Beneficial Oscillation

Figure 24:
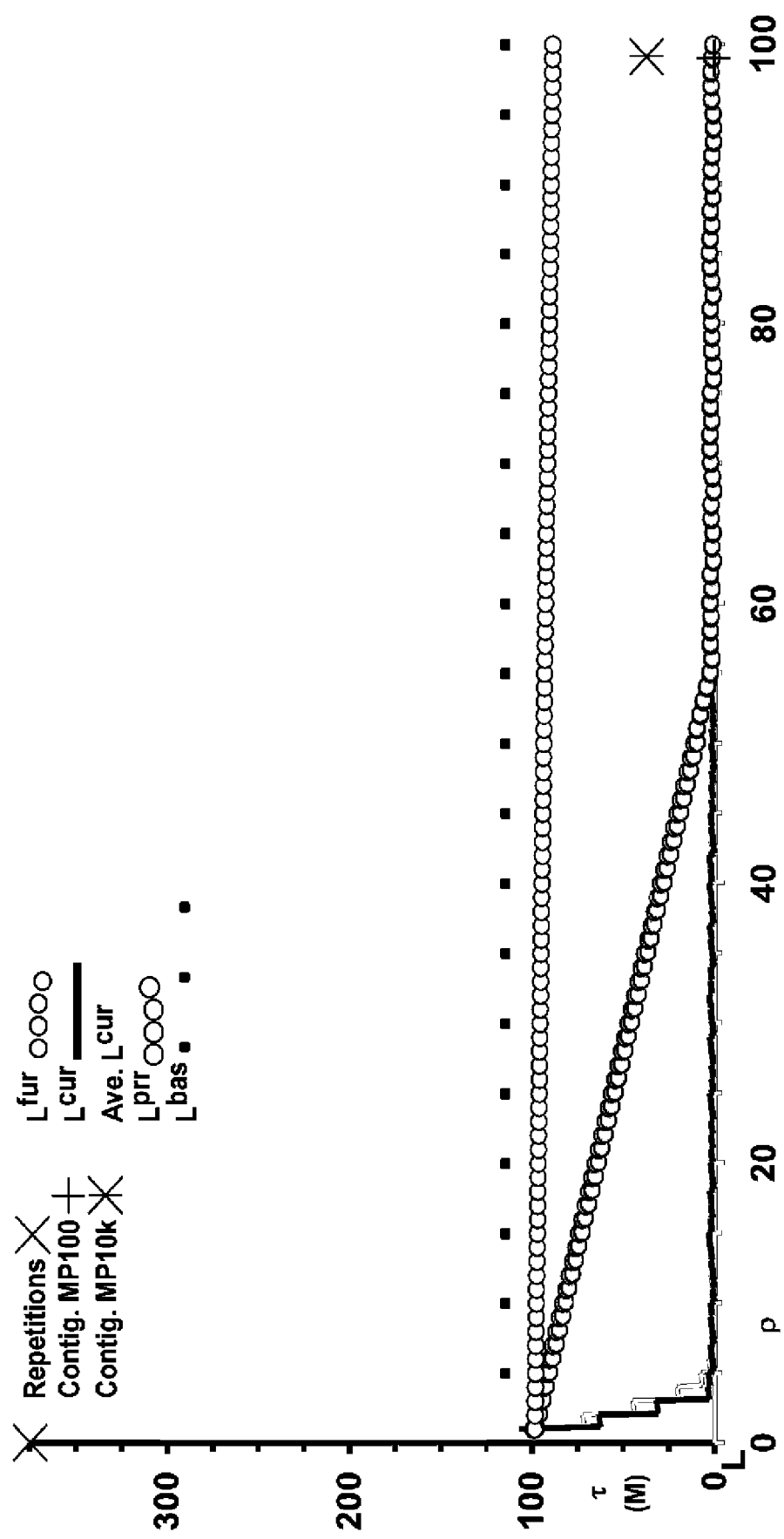
FIG. 24 is an illustration showing a Ron Animal Flashlight 26pot; Den A. (R=1ρ, RM=0.25, RA=2.5, $D_i$=4τ)
Figure 25:
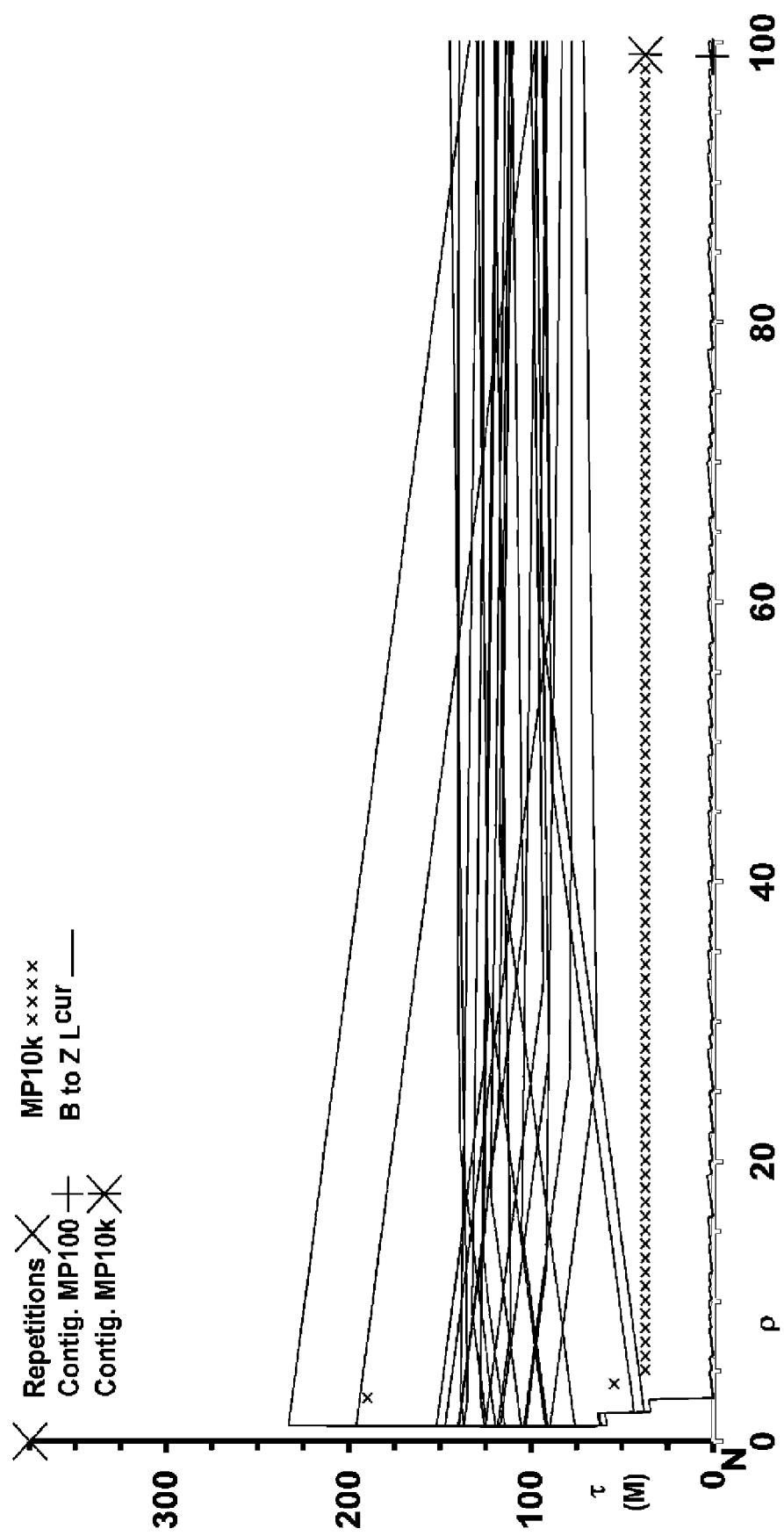
FIG. 25 is an illustration showing a Ron Animal Flashlight 26pot; Dens B-Z. (R=1ρ, RM=0.25, RA=2.5, $D_i$=4τ)
Figure 26:
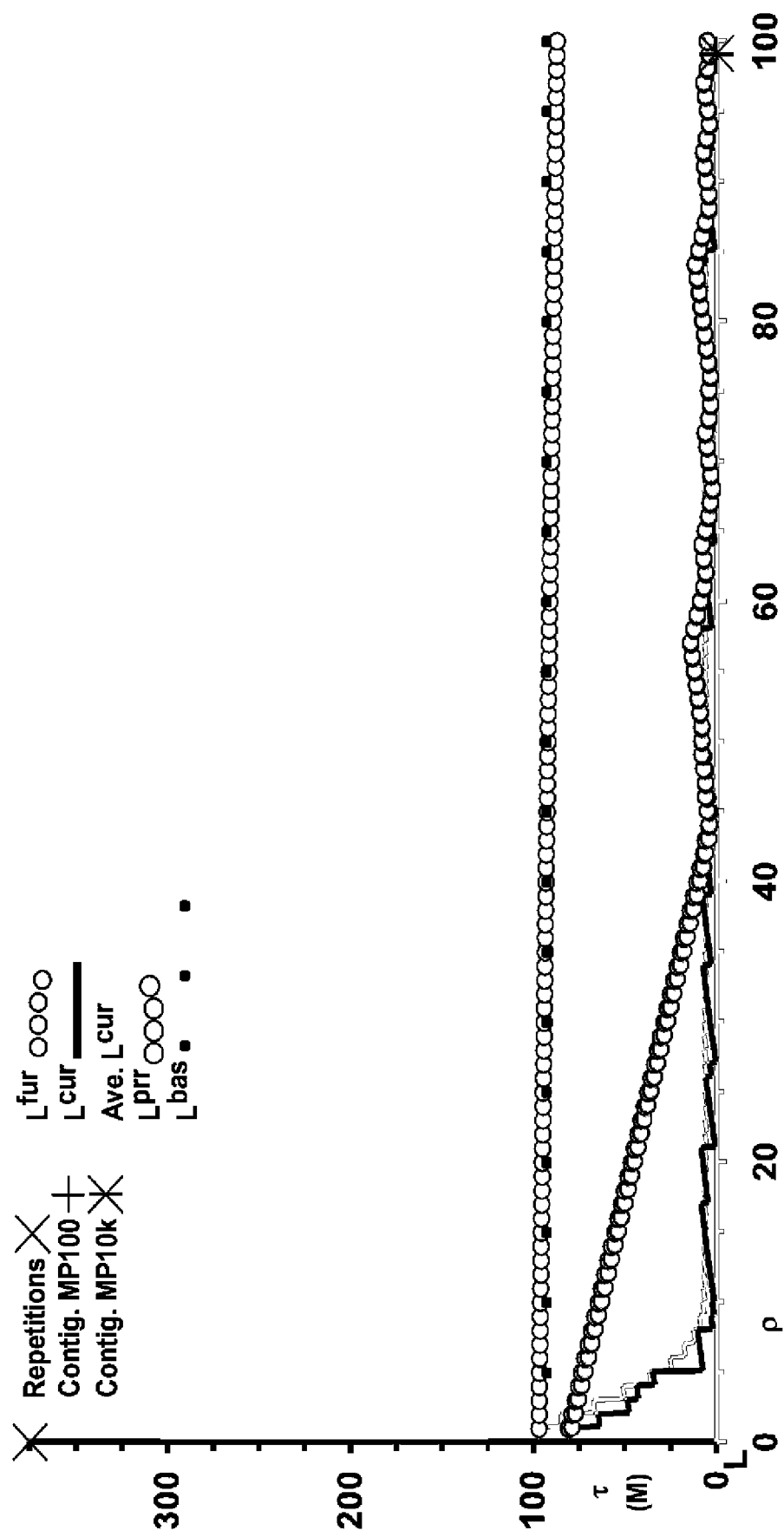
FIG. 26 is an illustration showing a Ron Animal Flashlight 26pot; Den A. (R=1ρ, RM=0.25, $D_i$=4τ); RA=25, $D_i$=4τ)
Figure 27:
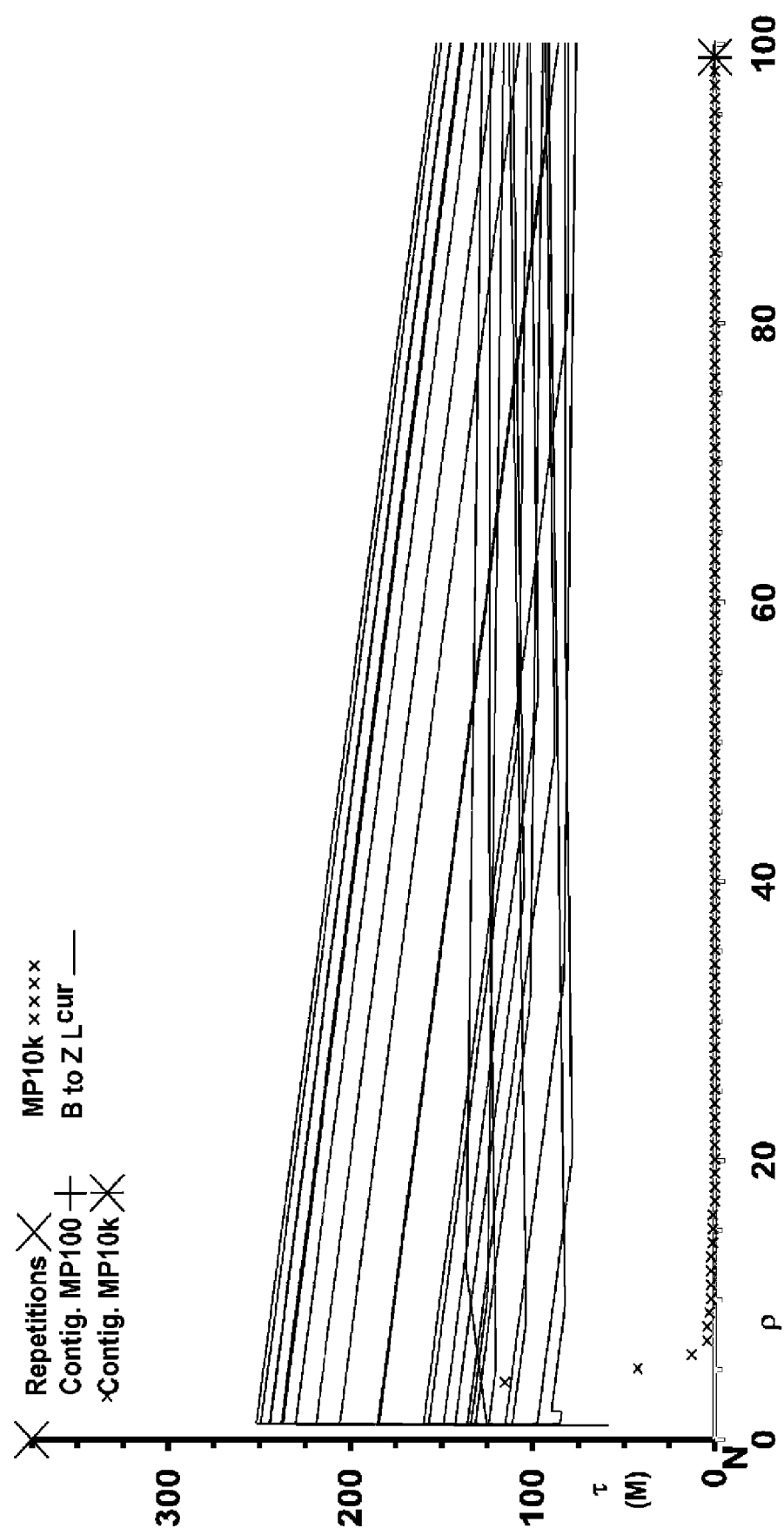
FIG. 27 is an illustration showing a Ron Animal Flashlight 26pot; Dens B-Z. (R=1ρ, RM=0.25, RA=25, $D_i$=4τ)
Figure 28:
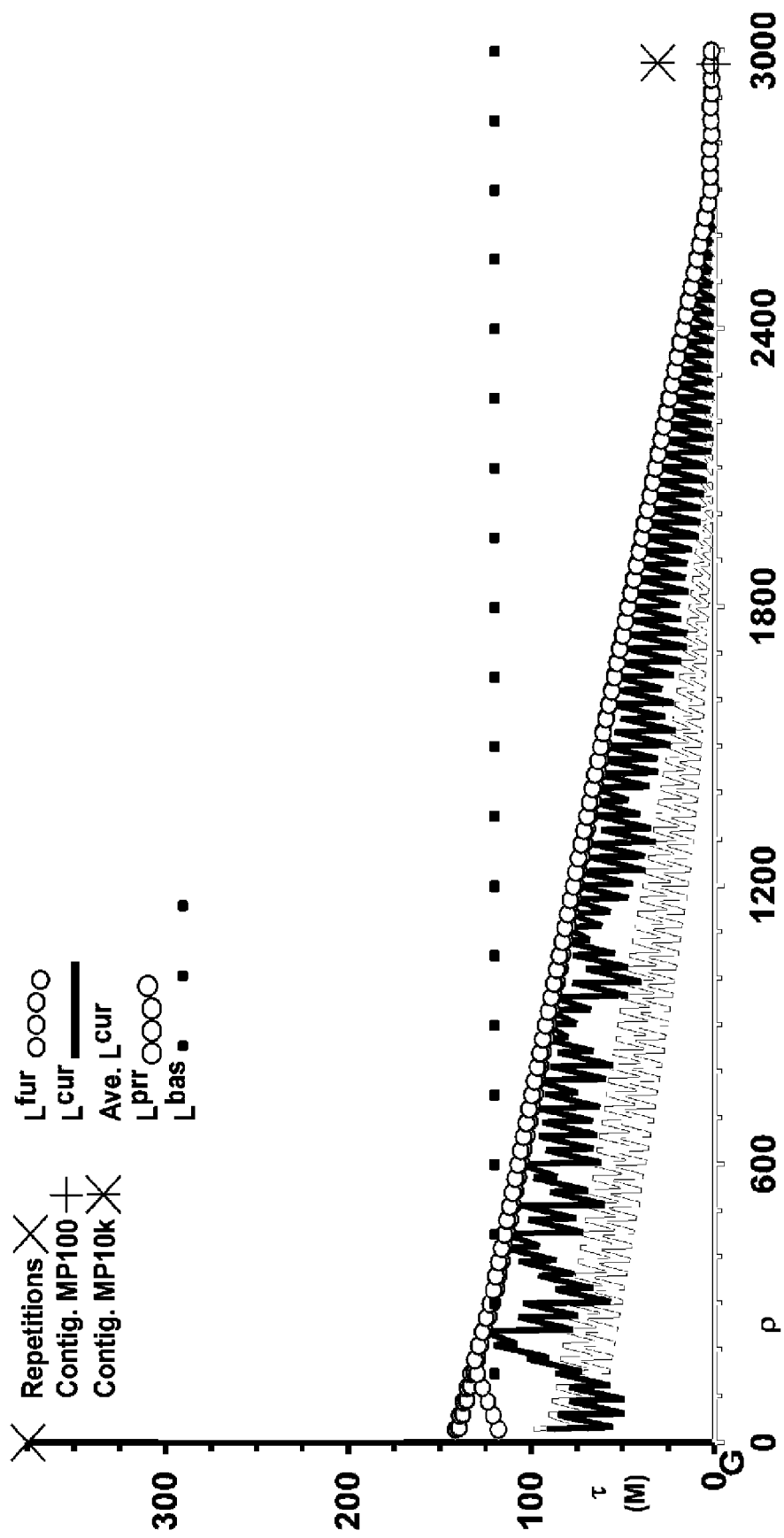
FIG. 28 is an illustration showing a Ron Animal Flashlight 26pot; Den A. (R=30ρ, RM=0.25, RA=2.5, $D_i$=4τ)

Seizures, brain activity that is associated with the incapacitation of an animal, are also associated with the propagation of synchronous neuron firings (non-activating to activating output transitions) that constitute distinctive voltage waves throughout part of the animal brain. These electrical waves are called brains waves. In the Ron brain, some Rons may become synchronized. These "incidental firings", firings not associated with a challenge, can incapacitate the Ron brain. The incidence of this Ron phenomenon depends of the happenstance interconnection of individual Rons. Hence, the Ron brain can model, and has the potential to elucidate, aspects of idiopathic epilepsy: a seizure syndrome that appears to occur randomly. FIG. 89 "Ron", the Ron functional-type consists of Syns, Dens, Gattes, an Orr and an Ax. The Induction period, time between a subunit activating input and a subunit activating output, is intended to be much longer for the Den in this discussion of the Ron then the other subunits. In the examples presented in this disclosure, the other subunits may be consider to be shorted (little or no time between an activating input and an activating output). "Simplification A" shows the relevant part of "Ron" for the discussion of generating an "incidental" Ron oscillation. An activating input is presented to input 'c'. By happenstance, the output of the Ron is connected to its input 'e'. When there is no effector that can extinguish the Ron input 'c', Ron input 'e' persists long enough to cause the Den B output to become activating. This extinguishes the Ron input 'e' immediately. This occurs repeatedly with little time between cycles, <1ρ. The time between the Den B output being activating and the Den input e consequently being non-activating would be small, $D_i < 4\tau$. Therefore, the internal properties of Den B would resemble those of the Causative Den in FIG. 24 where $L^{cur}$ is close to 0τ after few cycles. Den B quickly becomes "shorted" and the Ron firers (generates an activating out) rapidly and repeatedly. This output is broadcast to other Rons. Some Dens exposed to the rapid firing of Den B will also become shorted. In FIG. 25, for the particular equations used to represent Rellief in this disclosure, around 0.3% of incidental Rons become shorted from exposure to the causative Den of FIG. 24 (Contig. MP10k≈30). This is exemplified by the incidental Den whose $L^{cur}$ is almost 0τ after a few cycles in FIG. 24. If there were a great many Rons exposed to the originally oscillating Ron output then there would be some secondary Rons that would similarly echo the firings of this Ron. The Rons would cause still more Rons to echo their firings by the same mechanism. Consequently, there would be a large group of rapidly and synchronously firing Rons, enough to constitute a detectable electrical signal against the background of uninvolved Rons in the Ron brain. This wave would incapacitate the Ron Brain. Prior to the indirect activation of the Den B by input 'c', Den A and/or B may be "primed" by Apparent Causation, the $L^{cur}$ of Den A and/or Den B may be decreased, by changes in inputs "d" and "f", respectively. See FIG. 89 "Simplification B" and "Simplification C". An oscillating signal, like that of the Causative Den in FIG. 24 would have a strong priming effect. Therefore, the propagation of the rapid firing of Rons may be primed by environmental events. Seizure in animals may be primed by environmental events, especially those that are pulsatile in nature. Den "Lock-up", as described earlier, can lead to impaired function in the Ron brain and therefore may be useful in modeling some animal neuropathologies. The generation of a steady state oscillation, regarding neuron output, may be beneficial as well. Such inputs regulate heartbeat, for instance. Therefore, Ron behavior akin to that described immediately above may be useful for modeling beneficial oscillatory features of biology.

Happenstance Encouragement, Frustration and Causation

Figure 90:
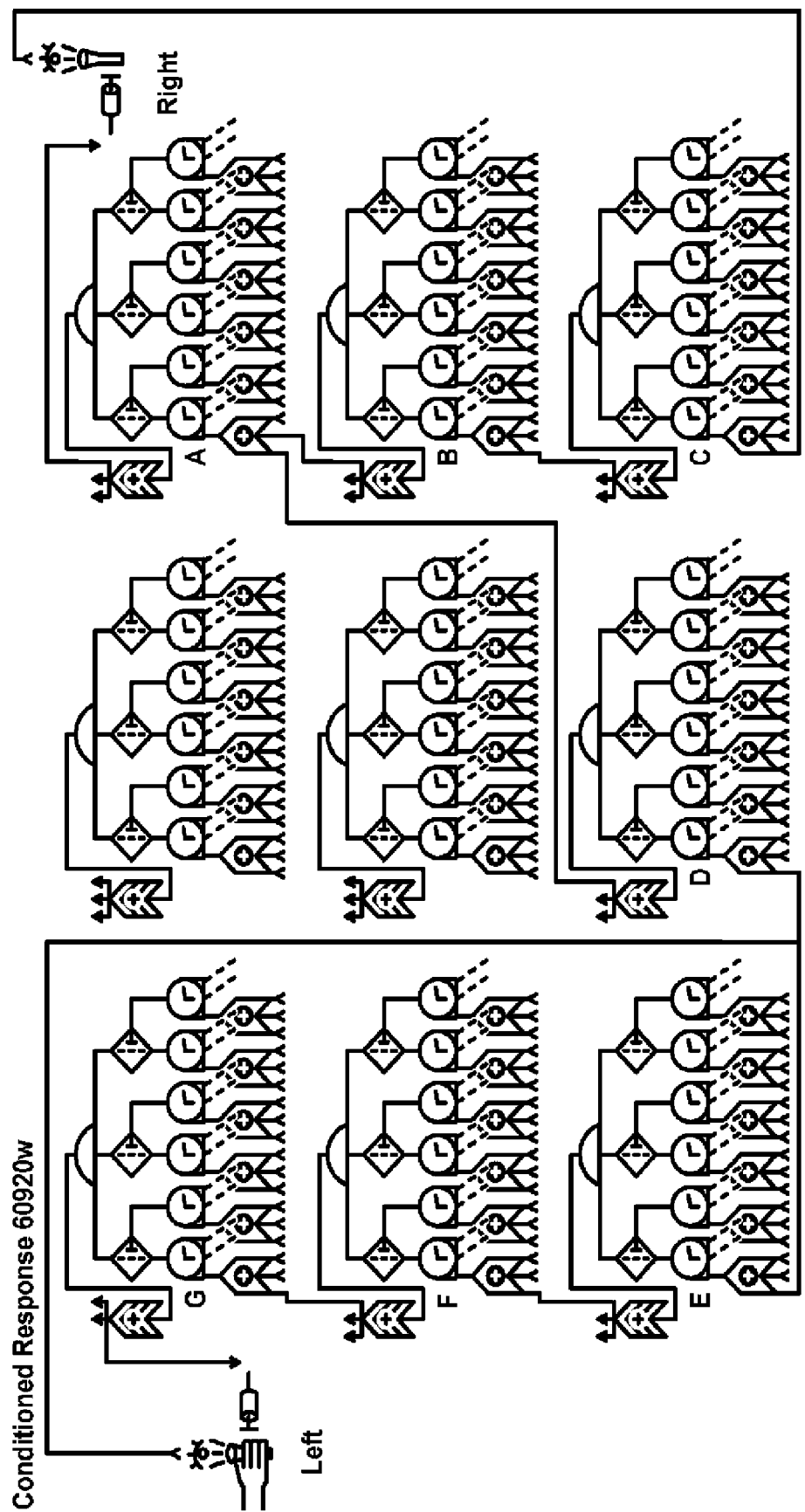

The happenstance Ron interconnections in the Ron brain and happenstance experiences of the Ron animal lead to the generation of a unique "Ron Personality". Through random organogenetic and environmental circumstances and events, the Ron animal develops predispositions that appear idiosyncratic (without the knowledge of the history and mapping of Rons). See FIG. 90. The "circuit CBA", a circuit that includes Dens C (input terminus), B and A (output terminus), may be "shorted" through experience. This is accomplished by placing the "Right" ON flashlight in front of the Right sensor repeatedly. The solenoids, when energized, are able to push away the corresponding flashlights, unless the flashlight is held by the hand. The sum of the $L^{cur}$ values of Dens A, B and C is reduced from around 300τ (average $L^{cur}$ value is 100τ), in the naive circuit, to 0τ, in the experience circuit. This decrease in "circuit Induction" would be caused by potentiation of individual Rons, specifically by individual Dens in those Rons. As in FIG. 10 the Den most proximal (Den A, here) to the effector becomes shorted first ($L^{cur}$ approaches zero).

After several placements of the ON flashlight in front of the Right sensor, the $L^{cur}$ values of Dens A, B and C might be 0, 50 and 100τ, respectively. Eventually Dens A, B and C would all be shorted. Such potentiation is associated with "Encouraging" experiences. An Encouraging experience occurs when a circuit produces an activating output quickly blocking the activating input that was initially presented to the circuit. The circuit need not be shorted, but may simply be primed (some reduction in the circuit Induction). In circuits that experience Encouragement, circuit Induction is decreased. The component Rons of these circuits are potentiated. Therefore, circuits that share the Dens of these Rons, are also Encouraged (have decreased circuit Inductions). This is referred to as "happenstance Encouragement" in this disclosure. Now, consider other circuits may also lead to the energizing of the Right effector. Initially, in the naive animal, the Right effector would be energized by the presence of the "Left" ON flashlight after around 200τ (the sum of the naive $L^{cur}$ values of Dens A and D). Initially, in the naive animal, the Left effector would be energized by the presence of the "Left" ON flashlight after around 300τ (the sum of the naive $L^{cur}$ values of Dens E, F and G). The Induction periods of circuits DA and EFG will increase if the hand does not remove the ON flashlight in response to the energizing of the Right and Left effectors, respectively. This is due to depotentiation of Dens. Such depotentiation is associated with "Frustrating" experiences. A Frustration occurs when a circuit produces an activating output that is unable to quickly block the activating input that was initially presented to the circuit. In circuits that experience Frustration, circuit Induction is increased. The component Rons of these circuits are depotentiated. Therefore, circuits that share Dens in this Rons, are also Frustrated (have increased circuit Inductions). This is referred to as "happenstance Frustration" in this disclosure. Encouraging and Frustrating experiences not only affect the circuit Induction directly through potentiation and depotentiation of Dens but they also affect other circuit Inductions that appear to be unrelated (without the knowledge of the history and mapping of Rons). "Happenstance Causation" may occur due to happenstance coincidence of events (stimuli). As above, intentional manipulation is used to simulate such happenstance events in FIG. 90. Happenstance Causation may occur, for instance, after the shorting of circuit CBA.

An On flashlight is placed in front of the Left and Right light sensors at the same time. The Right effector is energized before the Left effector initially. When the "Right" effector is energized, the Left On flashlight is removed by the hand at that instance when the Right effector pushes away the flashlight. Therefore, circuit DA behaves as if it caused the quick removal of the Right flashlight. Consequently the DA circuit becomes potentiated and its circuit induction reduces until it equals that of circuit CBA. This happenstance circuit was produced by artificially synchronizing the presentation of an activating signal at the input termini of two circuits and artificially synchronizing the removal of the Left ON flashlight with the removal of the Right ON flashlight (output termini of the two circuits). After this procedure has been repeated for a sufficiently long time, a condition response will be temporarily fixed: An Off flashlight is placed in front of the Right sensor; when an On flashlight is placed in front of the Left sensor the Right sensor pushes away the Right Off flashlight quickly.

Dishinhibition

Figure 91B:
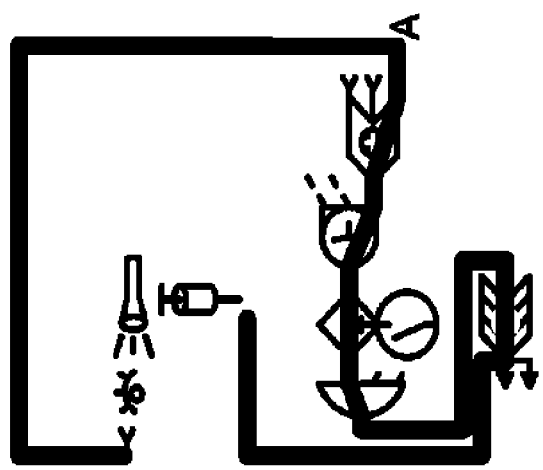
Figure 91A:
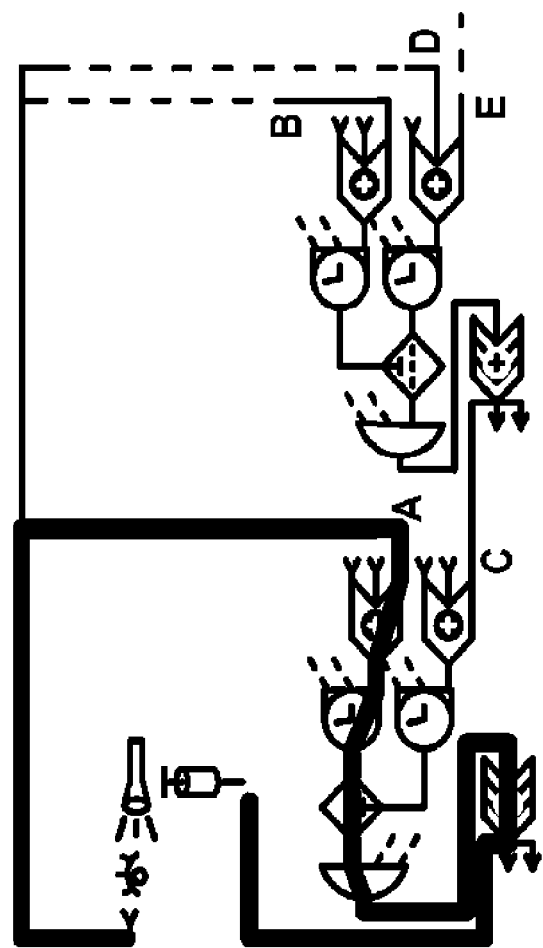

Disinhibition refers to the reversal of the blocking of the Gatte with an activating inhibitory input. An activating inhibitory input at a Gatte may prevent a circuit from propagating a signal. A non-activating inhibitory input at a Gatte may allow the propagation of a signal. In FIG. 91a, a dashed lines represents a linear sequences of Dens of unknown length and unknown $L^{cur}$ values. Each Den is part of a Ron. If inputs B-E remain non-activating, the Den A circuit (thick gray line) is uninhibited. If inputs E and/or D are activating while input B is non-activating, then circuit A will be inhibited. If input B then becomes activating, then circuit A will become disinhibited. The nature of the Dens represented by the dashed lines affect the status of inputs A, B, C and E. FIG. 91b is an abbreviation of 91a. The switch-in-a-circle symbol represents a circuit that can inhibit and disinhibit a circuit.

Comparing $L^{cur}$ Values

As the number of Rons in the Ron brain and the number of Ron-Ron interconnections per Ron increase the number and variety of circuits that may be primed increases. FIG. 92 represents a circuit that allows comparison of $L^{cur}$ values. Therefore, it provides a means of counting. There are 4 "Disinhibiters" (switches) as previously described (FIG. 91). They are numbered I-IV. There is a left-hand circuit AB and a right-hand circuit DE that push away an ON flashlight if that flashlight is placed in front of the corresponding sensor. This occurs if Disinhibiters I and III prevent the Gatte from being blocked. Dashed lines represent linear sequences of Dens of unknown length and unknown $L^{cur}$ values. When the Disinhibiters II and IV are in the "disinhibiting" state and the input "c" in activating, the $L^{cur}$ values of Den A and D are compared via a sampling process. Inputs a and b are non-activating. An activating signal is presented and held at point "c". Assuming that the $L^{cur}$ values of Den C and F are approximately equal, and that values of G and H are approximately equal, output "d" will eventually become activating if $L^{cur}$ of Den A is more than that of Den B (if the Den A Induction period is longer than the Den B Induction period). Otherwise output d will remain non-activating during the sampling process. Right and Left effectors will not become energized if Disinhibiters I and III are in the "inhibiting" state.

Drugs, Genetics and Muscle

Subunits in specific Rons can be altered to mimic the environment and body of an animal. In FIG. 93i is represented an ON flashlight (stimulus), an eye (sensor) and a solenoid with an attached sheet that can be moved by the solenoid to block the light (effector). In FIG. 93ii the Gatte represents the interface of the stimulus, the sensor and the effector. In FIG. 93iii the temporal properties of the this interface are determined by Syns, Dens and an Ax of Ron. The dashed outlines of these subunits indicates that their temporal properties have been specifically modified. A stimulus is modeled by presenting an activating input at α. This signal is delayed from reaching the Gatte if excitatory input if Syn D and Den B have been modified to produce relatively long Induction periods. This situation could model a hypothetical flashlight that when turned on requires a certain amount of time to produce light strong enough to be sensed. Sensing a stimulus is modeled by activating output γ. This signal is delayed if Ax A has been modified to produce relatively long Induction periods. This situation could model a hypothetical sensor that requires a certain exposure time to produce an activating output. Energizing an effector is modeled by activating input β. The mobilization of the effector is delayed if Syn E and Den C have been modified to produce relatively long Induction periods. This situation could model a hypothetical muscle (effector)

that is sluggish. Genetic variation could be modeled by creating Ron brains where subunits in specific subpopulations of Rons are modified. The relationship between experience and behavior would then be examined. Similarly the effects of psychotropic drug on behavior could be examine by modifying subunits in a specific subpopulations of Rons in a manner resembling the admission of drugs. For instance, the effects of SSRIs, could be modeled by modifying Syns to have longer Induction periods. SSRIs are supposed to have their behavioral effects by increasing the about of time taken to activate another neuron. This delay occurs because the concentration of neurotransmitters in pre-synaptic neuron is decreased. The pre-synaptic neuron generates an output that serves as an input for another neuron (post-synaptic neuron). Neurotransmitters moving from this pre-synaptic chamber into the chamber of the synapse initiate processes that lead to the firing of the post-synaptic neuron. Ron brains which use solute molecules as Transferants and aqueous chamber as Tanks while using a "biological" functional type may be particularly useful for modeling the effects of drugs on behavior. Similarly, the effects of endogenously produced reagents such as hormones may be modeled. The physical environment may be modeled as well. FIG. 93$iv$ shows the stimulus-effector-sensor interfaced with a Ron. FIG. 93$v$ shows the stimulus-effector-sensor modeled by a specially modified Ron. This is interfaced to a Ron, which is intended to model a neuron.

Neurophysiological Potentiation

In experimental neurophysiology, potentiation refers to the application of an electrical voltage (input activating signal) across biological tissues containing neurons with the consequence that these neurons generate outputs that are considered activating to other neuron more quickly after than before the voltage. The Dens exhibit this behavior. The Dens are sensitive to the pulsatile nature of the activating signal. The behavior of the Dens may be useful in guiding experimental designs to reveal features of the nature of experimental potentiation.

Flip-Flop

As an example of the possibilities for the formation of logic units akin to those in modern computers, the Ron latch is described. The Gatte can behave like the inverter unit common to digital electronics. If the excitatory input is held at an activating level, then the output is the logical inverse of the inhibitory input. If the inhibitory input is non-activating then the output is activating. If the inhibitory input is activating then the output is non-activating. See FIG. 12. The Orr subunits, Tie and Syn, behave like the OR gate common to digital electronics. See Tie logic in FIG. 9B. The Ron NAND (logical NOT AND) can be constructed using two Gattes and one Tie akin to the construction of the NAND gate, common to digital electronics, which may be formed from inverters and an OR gate. As in the case of the set-reset flip-flop (cross-coupled NAND gates) of computer electronics, a set-reset flip-flop may be formed from Ron NANDs. The computer set-reset flip-flop is a memory device and a building block for a variety of logical devices. Therefore, the Ron set-reset flip-flop (and other such entities) allow a variety of logical functions in the Ron brain. The Ron flip-flop behavior would be more complex than the computer flip-flop because it has temporal components not in the computer flip-flop.

Maladaptive Behavior

The Ron animal can model interactions between an animal and its environment that lead to lasting modifications of behavior via changes in Den internal properties. Such modifications, as happenstance Causation, may be deleterious to the performance of the Ron animal with varying degrees of reversibility. Hence, the Ron animal will be of value to the study of maladaptive behavior in real environments and strategies to correct or circumvent such behavior. The possible influences of genetics, organogenetics, environment, hormones and drug administration on the development and suppression of behaviors may be modeled. This would be beneficial to the psychiatric disciplines of behavioral therapy and drug intervention.

Motivation, Innovation

Due to the complexity of circuits that may be primed through environmental interaction, the Ron animal may be motivated (predisposed) to perform tasks (without being subject to supervisory computer programs). If an aversive stimulus is presented to the Ron animal, the Ron brain will produce activating outputs until the stimulus is removed. The removal of the stimulus can be intentionally associated with the completion of a task. Each time the stimulus is presented a sequence of Dens in Rons, a circuit, is more deeply primed. There is no influence of pre-set notions (of investigators) of how tasks should be performed. Therefore, depending of the previously experiences and the Ron-Ron interconnections, the Ron animal will spontaneously innovative, activating circuits until the aversive stimulus is removed. A group of Ron animals can be presented with the same situation, since their Ron Personalities will be different due to happenstance Encouragement, Frustration and Causation, their reactions will vary. Thus different Ron animals may have different strategies to the same problem. The possible influences of genetics, organogenetics, environment, hormones and drug administration on motivation and innovation may be modeled.

Intoxication

The Ron animal has the potential to modify its own brain when meeting a challenge. Meeting the challenge (removing an activating signal from the input terminus of a circuit) may consist of blocking the transmission of a signal through circuit (desensitization and inhibition/disinhibition). This would obviate the need to respond directly to a challenge. The brain may activate internal effectors to alter the performance of subsets of Ron subunits to meet a challenge (hormone secretion model). The animal may alter the performance of individual Rons by subjecting the brain to exogenous substances or physical forces that promote global homeostasis without the need to meet a challenge. This may occur by Ron animals promoting the doping of Ron tanks with exogenous substances or by exposing the brain to various forms of radiation, which alter but do not destroy brain function (intoxication). A reliance on this strategy may develop (dependence).

Bipolar

Some Ron animals may be exceptionally susceptible to the effects of happenstance Encouragement and Frustration. The degree of Lock-Up that occurs in some repetitive potentiation and depotentiation scenarios may vary according to experience and Ron-Ron interconnection parameters. Lock-Up greatly effects the $L^{cur}$ values of incidental Dens. As in the seizure example given, circuits with oscillatory outputs may develop in response to environment challenges. This may cause repetitive potentiation or depotentiation. Happenstance Encouragement, Frustration, Causation and the randomness of organogenesis may promote cyclic changes in motivation in Ron animals. Such a dysfunction (bipolar disease, manic-depression) may arise in the Ron animal due to higher levels of interconnectedness between Ron circuits, for instance. In that case, happenstance Encouragement and Frustration would be greater than in "normal" animals. Therefore, in such an animal, a few True Encouragements could lead to behavior that would be like that of having many True Encouragements in a "normal" Ron animal. This is akin to a manic behavior being "seeded" by a few successes or depressed behavior being "seeded" by a few failures in humans. In the general population, this may be seen as "moodiness". The way in which potentiation/depotentiation occur relevant to Following may be altered such that happenstance Encouragement and Frustration are more prolonged in a Ron animal Bipolar model. Recurrences of states global potentiation (high level of responsiveness in the Ron animal) and depotentiation (low levels of responsiveness) may be promoted because $L^{cur}$ values approaches $L^{bas}$ more slowly. The possible biologic influences of genetics, organogenetics, environment, hormones and drug administration on the development and suppression of this cycling may be modeled with Ron animals.

Rodent Models of Behavior

Today mice and rats are used to model the effects behavior. Behavior is described using amorphous and overlapping terms such as anxiety, depression and novelty seeking. Despite heroic effects to make the experiences of genetically identical rodents equivalent, there is significant variation in the performance of such rodents, even using subjective measures of activity. The Ron-animal may be useful to understand the nature of this variation. As the number of sensors and effectors interfaced to the Ron brain increases (along with the number of Rons in the Ron Brain and the number of Ron-Ron interconnections per Ron), the effect of environment on behavior becomes increasing complex. Eventually, like rodents, the Ron animal would become exquisitely sensitive to environmental minutia and resistant to behavioral homogenization by rigid control of environment. Because of the complexity of circuits that may be primed in such a Ron animal, behavior may be examined not with broad terms relating to affect but mechanistic terms relating to discrete neural circuits. Progress in the understand of animals, including ourselves, may be hastened by a physical model of behavior, especially employing materials with biological relevance.

The Halfgate

Conceptually, the biological neuron is composed of elemental functionalities that have a dual binary/continuous character. The behavior of these functionalities is dependent on relative concentrations of substances in contact with a microactuator. Such functionalities are said to be gated. Examples of such elementary functionalities are concentration-gated pores, allosterically-gated enzymes and gated neurotransmitter release. This dual character is typified in the idealized concentration-gated pore. The pore functions as a microactuator that closes when the relationship between specific concentrations of substances passes a threshold and becomes open when this relationship passes another threshold. When the pore is open, the rate of passage of a substance through the pore is dependent on the relationship between specific concentrations of substances. This dual behavior was captured with the Transferant/Tank/Valve system previously described herein. The Halfgate rather than facilitating the exchange or interconversion of material, causes a change in material. Halfgates can be used to produce the behavior of the Transferant/Tank/Valve systems already described here. Neuron subunits described here that were constructed using such systems can therefore be constructed using Halfgates, with sensors and actuators. The Den subunit employing Halfgates is described below. The Halfgate is more amenable to building increasingly complex systems than the Transferant/Tank/Valve system.

FIG. 94 shows a Halfgate according to the invention that provides a gradient-based dual binary/continuous behavior to provide for emulation of such elemental neuronal functionalities in machines, and thus may serve as a constituent processing element of the Ron or of sub-elements thereof. The Halfgate may be implemented electrically, either by circuitry or by utilizing a programmable controller, and thus, inputs and outputs for the Halfgate may take the form of analog and/or digital electrical signals. However, inputs may also be provided to the Halfgate in numerous other forms, such as the concentrations of substances. Likewise, the Halfgate may provide outputs in any desired form, for example, by coupling the Halfgate to a microactuator (not shown) that responds to the output of the Halfgate to change the concentration of a solution. Note that if the actuator driven by the Halfgate facilitates the exchange of material then the Transferant/Tank/Valve systems can be constructed easily. Enzyme activities may be modeled with actuators that facilitate conversion of material. Thus, the Halfgate may provide a gradient-based dual binary/continuous behavior to any artificial actuator. Therefore neuronal elemental functionalities may be emulated using biologically relevant materials. Because the Halfgate reduces elemental functionalities into components, it simplifies the emulation of systems of cascading elemental functionalities in the neuron. Furthermore, non-biological forms of intelligence may be emulated because the inputs of the Halfgate may be derived from properties other than concentration and the output may drive an actuator that alters a property other than concentration.

The Halfgate has a plurality of inputs and one output. There are 4 "continuous-value-determining inputs". There are 4 "responsiveness-determining inputs". There is a "constant-value" input. The output of the Halfgate has a dual binary/continuous character. The Halfgate is either "responsive" or "non-responsive". In the responsive state the output is determined in a continuous manner by the 4 continuous-value-determining inputs. In the non-responsive state the output is equal to the constant-value input.

Using electronics, the manipulation of the inputs is illustrated, but it should be understood that the halfgate may be implemented otherwise. An "X" inside of a triangle designates amplifiers used as multipliers. Signal i equals input a times input b. Signal j equals input c times input d. Amplifiers used in the difference mode are designated by a "−" and a "+" inside of a triangle. Signal k equals signal j minus signal i. Signal l equals input g minus input f. Amplifiers used as comparators are designated by a "−", a "+" and a filled right triangle inside of a triangle. If signal l minus input e is less than zero 0, then signal m equals logical 1 else signal m equals logical 0. If input h minus signal l is greater than 0, then signal n equals logical 1, else signal n equals logical 0. A set-reset flip-flop is designated by "s", "r" and "q" inside a box. If signal m and signal n both equal logical 0 then signal o is not changed. If signal m equals logical 1 and signal n equals logical 0 then signal o equals logical 1. If signal m equals logical 0 and signal n equals logical 1 then signal o equals logical 0. An open switch inside of a square designates a bilateral switch. An open circle against the box indicates the switch is closed by a logical 0 signal. Otherwise the switch is closed by a logical 1 signal. If signal o equals logical I then the output of the Halfgate equals signal k (the Halfgate is responsive) else the output equals signal v (the Halfgate is non-responsive).

Potentiation Accumlator and Depotentiation Accumulator

Complex functionalities in the neuron are the result of the cascading of similar and disparate elemental functionalities. Conceptually, such a complex functionality is the neuronal process that allows potentiation-depotentiation to occur in nervous tissue. This complex functionality is characterized by two frequency relationships. Sustained low frequency excitation of the neuron results in the slowing of the rise in the neuron output following each excitation event. This effect is lasting: later excitation events continue to produce a slowed rise in output. A similar, but reversed, relationship is seen with high frequency excitation: increase in the rise of the neuron output with increased rise in output. This persists with later excitation events. A Potentiation Accumulator and a Depotentiation Accumulator, as will be described herein, allow emulation of this putative potentiation-depotentiation neuronal complex functionality in machines. Each device reduces potentiation-depotentiation into a particular component. The Den subunit can be constructed using Potentiation Accumulators, Depotentiation Accumulators and other parts. This is detailed below in the Den system. Reducing the Rellief mechanism into such Accumulators functions allows a more facile construction of increasingly complex Rellief systems. Note that the first and second "events" described immediately following are equivalent to the Reciprocation and Extinction points, resp., described here already in regard to Rellief and the Den subunit.

The Potentiation Accumulator has two inputs and one output, as illustrated by the timing chart shown in FIG. 95. The output is determined by the spacing between two events relative to a threshold. The first event is when the second input becomes activating while the first input is activating. The second event is when the first input becomes deactivating while the second input is activating. The period between the first and second event is called $T_E$. There is a constant that is called the potentiation-depotentiation threshold, $T_{PD}$. Immediately following the second event the output may be of a magnitude of zero or greater for a fixed period, $T_F$. If $T_E$ is less than $T_{PD}$ then the average magnitude of the output during the fixed period will be proportional to $T_{PD}-T_E$. If $T_E$ is not less than $T_{PD}$ then the magnitude of the output will be zero during this fixed period.

The Depotentiation Accumulator has two inputs, one output, as illustrated by the timing chart shown in FIG. 96. Like the Potentiation Accumulator, the output is determined by the spacing between two events relative to a threshold. The first event is when the second input becomes activating while the first input is activating. The second event is when the first input becomes deactivating while the second input is activating. The period between the first and second event is called $T_E$. There is a constant that is called the potentiation-depotentiation threshold, $T_{PD}$. Immediately following the second event the output may be of a magnitude of zero or greater for a fixed period, $T_F$. Unlike the Potentiation Accumulator, if $T_E$ is greater than $T_{PD}$ then the average magnitude of the output during the fixed period will be proportional to $T_E-T_{PD}$. If $T_E$ is not greater than $T_{PD}$ then the magnitude of the output will be zero during this fixed period.

The putative potentiation-depotentiation complex functionality of the neuron may be emulated employing Potentiation Accumulators and Depotentiation Accumulators in machines under the following conditions. The first inputs of the Potentiation Accumulators and Depotentiation Accumulators (seen in FIGS. 95 and 96) are derived from the input of the machine potentiation-depotentiation functionality. The second inputs of the Potentiation Accumulators and Depotentiation Accumulators are derived from the output of the potentiation-depotentiation functionality. The outputs of the Potentiation Accumulators and Depotentiation Accumulators drive actuators that alter the concentrations of substances. Theses substances either directly or indirectly affect the rate at which the potentiation-depotentiation output rises. The basis of the neurophysiology phenomenon potentiation very probably is the same as that of brain seizure and learning. Potentiation Accumulators and Depotentiation Accumulators can be used to emulate seizure induction and learning using machines. Such machines may be built employing Halfgates, materials relevant to the biology of the neuron and actuators modeling the elemental functionalities of the neuron.

Cascading of Halfgates

The cascading of Halfgates to carry out the action of the Potentiation Accumulator and the Depotentiation Accumulator is detailed in FIG. 97. There are six aqueous chambers: Q, R, S, T, U and V, which may be constructed physically, or simulated numerically. There are 8 solutes: a, b, c, d, e, f, g and h. The Halfgate-Set, a combination of concentration sensors, one Halfgate and one actuator is represented by a tall rectangle with a rectangular indention. Sensors detect the concentration of solutes in a particular chamber and provide this input to Halfgate. In this example the magnitude of the input is the same as the concentration of the solute. The output of the Halfgate drives an actuator that alters the concentration of a solute in a particular chamber. The rate of change in concentration of that solute is proportional to the output of the Halfgate. This concentration cannot exceed a maximum or minimum. The solute concentrations which vary and which affect the Halfgate-Sets are shown next to input symbols: the concentrations of a and c, [a] in chamber R and [c] in chamber Q, affect Halfgate-Set bR1. Concentrations that are constant provide constant inputs to the Halfgates and are not shown. The Halfgate-Set is half shaded to show the kind of effects the solute concentration has on the respective Halfgate. Inputs attached to the non-shaded part are continuous-value-determining inputs. Inputs attached to the shaded part are responsiveness-determining inputs. The action of the Halfgate-Set is shown with a vertical arrow inside of the indention: Halfgate-Set bR1 causes [b] in chamber R to increase, Halfgate-Set bR2 causes [b] in chamber R to decrease and Halfgate-Set bS3 causes [d] in chamber S to increase.

TABLES I-VI show an example of Halfgate inputs for the 17 Halfgates-Sets in the Den system. The constant-value input is of magnitude zero for all Halfgates. TABLE I shows the alteration of concentration [b] in chamber R by Halfgate-Sets bR1 and bR2, wherein the initial concentration is 15, the maximal concentration is 985, and the minimum concentration is 15. TABLE II shows the alteration of concentration [d] in chamber S by Halfgate-Sets dS1, dS2, and dS3, wherein the initial concentration is 35, the maximal concentration is 965, and the minimum concentration is 35. TABLE III shows the alteration of concentration [e] in chamber S by Halfgate-Sets eS1 and eS2, wherein the initial concentration is 25, the maximal concentration is 975, and the minimum concentration is 25. TABLE IV shows the alteration of concentration [c] in chamber R by Halfgate-Sets cR1, cR2, cR3, and cR4, wherein the initial concentration is 100, the maximal concentration is 997, and the minimum concentration is 3. TABLE V shows the alteration of concentration [f] in chamber T by Halfgate-Sets fT1 and fT2, wherein the initial concentration is 100, the maximal concentration is 997, and the minimum concentration is 3. TABLE VI shows the alteration of concentration [g] in chamber U, wherein the initial concentration is 100, the maximal concentration is 997, and the minimum concentration is 3. The inputs are constants or equal in magnitude to the concentrations listed. For example, in TABLE III, the three Halfgates that drive actuators that change [d] in chamber S are listed, and the input b of the Halfgate associated with Halfgate-Set dS1 is equal to [d] in chamber Q. The effect of the actuator associated with this Halfgate-Set decreases [d] in S at a rate equal to the output of the Halfgate.

TABLE I

| Halfgate-Set Name | bR1 | bR2 |
| --- | --- | --- |
| Halfgate Input a | 0 | 0 |
| Halfgate input b | 0 | 0 |
| Halfgate input c | 0.4 | 1 |
| Halfgate input d | [c] in R | 100 |
| Halfgate input e | 750 | 750 |
| Halfgate input f | 0 | [a] in Q |
| Halfgate input g | [a] in Q | 1000 |
| Halfgate input h | 250 | 250 |
| Actuator Effect | increase | Decrease |

TABLE II

| Halfgate-Set Name | dS1 | dS2 | dS3 |
| --- | --- | --- | --- |
| Halfgate Input a | 0 | 0 | 0 |
| Halfgate input b | 0 | 0 | 0 |
| Halfgate input c | 1 | 1 | 1 |
| Halfgate input d | 200 | 100 | 200 |
| Halfgate input e | 750 | 750 | 750 |
| Halfgate input f | 0 | 0 | 0 |
| Halfgate input g | [a] in Q | 1000 | [b] in R |
| Halfgate input h | 250 | 250 | 250 |
| Actuator Effect | decrease | decrease | increase |

TABLE III

| Halfgate-Set Name | eS1 | eS2 |
| --- | --- | --- |
| Halfgate Input a | 0 | 0 |
| Halfgate input b | 0 | 0 |
| Halfgate input c | 4.15 | 1 |
| Halfgate input d | 1 | 100 |
| Halfgate input e | 750 | 750 |
| Halfgate input f | 0 | [b] in R |
| Halfgate input g | [b] in R | 1000 |
| Halfgate input h | 250 | 250 |
| Actuator Effect | increase | decrease |

TABLE IV

| Halfgate-Set Name | cR1 | cR2 | cR3 | cR4 |
| --- | --- | --- | --- | --- |
| Halfgate Input a | 0.4 | 0.006 | 0.001 | 0.005 |
| Halfgate input b | [e] in S | 100 | [c] in R | [f] in T |
| Halfgate input c | 0.4 | 0.006 | 0.001 | 0.005 |
| Halfgate input d | 100 | [e] in S | [f] in T | [c] in R |
| Halfgate input e | 750 | 750 | 750 | 750 |
| Halfgate input f | 0 | 0 | 0 | 0 |
| Halfgate input g | [d] in S | [d] in S | 1000 | 1000 |
| Halfgate input h | 250 | 250 | 250 | 250 |
| Actuator Effect | increase | decrease | increase | decrease |

TABLE V

| Halfgate-Set Name | fT1 | fT2 |
| --- | --- | --- |
| Halfgate Input a | 0.002 | 0.0002 |
| Halfgate input b | [f] in T | [g] in U |
| Halfgate input c | 0.002 | 0.0002 |
| Halfgate input d | [g] in U | [f] in T |
| Halfgate input e | 750 | 750 |
| Halfgate input f | 0 | 0 |
| Halfgate input g | 1000 | 1000 |
| Halfgate input h | 250 | 250 |
| Actuator Effect | increase | decrease |

TABLE VI

| Halfgate-Set Name | gU1 | gU2 | gU3 | gU4 |
| --- | --- | --- | --- | --- |
| Halfgate Input a | 0.04 | 0.002 | 0.0003 | 0.0005 |
| Halfgate input b | [e] in S | 100 | [g] in U | [h] in V |
| Halfgate input c | 0.04 | 0.002 | 0.0003 | 0.0005 |
| Halfgate input d | 100 | [e] in S | [h] in V | [g] in U |
| Halfgate input e | 750 | 750 | 750 | 750 |
| Halfgate input f | 0 | 0 | 0 | 0 |
| Halfgate input g | [d] in S | [d] in S | 1000 | 1000 |
| Halfgate input h | 250 | 250 | 250 | 250 |
| Actuator Effect | increase | decrease | increase | decrease |

Potentiation and Depotentiation Accumulators in the Den System

The Potentiation Accumulator function as a constituent processing element in the Den system is shown in FIG. 98. Concentration [a] in chamber Q is represented by the thin black line; concentration [b] in chamber R is represented by the thick black line; concentration [c] in chamber R is represented by the light gray line. Concentration [d] in chamber S is represented by the medium gray line, and concentration [e] in chamber S is represented by the alternating line. The input A of the Potentiation Accumulator (FIG. 95) is equivalent to concentration [a] in chamber Q. The input B of the Potentiation Accumulator is equivalent to concentration [b] in chamber R. The output of the Potentiation Accumulator is equivalent to the output of the Halfgate associated with the Halfgate-Set cR1. This is not shown. It is evidenced by the increasing of concentration [c] in chamber R for a short period.

The Depotentiation Accumulator function as a constituent processing element in the Den system is shown in FIG. 99. The concentration [a] in chamber Q is represented by the thin black line; the concentration [b] in chamber R is represented by the thick black line; the concentration [c] in chamber R is represented by the light gray line, the concentration [d] in chamber S is represented by the medium gray line, and the concentration [e] in chamber S is represented by the alternating line. The input A of the Depotentiation Accumulator (FIG. 96) is equivalent to concentration [a] in chamber Q. The input B of the Depotentiation Accumulator is equivalent to concentration [b] in chamber R. The output of the Potentiation Accumulator is equivalent to the output of the Halfgate associated with the Halfgate-Set cR2. This is not shown. It is evidenced by the decreasing of concentration [c] in chamber R for a short period.

In the Den system the rate at which its output, concentration [b] in chamber R, increases in response to its input, concentration [a] in chamber Q, is proportional to concentration [c] in chamber R. The disposition of Halfgate-Sets in the Den causes the change in concentration [c] in chamber R to be long lasting. This is long-term memory of reactivity. This is an important characteristic of the biological phenomenon potentiation/depotentiation. This phenomenon is known to be intimately related to the process of learning. Memory in this example of the Den system is controlled the concentrations of solutes (FIG. 100). The concentration [a] in chamber Q, the Den input, is not shown but is oscillating as in FIG. 98, except during the pause. The concentration [c] in chamber R is represented by the light gray line; [g] in U is the thin black line; concentration [f] in T is the thick black line; and [h] in V is the medium gray line. Concentration [g] in chamber U responds to concentration [a] in chamber Q and concentration [b] in chamber R as concentration [c] in chamber R does, but to a lesser extent. The concentration [f] in chamber T moves toward that of concentration [g] in chamber U. The concentration [g] in chamber U moves toward that of concentration [h] in chamber V. The concentration [c] in chamber R moves toward that of concentration [f] in chamber T.

It should be understood that this Den system of Halfgate-Sets is equivalent to the previously described Den neuron subunit. For example, the quantity $J^i$ is equivalent to [a] in Q, the quantity $F^i$ is equivalent to [b] in R, the quantity $E^s$ is equivalent to [c] in chamber R, and the quantity $D^s$ is equivalent to [g] in chamber U. Randomness as described in the mathematical representation of Rellief can be added by increasing the complexity of the Halfgate-Sets system or by other means.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

The invention claimed is:

1. A processing element for an artificial neuron, comprising:
    a first plurality of inputs;
    a continuous value determining portion configured to generate a continuous value signal based on the first plurality of inputs;
    a second plurality of inputs;
    a responsiveness determining portion configured to generate a responsiveness signal corresponding to either a responsive state or a non-responsive state based on the second plurality of inputs; and
    an output value determining portion configured to receive the continuous value signal and the responsiveness signal and generate an output signal, wherein the output signal is equal to a predetermined value when the responsiveness signal corresponds to the non-responsive state and the output signal is equal to the continuous value signal when the responsiveness signal corresponds to the responsive state,
    wherein the continuous value signal is equal to the multiplicative product of a first set of at least two inputs of the first plurality of inputs subtracted from the multiplicative product of a second set of at least two inputs of the first plurality of inputs.

2. The processing element of claim 1, wherein the responsiveness determining portion generates a threshold value based on a pair of inputs of the second plurality of inputs, wherein the responsiveness signal corresponds to the non-responsive state when a first input of the second plurality of inputs is less than the threshold value and the responsiveness signal corresponds to the responsive state when a second input of the second plurality of inputs is less than the threshold value.

3. The processing element of claim 2, wherein the state of the responsiveness signal does not change if the first input of the second plurality of inputs is greater than the threshold value and the second input of the second plurality of inputs is greater than the threshold value.

4. The processing element of claim 3, wherein the threshold value is based on a third input of the second plurality of inputs and a fourth input of the second plurality of inputs.

5. The processing element of claim 4, wherein the threshold value is equal to the third input subtracted from the fourth input.

6. The processing element of claim 1, wherein the first plurality of inputs and the second plurality of inputs have values corresponding to the concentrations of respective solutions of a plurality of solutions.

7. The processing element of claim 6, further comprising:
    an actuator configured to receive the output signal and change the concentration of an output solution based on the output signal.

* * * * *